US012078292B2

(12) United States Patent
Sisto

(10) Patent No.: US 12,078,292 B2
(45) **Date of Patent: *Sep. 3, 2024**

(54) SUPPORT ASSEMBLY AND MOUNTING SYSTEM

(71) Applicant: Salto, LLC, Philadelphia, PA (US)

(72) Inventor: Salvatore Sisto, East Brunswick, NJ (US)

(73) Assignee: Salto, LLC

(*) Notice: Subject to any disclaimer, the term of this patent is extended or adjusted under 35 U.S.C. 154(b) by 1 day.

This patent is subject to a terminal disclaimer.

(21) Appl. No.: 17/863,585

(22) Filed: Jul. 13, 2022

(65) Prior Publication Data

US 2022/0349521 A1 Nov. 3, 2022

Related U.S. Application Data

(63) Continuation-in-part of application No. 17/336,736, filed on Jun. 2, 2021, now abandoned, and a (Continued)

(51) Int. Cl.
*F16M 13/02* (2006.01)
*A47B 96/02* (2006.01)
(Continued)

(52) U.S. Cl.
CPC ......... *F16M 13/025* (2013.01); *A47B 96/022* (2013.01); *A47K 3/125* (2013.01);
(Continued)

(58) Field of Classification Search
CPC .. F16M 13/025; A47B 96/022; A47B 96/024; A47B 96/066; A47B 95/008;
(Continued)

(56) References Cited

U.S. PATENT DOCUMENTS 1,286,588 A 12/1918 Goodykoontz
1,325,143 A 12/1919 Conterio
(Continued)

FOREIGN PATENT DOCUMENTS

DE 29801869 3/1998
DE 19848697 4/2000
(Continued)

OTHER PUBLICATIONS

U.S. Appl. No. 17/336,736, filed Jun. 2, 2021.
(Continued)

*Primary Examiner* — Tan Le
(74) *Attorney, Agent, or Firm* — BELLES KATZ LLC

(57) ABSTRACT

A support assembly that includes a structural member that is delimited by a first end and a second end with a first end cap configured to be at least partially disposed within the first end of the structural member and a second end cap configured to be at least partially disposed within the second end of the structural member to mount the structural member to a structure. The support assembly allows for forces to be applied in all directions without causing rotation or disengagement of the support assembly from a mounting structure.

18 Claims, 136 Drawing Sheets

Related U.S. Application Data continuation of application No. 16/993,471, filed on Aug. 14, 2020, now Pat. No. 11,425,998, and a continuation-in-part of application No. 16/834,033, filed on Mar. 30, 2020, now Pat. No. 11,412,850, said application No. 17/336,736 is a continuation-in-part of application No. 16/528,788, filed on Aug. 1, 2019, now Pat. No. 11,054,083, and a continuation-in-part of application No. 16/360,780, filed on Mar. 21, 2019, now Pat. No. 11,047,160, said application No. 16/528,788 is a continuation-in-part of application No. 16/231,660, filed on Dec. 24, 2018, now Pat. No. 10,506,878, said application No. 16/834,033 is a continuation-in-part of application No. 16/220,435, filed on Dec. 14, 2018, now Pat. No. 11,067,218, and a continuation-in-part of application No. 16/104,046, filed on Aug. 16, 2018, now Pat. No. 10,602,843, said application No. 16/528,788 is a continuation-in-part of application No. 15/877,938, filed on Jan. 23, 2018, now Pat. No. 10,393,311, said application No. 15/877,938 is a continuation of application No. 14/934,429, filed on Nov. 6, 2015, now Pat. No. 9,874,309.

(60) Provisional application No. 62/888,094, filed on Aug. 16, 2019, provisional application No. 62/713,717, filed on Aug. 2, 2018, provisional application No. 62/649,033, filed on Mar. 28, 2018, provisional application No. 62/648,179, filed on Mar. 26, 2018, provisional application No. 62/609,713, filed on Dec. 22, 2017, provisional application No. 62/598,809, filed on Dec. 14, 2017, provisional application No. 62/546,402, filed on Aug. 16, 2017.

(51) Int. Cl.

| | |
|---|---|
| ***A47K 3/12*** | (2006.01) |
| ***A47K 17/02*** | (2006.01) |
| *A47B 95/00* | (2006.01) |
| *A47B 96/06* | (2006.01) |
| *F16B 47/00* | (2006.01) |

(52) U.S. Cl.
CPC .......... *A47K 17/022* (2013.01); *A47B 95/008* (2013.01); *A47B 96/066* (2013.01); *F16B 47/003* (2013.01)

(58) Field of Classification Search
CPC ...... A47K 3/125; A47K 17/022; A47K 17/02; A47F 7/00; F16B 47/003
See application file for complete search history.

(56) References Cited

U.S. PATENT DOCUMENTS 1,540,027 A 6/1925 Ulysses
1,670,455 A 5/1928 Kuhn
1,688,191 A 10/1928 Kuhn
1,832,203 A 11/1931 Gussack
2,048,845 A 7/1936 Danley
2,182,600 A 12/1939 Spetz et al.
2,338,310 A 1/1944 Barnes
2,587,912 A 3/1952 Simpson
2,665,869 A 1/1954 Samuels
2,728,101 A 12/1955 Thorp
2,754,974 A 7/1956 Larson
2,947,093 A 8/1960 Masters
3,260,021 A 7/1966 Katz
3,337,172 A 8/1967 Jackson
3,381,636 A 5/1968 Saiberlich
3,437,214 A 4/1969 Sainsbury
3,507,082 A 4/1970 Heirich
3,527,175 A 9/1970 Kapnek
3,580,397 A 5/1971 Triplett
3,601,926 A 8/1971 Weiher
3,664,622 A 5/1972 Vaccaro
3,669,035 A 6/1972 Grossman
3,675,882 A 7/1972 Dibble
3,704,675 A 12/1972 Bellasalma
3,752,088 A 8/1973 Kapnek
3,848,843 A 11/1974 Levy
3,891,091 A 6/1975 Anderson
3,901,389 A 8/1975 Belokin, Jr.
3,989,215 A 11/1976 Weston
4,022,327 A 5/1977 Anderson
4,102,529 A 7/1978 Neblung et al.
4,112,539 A 9/1978 Hagen
4,131,203 A 12/1978 Bridges
D252,004 S 6/1979 Leventhal
4,160,570 A * 7/1979 Bridges ................ A47F 5/0853 D6/571
4,165,852 A 8/1979 Chervenak
D253,802 S 1/1980 Loud et al.
4,215,840 A 8/1980 Babberl
4,220,316 A 9/1980 Naka et al.
4,311,295 A 1/1982 Jamar, Jr.
4,352,478 A 10/1982 Loew
4,379,945 A * 4/1983 Zwillich ............. H01H 33/002 174/161 R
4,381,715 A 5/1983 Forman
4,399,159 A * 8/1983 Guibert ............. B65D 51/1666 426/106
4,422,616 A 12/1983 Wilke et al.
4,441,433 A 4/1984 Caldwell
4,457,436 A 7/1984 Kelley
4,503,637 A 3/1985 Parente
4,653,714 A 3/1987 Andrasko, Jr.
4,669,690 A 6/1987 McEniry
4,691,887 A 9/1987 Bessinger
4,716,693 A 1/1988 Webster
4,720,069 A 1/1988 Bessinger
4,765,575 A 8/1988 Bergi
4,795,038 A 1/1989 Johnson et al.
4,817,538 A 4/1989 Michaelsen
4,825,601 A 5/1989 Halverson
4,843,977 A 7/1989 Bridges
4,886,236 A 12/1989 Randall
5,042,766 A 8/1991 Baker
5,050,832 A 9/1991 Lee et al.
5,110,080 A 5/1992 Rieman
5,154,384 A 10/1992 Owens
5,178,353 A 1/1993 Huxtable
5,193,786 A 3/1993 Guenther
5,197,612 A 3/1993 Thomson
5,197,703 A 3/1993 Pratolongo
5,303,895 A 4/1994 Hart
5,332,108 A 7/1994 Blass
5,342,014 A 8/1994 Wilson
5,469,682 A 11/1995 Knight
5,513,575 A 5/1996 Slade
6,007,285 A 12/1999 Sisto et al.
6,126,256 A 10/2000 Doces, II
D433,632 S 11/2000 Bender
6,164,610 A 12/2000 Santiago
6,283,566 B1 9/2001 Doces
6,322,039 B1 11/2001 DeLuccia
6,361,129 B1 3/2002 Borgen et al.
6,386,518 B1 5/2002 Shreiner
6,463,754 B1 10/2002 Matesanz
6,763,956 B2 7/2004 Woods
6,830,299 B2 12/2004 Henriott
6,837,384 B2 1/2005 Secondino
7,080,743 B1 7/2006 Wolseth
7,195,125 B1 3/2007 Wolseth
7,225,935 B2 6/2007 Breymaier et al.
7,255,236 B1 8/2007 Sauder et al.
7,441,668 B2 10/2008 O'Malley
7,540,456 B2 6/2009 Thompson
7,708,252 B2 5/2010 Vander Berg

(56) References Cited

U.S. PATENT DOCUMENTS

| | | | | |
|---|---|---|---|---|
| 7,787,190 | B2 | 8/2010 | Mitsuda et al. | |
| 7,802,766 | B2 | 9/2010 | Thompson | |
| D635,809 | S | 4/2011 | O'Brien | |
| 8,020,820 | B2 | 9/2011 | Thompson | |
| 8,033,402 | B1 | 10/2011 | Bevis | |
| 8,042,700 | B1 | 10/2011 | Smalley | |
| 8,070,137 | B2 | 12/2011 | Bennet | |
| 8,082,859 | B2 | 12/2011 | Sevack | |
| 8,225,435 | B2 | 7/2012 | Kik, Jr. et al. | |
| 8,376,299 | B2 | 2/2013 | Burkman | |
| 8,596,473 | B2 | 12/2013 | Newbould | |
| 8,695,253 | B2 | 4/2014 | Bednarski | |
| 8,839,980 | B2 | 9/2014 | Baines | |
| 8,882,065 | B2 | 11/2014 | Henriott et al. | |
| 8,950,600 | B2 | 2/2015 | Sisto | |
| 8,998,008 | B1 | 4/2015 | Robertson | |
| 9,163,415 | B2 | 10/2015 | Nies | |
| 9,185,979 | B1 | 11/2015 | Jenks et al. | |
| 9,453,524 | B2 | 9/2016 | Sisto | |
| 9,521,915 | B1 | 12/2016 | Tanger et al. | |
| 9,668,576 | B2 | 6/2017 | Trunkle | |
| 9,763,515 | B2 | 9/2017 | Fratilla et al. | |
| 9,861,198 | B2 | 1/2018 | Anderson | |
| 9,874,309 | B2 | 1/2018 | Sisto | |
| 10,028,483 | B1 | 7/2018 | Dahl et al. | |
| 10,264,883 | B2 | 4/2019 | Stefenack | |
| 10,393,311 | B2 | 8/2019 | Sisto | |
| 10,412,929 | B2 | 9/2019 | Kasper | |
| 10,463,151 | B2 | 11/2019 | Murphy et al. | |
| 10,480,710 | B2 | 11/2019 | Thompson | |
| 10,506,878 | B2 | 12/2019 | Sisto | |
| 10,524,452 | B2 | 1/2020 | Feldman | |
| 10,575,641 | B1 | 3/2020 | Severa | |
| 10,588,412 | B2 | 3/2020 | Graber et al. | |
| 10,602,843 | B2 | 3/2020 | Sisto | |
| 10,932,441 | B2 | 3/2021 | Martino | |
| 11,047,160 | B2 | 6/2021 | Sisto | |
| 11,054,083 | B2 | 7/2021 | Sisto | |
| 11,067,218 | B2 | 7/2021 | Sisto | |
| 11,412,850 | B2 * | 8/2022 | Sisto | A47B 95/008 |
| 2002/0125389 | A1 | 9/2002 | Chu | |
| 2003/0209642 | A1 | 11/2003 | Fontana et al. | |
| 2004/0089621 | A1 | 5/2004 | Gangloff | |
| 2005/0082242 | A1 | 4/2005 | Hurst | |
| 2005/0121576 | A1 * | 6/2005 | Moran | A61B 90/39 248/222.11 |
| 2005/0189308 | A1 | 9/2005 | Warner et al. | |
| 2005/0247653 | A1 | 11/2005 | Brooks | |
| 2006/0197002 | A1 | 9/2006 | Dute et al. | |
| 2007/0045492 | A1 * | 3/2007 | Moran | F41C 33/006 248/222.11 |
| 2008/0169255 | A1 * | 7/2008 | Kokenge | A47F 5/0807 211/106.01 |
| 2008/0179476 | A1 | 7/2008 | McGinness et al. | |
| 2008/0224004 | A1 | 9/2008 | Gallien | |
| 2009/0224119 | A1 | 9/2009 | Heffernan | |
| 2010/0171019 | A1 * | 7/2010 | Funston | B65F 1/141 248/312.1 |
| 2010/0308186 | A1 | 12/2010 | Thompson | |
| 2011/0155880 | A1 | 6/2011 | Stimpson | |
| 2011/0266404 | A1 | 11/2011 | Hsu | |
| 2011/0315647 | A1 | 12/2011 | Andersson | |
| 2012/0049024 | A1 * | 3/2012 | Smith | F16M 11/041 248/222.14 |
| 2012/0091086 | A1 * | 4/2012 | Gregory | A47B 96/067 211/183 |
| 2012/0286117 | A1 | 11/2012 | Leary | |
| 2014/0238947 | A1 | 8/2014 | Hao | |
| 2015/0182024 | A1 | 7/2015 | Nies | |
| 2015/0252603 | A1 | 9/2015 | Cianetti | |
| 2017/0067276 | A1 | 3/2017 | Apodaca | |
| 2018/0168348 | A1 | 6/2018 | Carnelos et al. | |
| 2018/0355665 | A1 | 12/2018 | Seuberling | |
| 2019/0186686 | A1 | 6/2019 | Sisto | |
| 2020/0221871 | A1 | 7/2020 | Sisto | |
| 2021/0285599 | A1 | 9/2021 | Sisto | |

FOREIGN PATENT DOCUMENTS

| | | |
|---|---|---|
| DE | 102009008207 | 8/2010 |
| DE | 102011112029 | 3/2013 |
| EP | 0750464 | 6/1998 |
| EP | 1793129 | 6/2007 |
| GB | 2293963 | 4/1996 |
| JP | 2004332404 | 11/2004 |
| JP | 2005348954 | 12/2005 |
| JP | 2011092626 | 5/2011 |
| WO | WO2015031960 | 3/2015 |
| WO | WO2017001422 | 1/2017 |

OTHER PUBLICATIONS

U.S. Appl. No. 16/993,471, filed Aug. 14, 2020.
U.S. Appl. No. 16/834,033, filed Mar. 30, 2020.
U.S. Appl. No. 16/528,788, filed Aug. 1, 2019.
U.S. Appl. No. 16/360,780, filed Mar. 21, 2019.
U.S. Appl. No. 16/220,435, filed Dec. 14, 2018.
U.S. Appl. No. 16/104,046, filed Aug. 16, 2018.
U.S. Appl. No. 15/877,938, filed Jan. 23, 2018.
U.S. Appl. No. 14/934,429, filed Nov. 6, 2015.
U.S. Appl. No. 16/231,660, filed Dec. 24, 2018.

* cited by examiner

SUPPORT ASSEMBLY AND MOUNTING SYSTEM

CROSS-REFERENCE TO RELATED APPLICATIONS

This application is a continuation-in-part of U.S. patent application Ser. No. 17/336,736, filed Jun. 2, 2021, which is a continuation-in-part of U.S. patent application Ser. No. 16/528,788, filed Aug. 1, 2019, now U.S. Pat. No. 11,054, 083, which is a continuation-in-part of U.S. patent application Ser. No. 15/877,938, filed Jan. 23, 2018, now U.S. Pat. No. 10,393,311, which is a continuation of U.S. patent application Ser. No. 14/934,429, filed Nov. 6, 2015, now U.S. Pat. No. 9,874,309.

U.S. patent application Ser. No. 17/336,736 is also a continuation-in-part of U.S. patent application Ser. No. 16/360,780 filed Mar. 21, 2019, now U.S. Pat. No. 11,047, 160, which claims priority to U.S. Provisional Application No. 62/649,033 filed Mar. 28, 2018 and U.S. Provisional Application No. 62/713,717 filed Aug. 2, 2018.

U.S. patent application Ser. No. 16/528,788 is also a continuation-in-part of U.S. patent application Ser. No. 16/231,660, filed Dec. 24, 2018, now U.S. Pat. No. 10,506, 878, which claims priority to U.S. Provisional Patent Application Ser. No. 62/609,713, filed Dec. 22, 2017.

The present application is also a continuation-in-part of U.S. patent application Ser. No. 16/834,033, filed Mar. 30, 2020, which is a continuation in part of U.S. patent application Ser. No. 16/104,046, filed on Aug. 16, 2018, now U.S. Pat. No. 10,602,843, which claims the benefit of priority to U.S. Provisional Patent Application Ser. No. 62/546,402, filed Aug. 16, 2017.

U.S. patent application Ser. No. 16/834,033 is also a continuation-in-part of U.S. patent application Ser. No. 16/220,435 filed Dec. 14, 2018, now U.S. Pat. No. 11,067, 218, which claims priority to U.S. Provisional Application No. 62/598,809 filed Dec. 14, 2017 and U.S. Provisional Application No. 62/648,179 filed Mar. 26, 2018.

This application is also a continuation of U.S. patent application Ser. No. 16/993,471, filed Aug. 14, 2020, which claims priority to U.S. Provisional Application No. 62/888, 094, filed Aug. 16, 2019.

The entireties of the aforementioned applications are hereby incorporated herein by reference.

BACKGROUND

In one aspect, the present invention relates generally to a supporting structure and more particularly to a support assembly that is mountable between two converging structures.

Support assemblies that are mountable in a corner of a room between two converging walls are known. These support assemblies, such as footrests, grab bars, and shelving systems are commonly used, for example, in household showers, locker rooms, spas and the like. However, existing support assemblies do not allow for any significant force to be applied thereon without the support assembly rotating and/or becoming disengaged from a fixed position. As such, an individual can be severely injured due to the limited force that can safely sustained by known support assemblies.

Further, the present application also relates to racks for removable storage of containers in the form of bottles such as wine or other bottles.

Numerous types of racks are available for storage and display of containers such as wine or other bottles. Some storage racks are complex structures with many different components or parts, which are visually unattractive and more utilitarian in nature rather than ornamental. It is desirable to provide a container storage rack which combines the utilitarian aspects of the rack with a visually attractive and simple appearance that is aesthetically pleasing for displaying the containers in a public or private space.

In another aspect, the present invention relates generally to wall mounting systems and more particularly to mounting systems for fastening an accessory item, such as a shelf or other object, to a wall in an esthetically pleasing manner.

There are many instances where it is desirable to attach an accessory object or item to a wall, ceiling, or other surface. When sufficient structure exists to support the item, such as wood, metal, or masonry substructure, there are a variety of fasteners that will securely attach the item to the surface. However, hollow walls, ceilings, or other surfaces can present a situation where there is no structure behind the particular location of the fastener. For simplicity, the term "wall" will be understood to include walls, ceilings, or any other surface to which a fastener is attached. This presents a problem in that normal fasteners such as screws and nails can be easily pulled out from the wall because the wall material itself (drywall, for example) does not provide the required structure to securely hold the fastener.

Several types of fasteners exist that are specifically designed for use in a hollow wall. However, these designs often require force-distributing elements, such as plates or washers, on the wall surface that can be unsightly. These force-distributing elements can also create a space or gap between the exposed surface or face of the wall and the item being fastened to the wall. This space can cause an opening into which foreign material (such as food in a commercial kitchen) can fall and become lodged. In addition, the force-distributing elements may remain visible after the accessory item is mounted to the wall which may not be esthetically pleasing.

Accordingly, improved mounting systems that include some means of covering the force-distributing elements that also covers any space caused be the force-distributing elements are needed.

In yet another aspect, the present invention relates generally to doors, and more particularly to a door support and mounting assembly for mounting doors in a suspended sliding manner.

Sliding doors such as barn style door or similar are mounted in a suspended and linear sliding manner from an overhead support system of some type. This contrasts to conventional door mounting hardware which pivotably mount the doors via hinges to the vertical door jambs that define the doorway. Sliding doors do not consume the same room space necessary to operate a pivotably mounted door, and are therefore beneficial in tight spaces or other situations where a slidable door mounting is a desirable option. There are however drawbacks to current mounting hardware for sliding doors.

Hardware for mounting barn style doors typically use a fixed rail track and relatively large diameter pulley wheels which are attached to the door and roll along the rail as the door is opened or closed. U.S. Patent Application Publication No. 2017/0067276 discloses such an arrangement as an example. When the door is pushed in a direction along the rail, these large diameter pulleys are conducive for imparting significant momentum to the door once it starts rolling in a somewhat uncontrolled manner. The doors may therefore strike the ends of the track with considerable force causing damage and/or hardware mounting the track to the wall.

Another drawback to suspended barn style door mounting systems is a lack of means to resistant the door from moving and swaying in and out in a plane transverse to the direction of travel when a user pushes or leans against the large front/back side of the door. This can push the door off the rail and/or cause damage to the building structure. In addition, yet another drawback is that the mounting hardware for suspended sliding doors is sometimes bulky and unrefined in ornamental appearance, thereby limiting application of such installations to situations where aesthetics is not an overriding consideration. Thus, improvements are desired in suspended sliding door mounting hardware.

BRIEF SUMMARY

The present invention is directed, in part, to a support assembly that allows for significant forces to be applied in all directions without causing rotation or disengagement of the support assembly from a mounting structure. This is because, as will be described in more detail below, the end caps of the support assembly are not mounted in parallel to each other. As a result, the rotational axes of the end caps contrast each other and in turn stabilize a structure extending between and from the end caps. Moment forces only exist in the area of the structure that exceeds the axes of the end caps. As such, the moment forces are minimized and the torsion forces are negated by opposing each other resulting in an assembly that is stable and does not rotate upon a force being applied thereto.

In one aspect, the invention may be a support assembly comprising: a first end cap configured to be coupled to a first support surface; a second end cap configured to be coupled to a second support surface that is substantially perpendicular to the first support surface; each of the first and second end caps comprising a block element; a support member comprising a first end face and a second end face, the first end face lying in a first plane and the second end face lying in a second plane that is substantially perpendicular to the first plane; a first slot formed into the first end face of the support member and a second slot formed into the second end face of the support member; and wherein the support member is coupled to the first and second end caps so that the block element of the first end cap is positioned within the first slot and the block element of the second end cap is positioned within the second slot to mount the support member from the first and second support surfaces.

In another aspect, the invention may be a support assembly comprising: a support member extending along a first axis and comprising a first end oriented at a first angle that is oblique relative to the first axis and a second end oriented at a second angle that is oblique relative to the first axis; a first end cap being mountable to a first support surface, the first end cap comprising a first body having a front surface and a rear surface and a first block element extending from the front surface; and a second end cap being mountable to a second support surface that is substantially perpendicular to the first support surface, the second end cap comprising a second body having a front surface and a rear surface and a second block element extending from the front surface; and wherein the support member is mounted to the first and second end caps with the first block element of the first end cap disposed within the first end of the support member and the second block element of the second end cap is disposed within the second end of the support member.

The present invention is also directed, in part, to a mounting system which provides an esthetically pleasing and secure anchoring system for attaching an accessory object or item to a hollow wall. This is accomplished by a special cover plate design that covers force-distributing mounting elements (e.g. plates or washers) on the surface of the wall and also covers any gap between the wall surface and the item or structural support for the item being fastened to the wall. Such accessory items may include shelves, soap dispensers, or other items. In some implementations, the mounting element and cover may be omitted and the accessory item or structural support for the item may be fastened directly to the wall, which may be hollow or solid. In one configuration, a cantilevered rectilinear perimeter frame may be mounted to the wall; which frame in turn supports the accessory item. The frame defines an upwardly open receptacle which receives at least a portion of the accessory item insert (e.g. shelf insert) therein. Various possible configurations and constructions of shelf inserts are disclosed herein. In another configuration, the item may be a linearly elongated frameless shelf.

According to one aspect, a mounting system for fastening an item to a wall includes: a force-distributing plate configured to be positioned against an outer surface of the wall and between the item and the outer surface of the wall, the force-distributing plate creating a gap between the item and the outer surface of the wall; a cover that, when in an installed position, covers the force-distributing plate, the gap and an upper edge of the item, the cover having a first rear face and a second rear face; and a fastener that extends through the cover, the item, and the force-distributing plate and is configured to fasten the cover, the item, and the force-distributing plate to the wall; wherein the first rear face of the cover contacts the item in an installed position, and the second rear face of the cover contacts the outer surface of the wall in the installed position.

According to another aspect, a mounting system for fastening an accessory to a wall includes: a support structure configured for mounting an accessory thereto, the support structure comprising a plurality of side elements each including a vertical portion and a horizontal portion; a force-distributing plate configured to be positioned against an outer surface of the wall and between the wall and a mountable one of the side elements configured for fastening to the wall, the force-distributing plate creating a gap between the mountable one of the side elements and the outer surface of the wall; a cover configured to cover the force-distributing plate, the gap, and the mountable one of the side elements adjacent to the force-distributing plate, the cover having a first rear face and a second rear face; a fastener that extends through the cover, the mountable one of the side elements, and the force-distributing plate, the fastener being configured to fasten the cover, the mountable one of the side elements, and the force-distributing plate to the wall in stacked relationship; wherein the first rear face of the cover contacts the one of the side elements in an installed position, and the second rear face of the cover contacts the outer surface of the wall in the installed position. In one embodiment, the accessory is a shelf. In another embodiment, the accessory is a soap dispenser.

A method for mounting an item to a wall is also provided. The method includes: providing an item to be mounted to the wall, a cover, and a force-distributing plate configured for placement against a surface of the wall; forming an assembly by inserting in order a threaded shaft of the fastener with an expansion part coupled to the shaft through a hole in the cover, a hole in the item, a hole in the force-distributing plate, and a pre-drilled hole in the wall; abuttingly engaging the force-distributing plate against the wall; and tightening the fastener, wherein the expansion part changes from an unexpanded state prior to tightening to an expanded state securing the item to the wall.

According to another aspect, a shelf support system comprises: a wall defining an outer surface; a perimeter frame formed by a plurality of side elements, at least one of the side elements mounted to the wall which supports the perimeter frame in a cantilevered manner; the perimeter frame defining an upwardly open receptacle; and a shelf insert inserted into the upwardly open receptacle, the perimeter frame circumscribing the shelf insert and at least partially concealing a side surface of the shelf insert, a top surface of the shelf insert being exposed.

According to another aspect, a shelf support system comprises: a wall defining an outer surface; a perimeter frame formed by a plurality of side elements, at least one of the side elements mounted to the wall which supports the perimeter frame in a cantilevered manner; the perimeter frame defining an upwardly open receptacle; and a shelf insert including a lower portion inserted into the upwardly open receptacle and an upper portion defining a top surface which extends beyond top edges of the side elements of the perimeter frame which are not mounted to the wall to form cantilevered overhangs.

The present invention is also directed, in part, to a mounting system for hanging a door in a suspended and sliding "barn style" manner from the building structure that overcomes the shortcomings of prior door mounting hardware. The door mounting system disclosed herein has improved aesthetics while including features that provide smooth operation and sufficient structural strength for hanging the door. Advantageously, the present door mounting system further includes provisions which reduce the rolling momentum of the door and prevents sway in a plane transverse to the door's direction of travel. The mounting system may variously be used with door systems having a single or double operating doors. In addition, the mounting system may be used with any type of sliding door in various environments and applications such as shower doors, closet doors, interior or exterior doors, and others.

In one non-limiting embodiment, a door mounting system for sliding translation of a door includes a horizontally/longitudinally elongated support rail, a pair of wall mounts such as standoffs rigidly anchoring the support rail to a vertical support surface, a door bracket movably engaging the support rail, and a door supported by the door bracket in a suspended manner, wherein the door is linearly translatable along the support rail. The mounting system may further comprise a linear needle roller bearing disposed at an interface between the door bracket and the support rail to facilitate sliding movement of the door bracket along the support rail and/or a nylon bearing sheet attached to the door bracket and slideably engaging a side surface of the support rail. The door bracket may include a hook-shaped hanger and an anti-sway bracket in one embodiment which is configured to arrest movement of the door in a plane transverse to the door's direction of travel. In one construction, the support rail, door bracket, and mounting standoffs may be formed of stainless steel for moist operating environments such as bathrooms.

In one aspect, a door mounting system for sliding translation of a door includes: a longitudinally elongated support rail defining a horizontally oriented mounting axis; a pair of wall mounts rigidly anchoring the support rail to a vertical support surface; a door bracket movably engaging the support rail; a door supported by the door bracket in a suspended manner; and a linear roller bearing disposed at an interface between the door bracket and support rail to facilitate movement of the mounting bracket along the support rail; wherein the door is linearly translatable along the support rail.

According to another aspect, a door mounting system for sliding translation of a door includes: a longitudinally elongated support rail defining a mounting axis; a pair of wall mounts rigidly anchoring the support rail to a vertical support surface; a door bracket movably engaging the support rail, the door bracket including a pair of open ends and rearwardly open channel extending between the ends, the channel slideably receiving the support rail therein; a door supported by the door bracket in a suspended manner; and a linear roller bearing disposed at an interface between the door bracket and support rail inside the channel to facilitate movement of the mounting bracket along the support rail; wherein the door is linearly translatable along the support rail via rolling engagement between the roller bearing and the door bracket.

According to another aspect, a method for using a mounting system for sliding translation of a door includes: providing a longitudinally elongated support rail defining a mounting axis, a pair of elongated wall mounts rigidly attached to the support rail, a door bracket including an opposing pair of open ends and a rearwardly open channel extending between the ends, and a linear roller bearing disposed inside the channel; attaching the door bracket to a door; anchoring the support rail to a vertical support surface of a building; lifting the door with attached door bracket; inserting the support rail through the open ends of the door bracket into the channel; engaging the linear roller bearing with a top surface of the support rail; and sliding the door in one of two direction on the support rail.

In some embodiments, the method may further include: the door bracket further including an anti-sway clip; applying a lateral transverse force against the door; and engaging a stop surface of the anti-sway clip with the support rail to arrest motion of the door in a plane transverse to the mounting axis.

In yet other embodiments, the method may further include: the linear roller bearing having a U-shaped body comprising a top wall and at least one lateral sidewall extending downwards from the top wall, the top wall including a plurality of top needle rollers engaging the top surface of the support rail, and the at least one lateral sidewall including a plurality of lateral needle rollers oriented transversely to the top needle rollers; and the step of applying the lateral transverse force against the door further engages an upper rear surface of the support rail with the lateral needle rollers and the anti-sway clip engages a lower rear surface of the support rail to arrest motion of the door in a plane transverse to the mounting axis.

In yet other embodiments, the method may further include: the linear roller bearing having a U-shaped body comprising a top wall and at least one sidewall extending downwards from the top wall, the top wall including a plurality of top needle rollers engaging the top surface of the support rail, and the at least one sidewall including a plurality of lateral needle rollers oriented transversely to the top needle rollers; applying a lateral transverse force against the door; and engaging a rear surface of the support rail with the lateral needle rollers to arrest motion of the door in a plane transverse to the mounting axis.

In another aspect, a roller bearing includes: a U-shaped body comprising a top wall and a pair of lateral sidewalls extending downwards from the top wall; the top wall including a plurality of top needle rollers configured and arranged to engage a corresponding first planar support surface of a support structure; the sidewalls each including a plurality of lateral needle rollers configured and arranged to engage corresponding second and third planar support surfaces of the support structure which are each oriented perpendicularly to the first planar support surface.

In one aspect, the present invention is directed to a floating shelf apparatus that includes a floating shelf and a mounting bracket that may be attached to a wall, whereby the floating shelf includes a support surface for supporting external objects.

The invention is directed to a floating shelf apparatus that includes a mounting bracket and a shelf. The mounting bracket is coupled directly to a support surface such as a wall and the shelf is mounted to the support surface to hang the shelf from the support surface. The mounting bracket includes a first portion that is coupled to the wall, a second portion having an S-shape that extends from a first end of the first portion, and a third portion having a linear shape that extends from a second end of the first portion. The shelf includes a ledge portion upon which items may be supported and a mounting portion that facilitates mounting the shelf to the mounting bracket. The mounting portion has a mounting element that interacts with the second portion of the mounting bracket to mount the shelf to the mounting bracket.

In another aspect, the invention may be a floating shelf apparatus comprising: a shelf comprising a ledge portion and a mounting portion, the mounting portion comprising a mounting element and a mounting cavity having an open rear end; a mounting bracket comprising: a first portion having a front surface and a rear surface opposite the front surface, the first portion extending from a first end to a second end along a longitudinal axis, wherein the first portion is configured to couple the mounting bracket to a wall with the rear surface of the first portion facing the wall; a second portion having a first leg that extends from the first end of the first portion in an upward direction that is oblique to the front surface of the first portion; and a third portion extending from the second end of the first portion in a downward direction that is oblique to the front surface of the first portion; and wherein the second and third portions of the mounting bracket are located within the mounting cavity of the mounting portion of the shelf and the mounting element of the mounting portion of the shelf interacts with at least one of the second and third portions of the mounting bracket to mount the shelf to the mounting bracket and hang the shelf from the wall.

In another aspect, the invention may be a floating shelf apparatus comprising: a shelf comprising a ledge portion and a mounting portion, the mounting portion comprising a mounting element; a mounting bracket comprising: a first portion configured to be coupled to a wall with a rear surface of the first portion facing the wall, the rear surface lying in a plane; and a second portion comprising: a first leg extending upwardly from a first end of the first portion in a direction away from the plane and being oblique to the plane; a second leg extending upwardly from the first leg in a direction towards the plane and being oblique to the plane; and a third leg extending from the second leg in a direction away from the plane and being perpendicular to the plane; and wherein the mounting element of the shelf interacts with the third leg of the second portion of the mounting bracket to mount the shelf to the mounting bracket and hang the shelf from the wall.

In yet another aspect, the invention may be a floating shelf apparatus comprising: a shelf comprising a ledge portion and a mounting portion, the mounting portion comprising a mounting element; a mounting bracket comprising: a first portion configured to be coupled to a wall with a rear surface of the first portion facing the wall, the rear surface lying in a plane; and a second portion extending from the first portion and comprising a top surface that is generally perpendicular to the plane, the top surface transitioning into a bent portion that faces the plane and is spaced apart from the plane by a gap; and wherein the mounting element of the shelf comprises a first portion that rests atop the top surface of the second portion of the mounting bracket and a second portion that extends into the gap between the bent portion of the second portion of the mounting bracket and the plane to mount the shelf to the mounting bracket.

The invention may be directed to a shelf system for mounting a shelf to a wall, which includes a shelf having a rear edge and first and second shelf fasteners coupled to the shelf and protruding from the rear edge. The shelf system may also include a mounting bracket assembly for mounting directly to a wall and to which the shelf is to be coupled. The mounting bracket assembly may include first and second shelf engaging portions that have mounting apertures therethrough. Wall fasteners may extend through the mounting apertures of the first and second shelf engaging portions to mount the mounting bracket assembly to the wall. The portions of the first and second shelf fasteners which protrude from the rear edge of the shelf may be inserted into the mounting apertures of the first and second shelf engaging portions of the mounting bracket assembly to couple the shelf to the mounting bracket assembly.

In one aspect, the invention may be a shelf system for mounting a shelf to a wall, the shelf system comprising: a shelf comprising a rear edge; a first shelf fastener and a second shelf fastener coupled to the shelf, a first portion of each of the first and second shelf fasteners protruding from the rear edge of the shelf; a mounting bracket assembly configured to be mounted to a wall, the mounting bracket assembly comprising: a first shelf engaging portion configured to extend from the wall to a distal end and comprising an inner surface that defines a cavity that extends along a cavity axis that is perpendicular to the wall when the mounting bracket assembly is mounted to the wall; and a second shelf engaging portion configured to extend from the wall to a distal end and comprising an inner surface that defines a cavity that extends along a cavity axis that is perpendicular to the wall when the mounting bracket assembly is mounted to the wall; and wherein the first portions of the first and second shelf fasteners are positioned within the cavities of the first and second shelf engaging portions of the mounting bracket assembly, respectively, to couple the shelf to the mounting bracket assembly, at least a portion of the rear edge of the shelf which is adjacent to the distal ends of the first and second shelf engaging portions of the mounting bracket assembly being spaced apart from the wall.

In another aspect, the invention may be a shelf system for mounting a shelf to a wall, the shelf system comprising: a shelf having a front edge, a rear edge, and a support surface extending from the front edge to the rear edge; a first shelf fastener comprising a first portion and a second portion, the second portion being embedded within the shelf and the first portion protruding from the rear edge of the shelf; a second shelf fastener comprising a first portion and a second portion, the second portion being embedded within the shelf and the first portion protruding from the rear edge of the shelf; a first mounting bracket comprising a rear surface configured to abut an outer surface of a wall and a distal end, a first opening in the distal end, a second opening in the rear surface, and a first mounting aperture extending through the first mounting bracket along a first cavity axis from the first opening to the second opening, the first mounting aperture comprising a first portion located adjacent to the distal end and having a first transverse cross-sectional area and a second portion located adjacent to the rear surface and comprising a second transverse cross-sectional area that is less than the first transverse cross-sectional area; a second mounting bracket comprising a rear surface configured to abut the outer surface of the wall and a distal end, a first opening in the distal end, a second opening in the rear surface, and a second mounting aperture extending through the second mounting bracket along a second cavity axis from the first opening to the second opening, the second mounting aperture comprising a first portion located adjacent to the distal end and having a first transverse cross-sectional area and a second portion located adjacent to the rear surface and comprising a second transverse cross-sectional area that is less than the first transverse cross-sectional area; a first wall fastener inserted through the first opening in the distal end of the first mounting bracket to mount the first mounting bracket to the wall, a first portion of the first wall fastener located in the first portion of the first mounting aperture of the first mounting bracket, a second portion of the first wall fastener located in the second portion of the first mounting aperture of the first mounting bracket, and a third portion of the first wall fastener protruding from the rear surface of the first mounting bracket and configured for insertion into the wall; a second wall fastener inserted through the first opening in the distal end of the second mounting bracket to mount the second mounting bracket to the wall, a first portion of the second wall fastener located in the first portion of the second mounting aperture of the second mounting bracket, a second portion of the second wall fastener located in the second portion of the second mounting aperture of the second mounting bracket, and a third portion of the second wall fastener protruding from the rear surface of the second mounting bracket and configured for insertion into the wall; and wherein the shelf is mounted to the first and second mounting brackets by inserting the first portion of the first shelf fastener into the first mounting aperture of the first mounting bracket through the first opening in the distal end of the first mounting bracket and inserting the first portion of the second shelf fastener into the second mounting aperture of the second mounting bracket through the first opening in the distal end of the second mounting bracket.

In yet another aspect, the invention may be a method of mounting a shelf to a wall, the method comprising: positioning a rear surface of a mounting bracket assembly against an outer surface of a wall, first and second shelf engaging portions of the mounting bracket assembly protruding from the outer surface of the wall; inserting a first wall fastener through a first opening in a distal end of the first shelf engaging portion until a portion of the first wall fastener extends through a second opening in the rear surface of the mounting bracket assembly and into the wall; inserting a second wall fastener through a first opening in a distal end of the second shelf engaging portion until a portion of the second wall fastener extends through a third opening in the rear surface of the mounting bracket assembly and into the wall; aligning a first shelf fastener protruding from a rear edge of the shelf with the first opening in the distal end of the first shelf engaging portion of the mounting bracket assembly and aligning a second shelf fastener protruding from the rear edge of the shelf with the first opening in the distal end of the second shelf engaging portion of the mounting bracket assembly; and moving the shelf towards the wall so that: the first shelf fastener extends through the first opening in the distal end of the first shelf engaging portion of the mounting bracket assembly and nests within a first cavity of the first shelf engaging portion of the mounting bracket assembly; and the second shelf fastener extends through the first opening in the distal end of the second shelf engaging portion of the mounting bracket assembly and nests within a second cavity of the second shelf engaging portion of the mounting bracket assembly.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 112 is an end view thereof;

FIG. 113 is a rear perspective view of a door bracket of the door mounting systems of FIGS. 105 and 109;

FIG. 114 is a rear perspective view thereof;

FIG. 115 is a rear view thereof;

FIG. 116 is a front view thereof;

FIG. 117 is an end view thereof;

FIG. 118 is a top plan view thereof

FIG. 119 is a perspective view of a linear needle roller bearing of the door mounting systems of FIGS. 105 and 109;

FIG. 120 is an alternative embodiment of a base plate of the door mounting systems of FIGS. 1 and 5;

FIG. 121 is a perspective view of an alternative embodiment of a U-shaped linear roller bearing;

FIG. 122 is an enlarged view thereof taken from FIG. 121;

FIG. 123 is a bottom view thereof;

Figure 3:
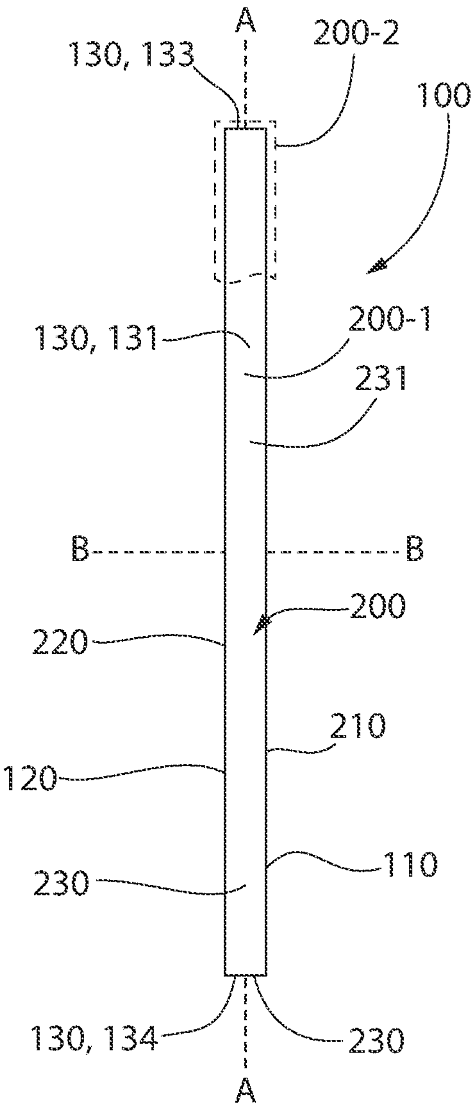
FIG. 3 is a front view of the rack apparatus of FIG. 1 looking towards the support structure.
Figure 4:
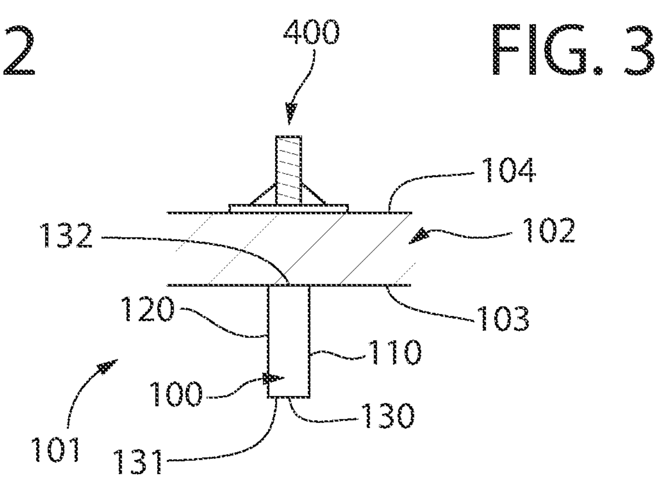
FIG. 4 is a top view of the rack apparatus of FIG. 1 in the installed state.
Figure 5:
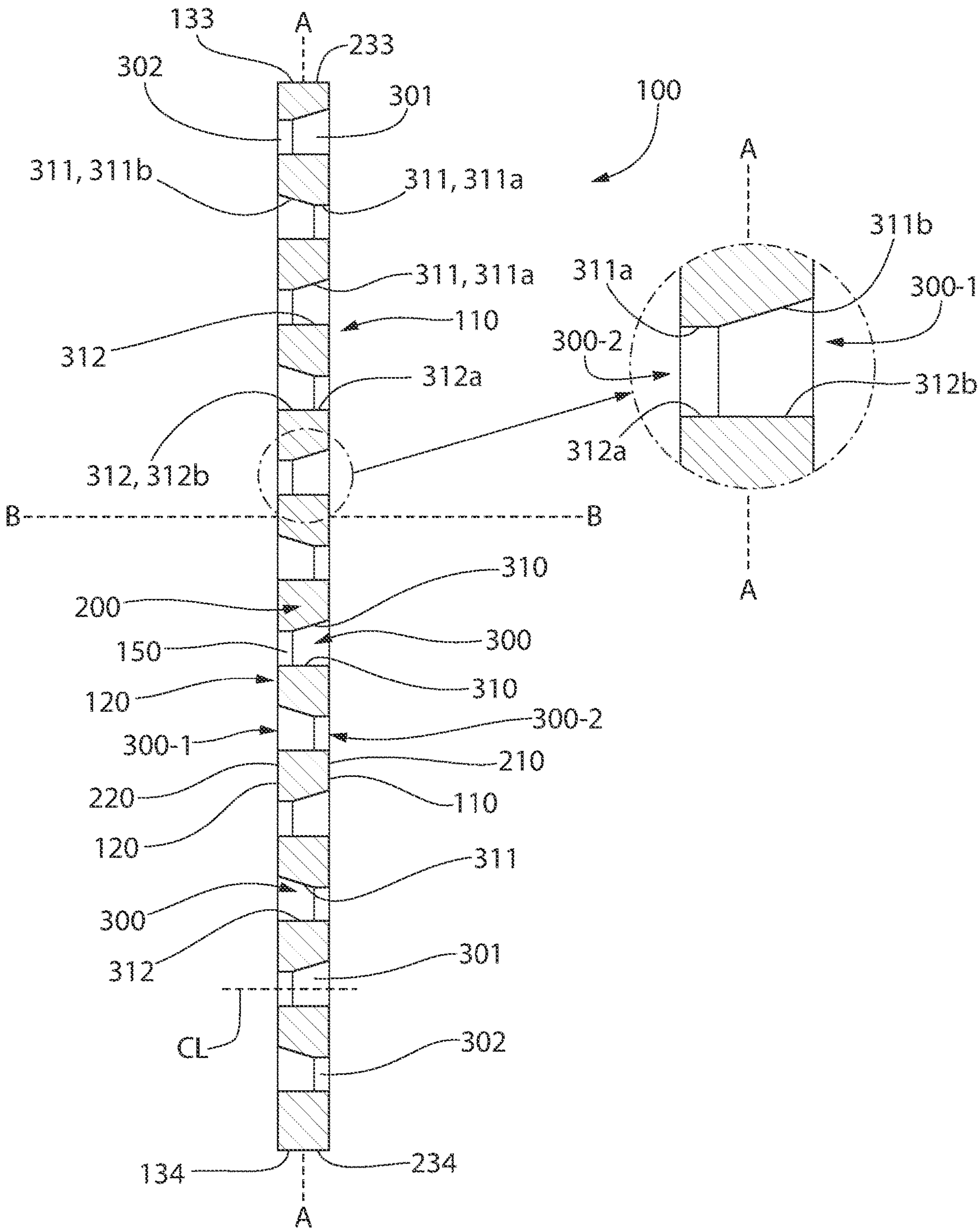
FIG. 5 is a cross-sectional view of the rack apparatus along line V-V of FIG. 2.
Figure 105:
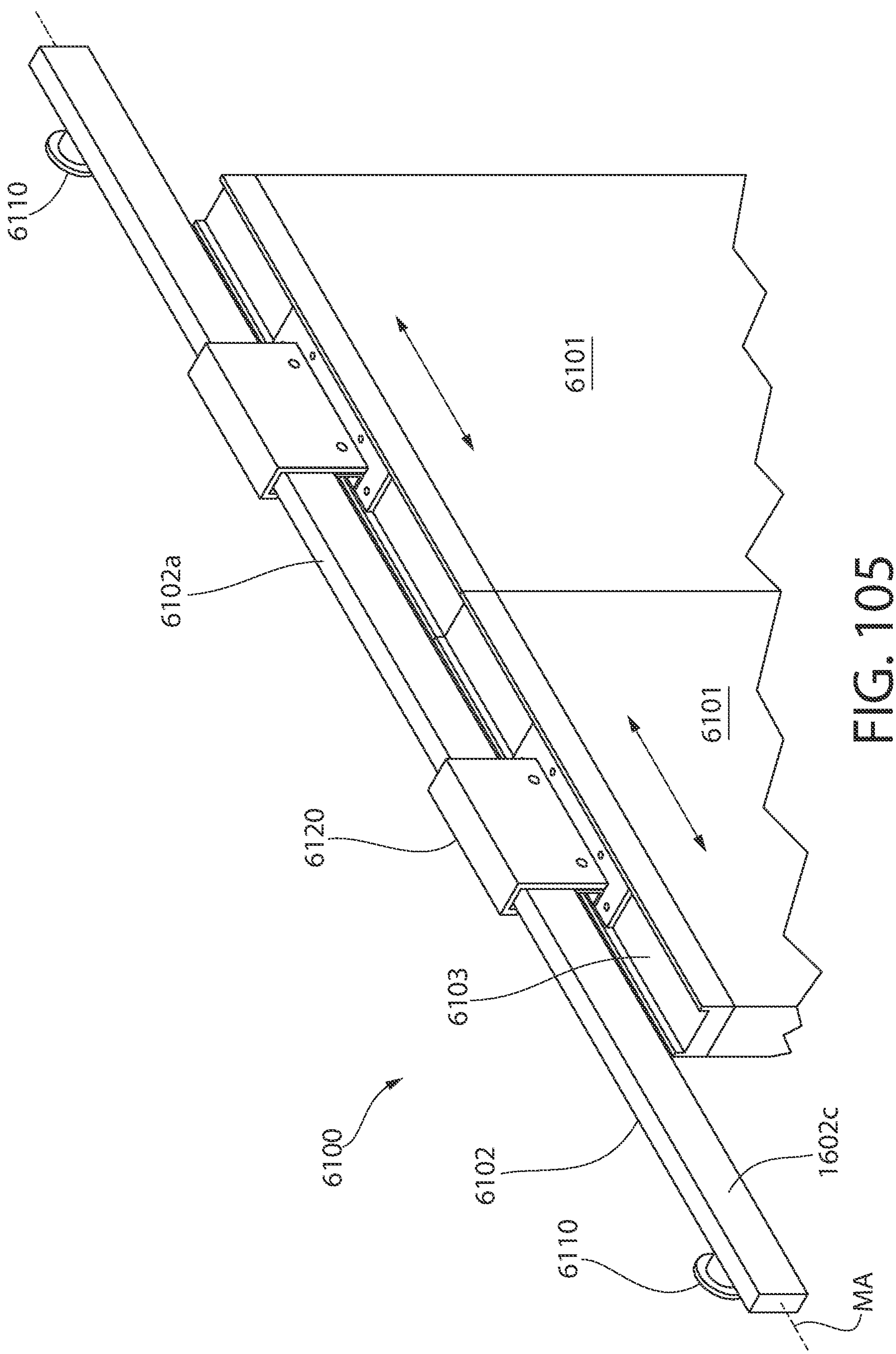
FIG. 105 is a perspective view of a sliding door mounting system according to an embodiment of the present disclosure.
Figure 106:
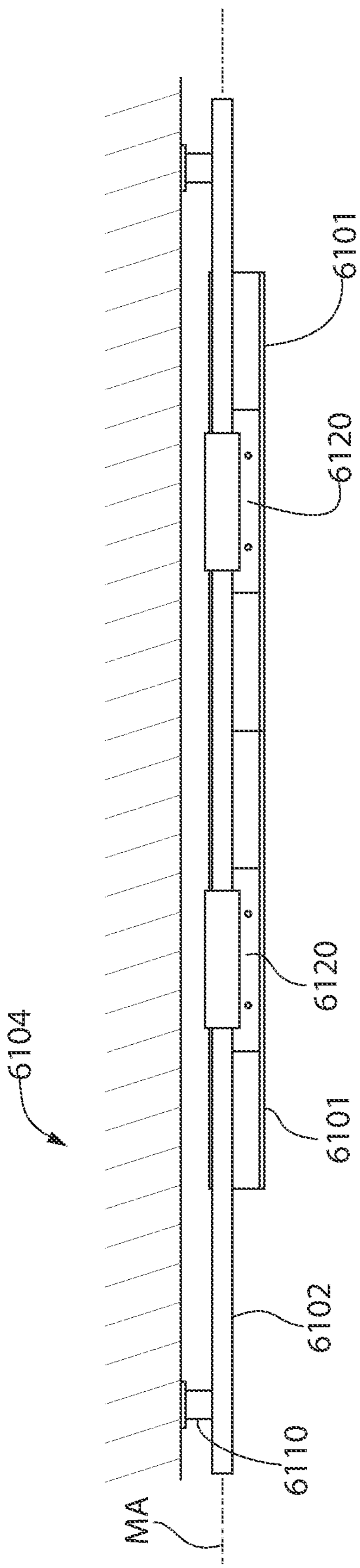
FIG. 106 is a top view thereof.
Figure 107:
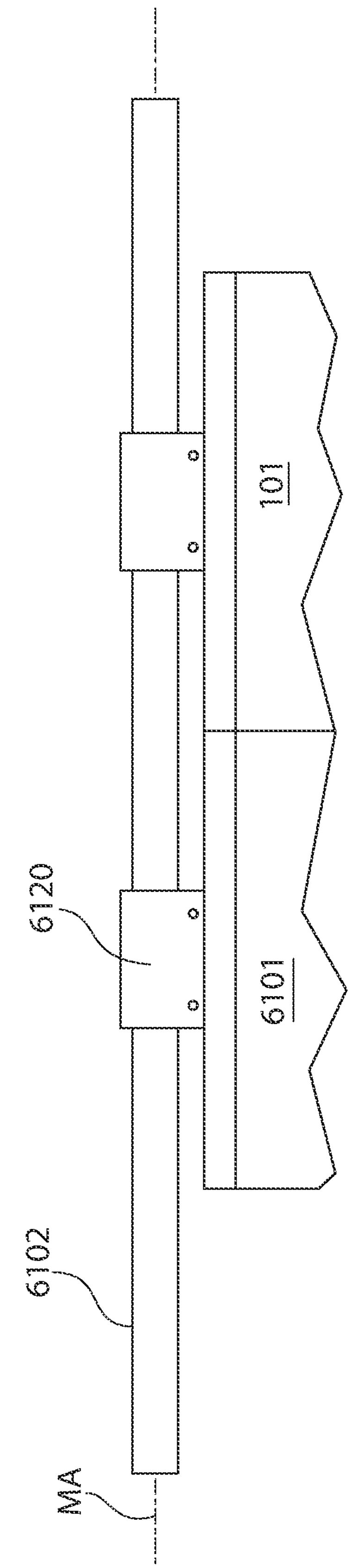
FIG. 107 is a front view thereof.
Figure 108:
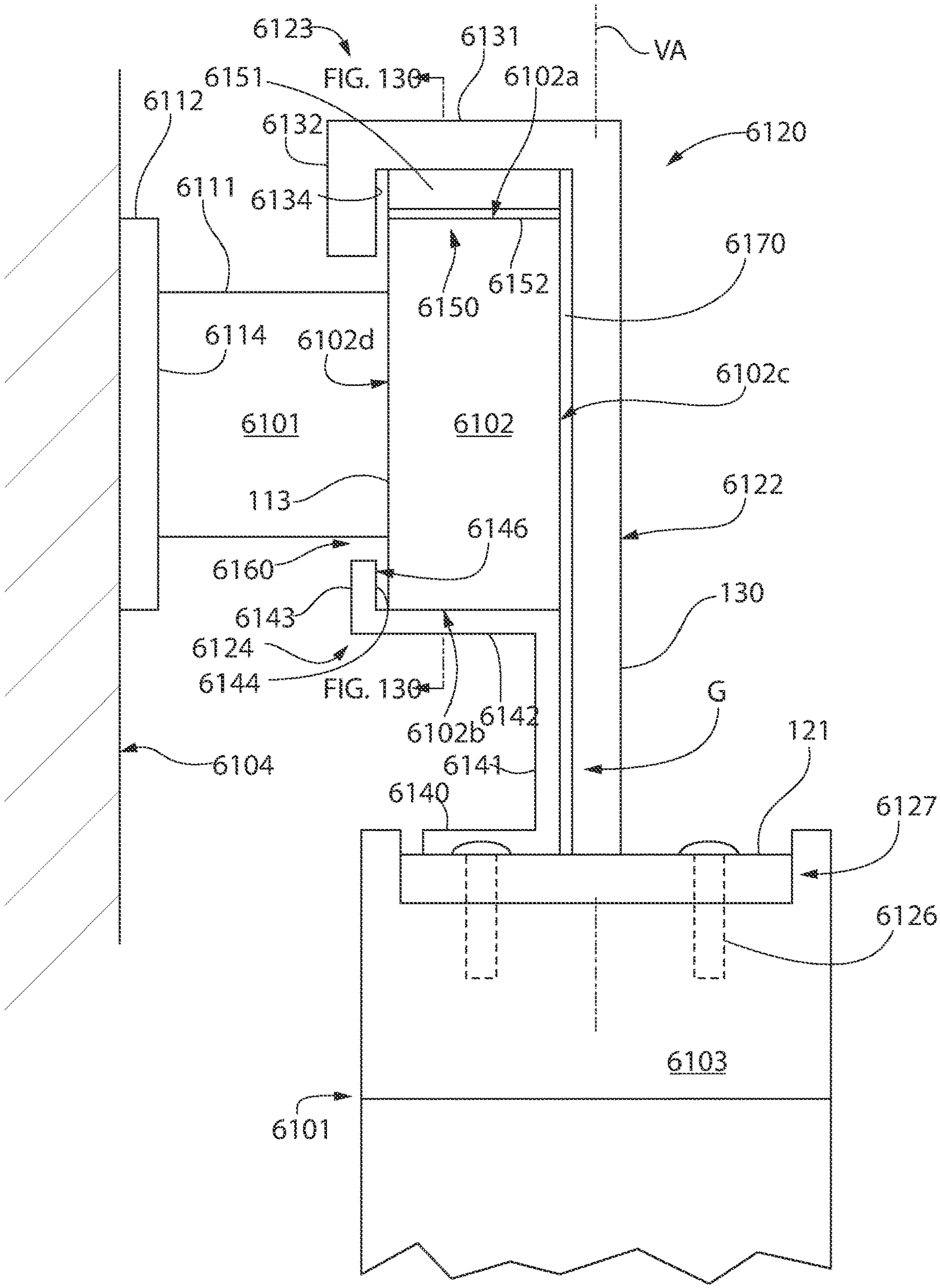
FIG. 108 is an end view thereof.
Figure 109:
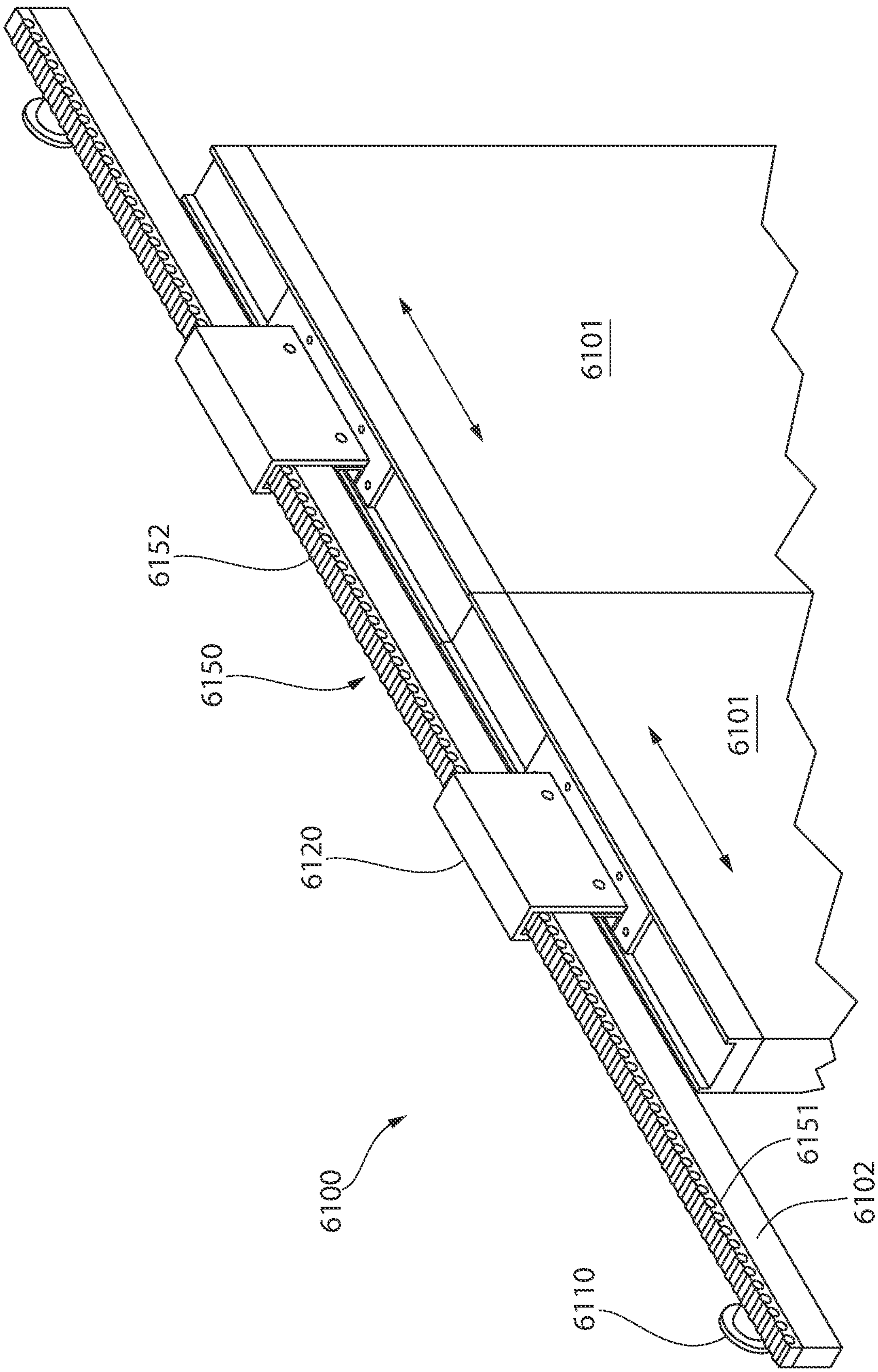
FIG. 109 is a perspective view of an alternative embodiment of a sliding door mounting system according to the present disclosure.
Figure 110:
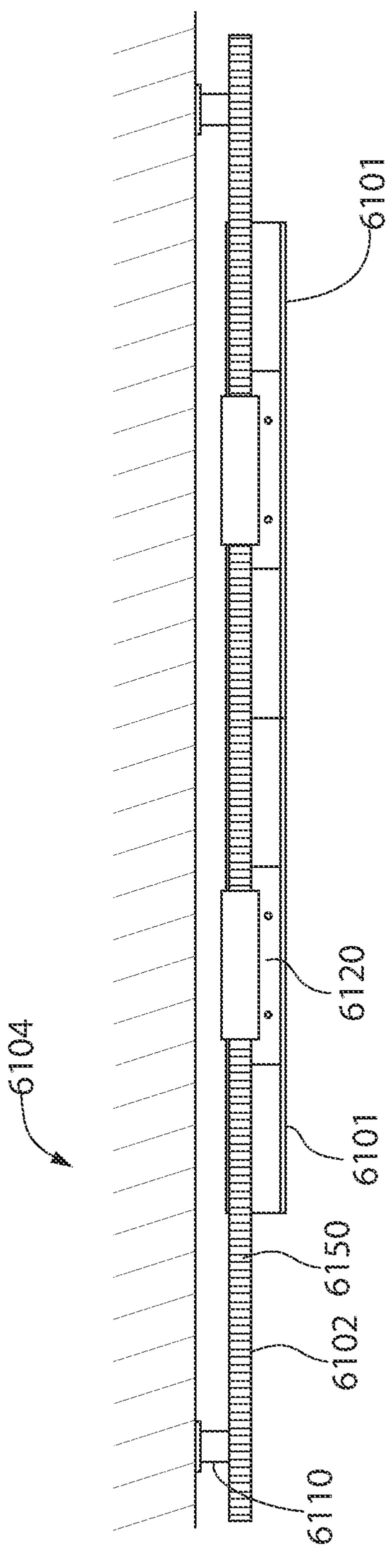
FIG. 110 is a top view thereof.
Figure 111:
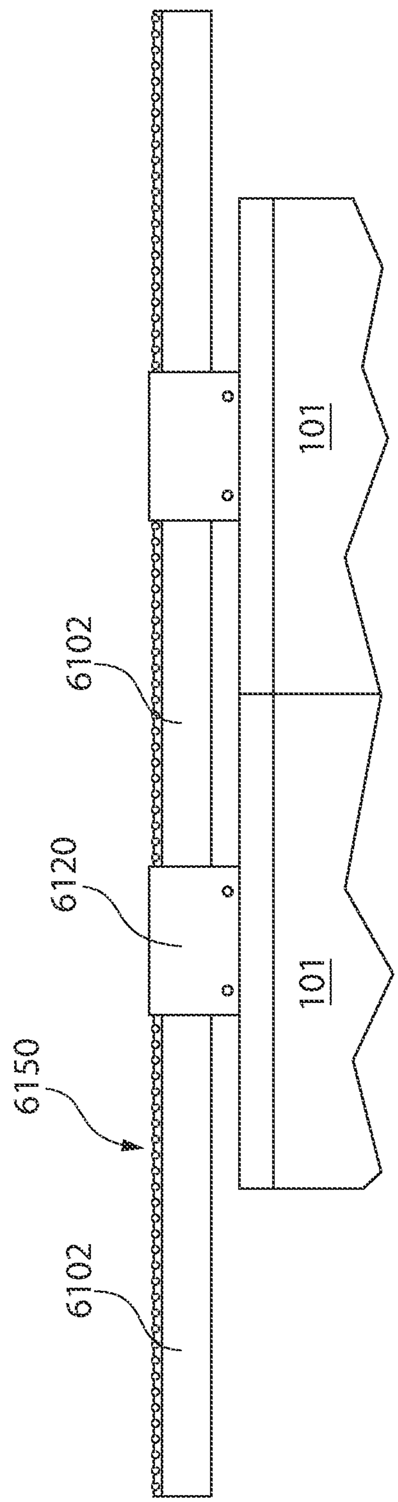
FIG. 111 is a front view thereof.
Figure 112:
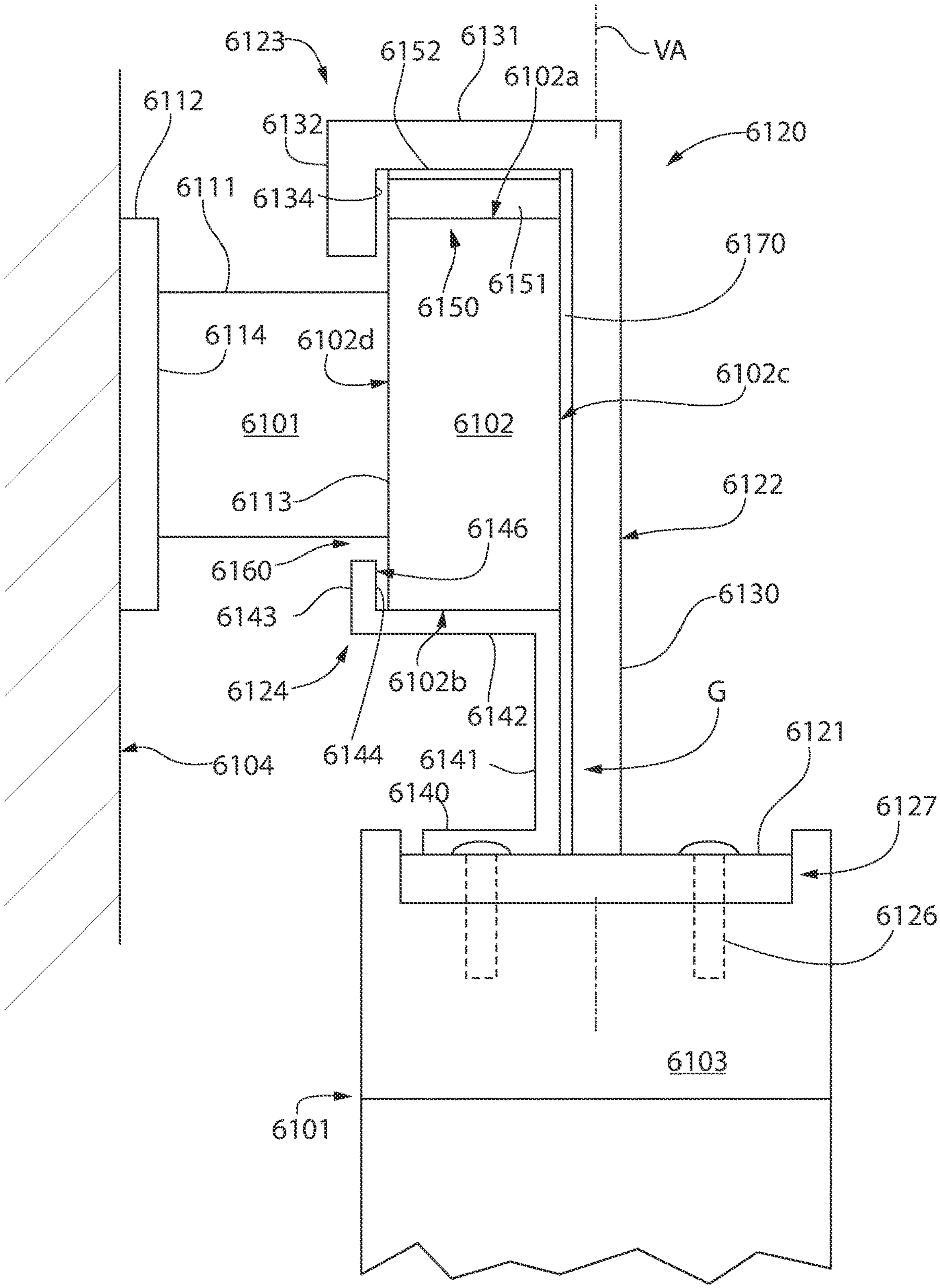
Figure 113:
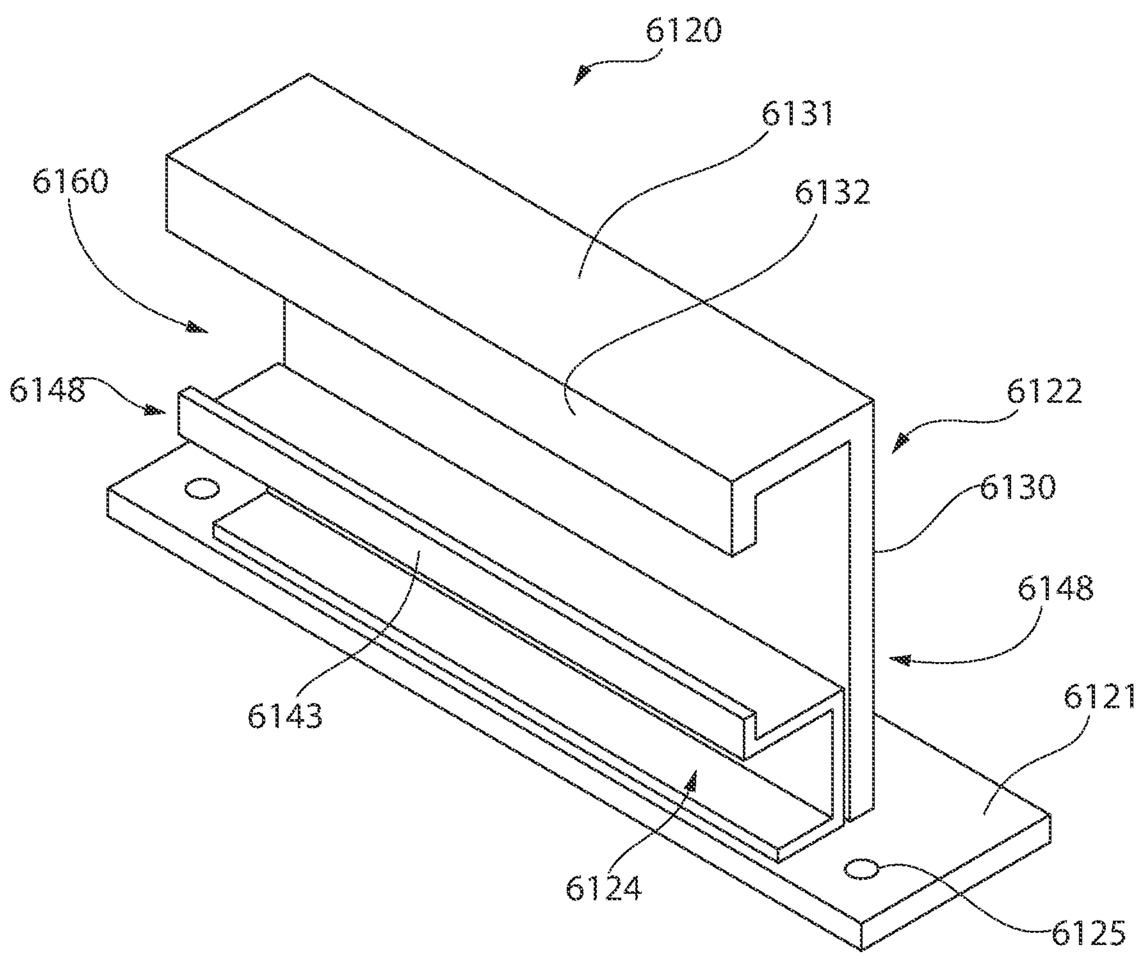
Figure 114:
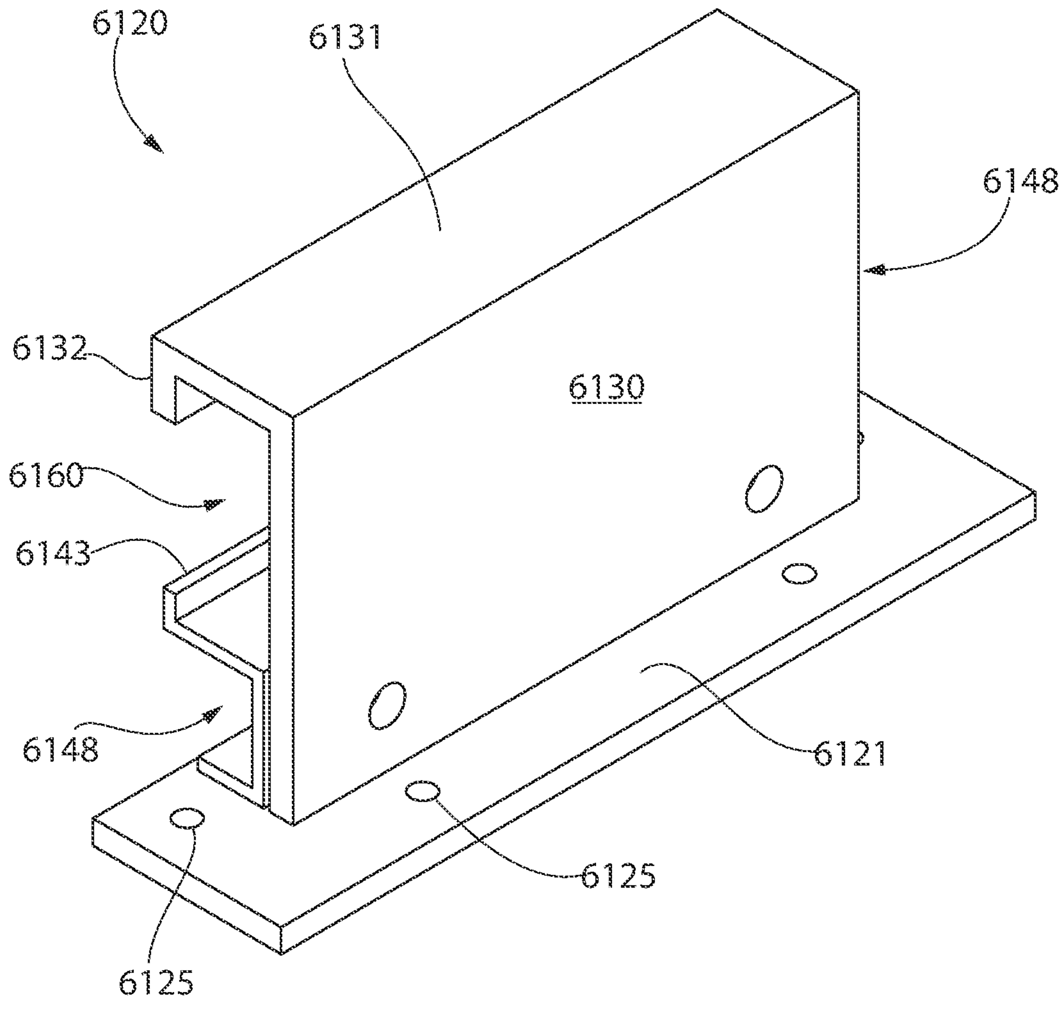
Figure 115:
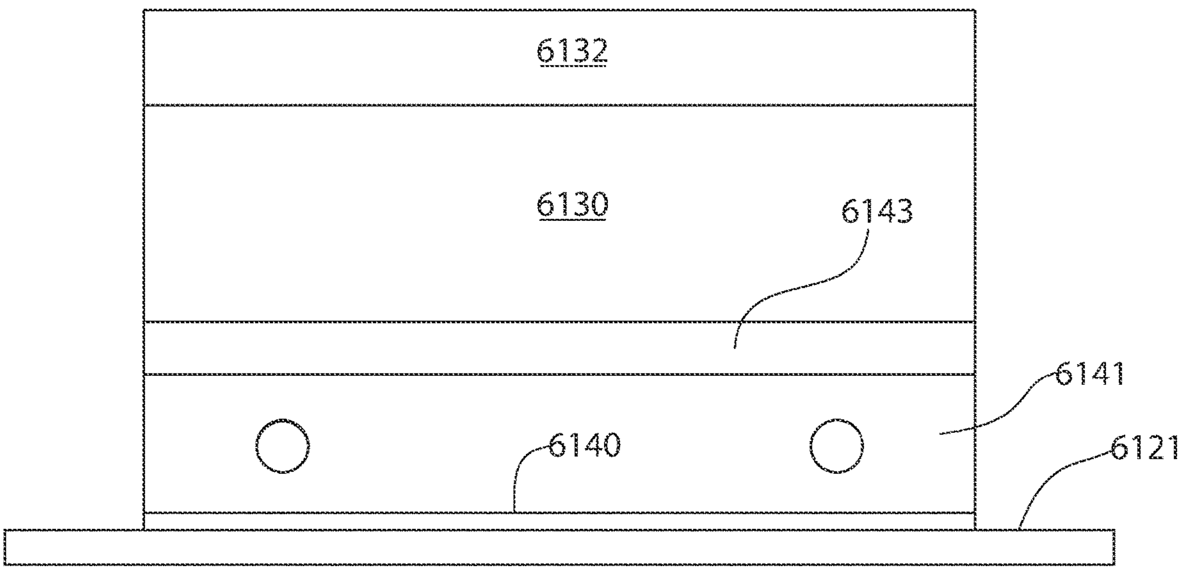
Figure 116:
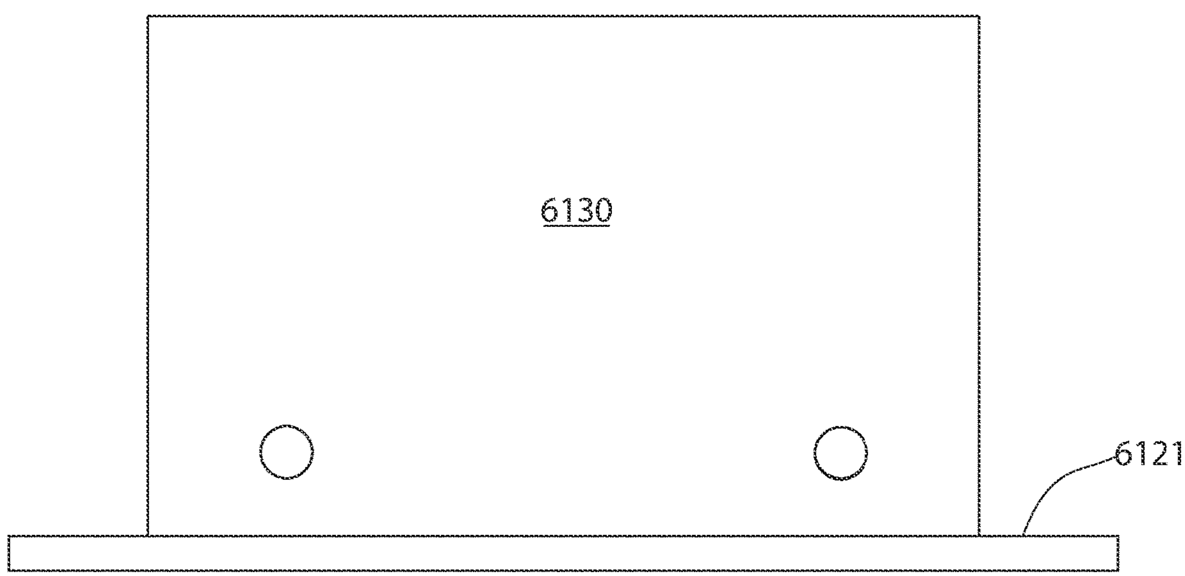
Figure 117:
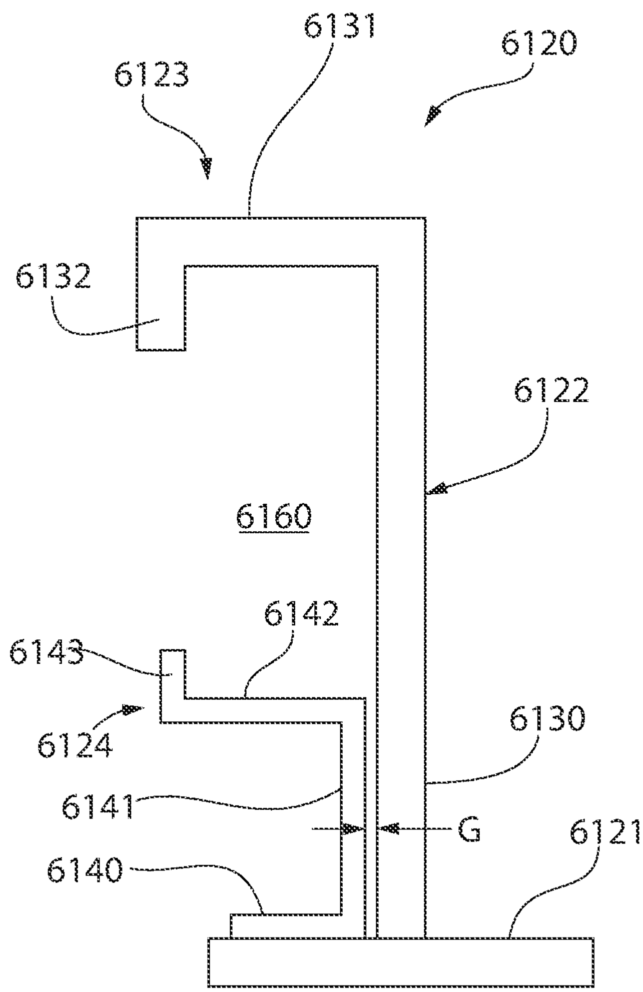
Figure 118:
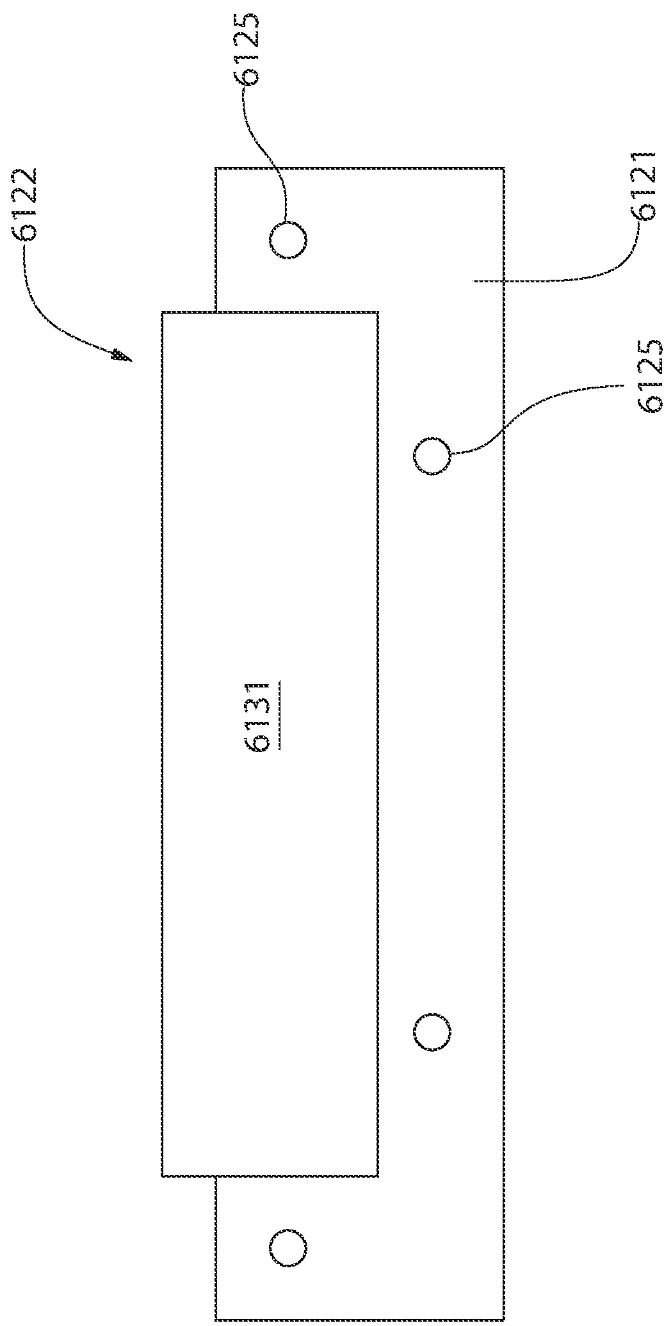
Figure 121:
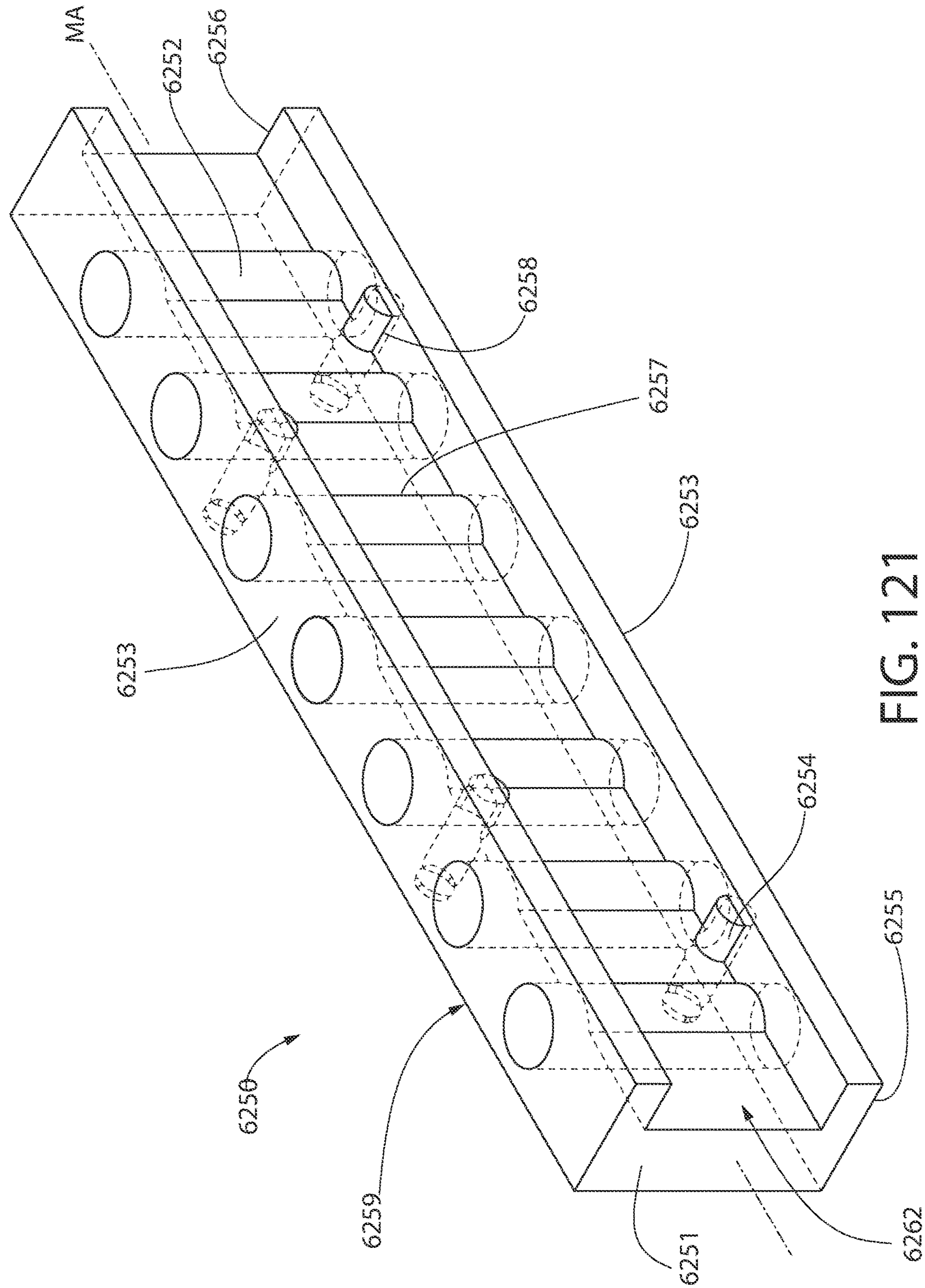
Figure 123:
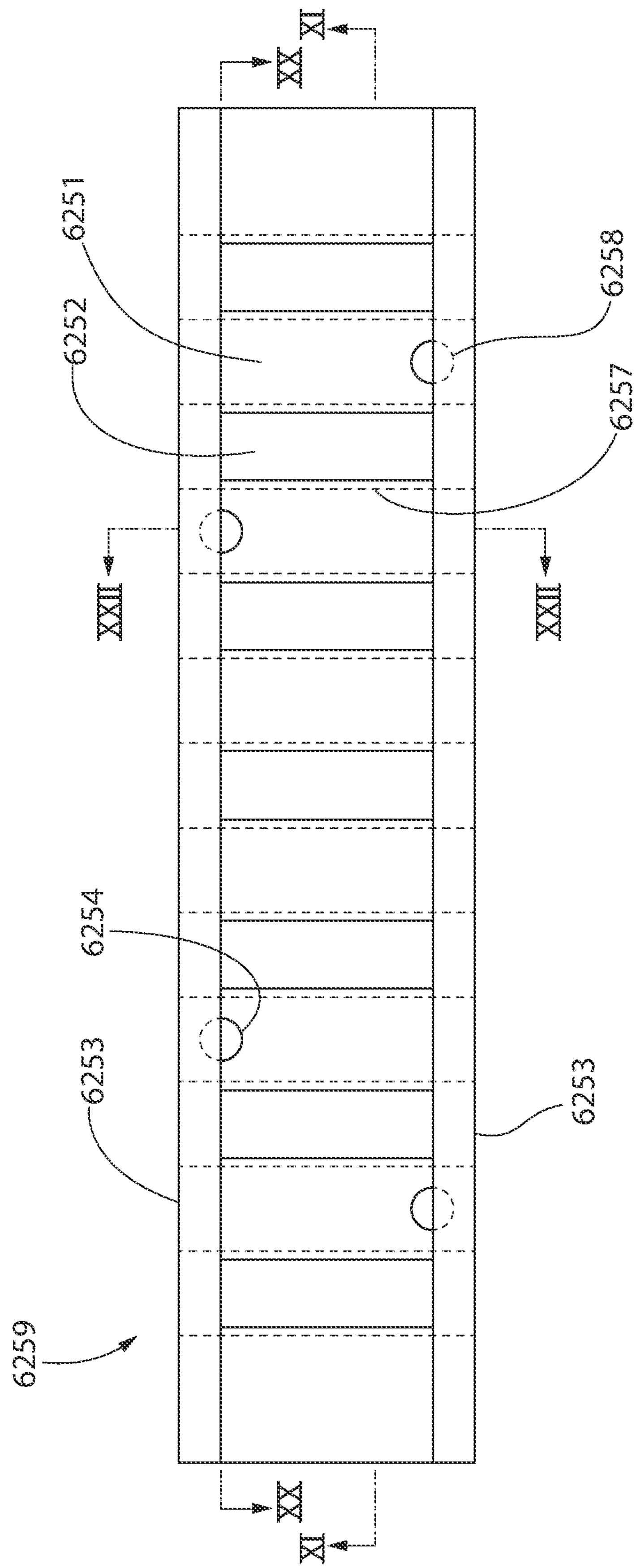
Figure 124:
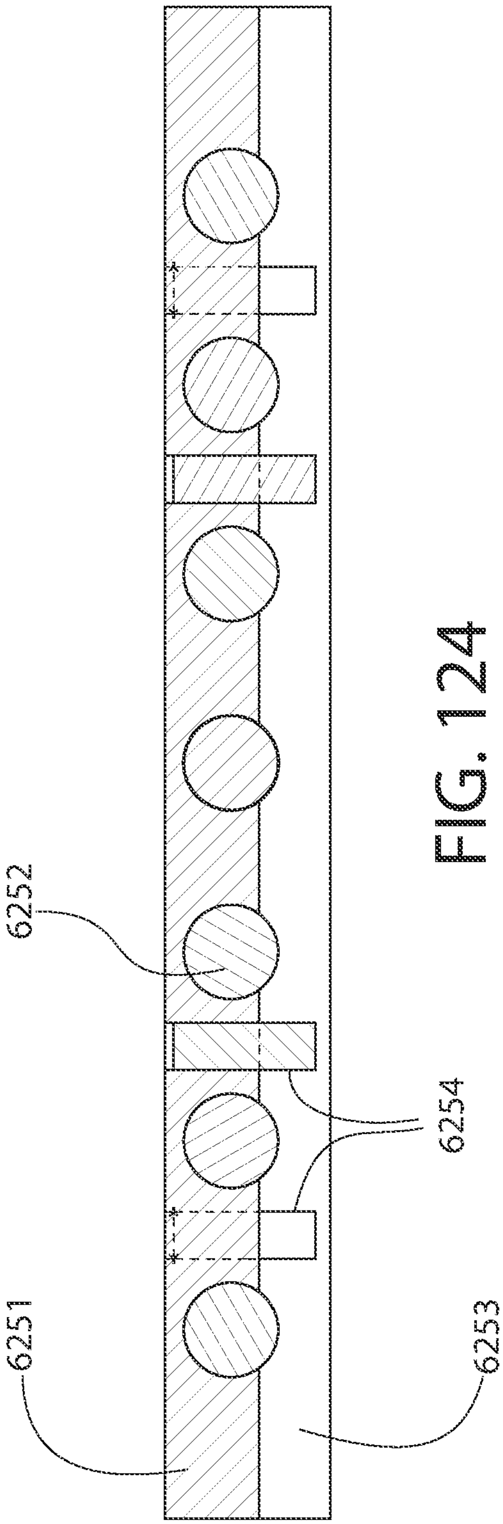
Figure 125:
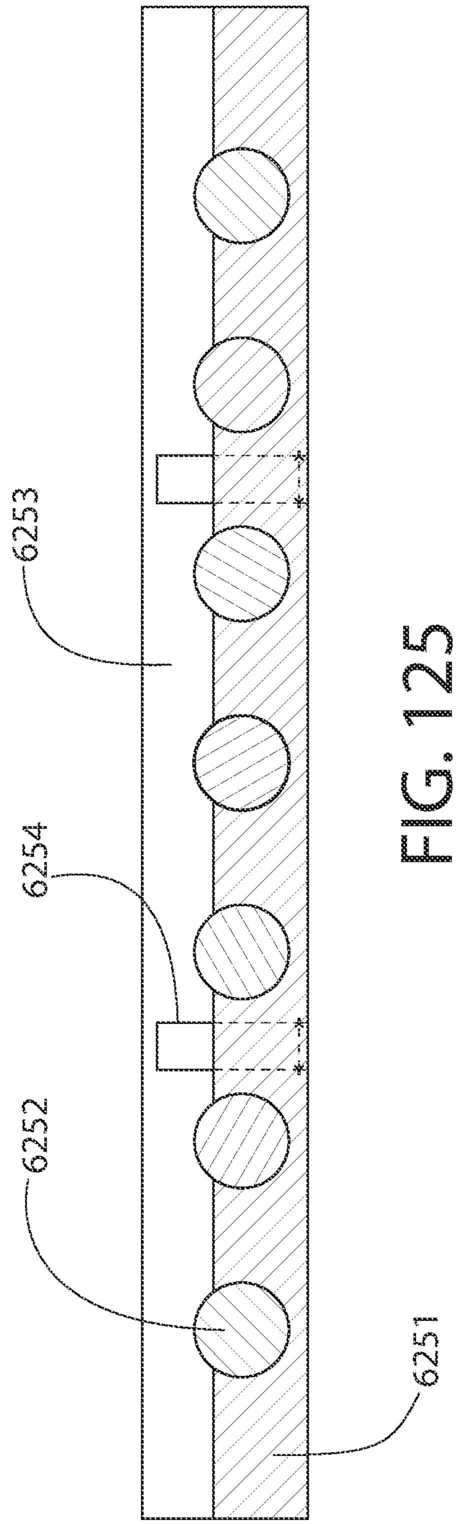
Figure 126:
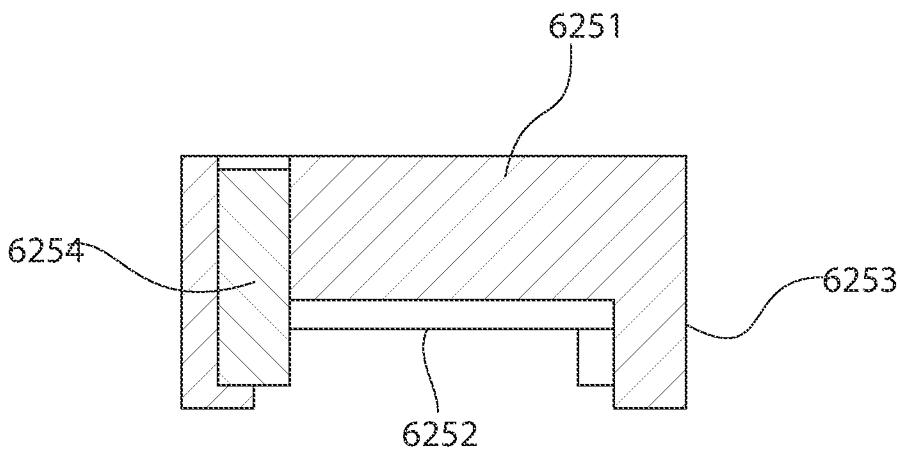
Figure 127:
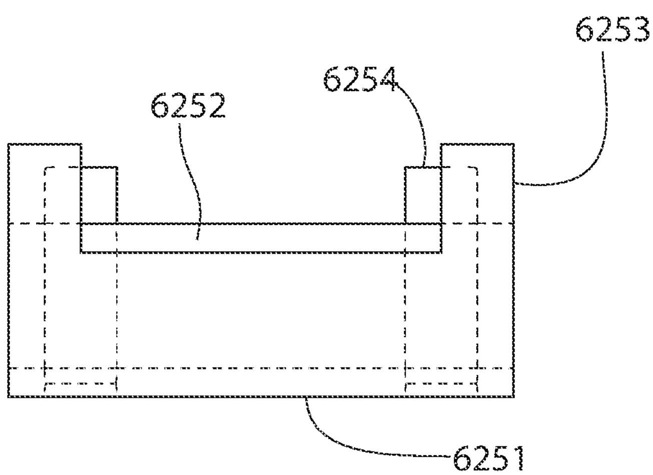
Figure 128:
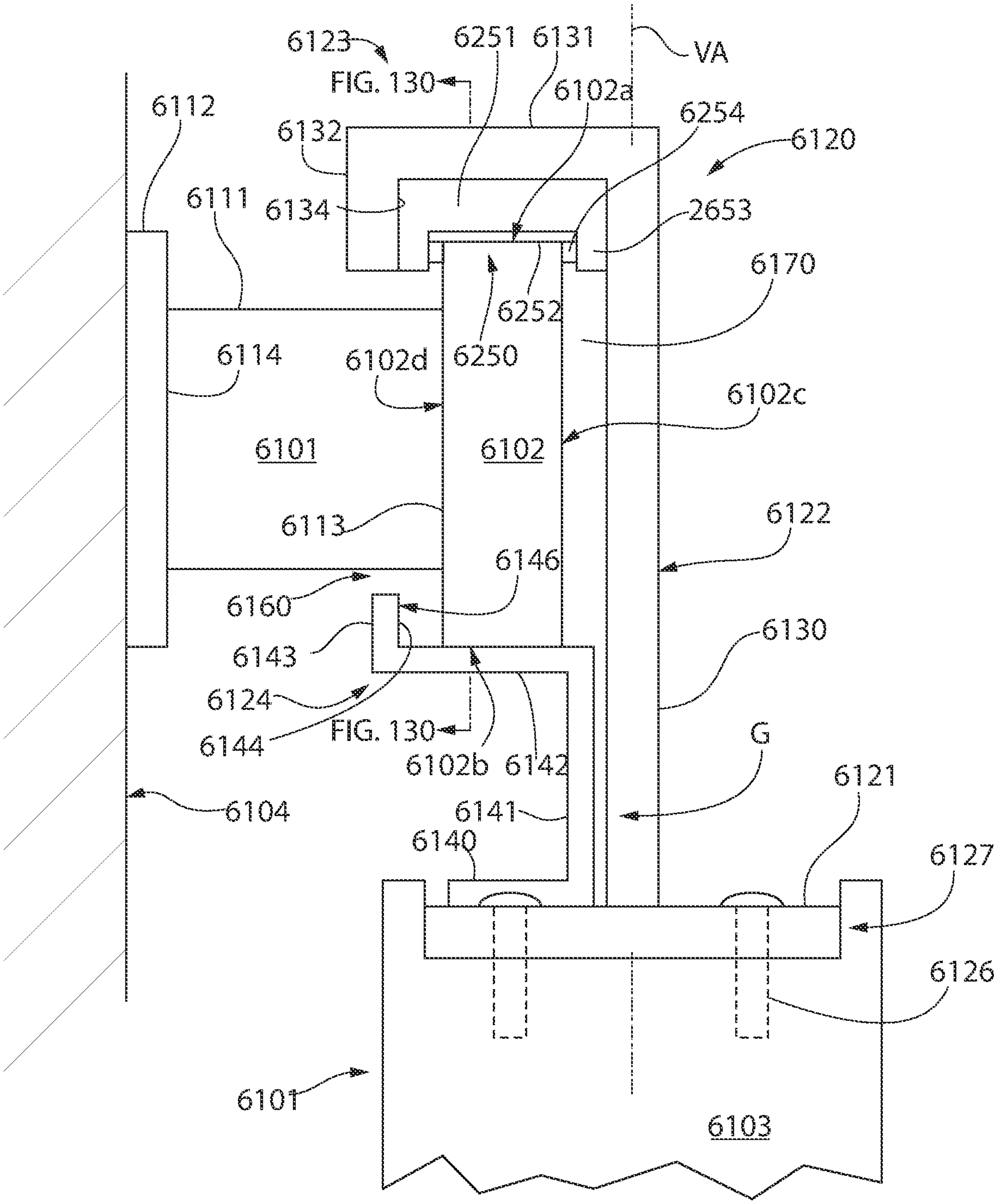
Figure 129:
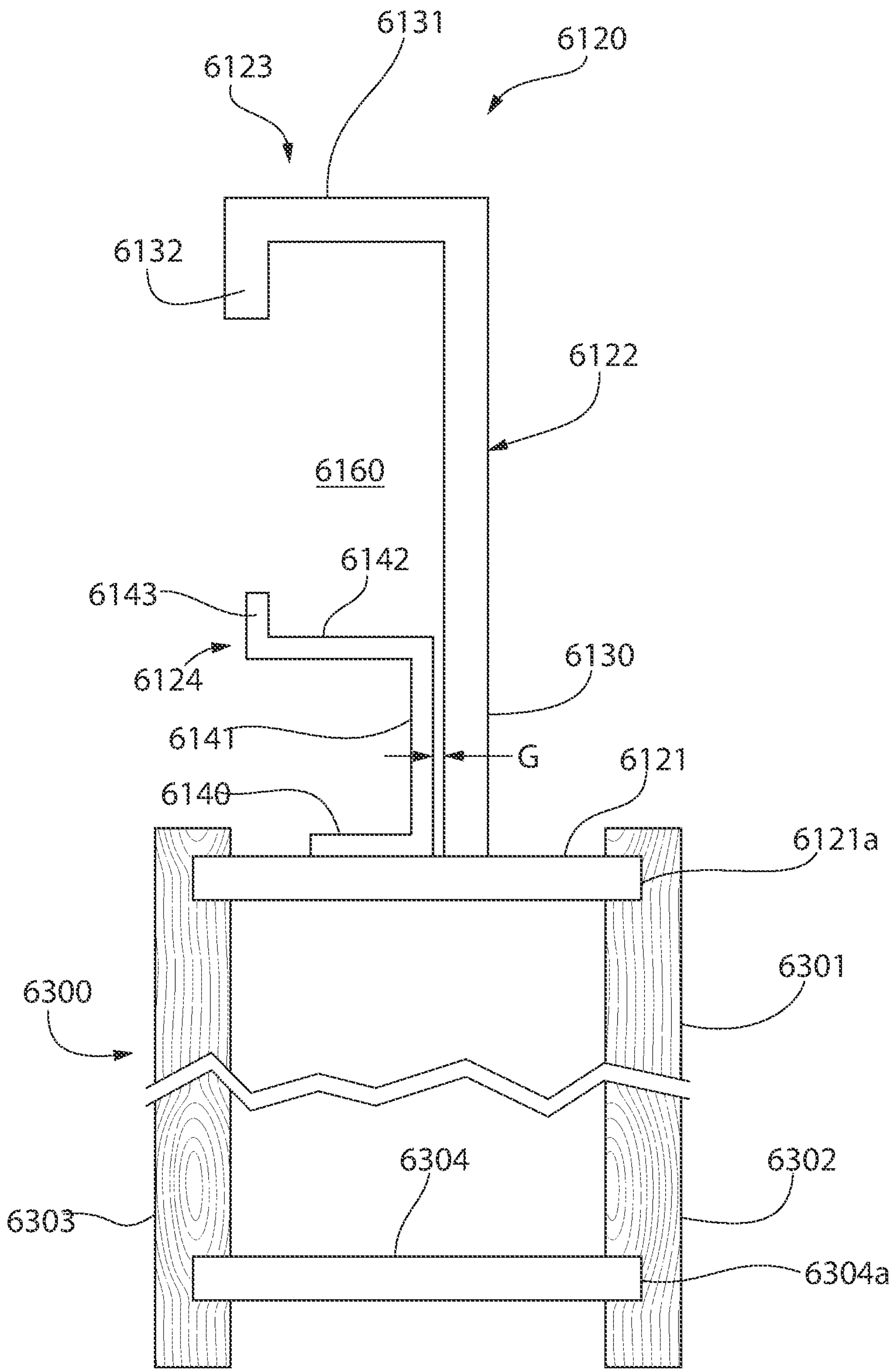
Figure 130:
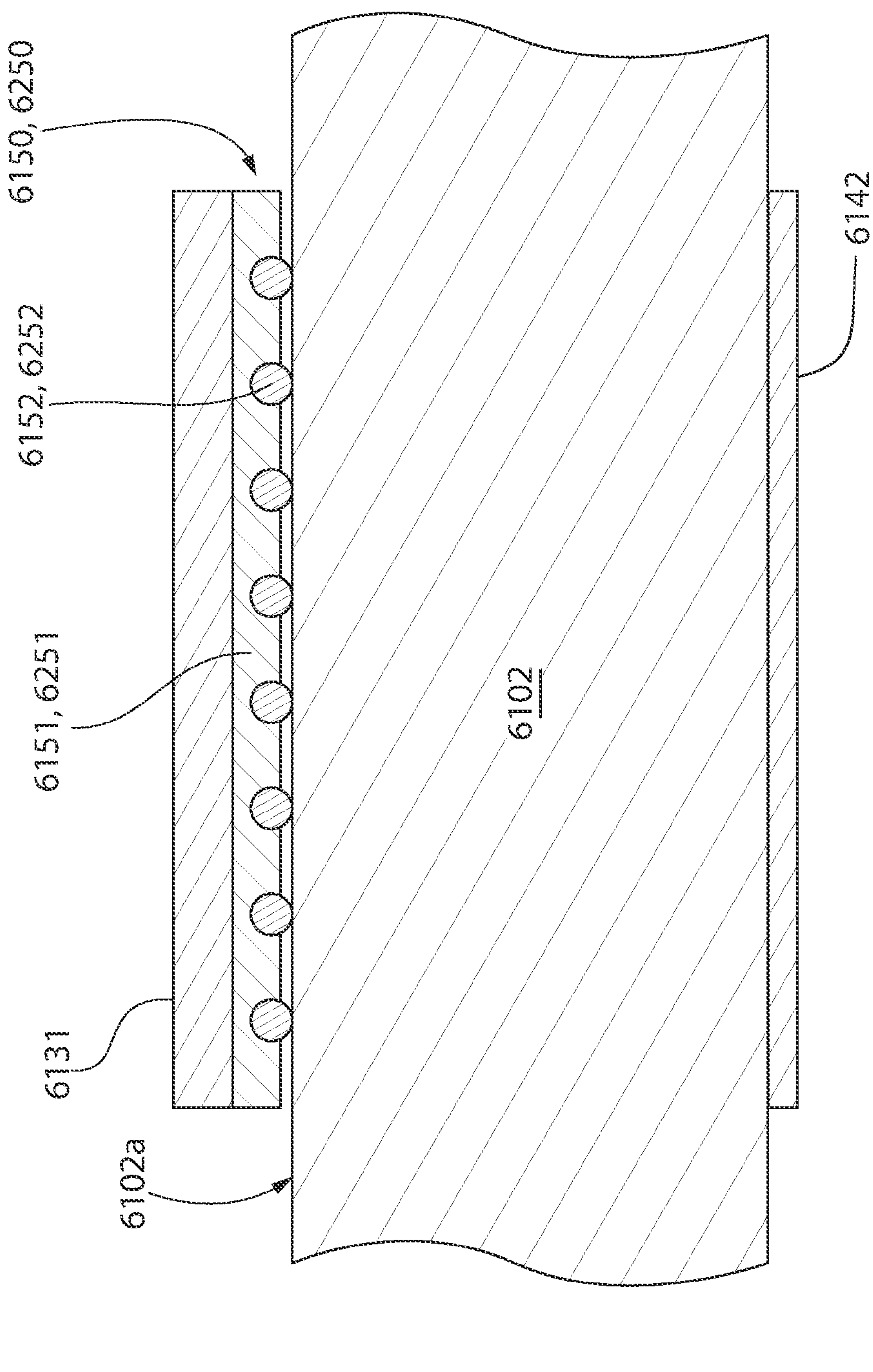
Figure 131:
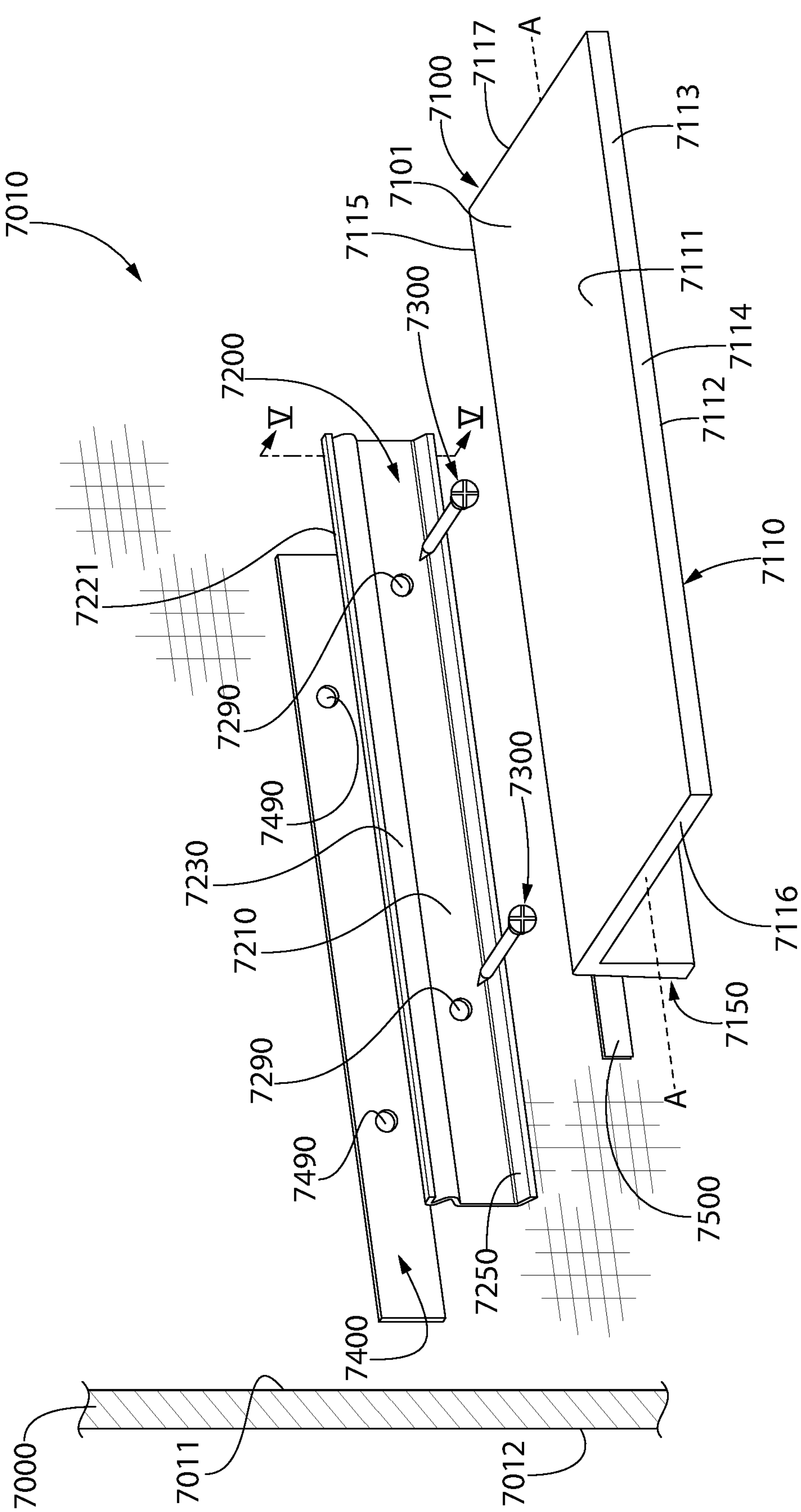
Figure 132:
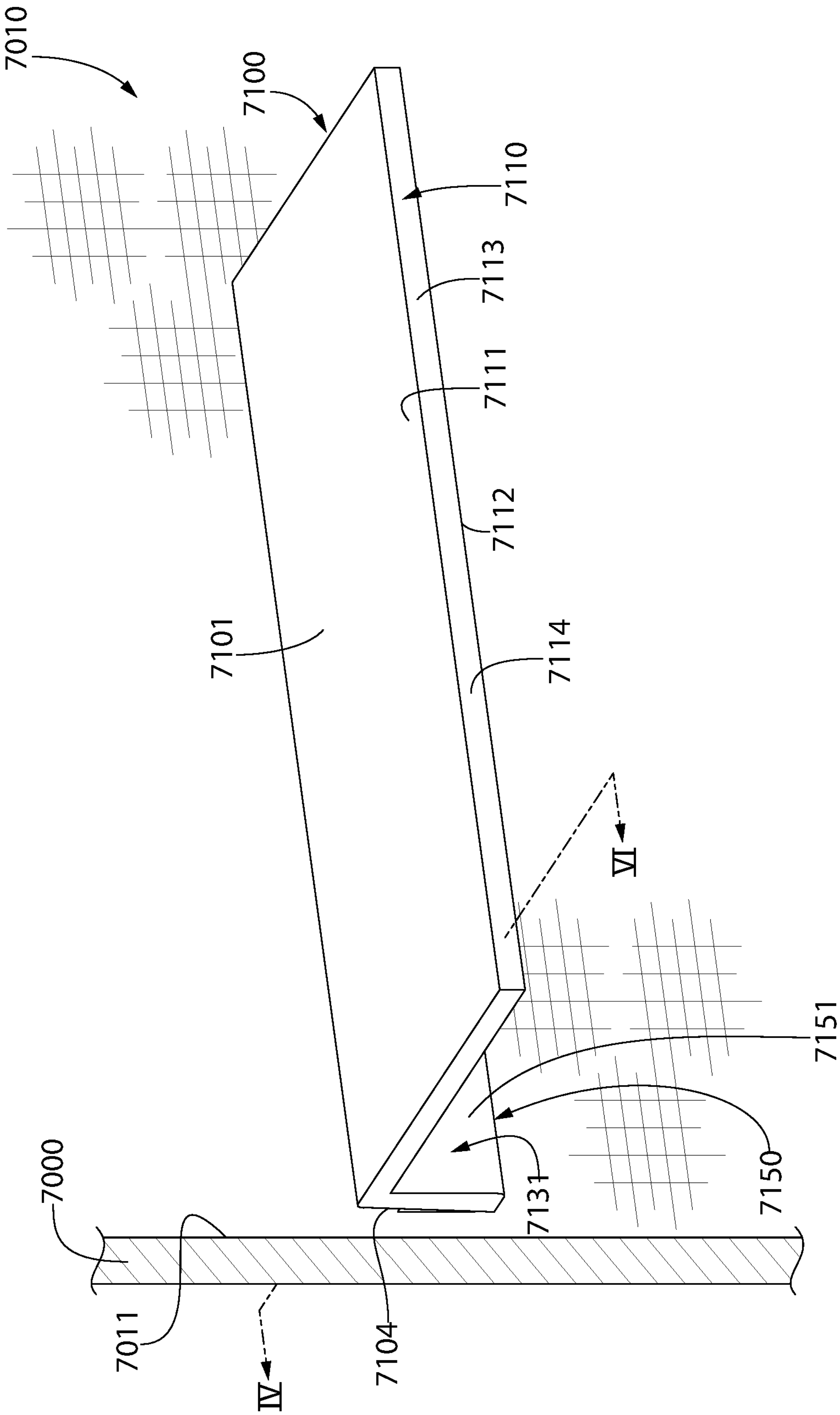
Figure 133:
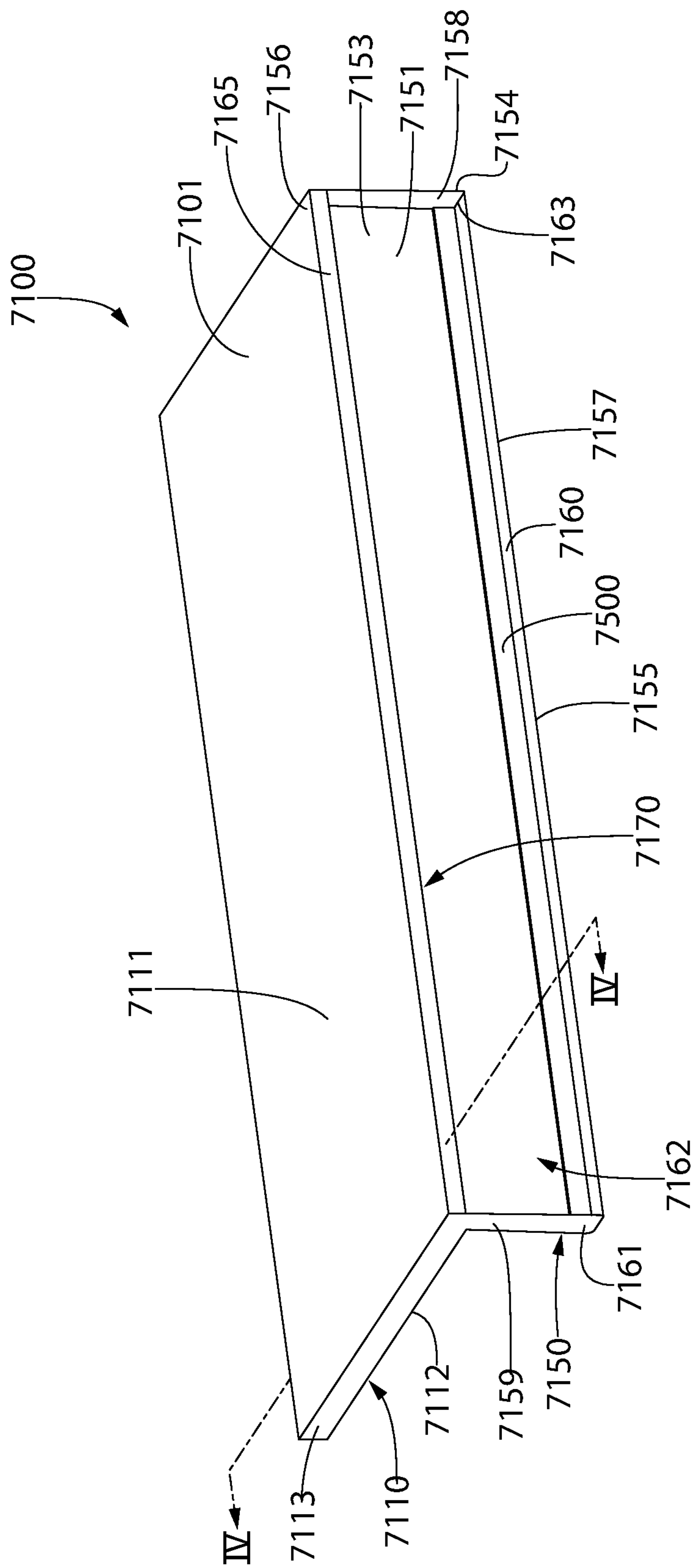
Figure 134:
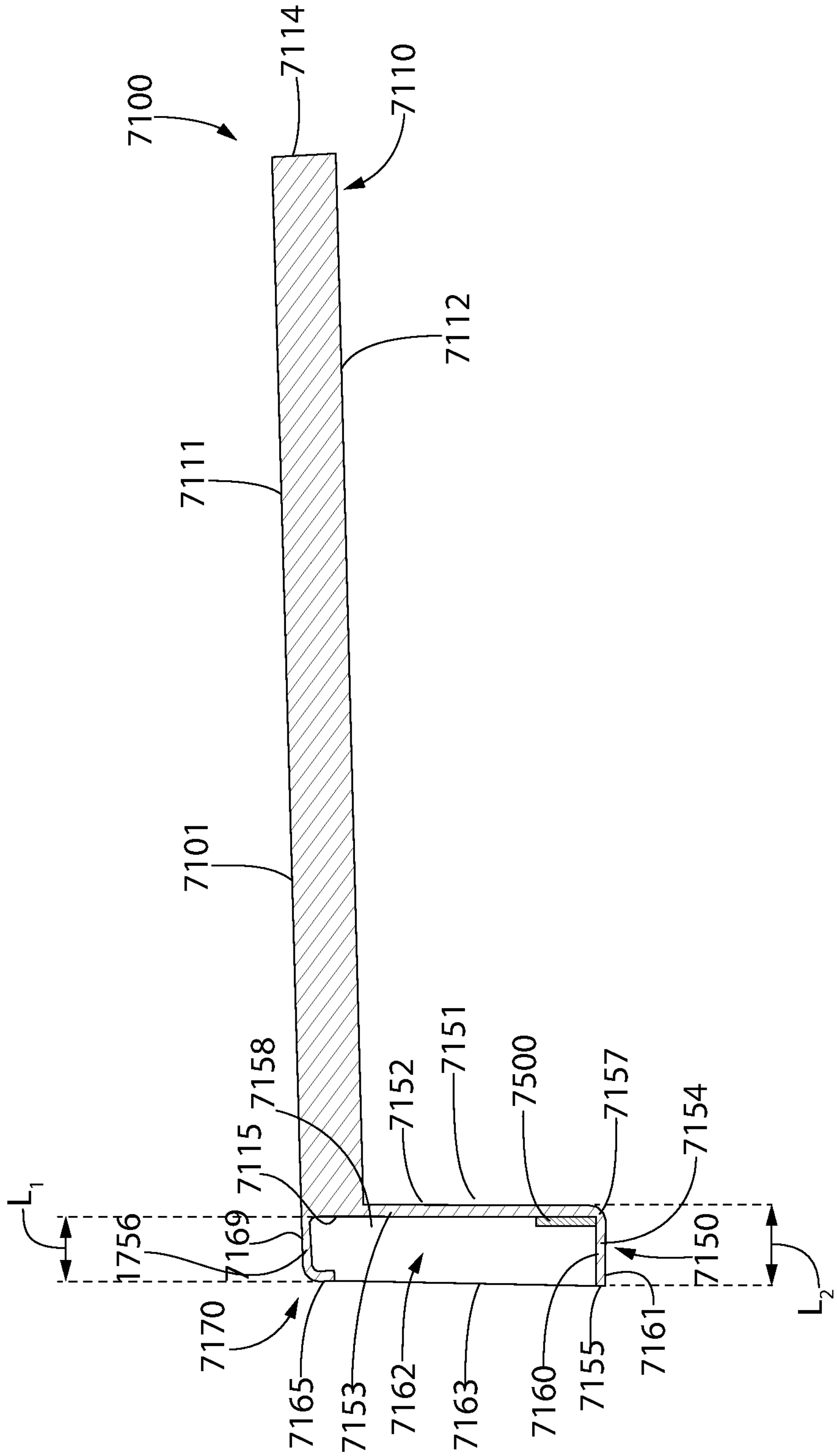
Figure 135:
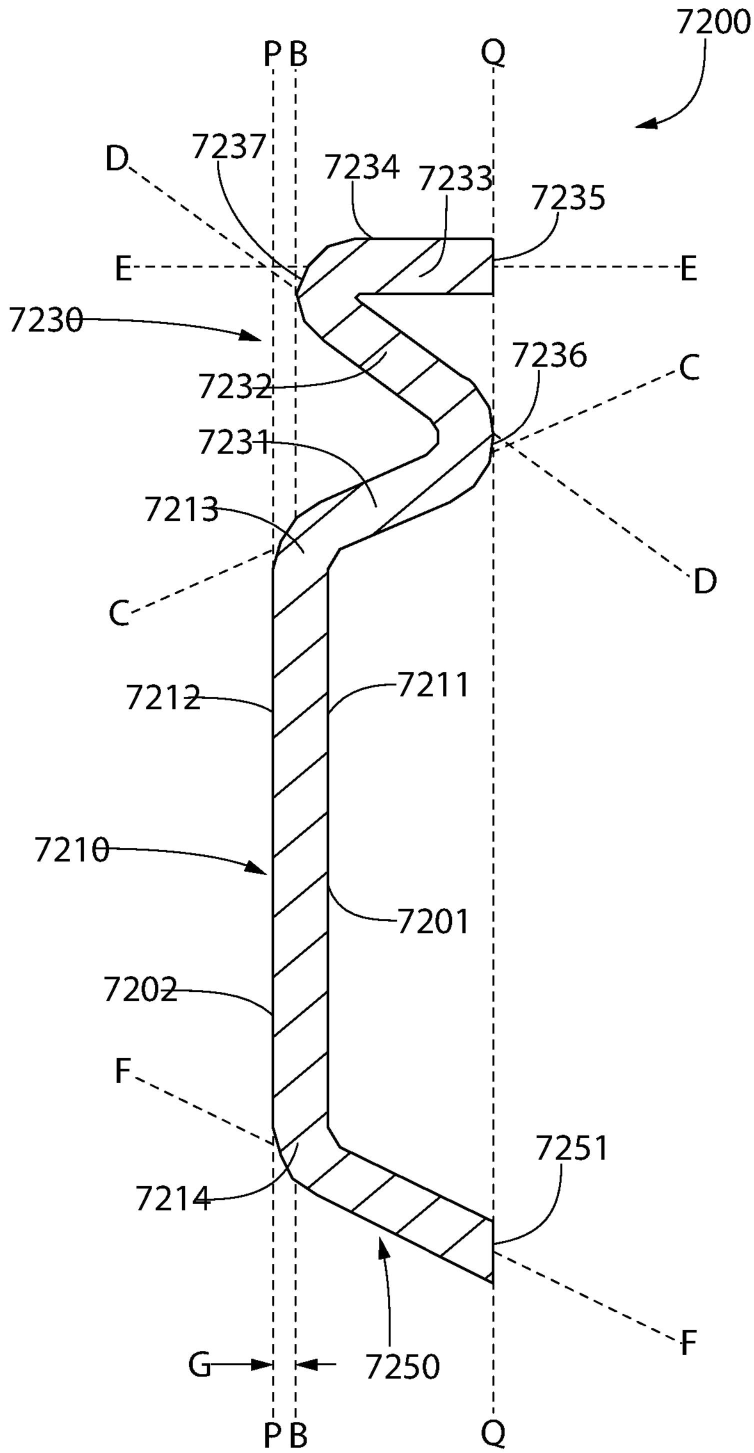
Figure 136A:
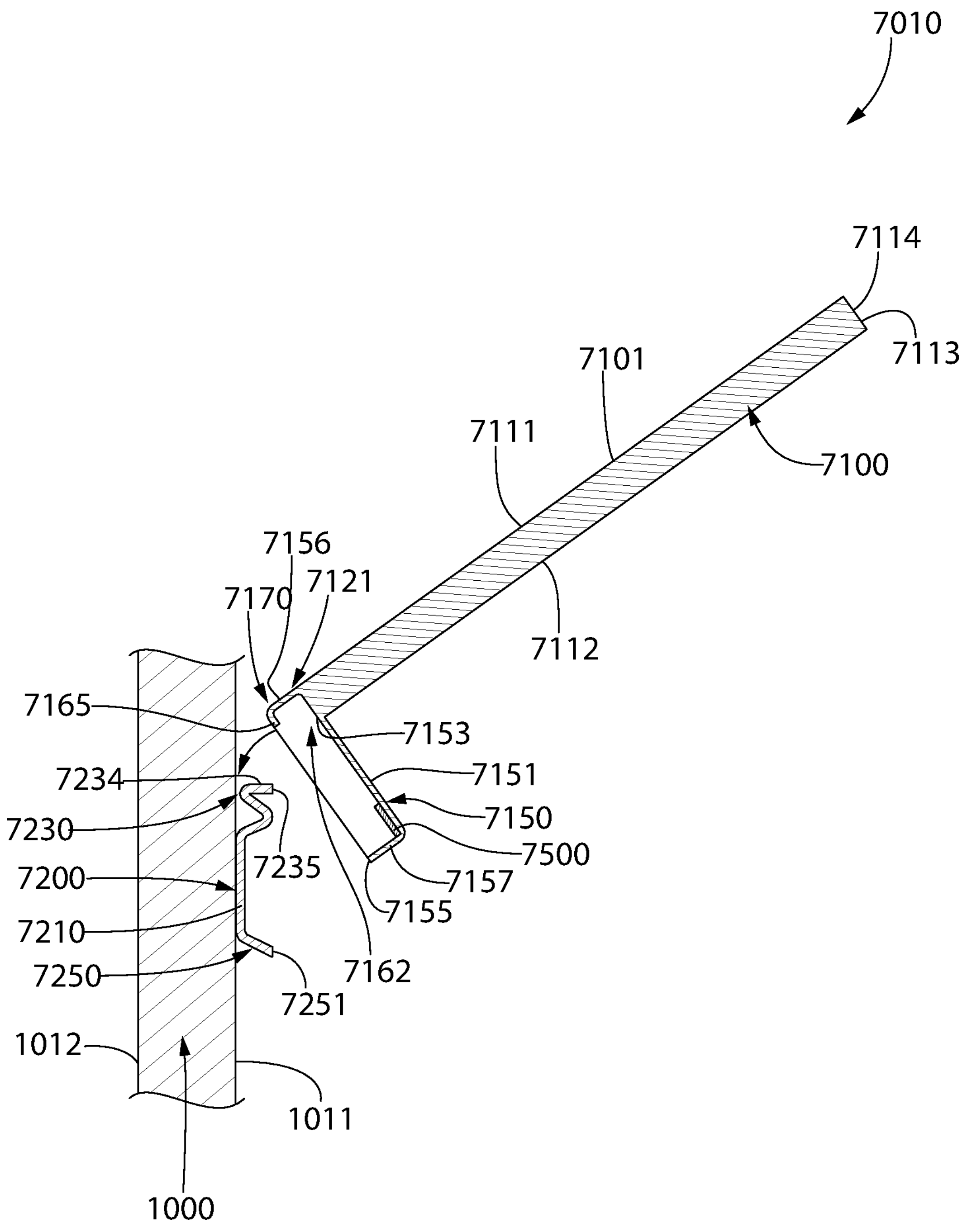
Figure 136B:
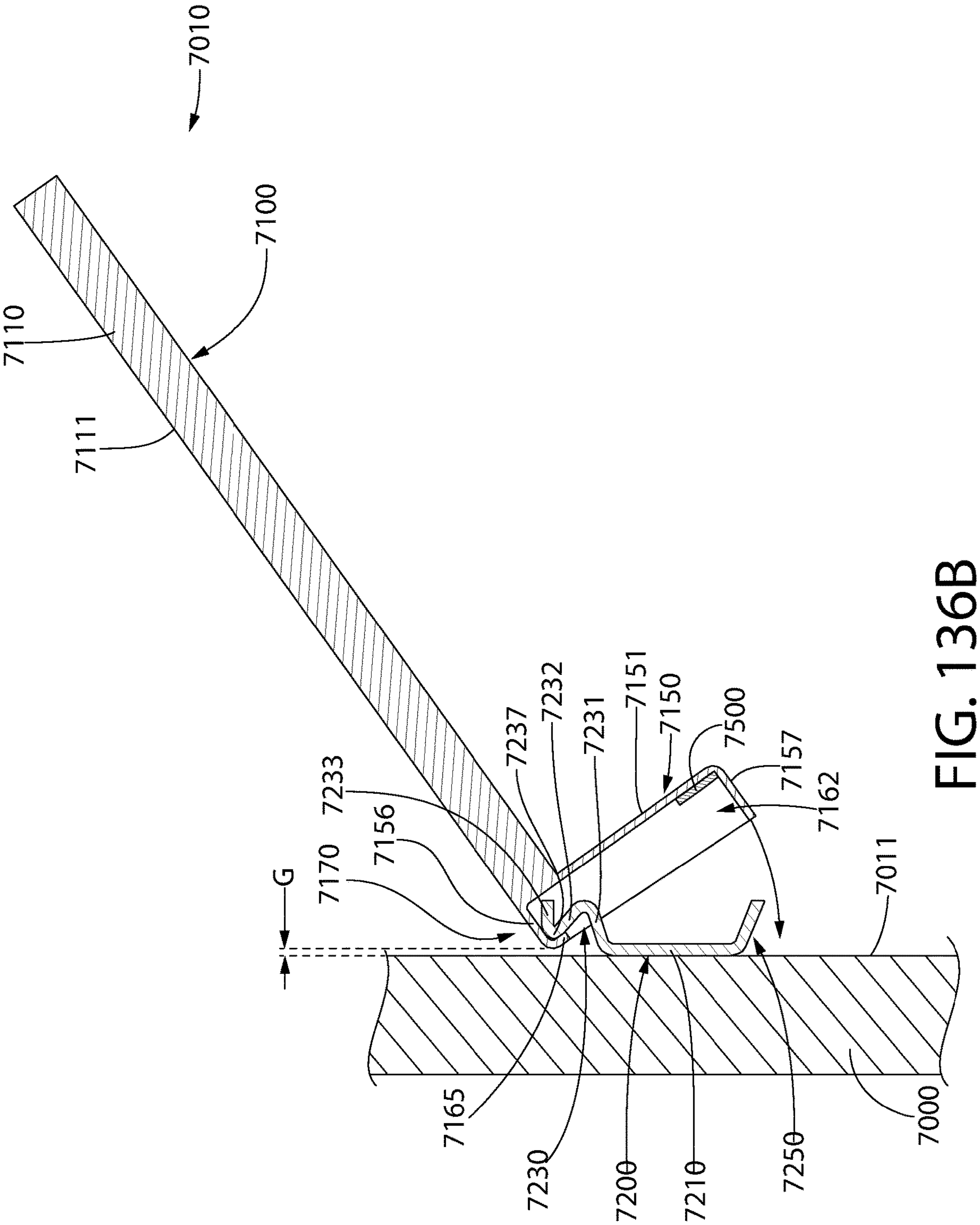
Figure 136C:
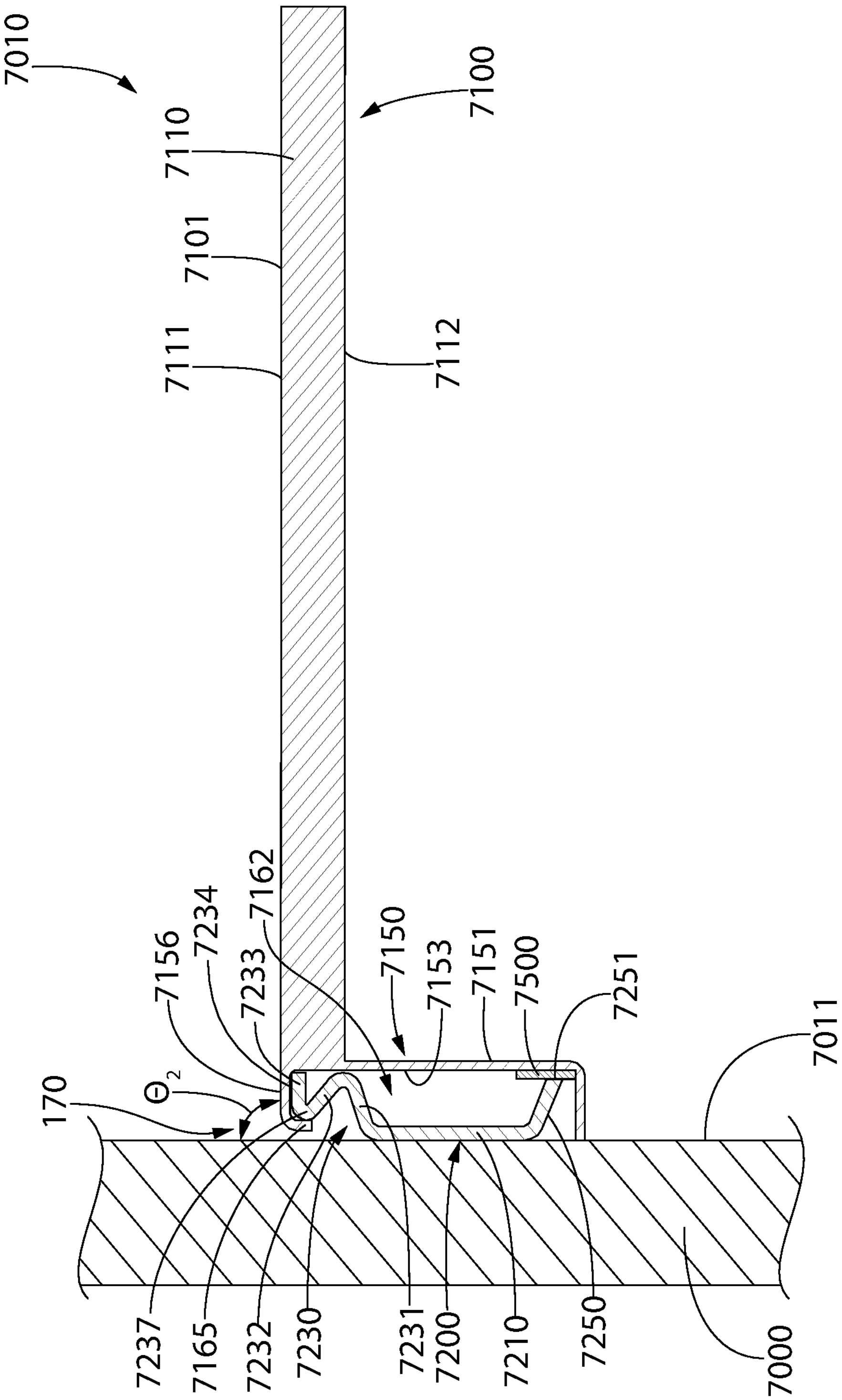
Figure 137:
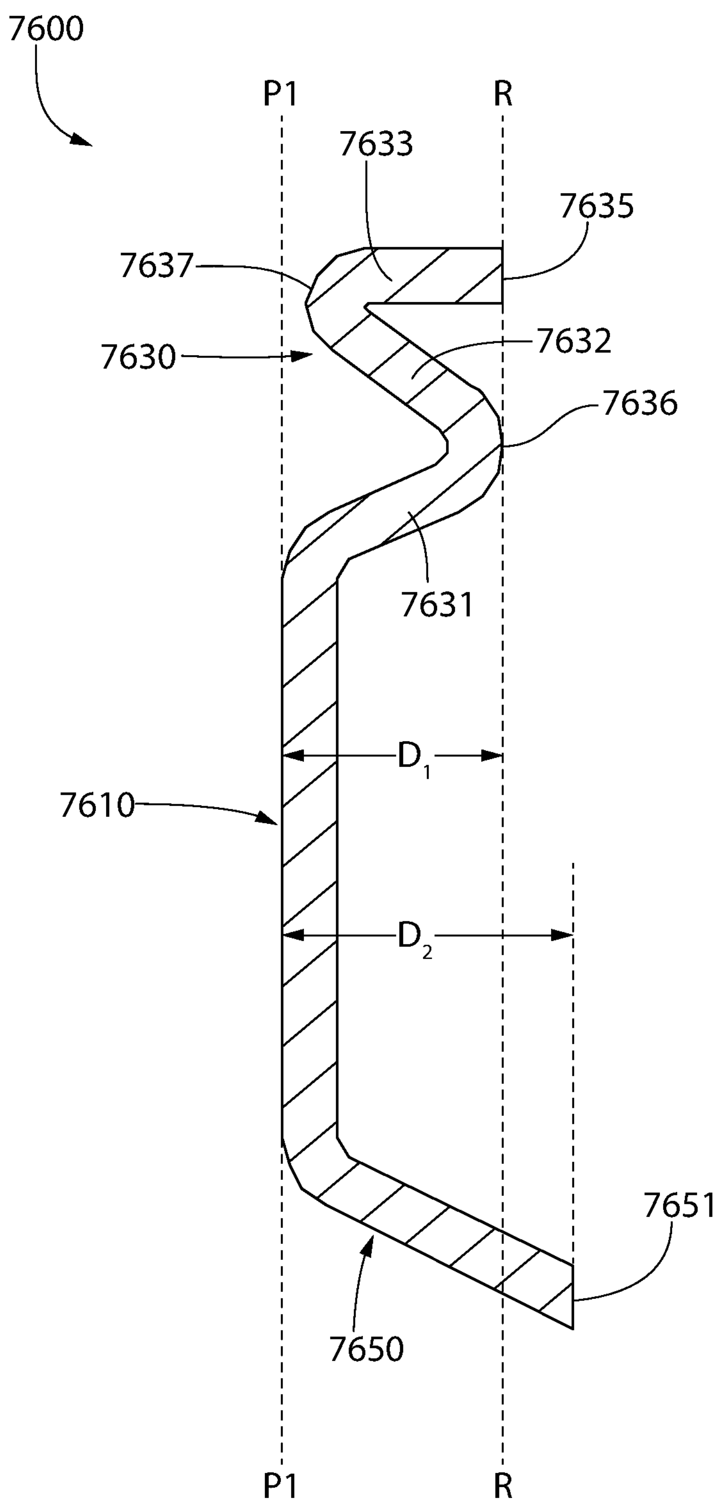
Figure 138A:
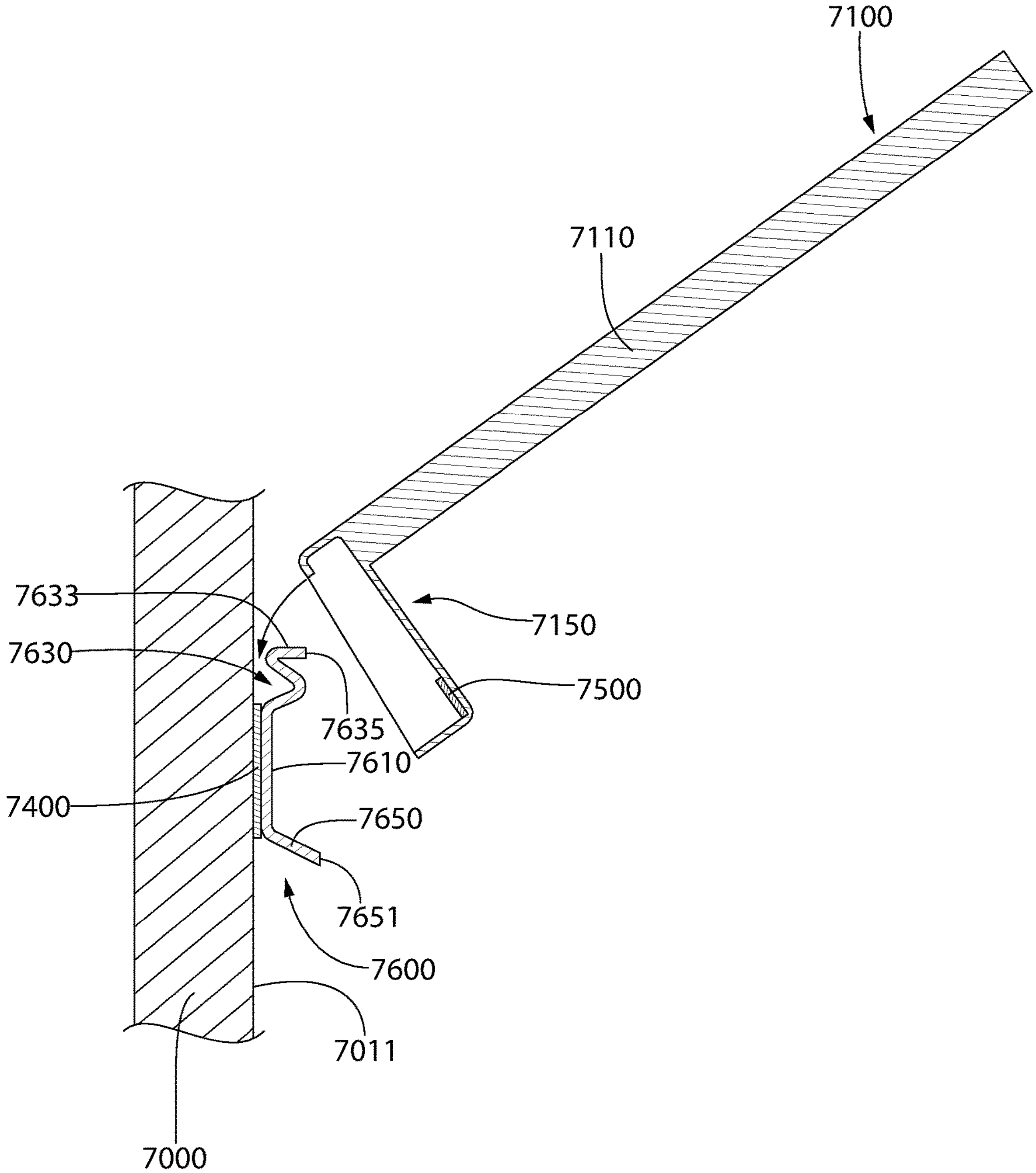
Figure 138B:
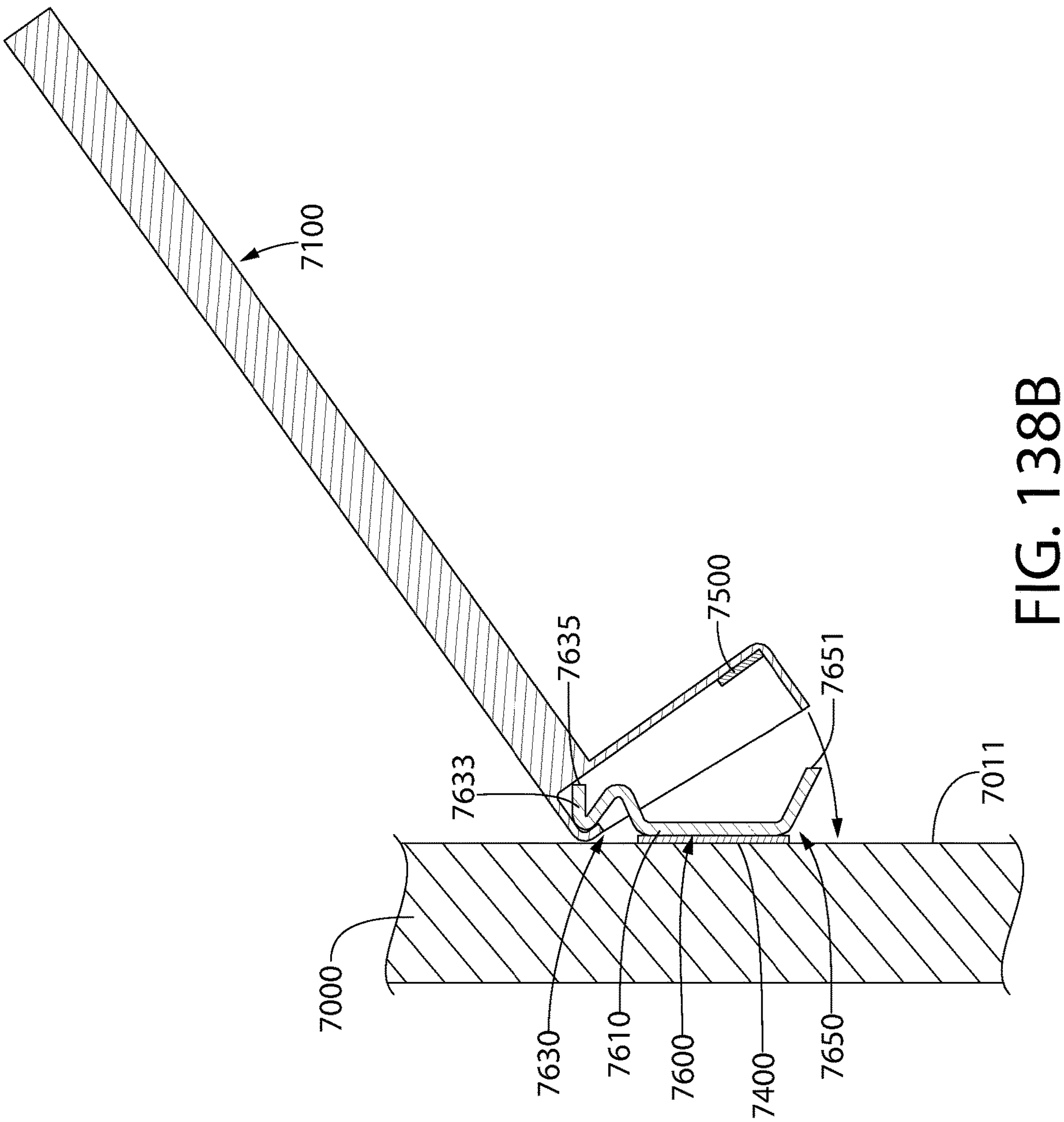
Figure 138C:
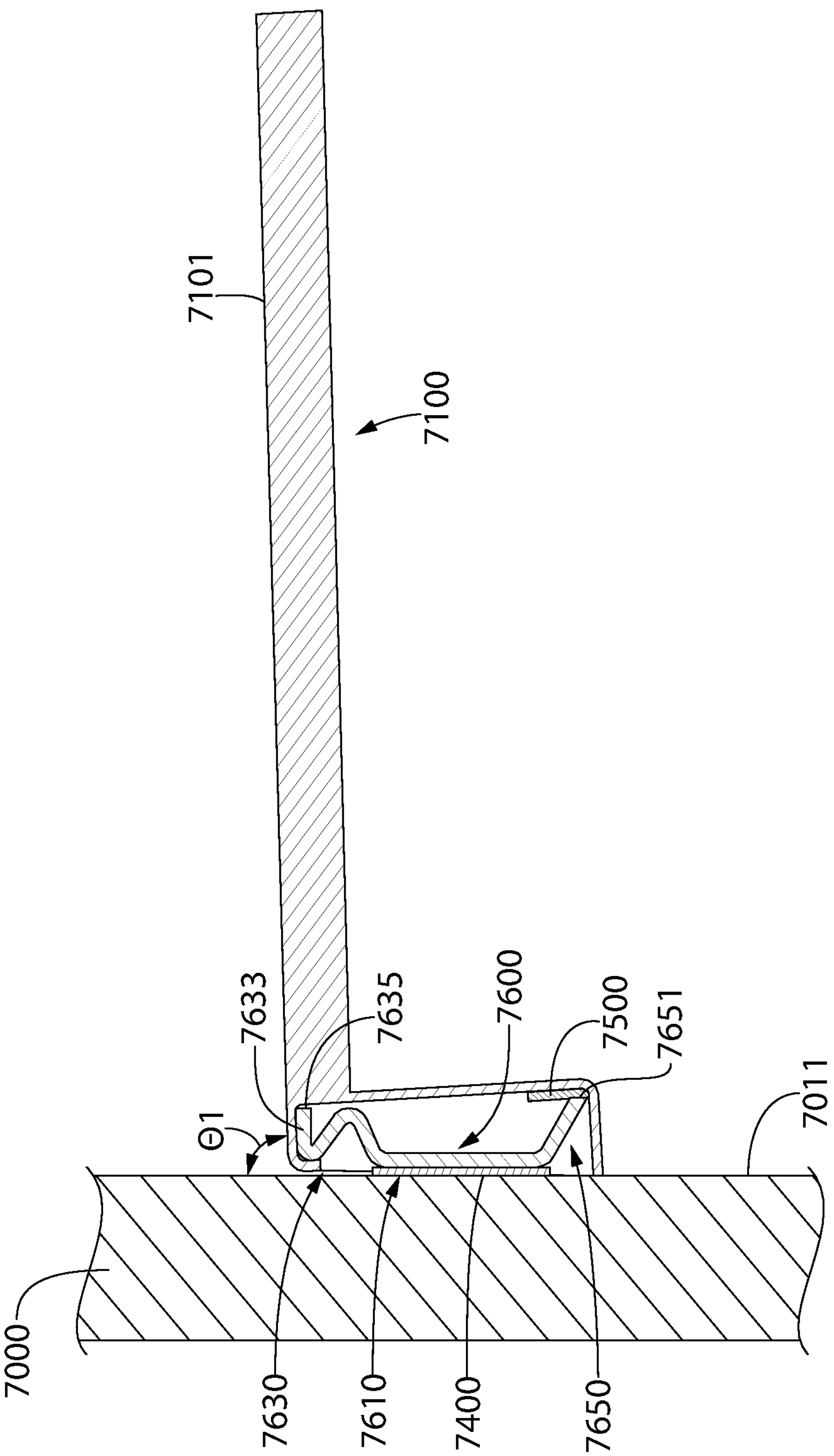
Figure 139:
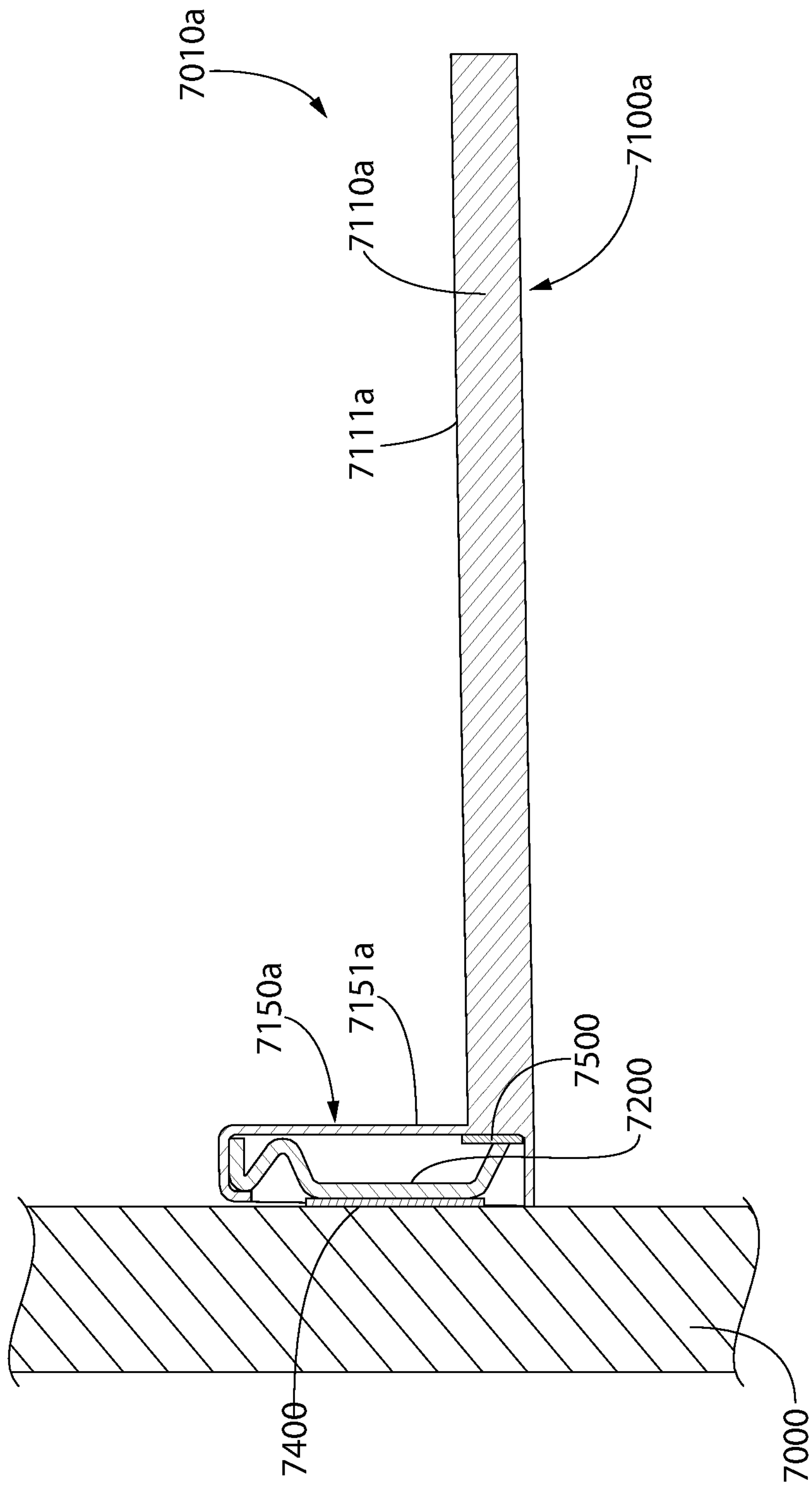
Figure 140:
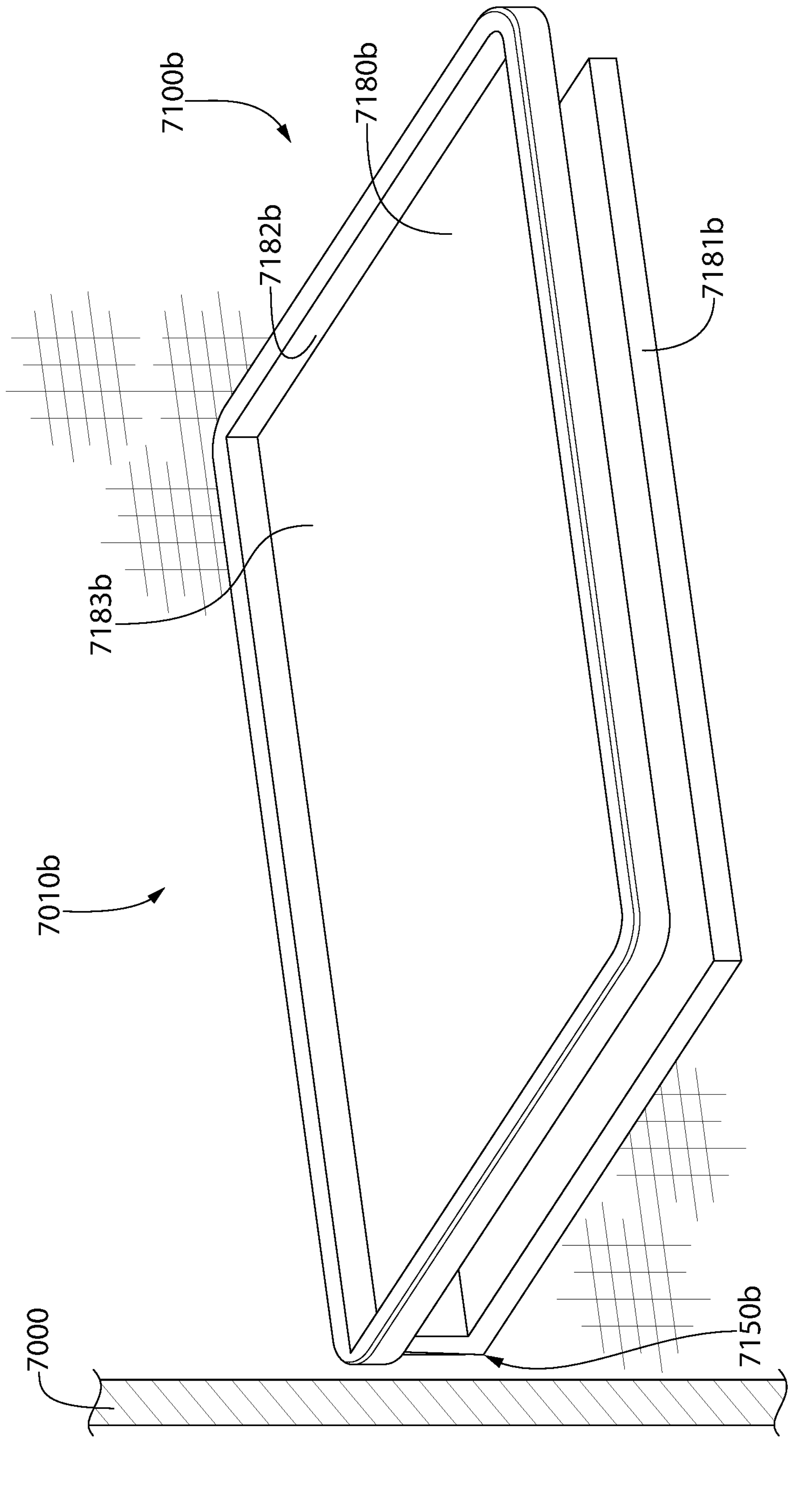
Figure 141:
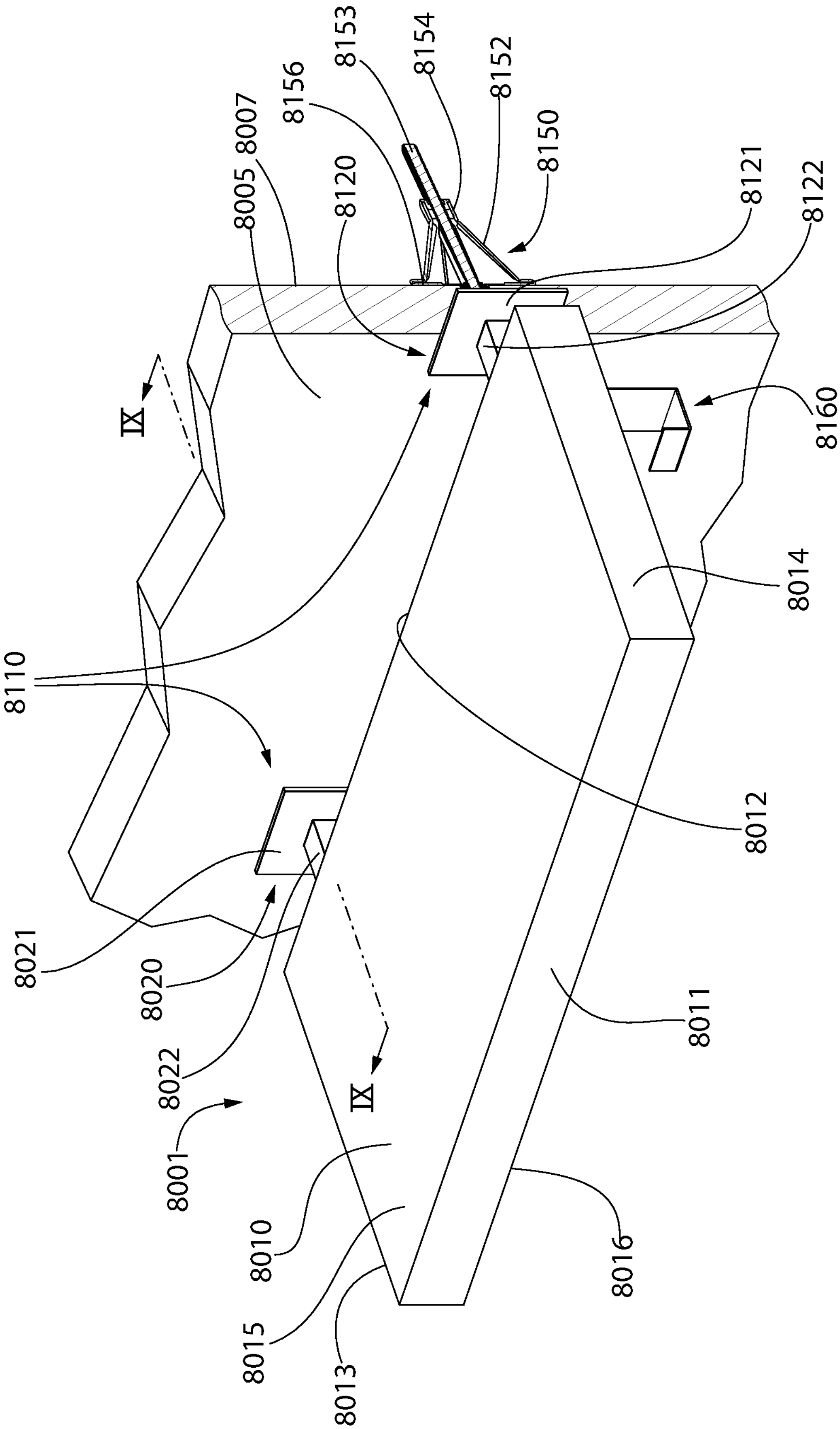
Figure 142:
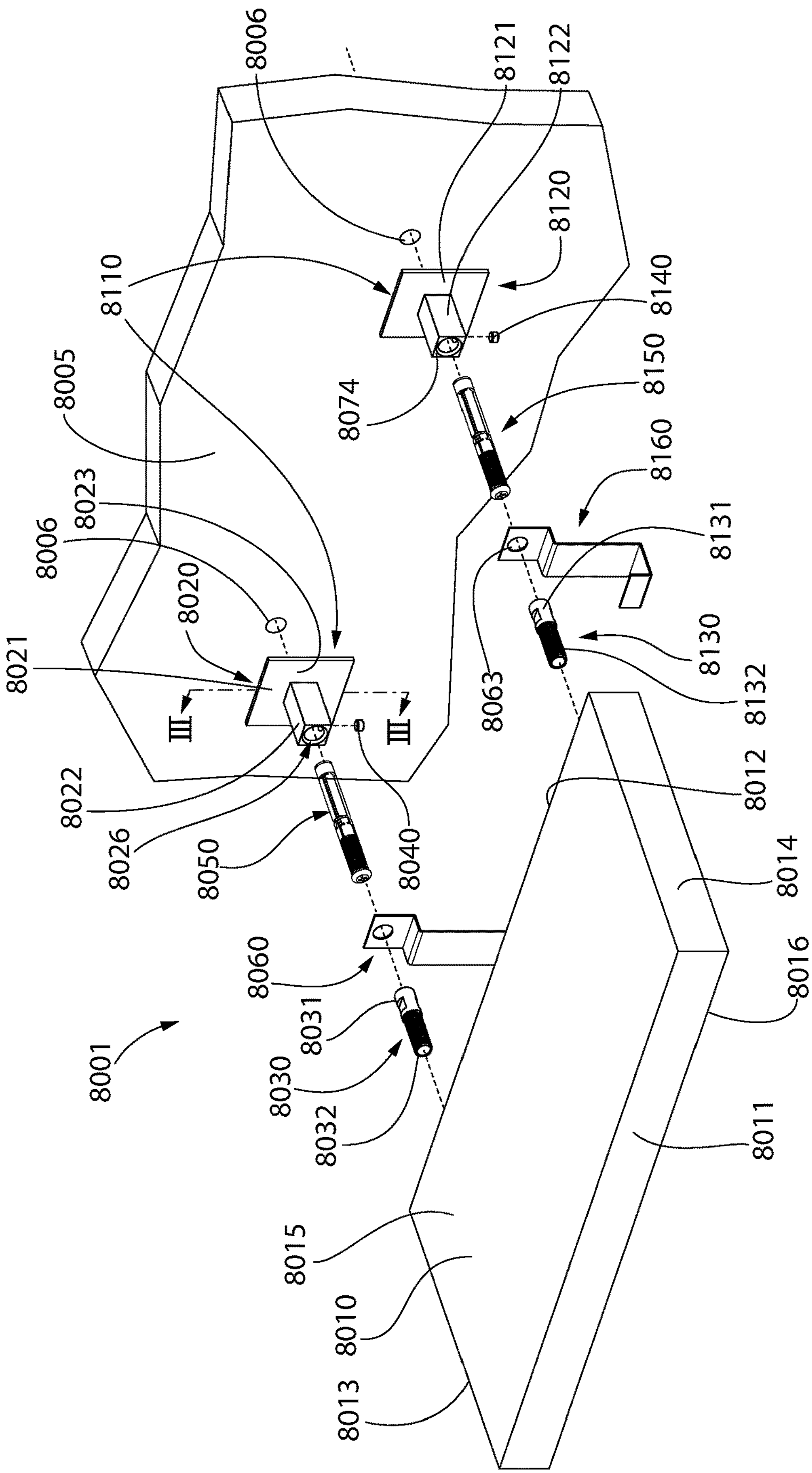
Figure 143:
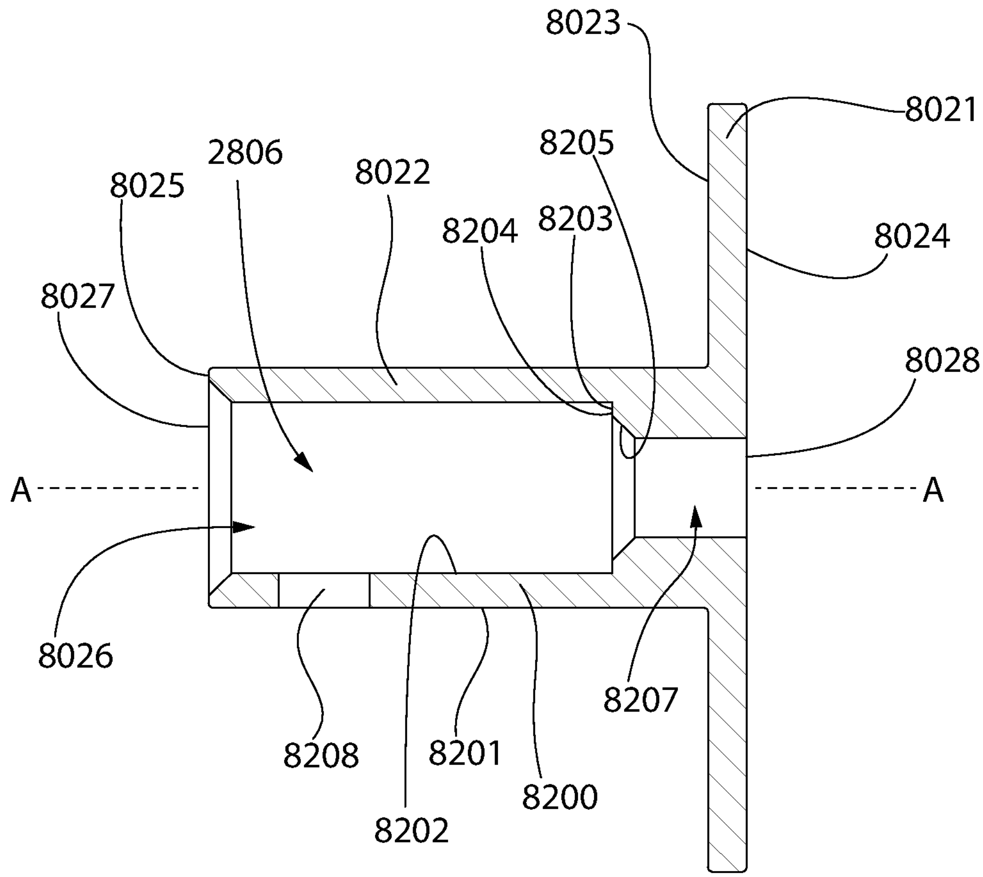
Figure 144:
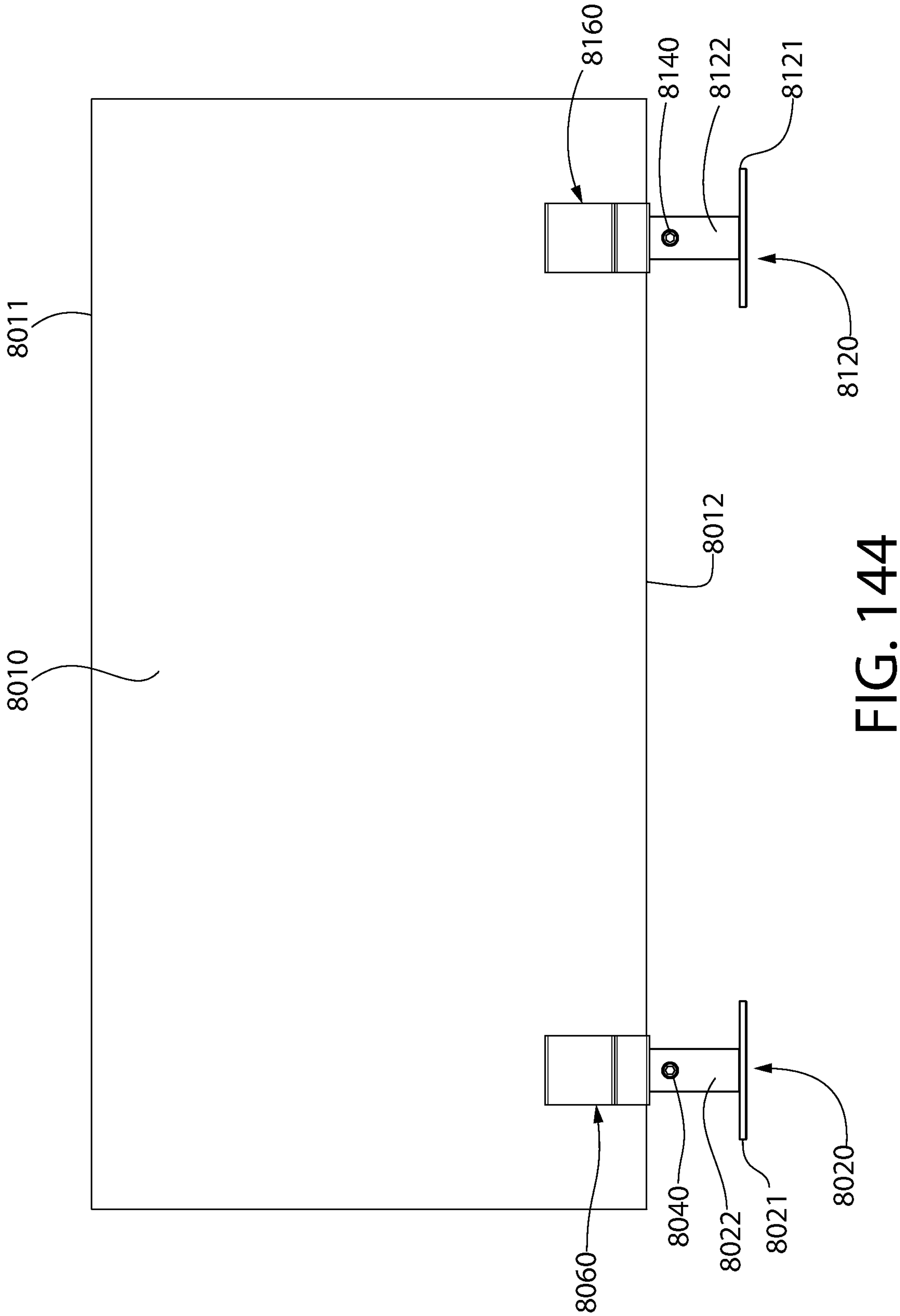
Figure 145A:
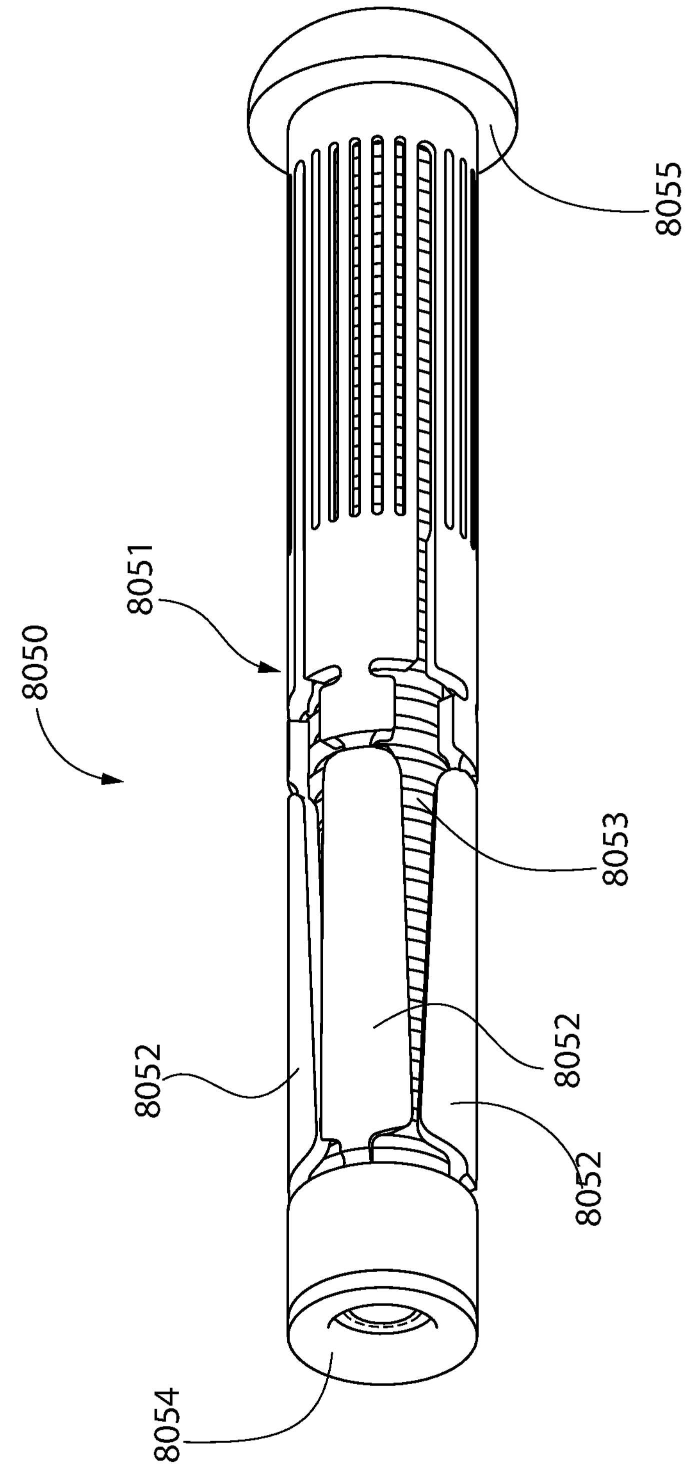
Figure 145B:
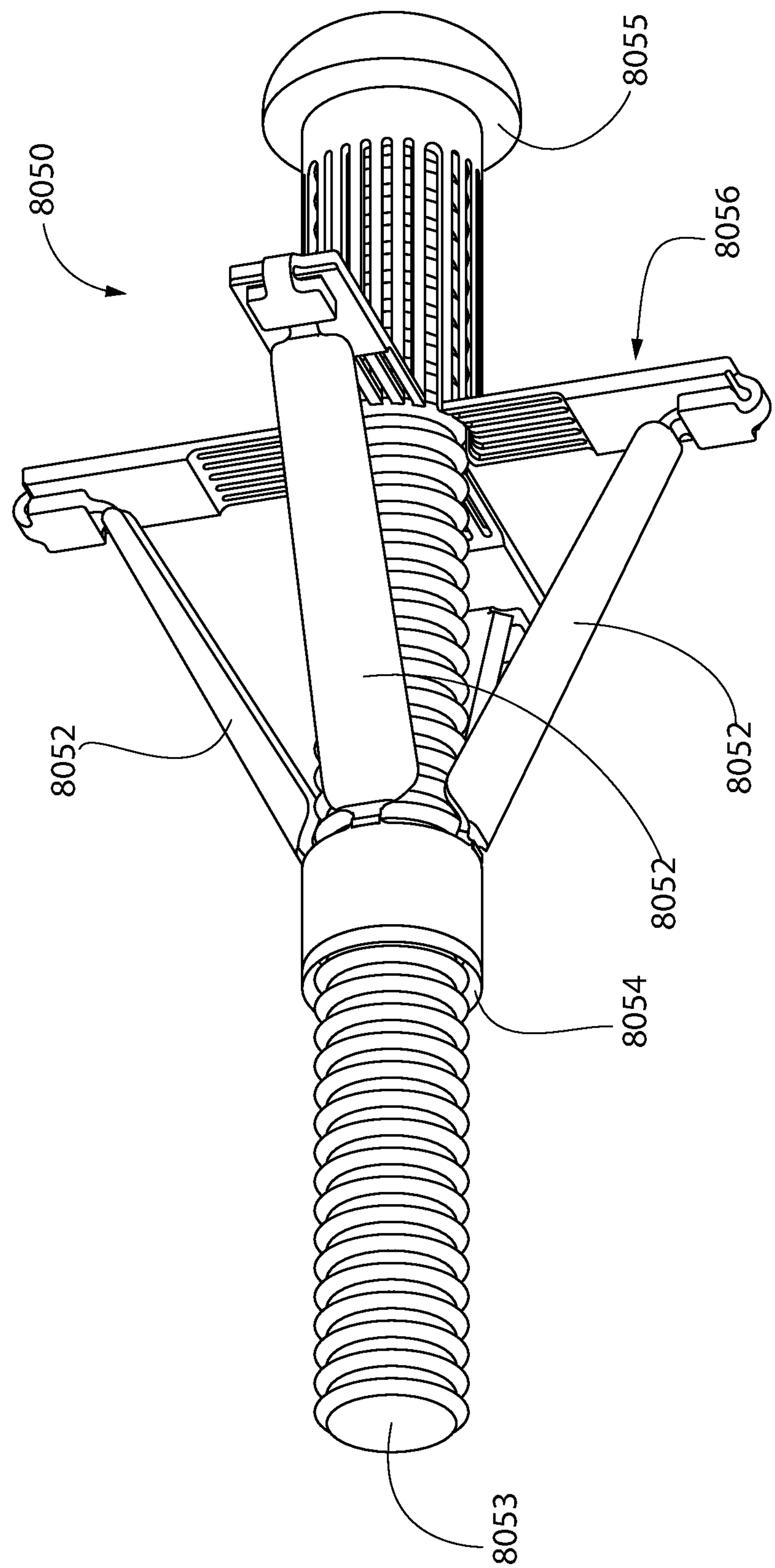
Figure 146:
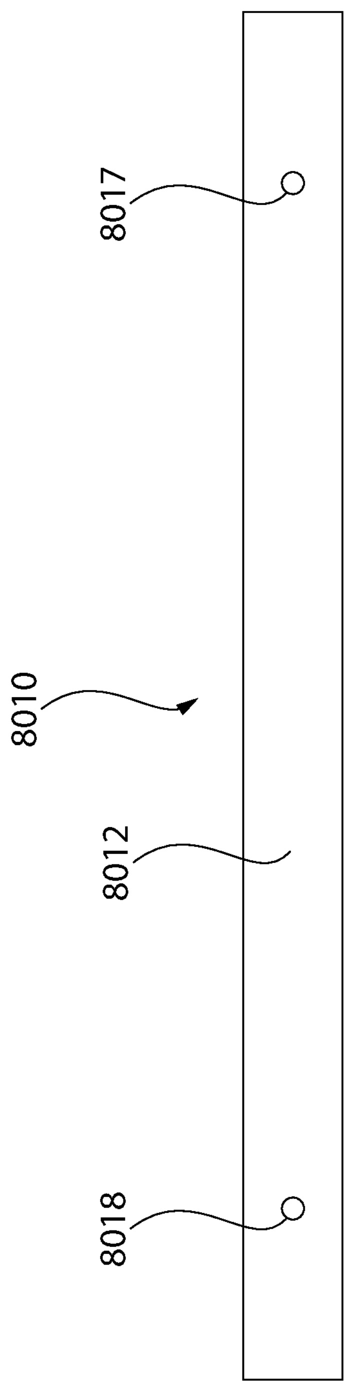
Figure 147A:
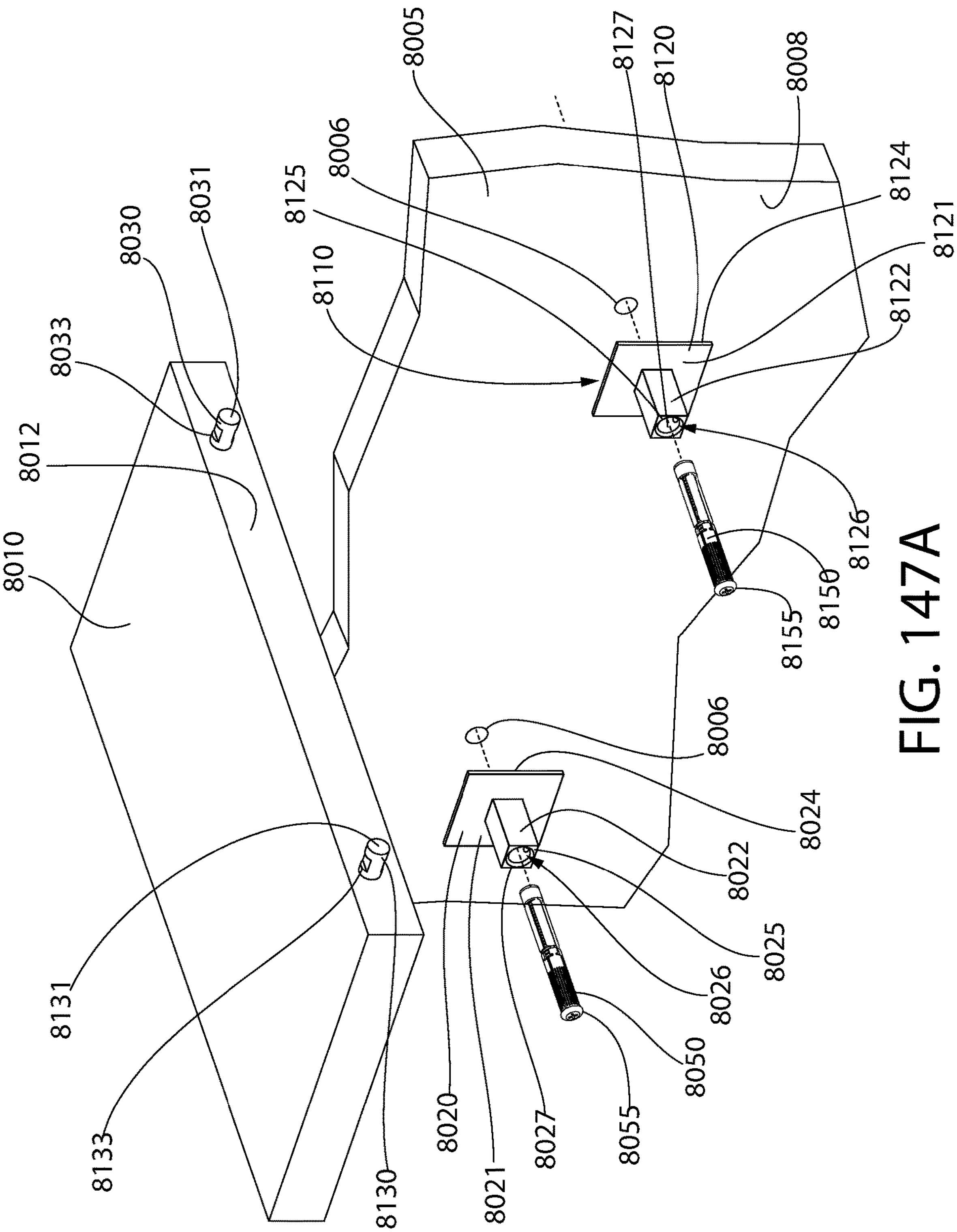
Figure 147B:
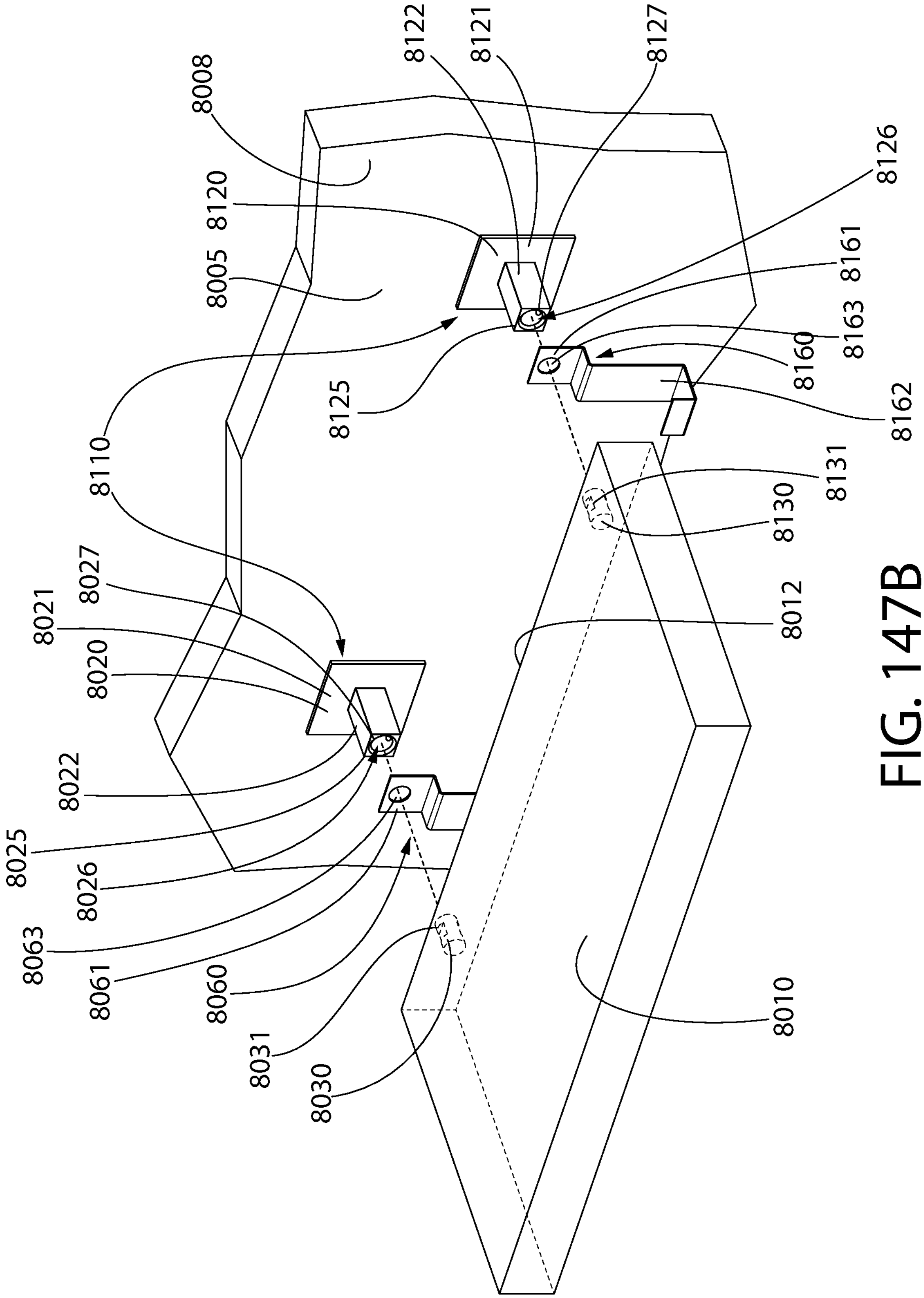
Figure 147C:
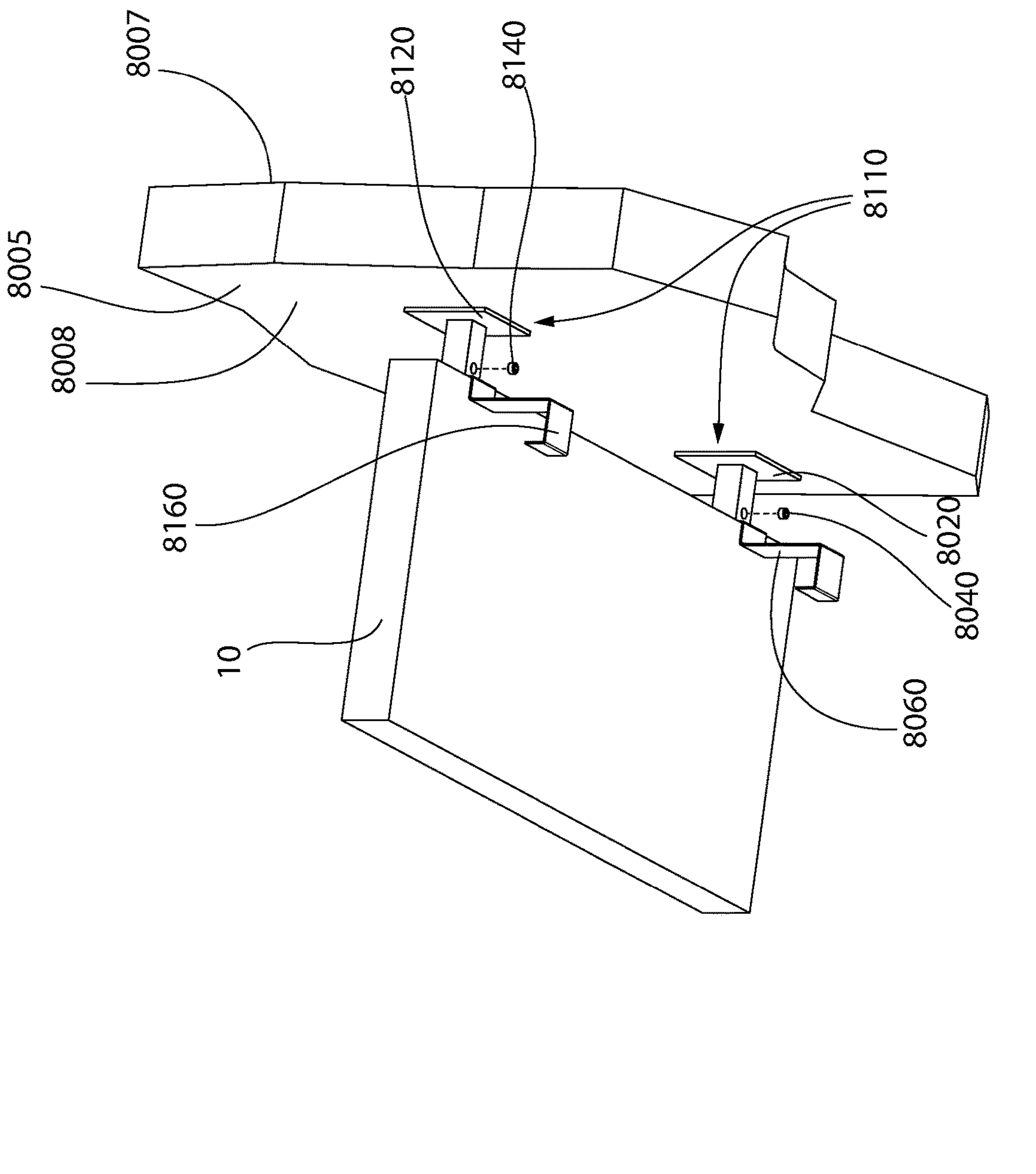
Figure 147D:
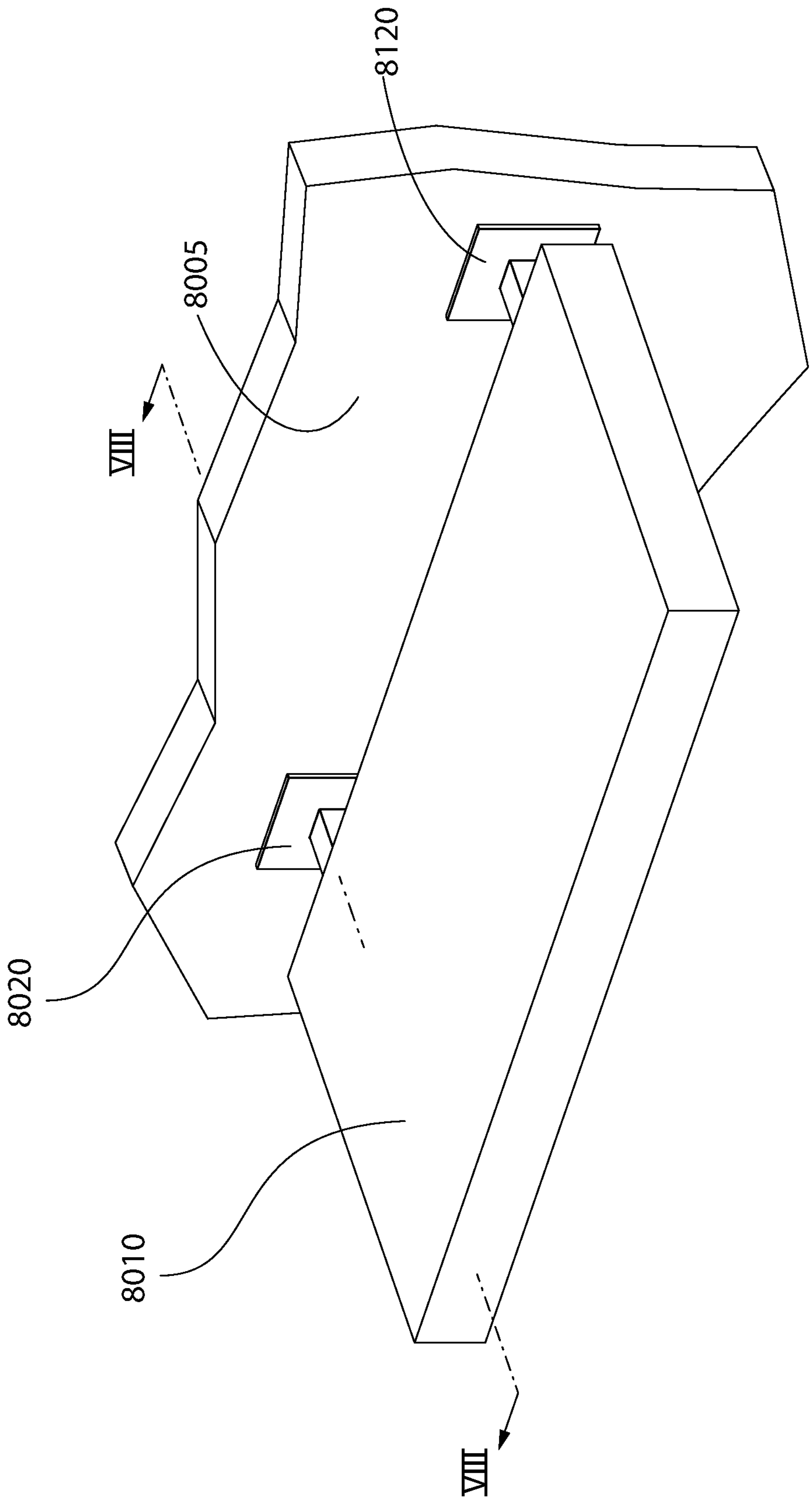
Figure 148:
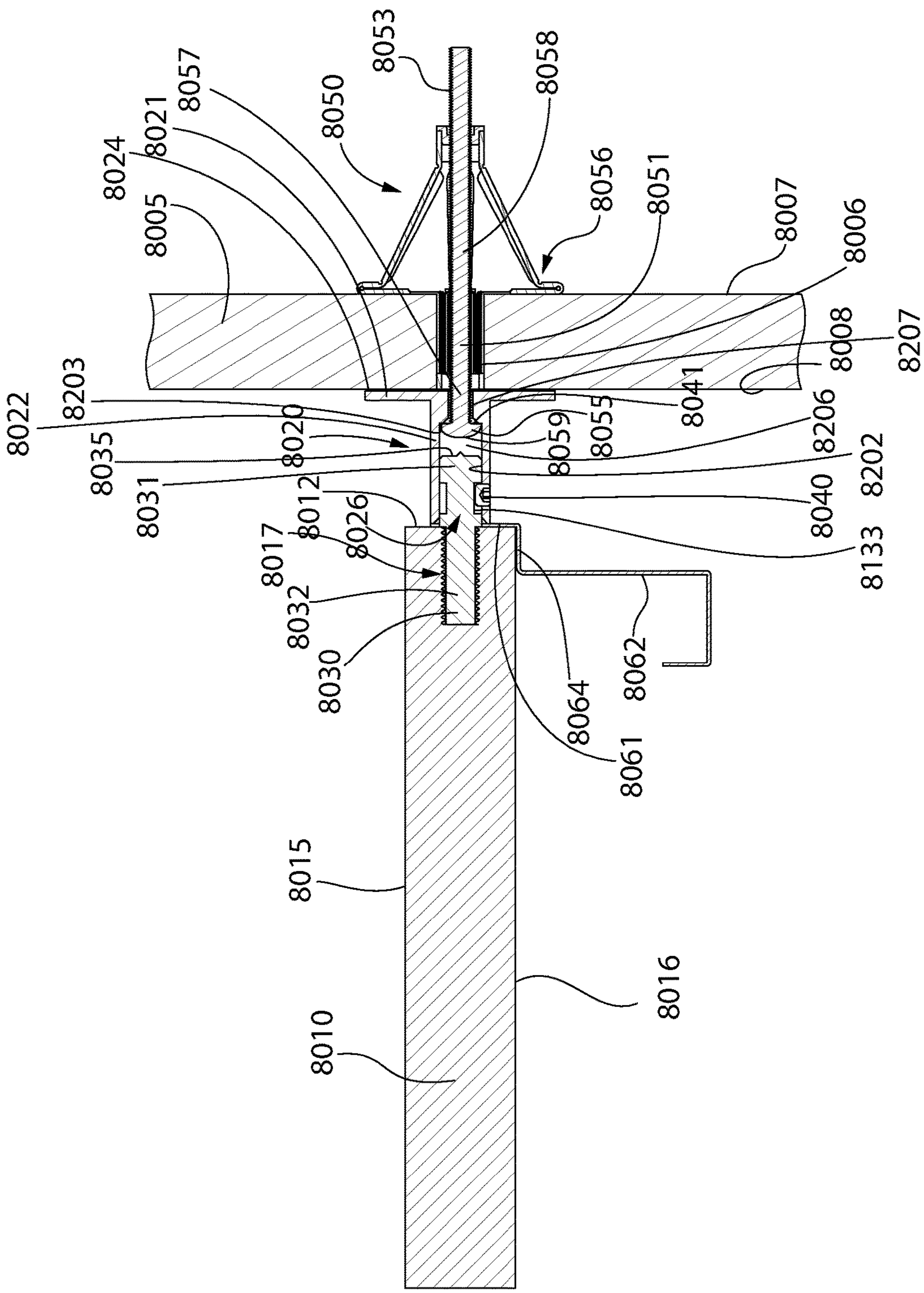
Figure 149:
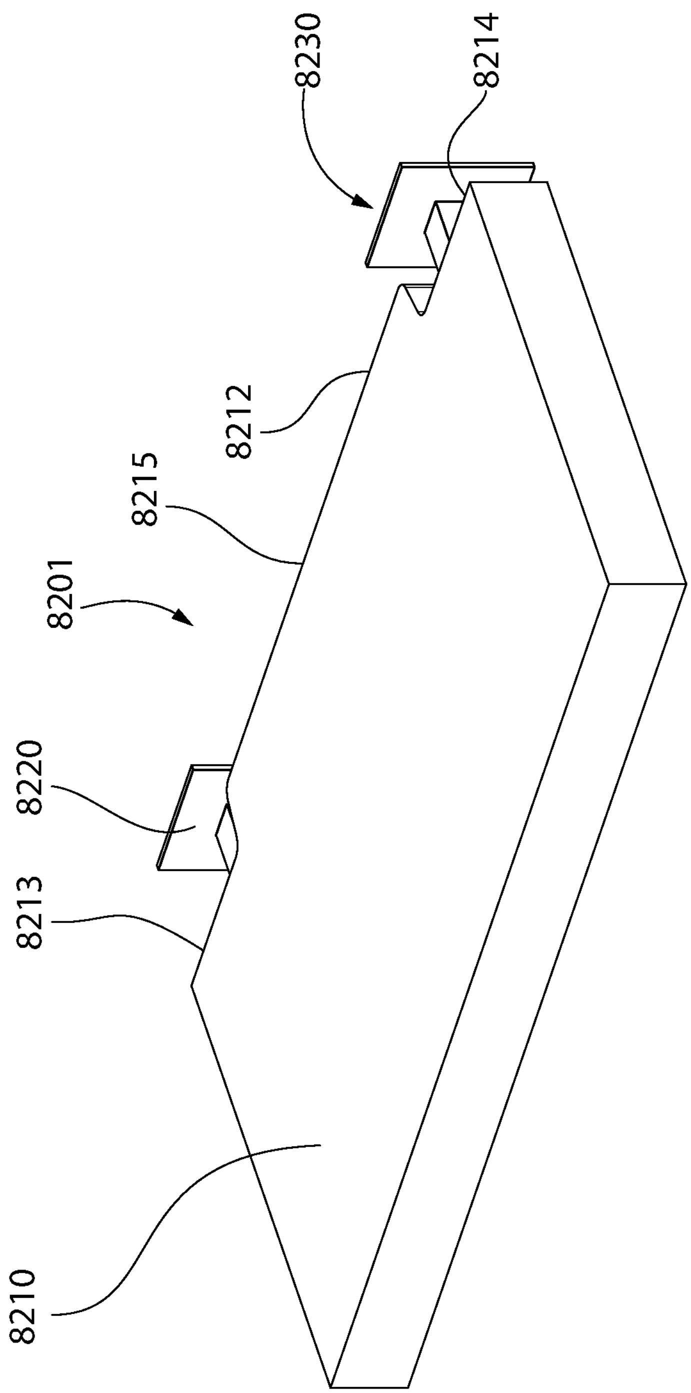
Figure 150:
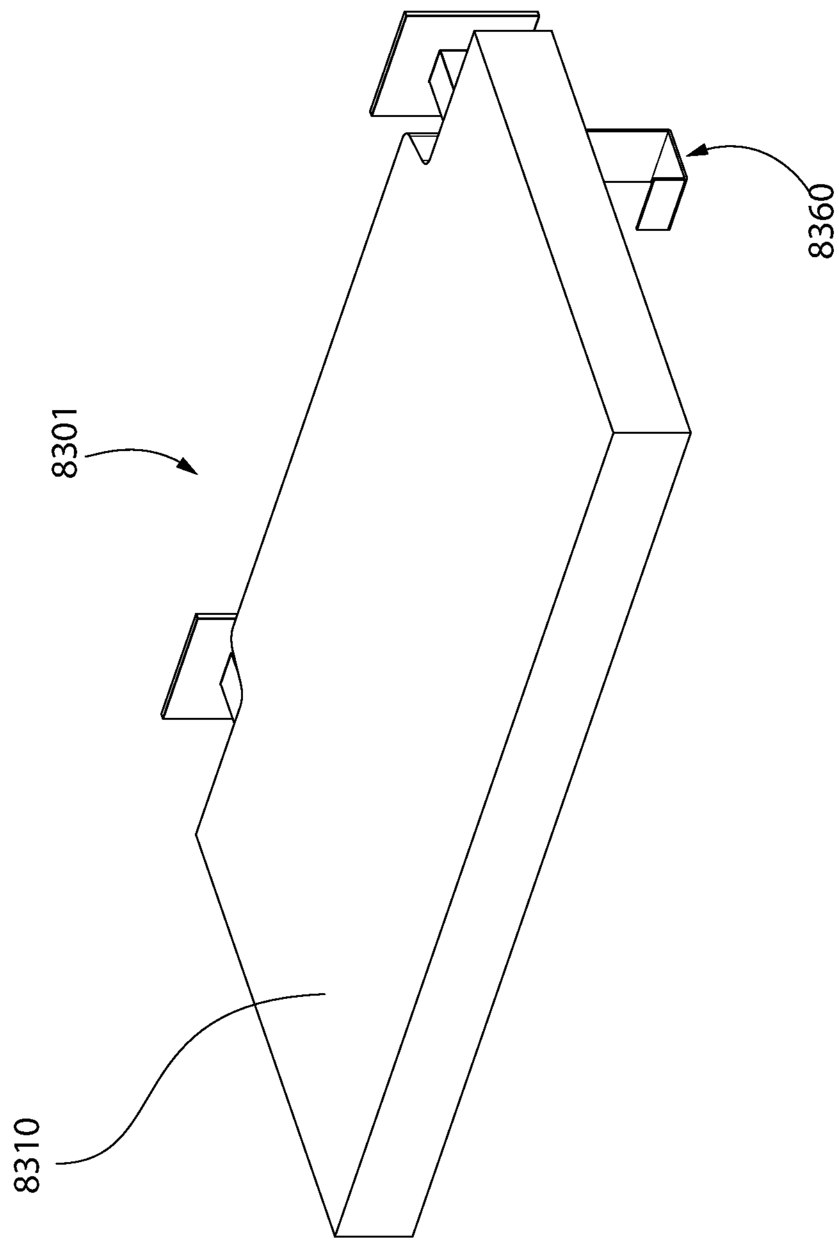

FIG. 124 is a first longitudinal cross-sectional view taken from FIG. 123;

FIG. 125 is a second longitudinal cross-sectional view taken from FIG. 123;

FIG. 126 is a transverse cross-sectional view taken from FIG. 123;

FIG. 127 is an end view of the linear roller bearing of FIG. 121;

FIG. 128 is an view of the door mounting system of FIG. 105 which alternatively incorporates the U-shaped linear roller bearing of FIG. 116;

FIG. 129 is a transverse cross-sectional end view of an alternative embodiment of a mounting door bracket configured for mounting to hollow door; and FIG. 130 is a longitudinal cross sectional view taken in FIGS. 108 and 128 as indicated which is representative of both of the linear needle roller bearings of the door mounting system assemblies of FIGS. 108 and 128 with respect to engagement of the needle rollers with the top surface of the mounting rail;

FIG. 131 is an exploded perspective view of a floating shelf apparatus in accordance with an embodiment of the present invention;

FIG. 132 is perspective view of the floating shelf apparatus of FIG. 131 in an assembled state;

FIG. 133 is a rear perspective view of a shelf of the floating shelf apparatus of FIG. 131;

FIG. 134 is a cross-sectional view taken along line IV-IV of FIG. 133;

FIG. 135 is a cross-sectional view of a mounting bracket of the floating shelf apparatus taken along line V-V of FIG. 131;

FIGS. 136A-136C are schematic cross-sectional views taken along line VI-VI of FIG. 132 illustrating the manner in which the shelf of FIG. 133 is mounted to the mounting bracket of FIG. 5;

FIG. 137 is a cross-sectional view of a mounting bracket of the floating shelf apparatus taken along line V-V of FIG. 131 in accordance with an alternative embodiment of the present invention;

FIGS. 138A-138C are schematic cross-sectional views taken along line VI-VI of FIG. 132 illustrating the manner in which the shelf of FIG. 3 is mounted to the mounting bracket of FIG. 137;

FIG. 139 is a cross-sectional view taken along line VI-VI of FIG. 132 in accordance with another embodiment of the present invention; and FIG. 140 is a perspective view of a floating shelf apparatus in accordance with another embodiment of the present invention;

FIG. 141 is a perspective view of a shelf system mounted to a support structure in accordance with a first embodiment of the present invention;

FIG. 142 is an exploded perspective view of the shelf system of FIG. 141;

FIG. 143 is a cross-sectional view taken along line III-III of FIG. 142;

FIG. 144 is a bottom view of the shelf system of FIG. 141;

FIG. 145A is a perspective view of a wall fastener of the shelf system of FIG. 141 in an unexpanded state;

FIG. 145B is a perspective view of the wall fastener of FIG. 146A in an expanded state;

FIG. 146 is a rear view of a shelf of the shelf apparatus of FIG. 141;

FIGS. 147A-147D sequentially illustrate the process of mounting the shelf system of FIG. 141 to a support structure such as a wall;

FIG. 148 is a cross-sectional view taken along line VIII-VIII of FIG. 147D;

FIG. 149 is a perspective view of a shelf system in accordance with another embodiment of the present invention; and FIG. 150 is a perspective view of the shelf system of FIG. 149 with hook members included.

All drawings are schematic and not necessarily to scale. Parts given a reference numerical designation in one figure may be considered to be the same parts where they appear in other figures without a numerical designation for brevity unless specifically labeled with a different part number and described herein.

DETAILED DESCRIPTION

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Unless otherwise specified, all percentages and amounts expressed herein and elsewhere in the specification should be understood to refer to percentages by weight. The amounts given are based on the active weight of the material. According to the present application, the term "about" means+/−5% of the reference value.

Referring now to FIGS. 1-4 and 6, the present invention includes a storage system 101 that comprises a support structure 102, a vertically oriented storage rack apparatus 100 (or "storage rack" or "rack" for brevity) coupled to the support structure, and at least one fastener 400. The rack apparatus 100 may be coupled to the support surface 102 by the at least one fastener 400—herein referred to as the "installed-state." In preferred embodiments, at least two vertically spaced fasteners are provided. In the installed-state, the rack apparatus 100 may be used to support and store one or more containers 500—herein also referred to as the "in-use state." The term "container" is used synonymously and interchangeably with the term "bottle" also referred to herein. Non-limiting examples of containers/bottles 500 include alcoholic and non-alcoholic beverage containers (e.g., wine bottles, etc.), as well as other non-beverage liquid containers (e.g. olive oil, etc.).

In a non-limiting embodiment, the support structure 102 may be a preferably rigid wall having an outer surface 103 that is opposite an inner surface 104. The outer surface 103 may face a room environment (i.e., the interior of a kitchen, restaurant, or the like) and the inner surface 104 may face a partition space or outer superstructure of a building (i.e., voids between adjacent dry wall boards and laterally spaced framing boards). Non-limiting examples of the wall may include dry-wall, gypsum board, plywood, and the like. The wall may optimally have a vertical orientation in one embodiment; however, the rack 100 may be used with a wall oriented at an acute angle to a vertical reference plane between 0 and 90 degrees.

The rack apparatus 100 may be vertically elongated in structure and oriented when installed on wall 102 comprising a first side or lateral major surface 110 that is opposite a second side or lateral major surface 120, and a plurality of side surfaces 130 that extend between the first and second major surfaces 110, 120. The major surfaces may be substantially parallel to each other and planar/flat in one embodiment as shown. In other possible configurations, the major surfaces may be arranged at an acute angle to each other. When facing the support surface wall 102, the first major surface 110 may be considered a left lateral major surface and the second major surface 120 may be considered a right lateral major surface for convenience of reference. The plurality of side surfaces 130 of rack apparatus 100 may collectively define a perimeter of each of the first major surface 110 and the second major surface 110.

The plurality of side surfaces 130 of rack apparatus 100 may comprise a first vertical front side surface 131 facing away from support structure 102 (e.g. wall) that is opposite a second vertical rear side surface 132 facing the support structure. The plurality of side surfaces 130 of rack apparatus 100 may further comprise an upward facing top surface 133 that is opposite a downward facing bottom surface 134. The first vertical side surface 131 of rack apparatus 100 may intersect the top surface 133 and the bottom surface 134 of rack apparatus 100. The second vertical side surface 132 may intersect the top surface 133 and the bottom surface 134 of rack apparatus 100. The first vertical side surface 131 and the second vertical side surface 132 of rack apparatus 100 may be substantially parallel. The top surface 133 and the bottom surface 134 of rack apparatus 100 may be substantially parallel.

The rack apparatus 100 may be elongated (i.e. length greater than lateral width and front-rear depth) such that the first and second major surfaces 110, 120 of the rack apparatus 100 extend along and substantially parallel to a longitudinal axis A-A, which defines a vertical centerline of the rack equally spaced between front and rear side surfaces and right and left lateral surfaces. The first vertical side surface 131 and the second vertical side surface 132 may extend along the longitudinal axis A-A. The longitudinal axis A-A may intersect the top surface 133 and the bottom surface 134. The rack apparatus 100 may further comprise a transverse axis B-B that extends perpendicular to the longitudinal axis A-A, whereby the transverse axis B-B intersects both the first and second major surface 110, 120 of the rack apparatus 100.

In the installed state, the second vertical rear surface 132 may face the outer surface 103 of the support structure 102. As discussed in greater detail herein, in the installed-state the fastener 400 may extend from the second vertical side surface 132 of the rack apparatus 100 and through the support structure 10. The second vertical side surface 132 of the rack apparatus 100 may abut and directly contact the outer surface 103 of the support structure 102. In the installed state, the first and second major surfaces 120 may be oriented in a direction that is substantially orthogonal to the outer surface 103 of the support structure 102.

Figure 22A:
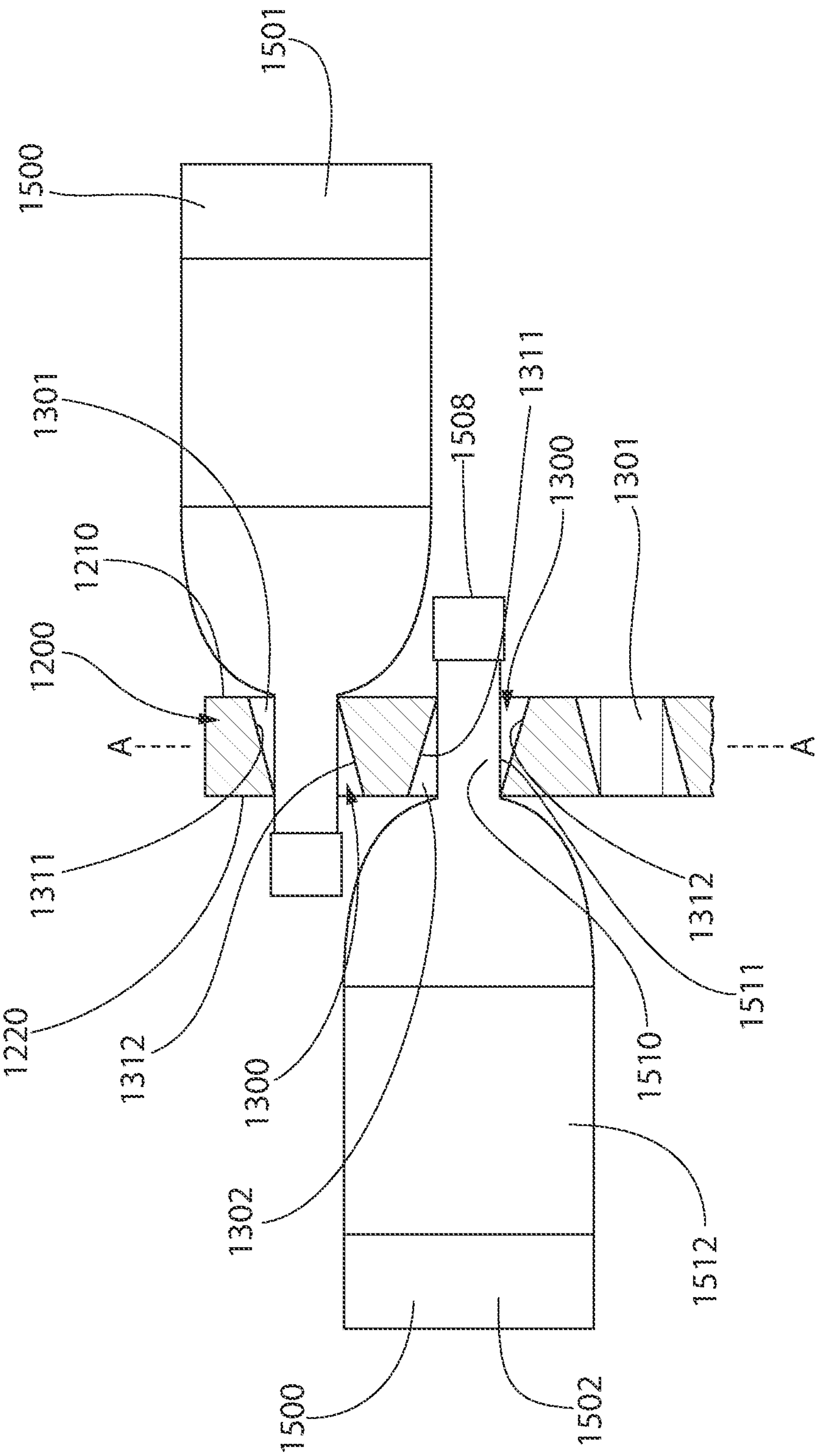
FIG. 22A is a close-up cross-sectional view of the rack apparatus along line VII-VII of FIG. 18 before insertion of a bottle.
Figure 22B:
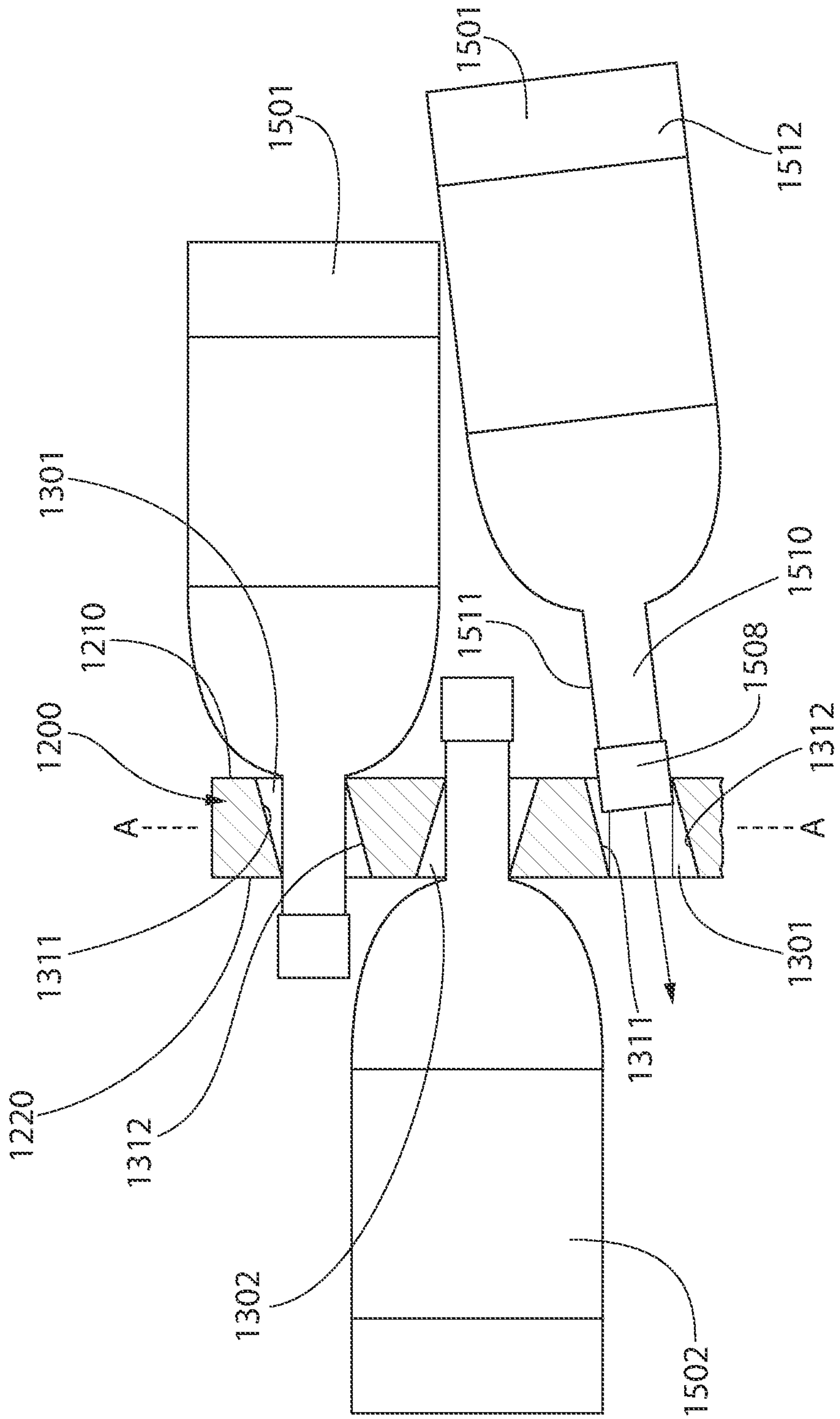
FIG. 22B is the close-up cross-sectional view of FIG. 22A during insertion of the bottle.
Figure 22C:
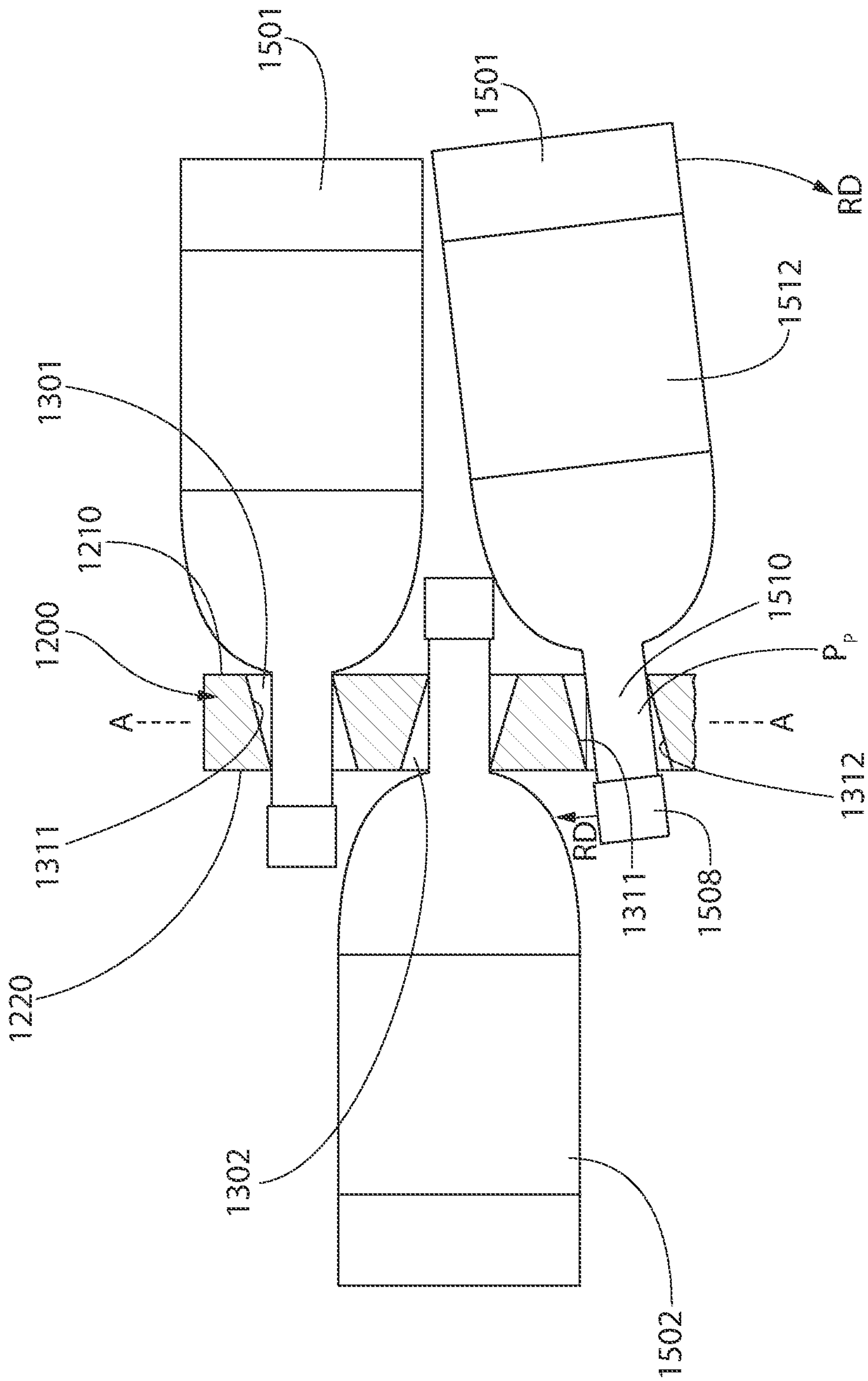
FIG. 22C is the close-up cross-sectional view of FIG. 22A during insertion of the bottle.
Figure 22D:
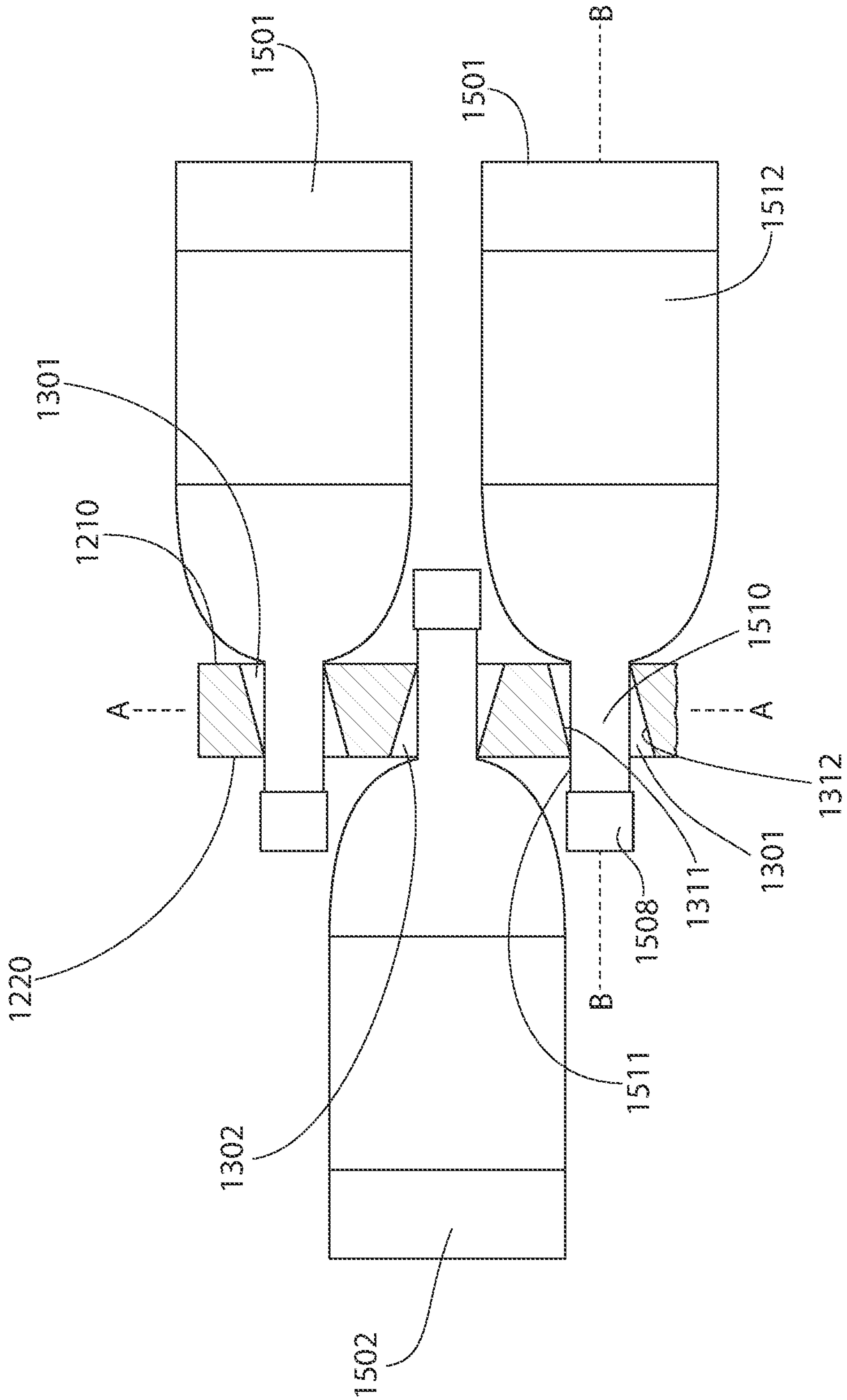
FIG. 22D is the close-up cross-sectional view of FIG. 22A after insertion of the bottle into the in-use state.
Figure 23:
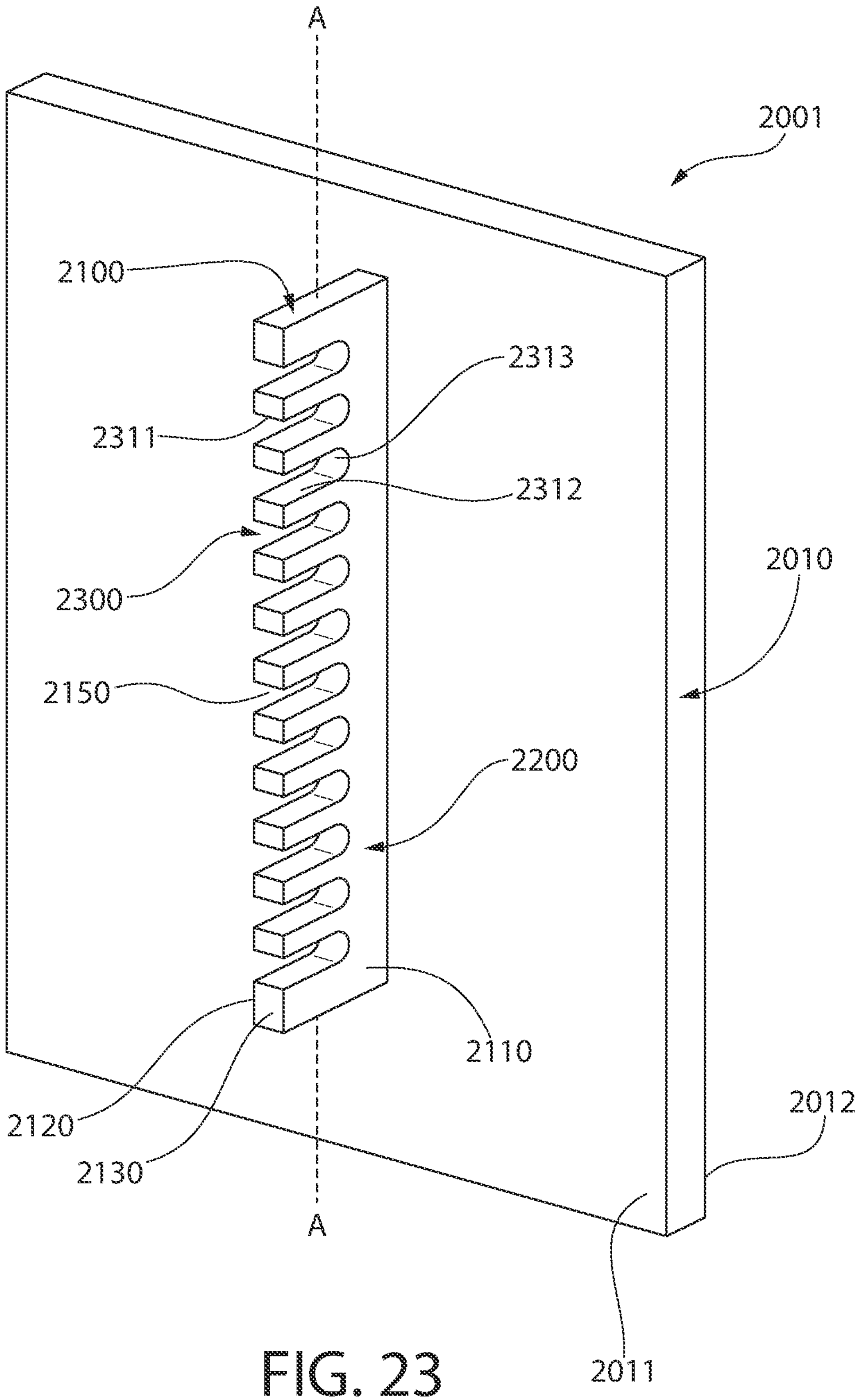
FIG. 23 is perspective view of a rack apparatus in an installed state according a third embodiment of the present invention.
Figure 24:
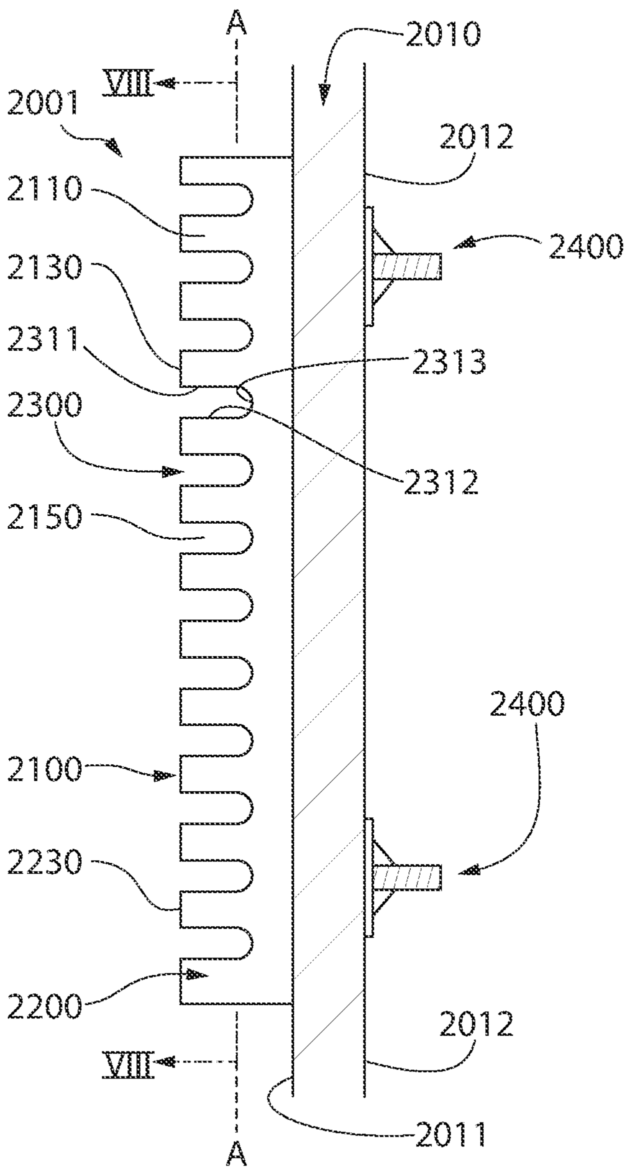
FIG. 24 is side view of the rack apparatus of FIG. 23 in the installed state.
Figure 25:
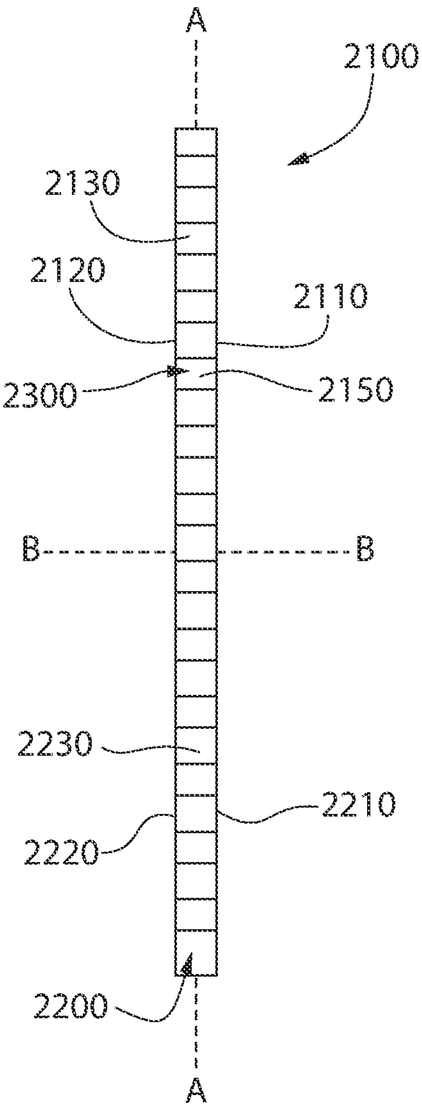
FIG. 25 is a front view of the rack apparatus of FIG. 23.
Figure 26:
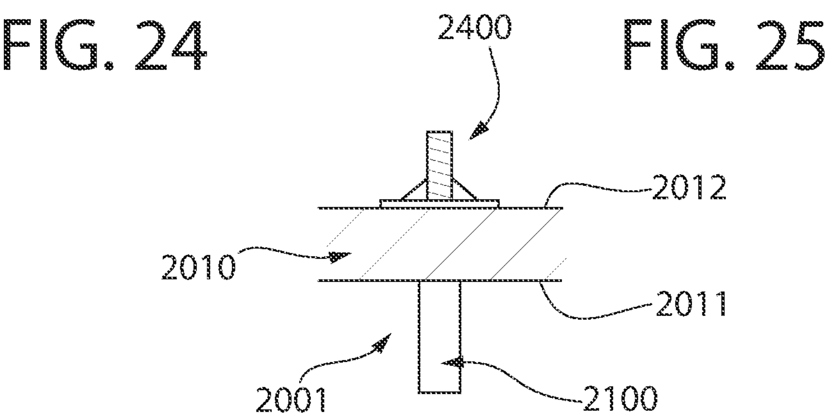
FIG. 26 is a top view of the rack apparatus of FIG. 23 in the installed state.
Figure 27:
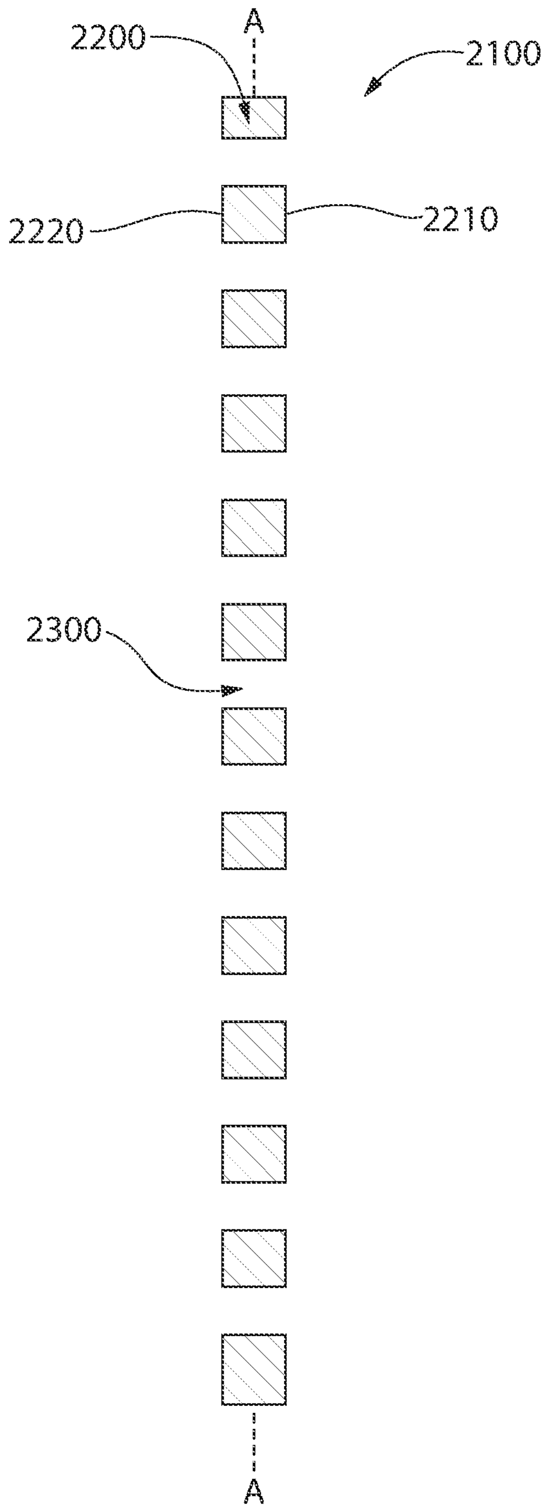
FIG. 27 is a cross-sectional view of the rack apparatus along line VIII-VIII of FIG. 24.
Figure 28:
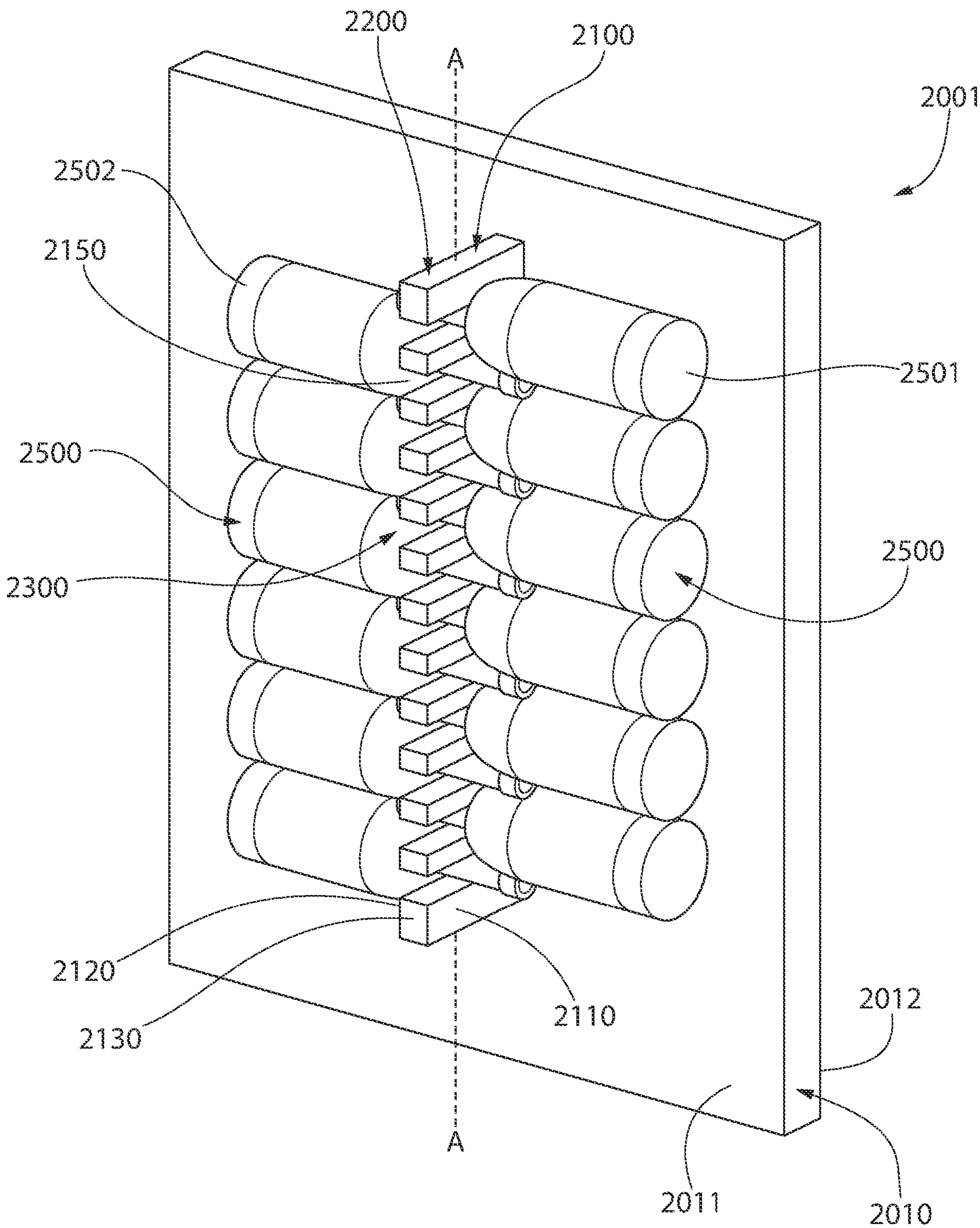
FIG. 28 is a perspective view of the rack apparatus of FIG. 23 in an in-use state.
Figure 29:
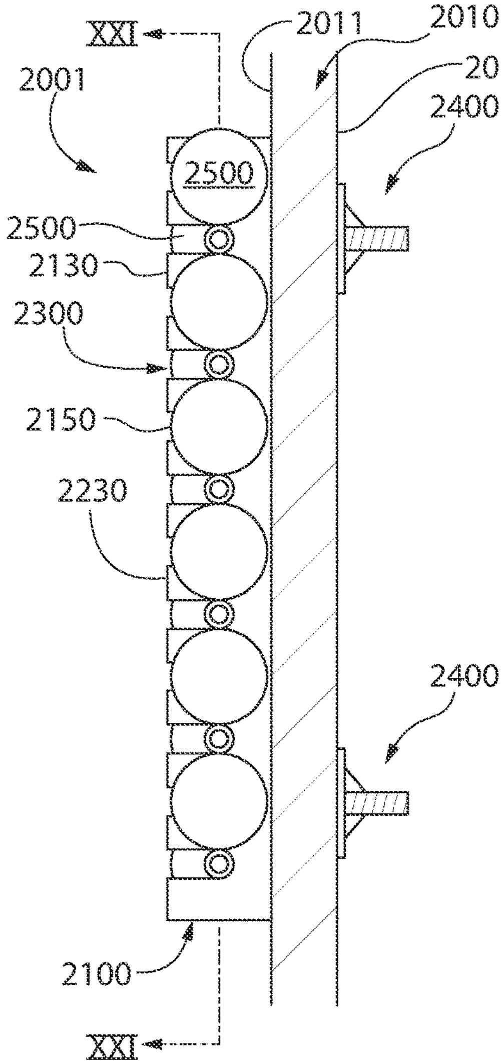
FIG. 29 is side view of the rack apparatus of FIG. 28 in the in-use state.
Figure 30:
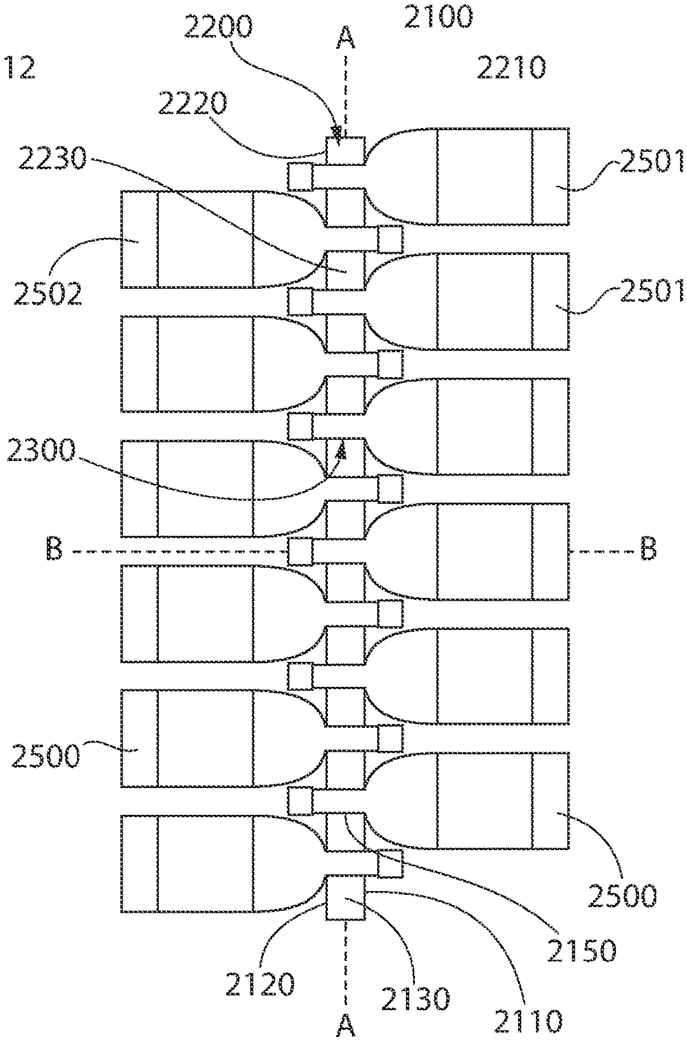
FIG. 30 is a front view of the rack apparatus of FIG. 28 in the in-use state.
Figure 31:
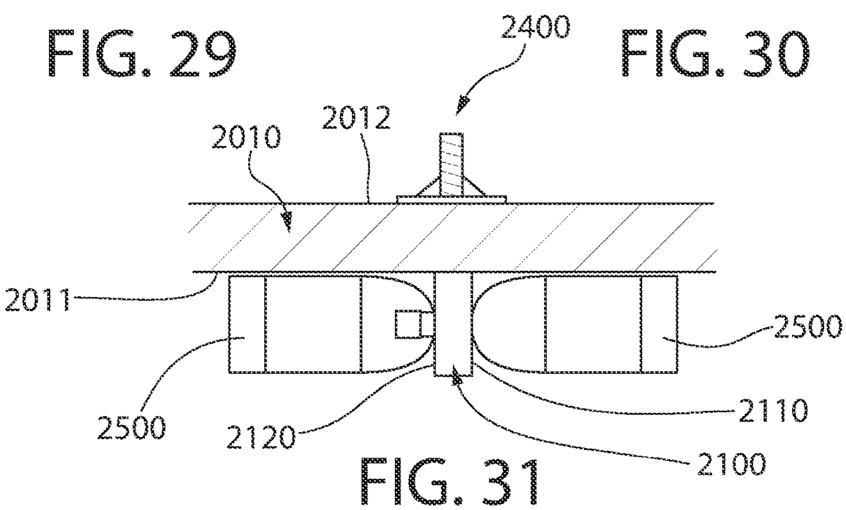
FIG. 31 is a top view of the rack apparatus of FIG. 28 in the in-use state.
Figure 32:
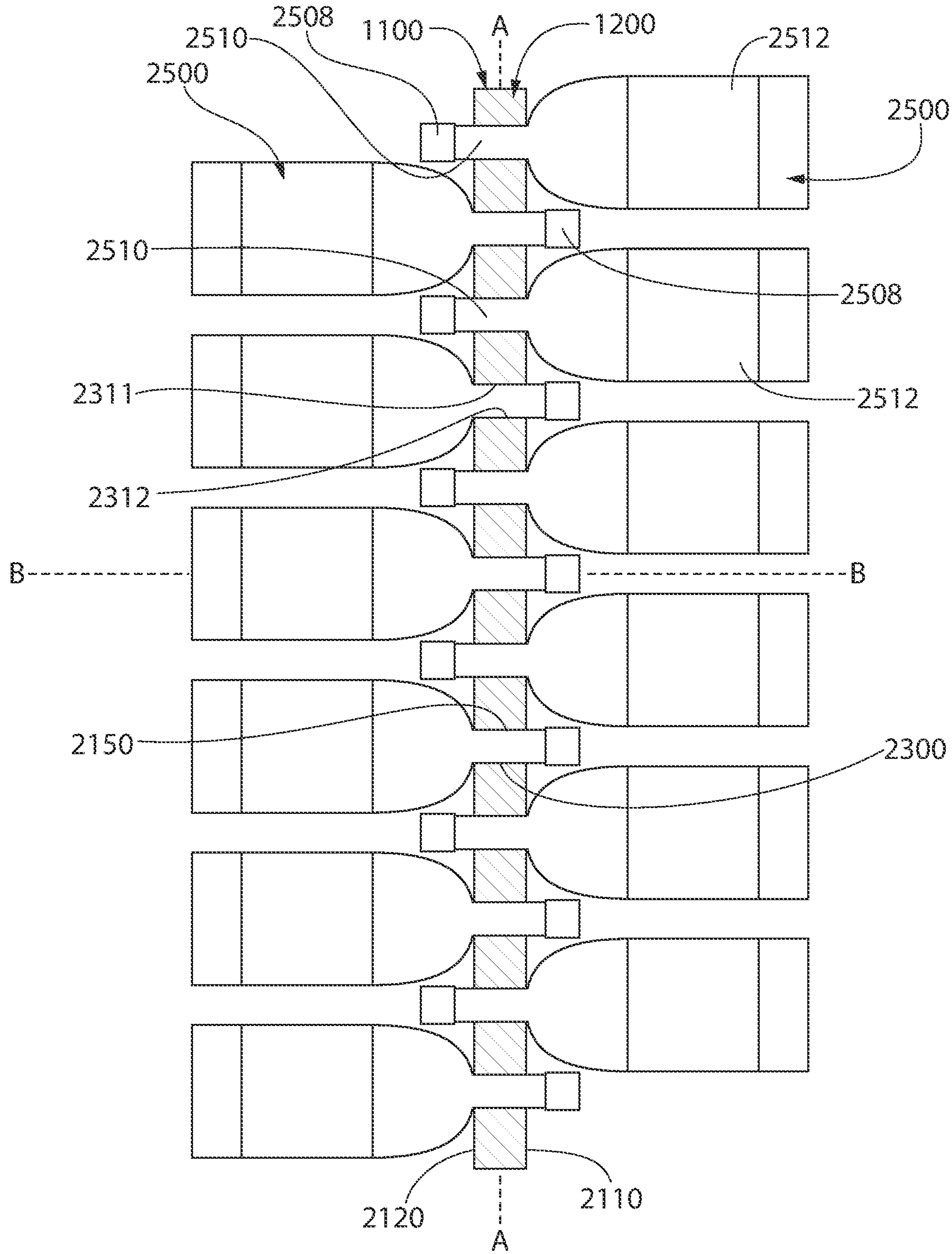
FIG. 32 is a cross-sectional view of the rack apparatus in the in-use state along line XXI-XXI of FIG. 29.

The body 200 of rack apparatus 100 comprises a plurality of vertically spaced apart container-mounting apertures 300 extending through and between major surfaces 110 and 120, as further described herein. The apertures are used to support the containers 500 from rack 100. In the embodiment of FIGS. 1-11, the mounting apertures 300 each define an aperture centerline CL which is oriented parallel to transverse axis B-B and perpendicular to longitudinal axis A-A (see, e.g. FIG. 5). In other embodiments, the mounting embodiments may be obliquely angled both the transverse and longitudinal axes (see, e.g. FIGS. 22A-B).

The rack apparatus 100 further comprises a plurality of container mounting features 150. These features include through passageways 150-1 defined by the mounting apertures 300 that extend from and through the first major surface 110 to the second major surface 120. As discussed in greater detail herein, the passageways 150-1 formed by each of the mounting features 150 may extend continuously from the first major surface 110 to the second major surface 120 to create an open channel there-between for inserting a neck portion of the container 500 therethrough. Each passageway 150-1 formed by each mounting feature 150 extends from the first major surface 110 to the second major surface 120 along a transverse axis B-B in a direction that is transverse the longitudinal axis A-A. The plurality of passageways 150-1 are arranged in a linear array that extends vertically along the longitudinal axis A-A, whereby each passageway is offset from an adjacent passage way by a non-zero distance as measured along the longitudinal axis A-A (the term "non-zero" connoting that the distance has some measurement value greater than zero).

In some embodiments, the rack apparatus 100 may further comprise an outer layer 200-2 that surrounds at least a portion of the body 200—as discussed in greater detail herein.

The rack body 200 may comprise a lateral first major surface 210 (e.g. right side when facing support structure wall 102) that is opposite a lateral second side major surface 220 (left side), and a plurality of side surfaces 230 that extend between the first and second major surfaces 210, 220 of the body 200. The plurality of side surfaces 230 may collectively define a perimeter of each of the first major surface 210 and the second major surface 210 of the body 200. The plurality of side surfaces 230 of the body 200 may comprise a first vertical front side surface 231 that is opposite a second vertical rear side surface 232. The plurality of side surfaces 230 of the body 200 may further comprise a top surface 233 that is opposite a bottom surface 234. The first vertical side surface 231 of the body 200 may intersect the top surface 233 and the bottom surface 234 of the body 200. The second vertical side surface 232 may intersect the top surface 233 and the bottom surface 234 of the body 200. The first vertical side surface 231 and the second vertical side surface 232 of the body 200 may be substantially parallel. The top surface 233 and the bottom surface 234 of the body 200 may be substantially parallel.

It bears noting that major surfaces 110, 120 of the rack apparatus 100 correspond to major surfaces 210, 220 of the rack body 200, respectively. Similarly, side surfaces 130 of the rack apparatus 100 described above (front 131, rear 132, top 133, bottom 134) each correspond to side surfaces 230 of the rack body 200 (front 231, rear 232, top 233, bottom 234). For convenience of reference, rack body 200 defines a lateral width between right and left lateral major surfaces 210, 220 (lateral major surfaces 110, 120), a depth between front and rear side surfaces 231, 232, and a length or height between top and bottom surfaces 233, and 234.

The surfaces 210 (right), 220 (left), 231 (front), 232 (rear), 233 (top), and 234 (bottom) are defined by right, left, front, rear, top, and bottom walls of the rack body 200 corresponding to these surfaces.

The rack body 200 is elongated in one embodiment such that the first and second major surfaces 210, 220 of the body 200 extend along and substantially parallel to the longitudinal axis A-A. The first vertical side surface 231 and the second vertical side surface 232 may extend along and parallel to the longitudinal axis A-A. The longitudinal axis A-A may intersect the top surface 233 and the bottom surface 234 of the body 200. The transverse axis B-B may intersect both the first and second major surface 210, 220 of the body 200.

The body 200 is preferably rigid in construction and may be formed from a first material such as wood, metal, ceramic, rigid/hard plastic, or a composite material (e.g. plywood, MDF, etc.) as some non-limiting examples. The first material may be rigid and have a first hardness. In a non-limiting example, the body 200 is formed from wood. In a non-limiting example, the body 200 may be formed from metal. The body 200 may be provided as a board or plank shaped piece of material, whereby the mounting apertures 300 are formed by cutting material from the board and/or plank. Non-limiting examples of cutting include drilling, CNC routing, and the like.

According to some embodiments, the first major surface 110 of the rack apparatus 100 may be formed from the body 200 such that the first major surface 110 comprises at least a portion of the first major surface 210 of the body 200. According to some embodiments, the second major surface 120 of the rack apparatus 100 may be formed from the body 200 such that the second major surface 120 may comprise at least a portion of the second major surface 220 of the body 200. According to some embodiments, the plurality of side surfaces 130 of the rack apparatus 100 may be formed from the body 200 such that at least one of the plurality of side surfaces 130 comprises at least a one of the plurality of side surfaces 230 of the body 200.

In particular, the first vertical side surface 131 of the rack apparatus 130 may comprise the first vertical side surface 231 of the body 200. The second vertical side surface 132 of the rack apparatus 130 may comprise the second vertical side surface 232 of the body 200. The top surface 133 of the rack apparatus 130 may comprise the top surface 233 of the body 233. The bottom surface 134 of the rack apparatus 130 may comprise the bottom surface 234 of the body 233.

According to the embodiments where the rack apparatus 100 may further comprise an outer layer 200-2 (represented by dashed lines in FIG. 3) to assist with retaining the container 500 (e.g. bottle) to the rack 200. The outer layer may form at least a portion of one or more of the first major surface 110 of the rack apparatus 100, the second major surface 120 of the rack apparatus 100, and/or one of the side surfaces 130 of the rack apparatus 100. In a non-limiting example, the outer layer 200-2 may be formed from a second material that is relatively softer than the first material which forms an inner core 200-1. The second material of the outer layer 200-2 may have a second hardness, whereby the second hardness is lower than the first hardness of the core material of the rack body 200. The second material may be formed a deformable resilient material in some embodiments. Non-limiting examples of the second material include organic polymers, inorganic polymers, elastomers, rubber, and composite materials as some non-limiting examples. The second material may be selected such to provide a frictional grip on rigid and hard materials from which the container 500 (e.g. bottle) may be constructed, such as hard plastic, glass, ceramic, metal, and the like. As discussed in greater detail here, the second material may help provide an increased frictional engagement/interference fit against an outer surface 511 of a container 500—specifically the outer surface 511 of a neck portion 510 of a container 500, to retain the container in the mounting aperture 300.

Referring now generally to FIGS. 1-2, 5 and 11, as discussed, the container mounting apertures 300 of rack 100 will now be discussed in greater detail. The plurality of apertures 300 form at least a portion of the mounting features 150 of the rack apparatus 100, along with the rack walls that define the apertures. Specifically, each aperture 300 forms the through passageway 150-1 of the mounting feature 150 that extends from the first major surface 110 to the second major surface 120 of the rack apparatus 100. Each aperture 300 is formed as a "closed-geometry" completely bounded and circumscribed by aperture walls 310 all around. Accordingly, aperture 300 does not penetrate the front or rear surfaces 131, 132 of the rack 100 in the present embodiment, only the major surfaces (see, e.g. FIG. 5). Each aperture 300 thus is defined by the aperture walls 310 that extend completely through the rack body 200 from the first major surface 110 of the rack apparatus 100 to the second major surface 120 of the rack apparatus 100.

As discussed in greater detail herein, each of the plurality of apertures 300 are configured to receive a portion of the container 500, specifically the narrowed neck portion, whereby at least a portion of the aperture walls 310 are configured to contact and engage an outer surface 511 of the neck portion of the container 500, thereby supporting the container 500 in a cantilevered manner when the storage system 101 is in the in-use state.

Figure 33:
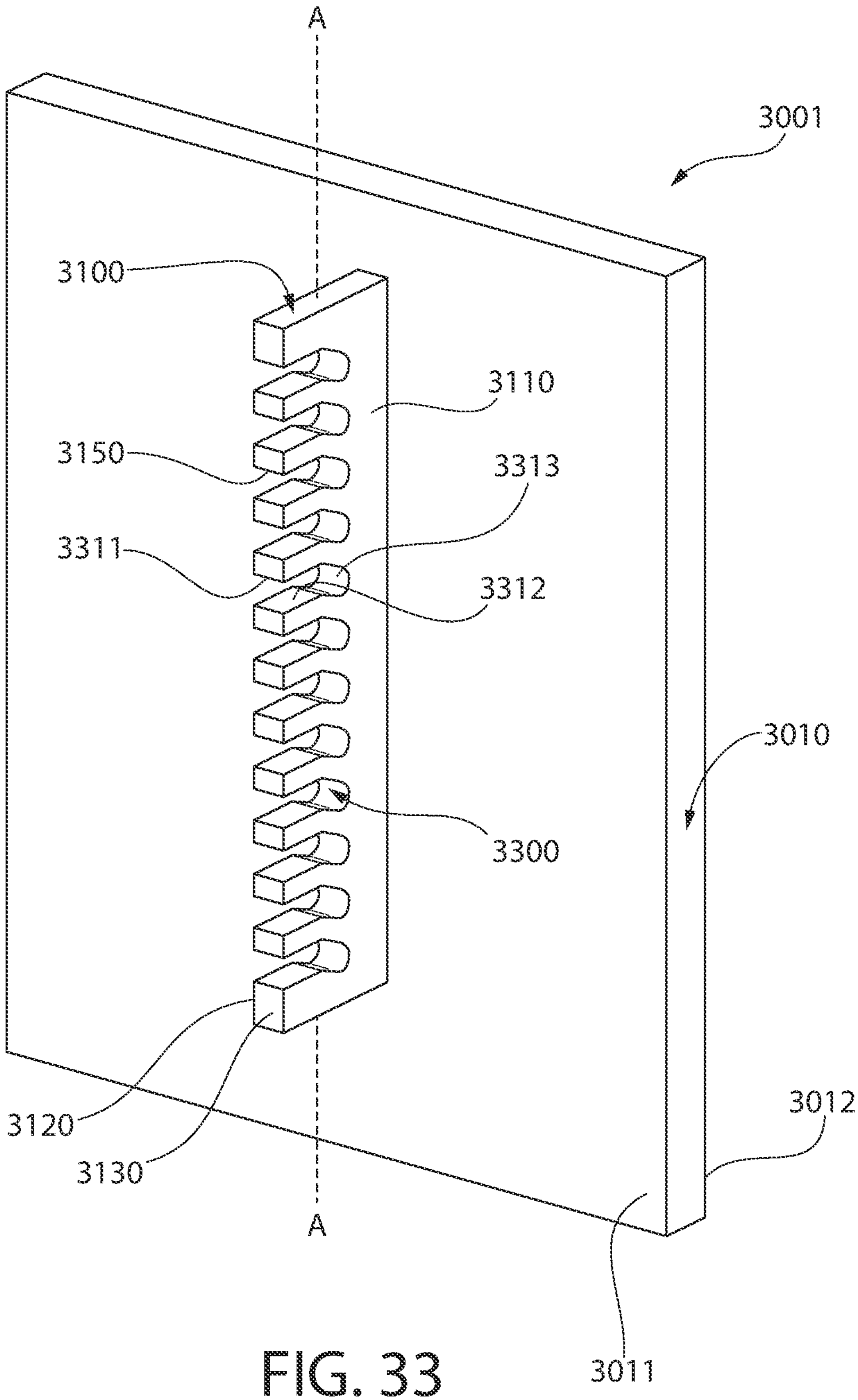
FIG. 33 is perspective view of a rack apparatus in an installed state according a fourth embodiment of the present invention.
Figure 34:
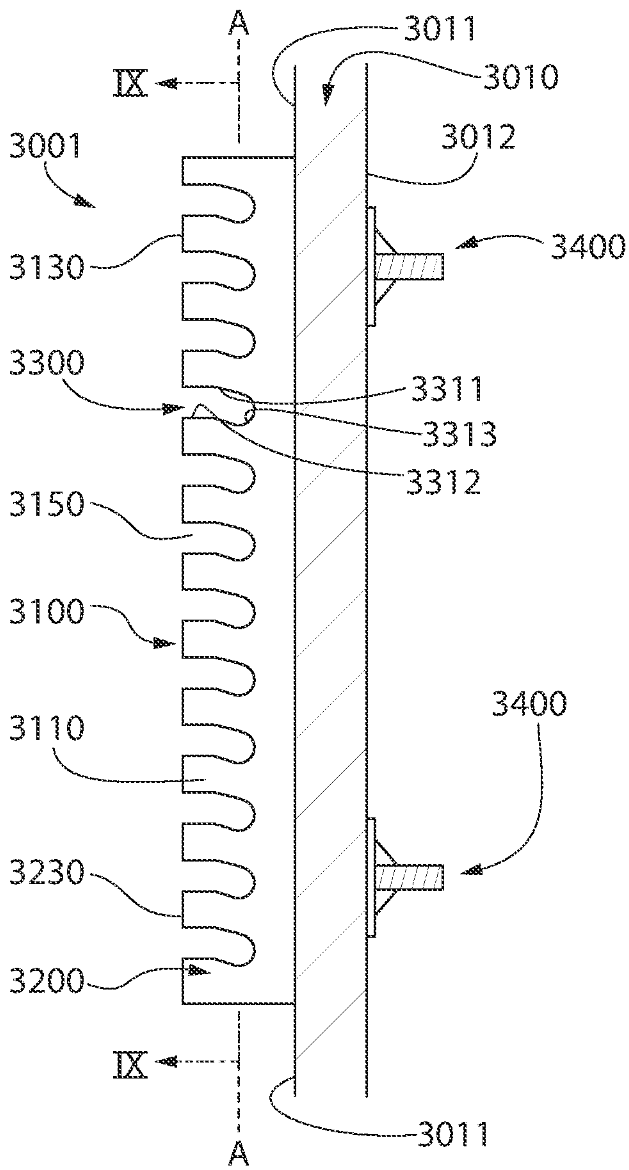
FIG. 34 is side view of the rack apparatus of FIG. 33 in the installed state.
Figure 35:
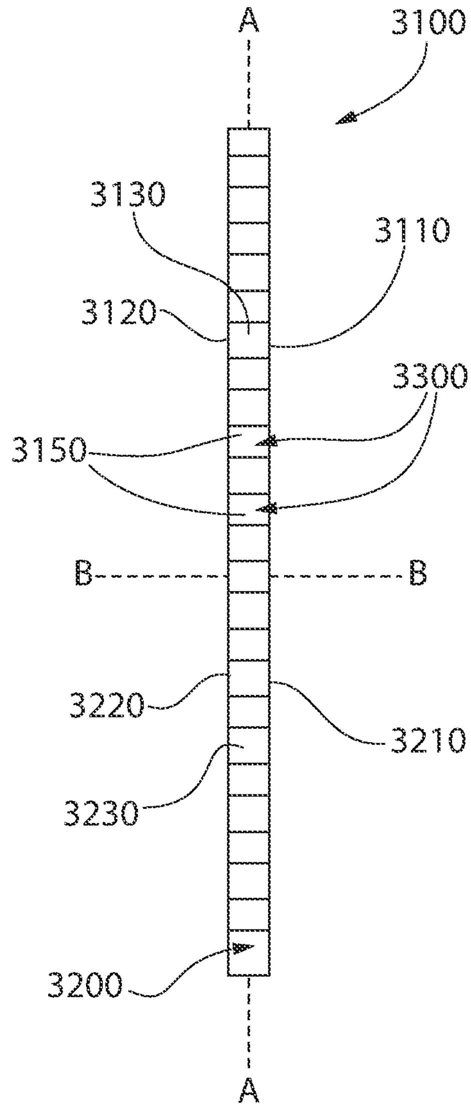
FIG. 35 is a front view of the rack apparatus of FIG. 33.
Figure 36:
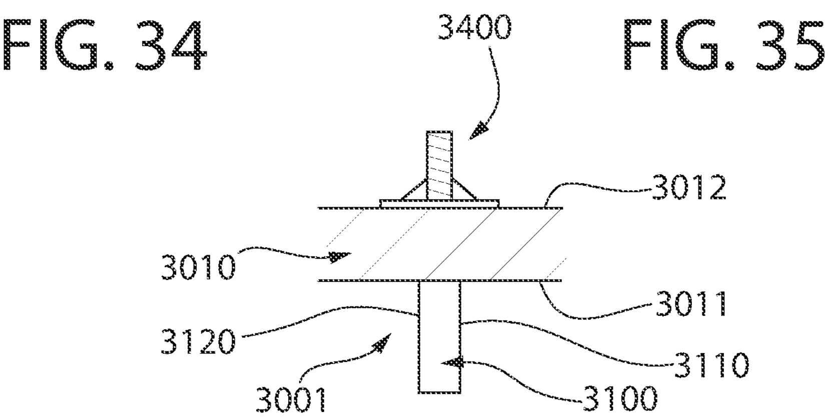
FIG. 36 is a top view of the rack apparatus of FIG. 33 in the installed state.
Figure 37:
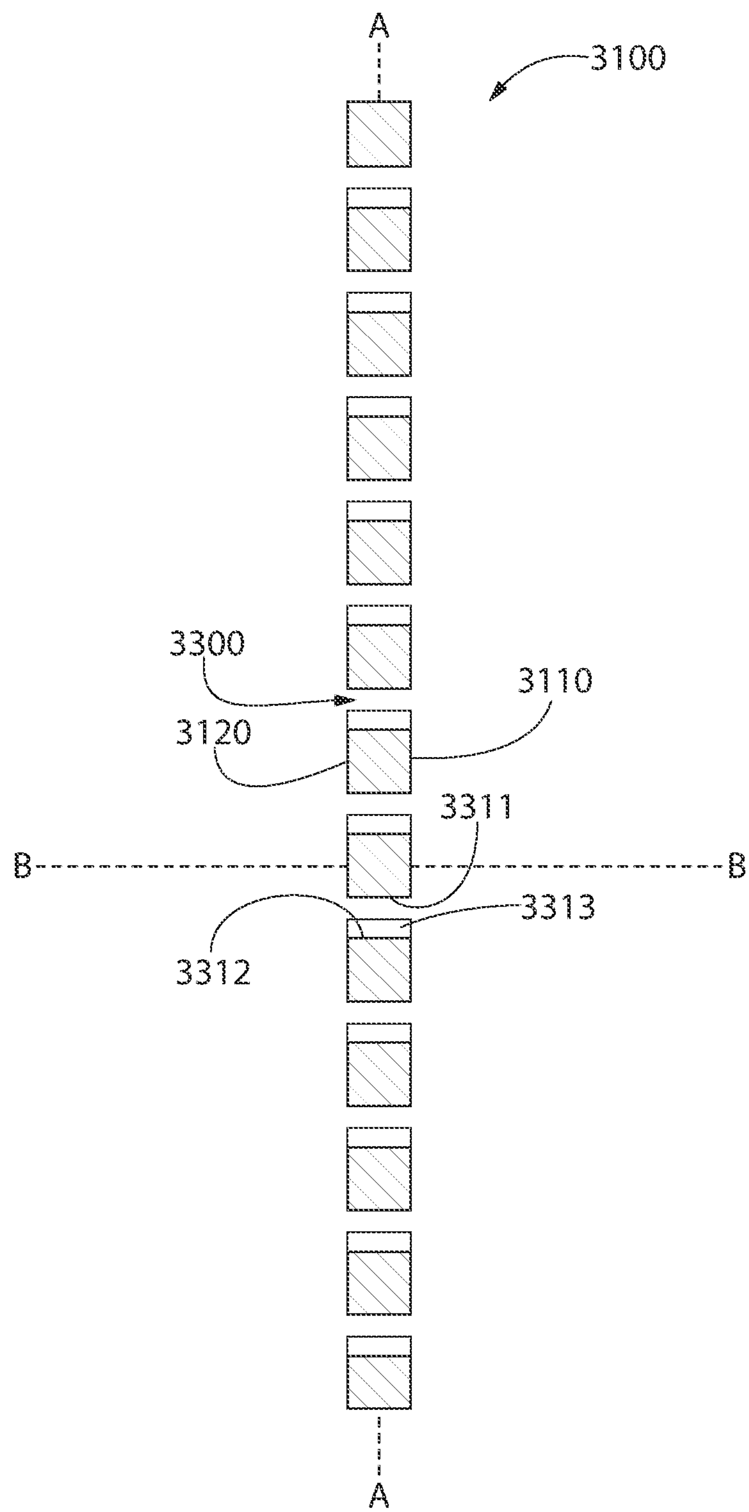
FIG. 37 is a cross-sectional view of the rack apparatus along line IX-IX of FIG. 34.
Figure 38:
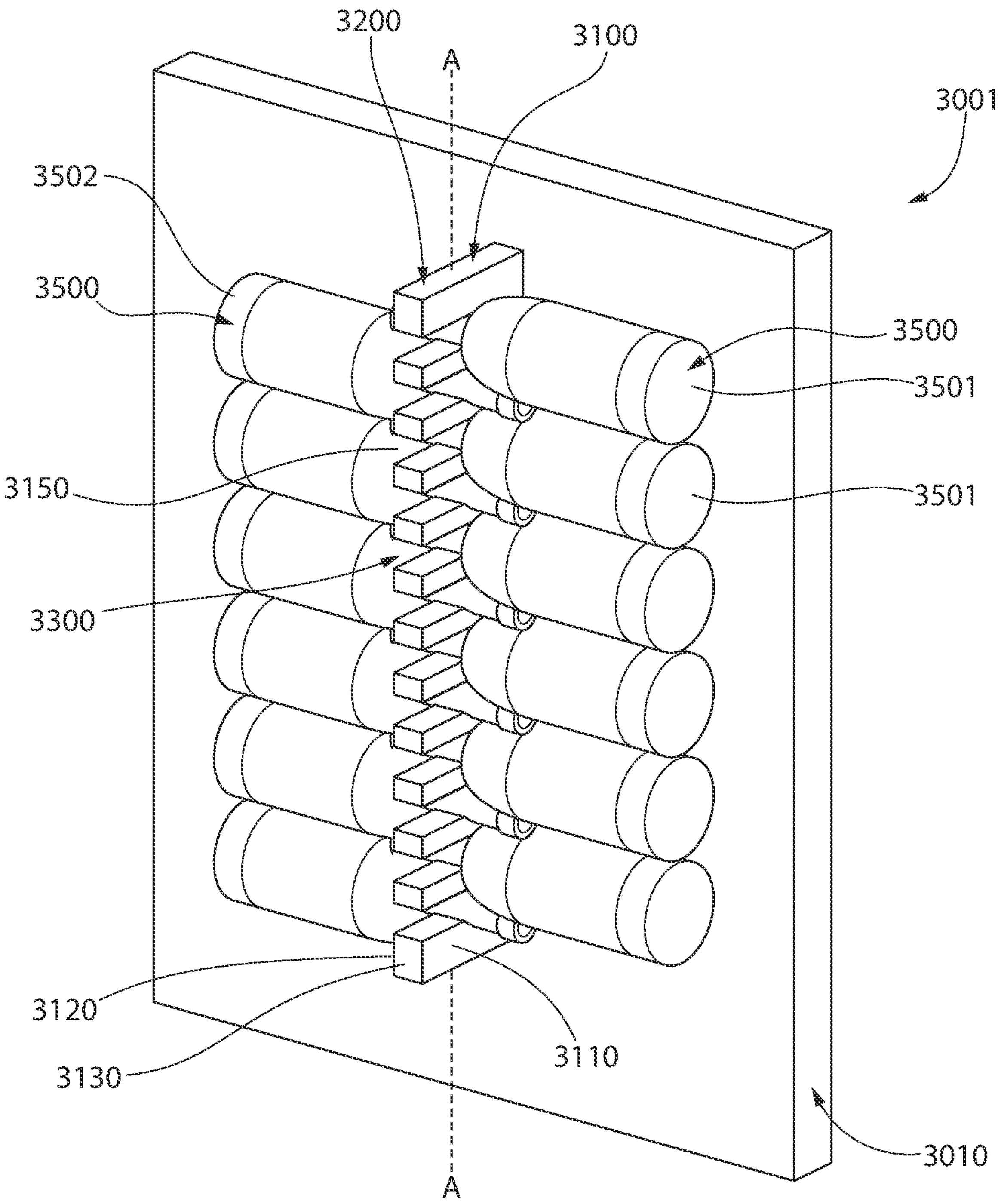
FIG. 38 is a perspective view of the rack apparatus of FIG. 33 in an in-use state.
Figure 39:
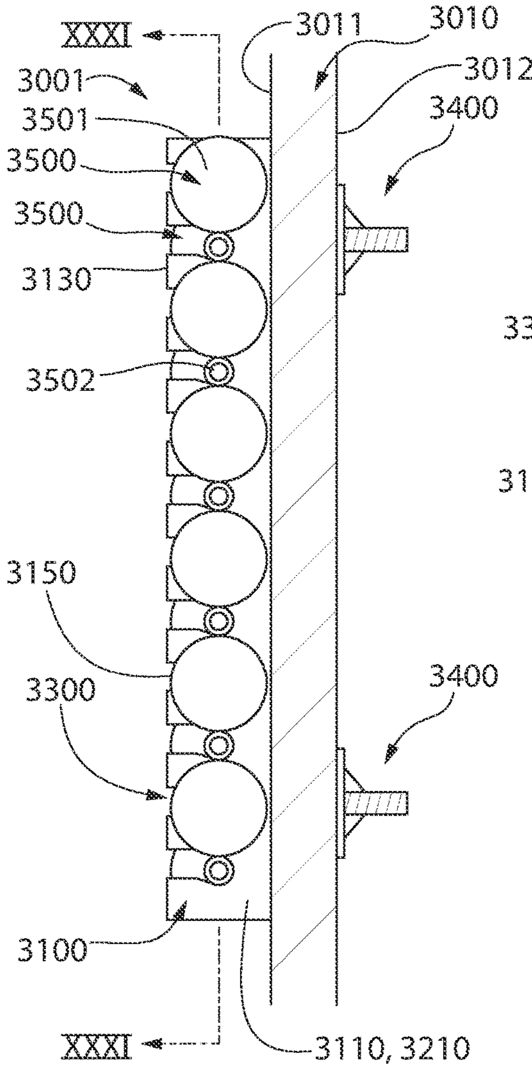
FIG. 39 is side view of the rack apparatus of FIG. 33 in the in-use state.
Figure 40:
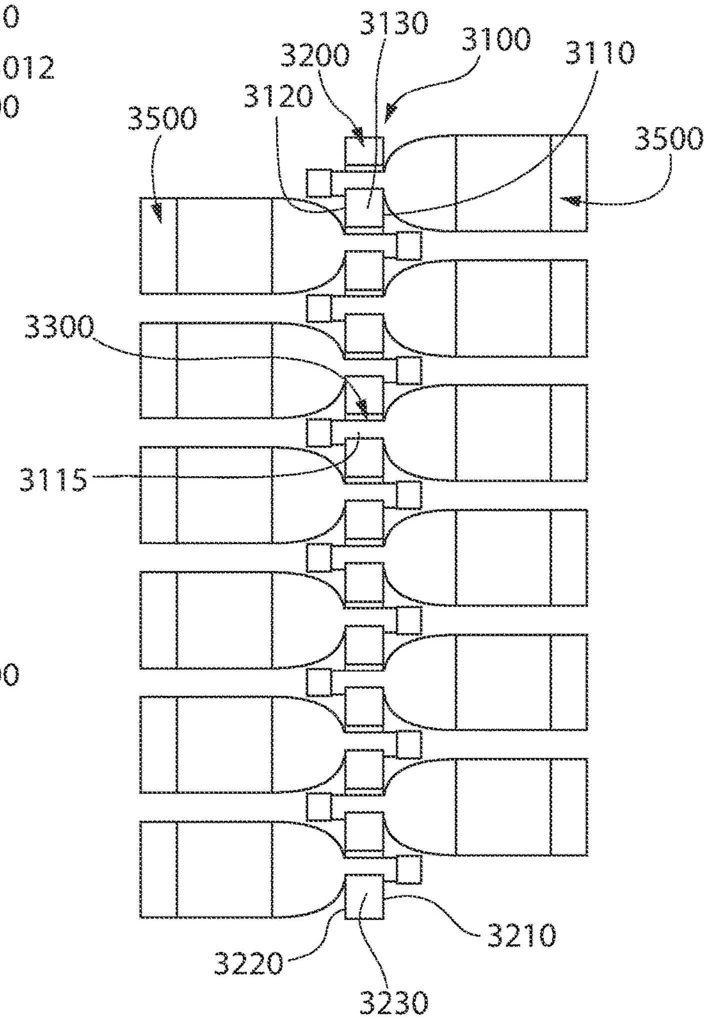
FIG. 40 is a front view of the rack apparatus of FIG. 33 in the in-use state.
Figure 41:
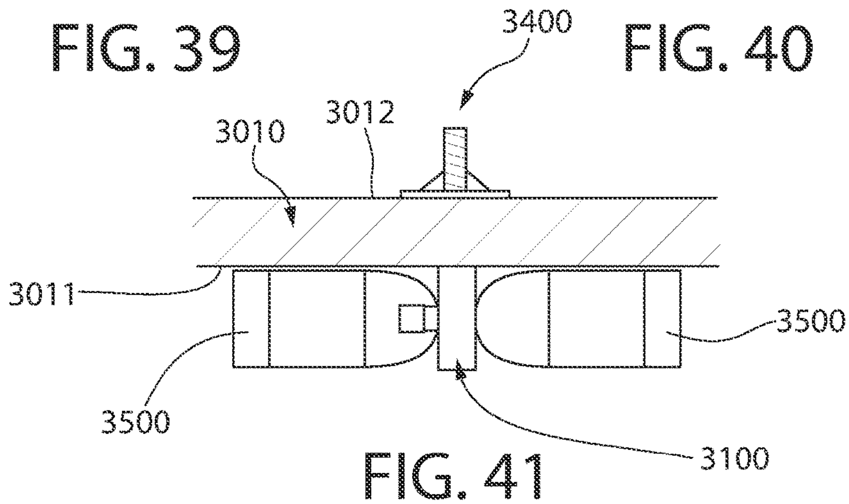
FIG. 41 is a top view of the rack apparatus of FIG. 33 in the in-use state.
Figure 42:
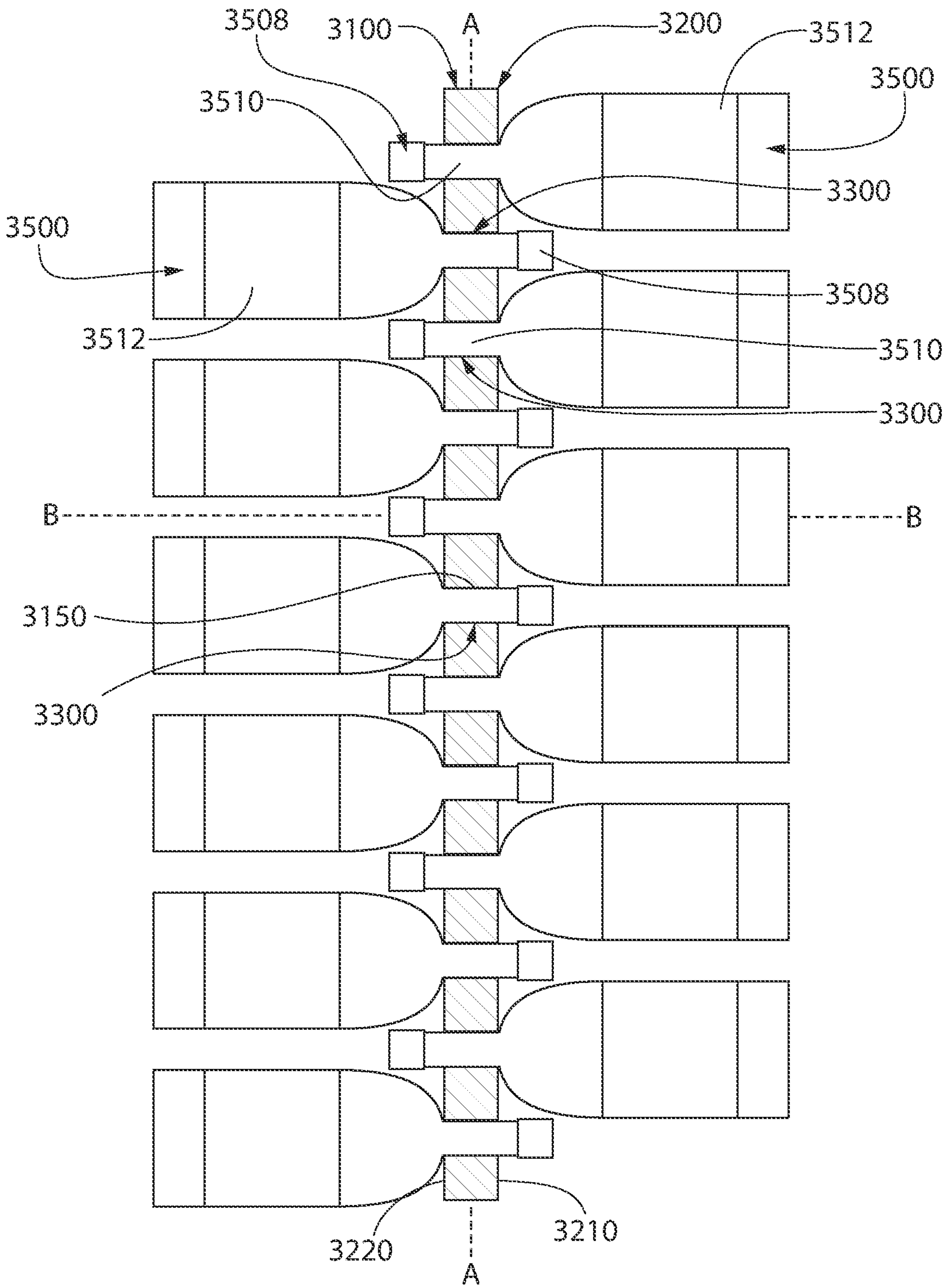
FIG. 42 is a cross-sectional view of the rack apparatus in the in-use state along line XXXI-XXXI of FIG. 39.
Figure 43:
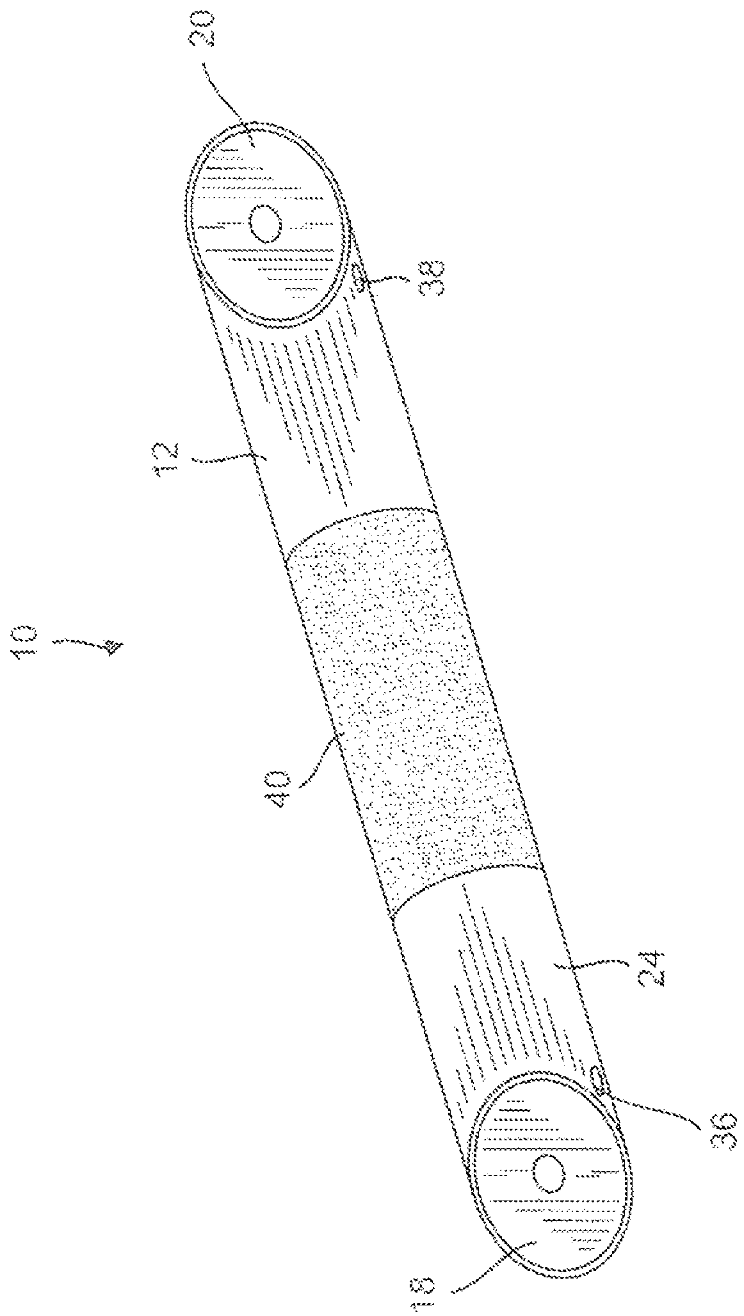
FIG. 43 is a perspective view of an embodiment of a support assembly of the present invention.

The aperture walls 310 may comprise an upper aperture wall 311 that is opposite a lower aperture wall 312. The aperture walls 310 may further comprise at least one aperture side wall 313 extending between the upper aperture wall 311 and the lower aperture wall 312 in some embodiments where the mounting apertures may have an open side wall and a closed side wall (see, e.g. FIGS. 33 and 34). In the present construction being addressed as shown in FIGS. 1, 2, 5, and 11 in which the mounting aperture has a "closed geometry" when viewed laterally (FIG. 2), two aperture side walls 313 comprising a front side wall 314 and rear side wall 315 are provided. The upper aperture wall 311, the lower aperture wall 312, and the aperture side walls 313 may form a continuous annular surface that collectively defines a closed-perimeter boundary or geometry of the aperture 300. Each of the lower aperture wall 312, upper aperture wall 311, and/or the aperture side walls 313 may be independently planar or curved.

The upper aperture wall 311 may define a surface that extends between the first major surface 210 of the body 200 and the second major surface 220 of the body 200 (but does not penetrate those surfaces) at an angle that is substantially perpendicular to the longitudinal axis A-A. In other embodiments, the upper aperture wall 311 may define a surface that extends between the first major surface 210 of the body 200 and the second major surface 220 of the body 200 at an angle that is oblique to the longitudinal axis A-A.

The lower aperture wall 312 may define a surface that extends between m the first major surface 210 of the body 200 and the second major surface 220 of the body 200 at an angle that is substantially perpendicular to the longitudinal axis A-A. In other embodiments, the lower aperture wall 312 may define a surface that extends between the first major surface 210 of the body 200 to the second major surface 220 of the body 200 at an angle that is oblique to the longitudinal axis A-A. Different portions of the walls 311 and 312 may be parallel or oblique.

The aperture side walls 313 may each define a surface that extends from the first lateral major surface 210 of the body 200 to the second lateral major surface 220 of the body 200 at an angle that is substantially parallel to the transverse axis B-B. In other embodiments, the aperture side walls 313 may define a surface that extends from the first major surface 210 of the body 200 to the second major surface 220 of the body 200 at an angle that is oblique to the transverse axis B-B. Different portions of the side walls 313 may be parallel or oblique.

In some embodiments, the upper aperture wall 311 may be a multi-directional surface having at least a first upper portion **311*a* and a second upper portion 311*b*. Referring to FIG. 5, the first upper portion 311*a* may extend from the first major surface 210 of the body 200 to the second upper portion 311*b* at a first angle relative to the longitudinal axis A-A. The second upper portion 311*b* may extend from the first upper portion 311*a* to the second major surface 220 of the body 200** at a second angle relative to the longitudinal axis A-A. The first and second angle of the first and second upper portions may be equal. In other embodiments, the first and second angle of the upper portions may be different.

The first angle formed between the first upper portion 311*a* and the longitudinal axis A-A may be substantially orthogonal or perpendicular (i.e. 90 degrees) as seen in FIG. 5. In other embodiments, the first angle formed between the first upper portion 311*a* and the longitudinal axis A-A may be oblique. The second angle formed between the second upper portion 311*b* and the longitudinal axis A-A may be substantially orthogonal or perpendicular. In other embodiments, the second angle formed between the second upper portion 311*b* and the longitudinal axis A-A may be oblique (see, e.g. FIG. 5). The second upper portion 311*b* may be laterally wider than the first upper portion 311*a*.

In some embodiments, the lower aperture wall 312 may be a multi-directional surface having at least a first lower portion 312*a* and a second lower portion 312*b*. The first lower portion 312*a* may extend from the first major surface 210 of the body 200 to the second lower portion 312*b* at a first angle relative to the longitudinal axis A-A. The second lower portion 312*b* may extend from the first lower portion 312*a* to the second major surface 220 of the body 200 at a second angle relative to the longitudinal axis A-A. The first and second angle of the lower portions 312*a*, 312*b* may be equal. In other embodiments, the first and second angle of the lower portions 312*a*, 312*b* may be different.

The first angle formed between the first lower portion 312*a* and the longitudinal axis A-A may be substantially orthogonal or perpendicular (see, e.g. FIG. 5). In other embodiments, the first angle formed between the first lower portion 312*a* and the longitudinal axis A-A may be oblique. The second angle formed between the second lower portion 312*b* and the longitudinal axis A-A may be substantially orthogonal or perpendicular (see, e.g. FIG. 5). In other embodiments, the second angle formed between the second lower portion 312*b* and the longitudinal axis A-A may be oblique. The second lower portion 312*b* may be wider than the first lower portion 312*a*.

In some embodiments, the first upper portion 311*a* and the first lower portion 312*a* may be parallel to each other (see, e.g. FIG. 5). In some embodiments, the first upper portion 311*a* and the first lower portion 312*a* may be non-parallel. In some embodiments, the second upper portion 311*b* and the second lower portion 312*b* may be parallel. In some embodiments, the second upper portion 311*b* and the second lower portion 312*b* may be non-parallel to each other as shown in FIG. 5. The illustrated embodiment forms an asymmetric surface defining a partial frustoconical shaped wall surface and concomitantly shaped entrance opening 300-1 between upper and lower second portions 311*b* and 312*b*, which is laterally offset to one major side surface 110 or 120 of the rack 100; the second upper portion 311*b* being obliquely angled and non-perpendicular to the longitudinal axis A-A (and obliquely angled to transverse axis B-B). The second lower portion 312*b* is perpendicular to longitudinal axis A-A and parallel to transverse axis B-B.

Figure 11:
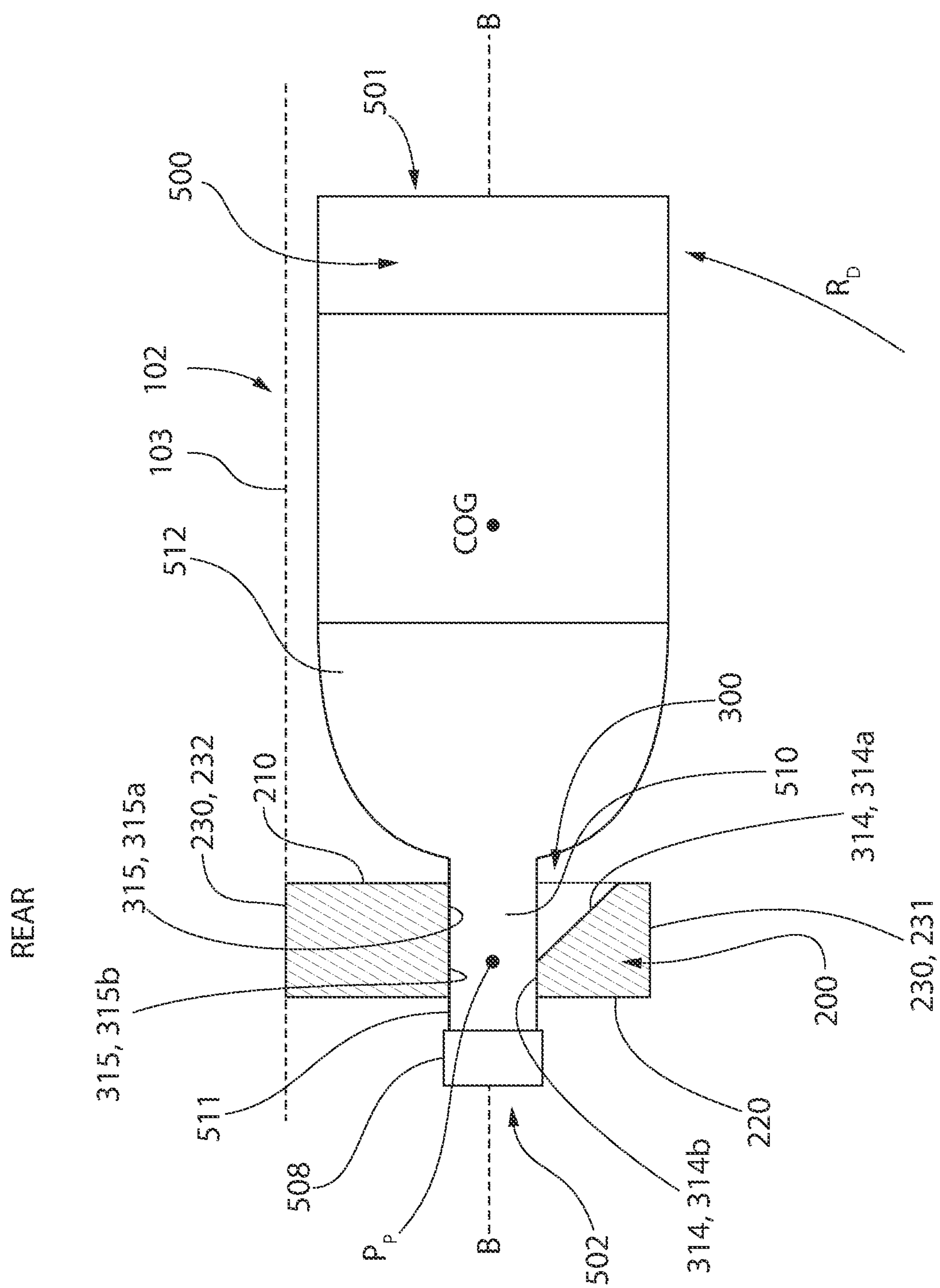
FIG. 11 is a close-up cross-sectional view of the rack apparatus along line XI-XI of FIG. 10 before insertion of a bottle.
Figure 12:
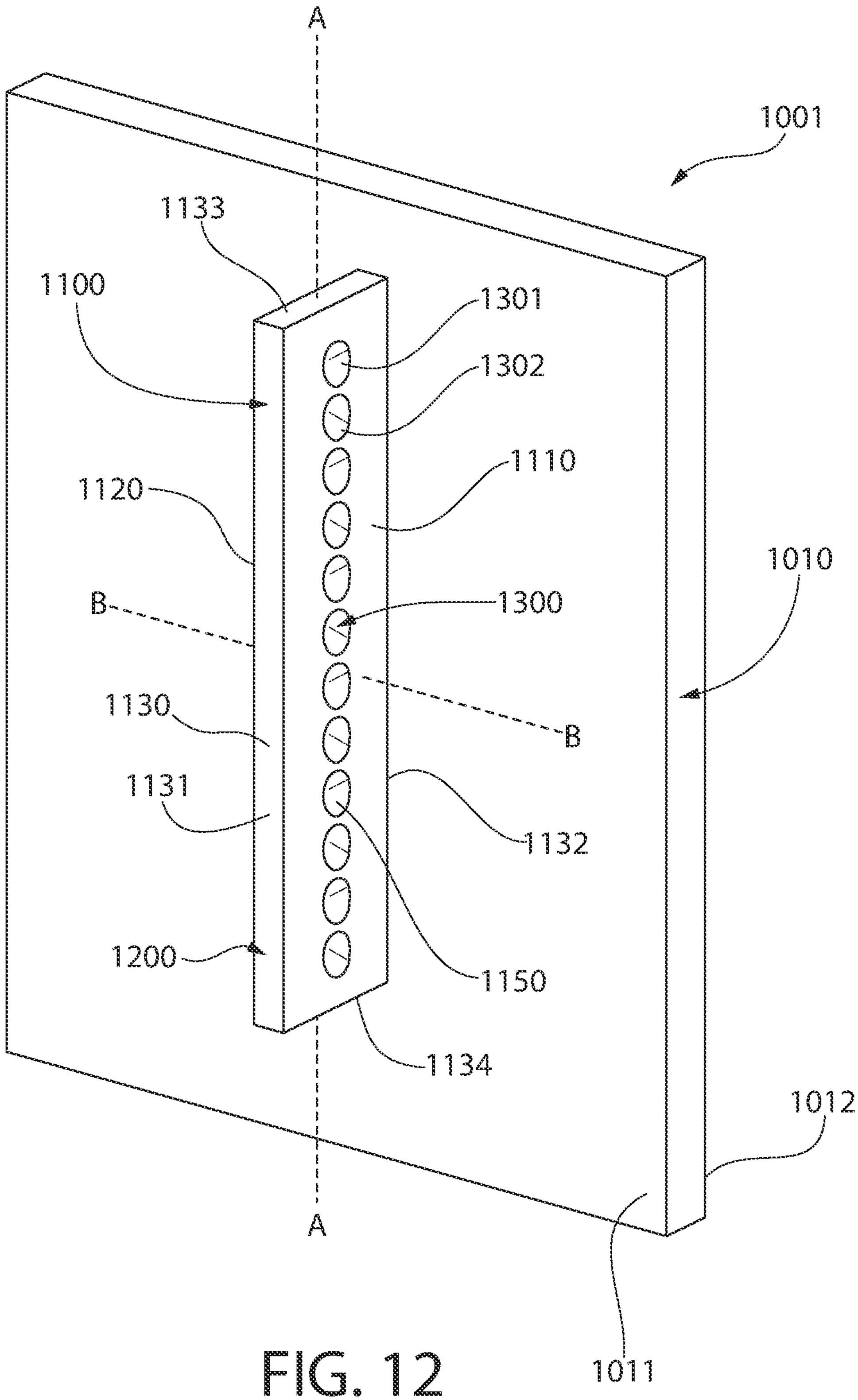
FIG. 12 is perspective view of a rack apparatus in an installed state according a second embodiment of the present invention.
Figure 13:
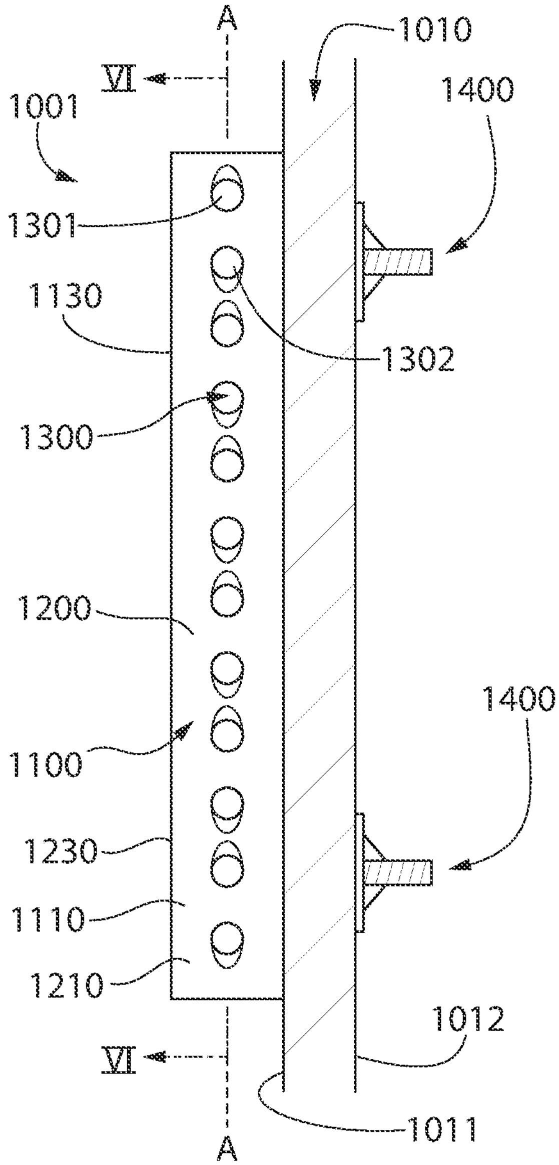
FIG. 13 is side view of the rack apparatus of FIG. 12 in the installed state.
Figure 14:
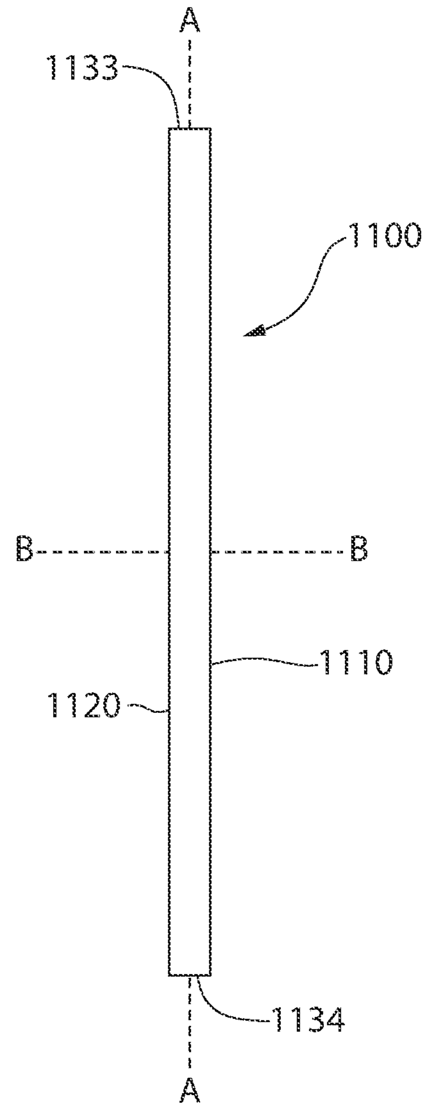
FIG. 14 is a front view of the rack apparatus of FIG. 12.
Figure 15:
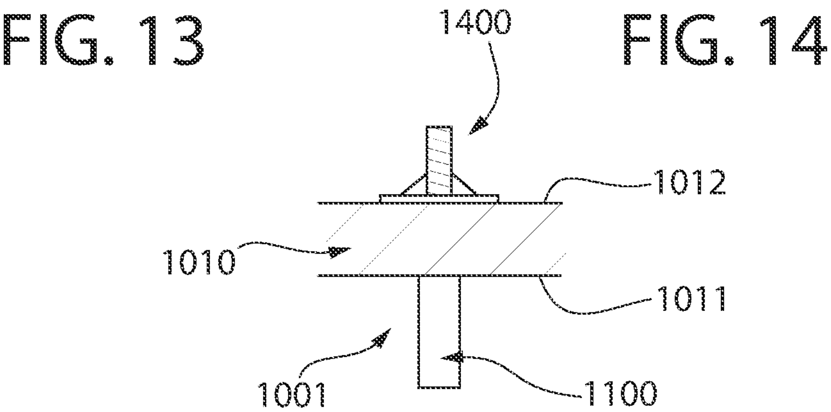
FIG. 15 is a top view of the rack apparatus of FIG. 12 in the installed state.
Figure 16:
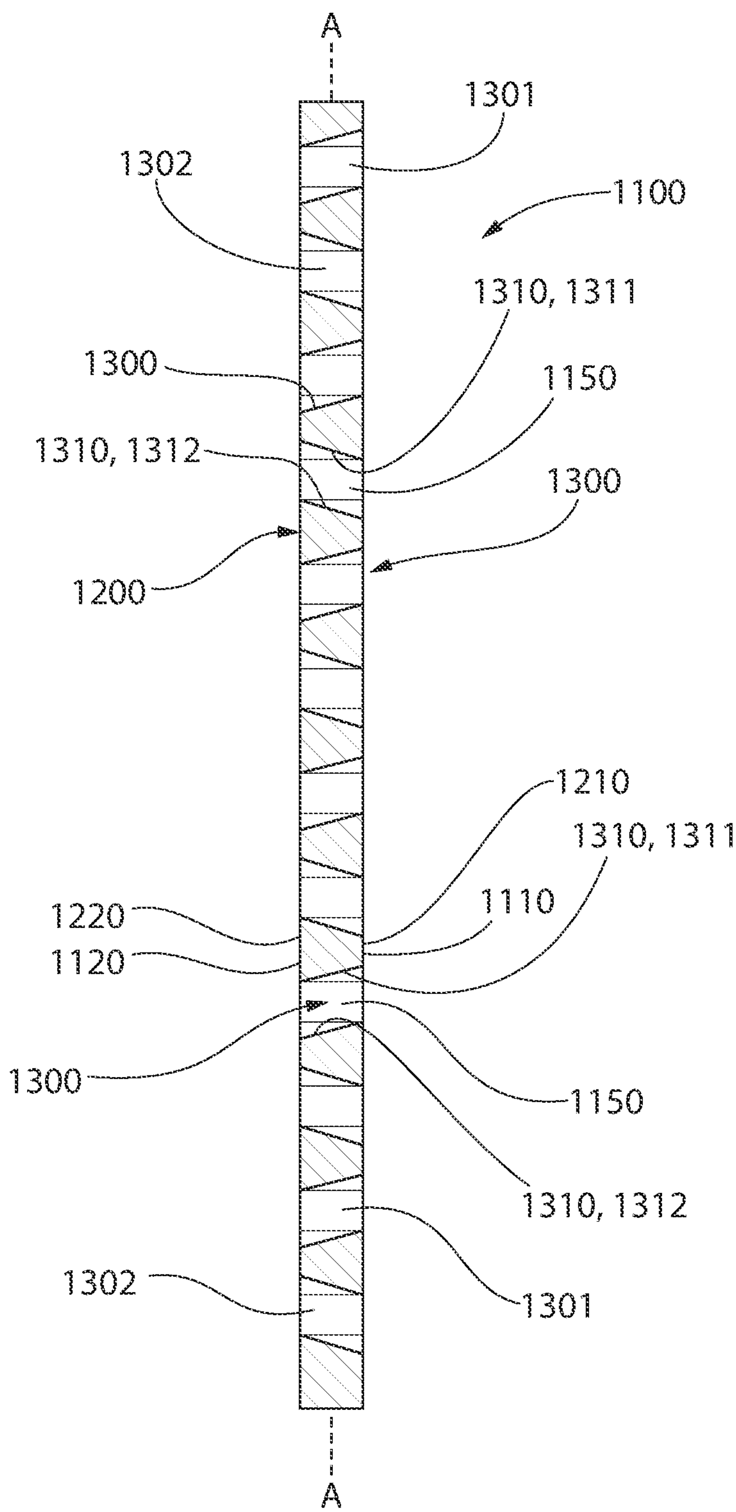
FIG. 16 is a cross-sectional view of the rack apparatus along line VI-VI of FIG. 13.
Figure 17:
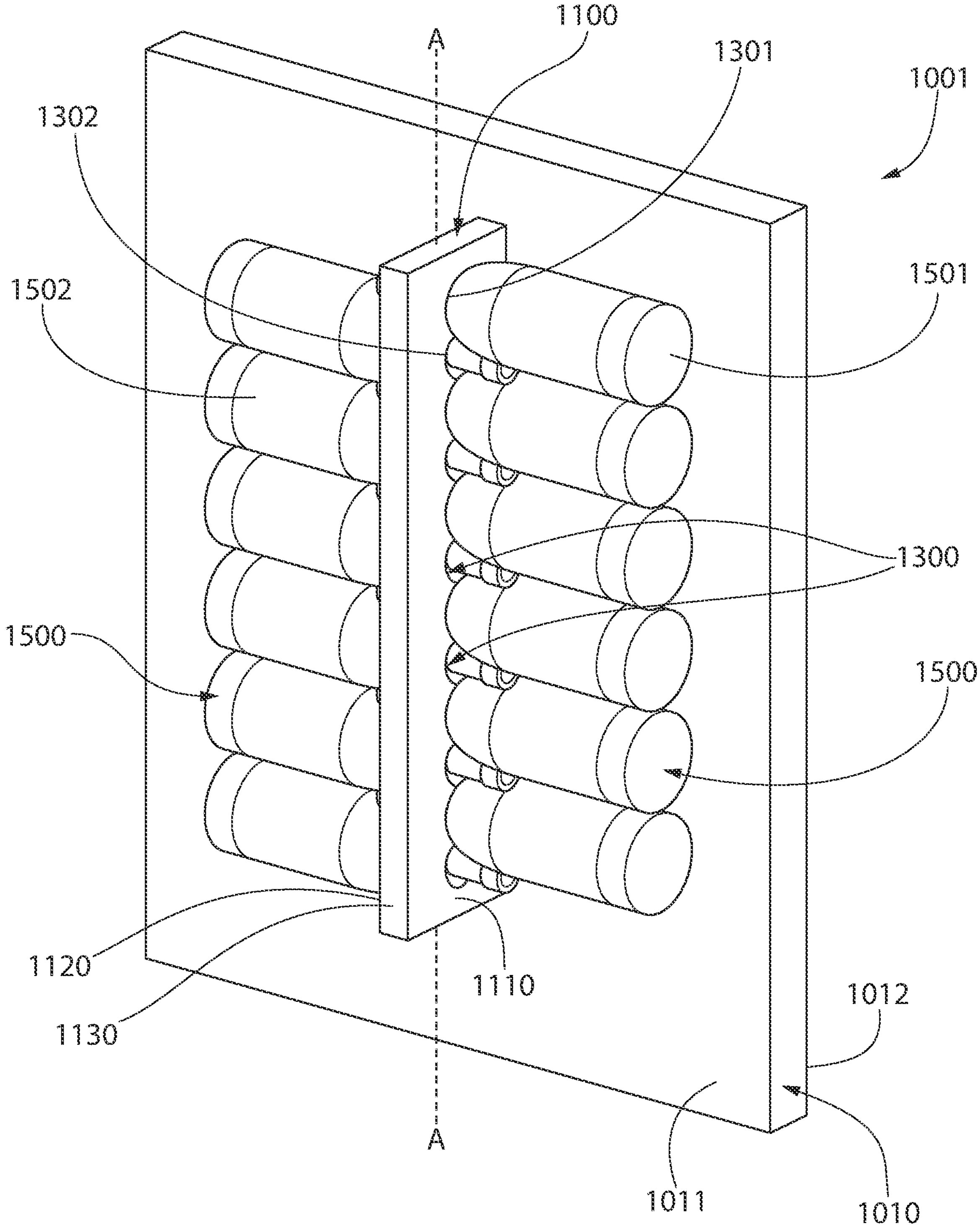
FIG. 17 is a perspective view of the rack apparatus of FIG. 12 in an in-use state.
Figure 18:
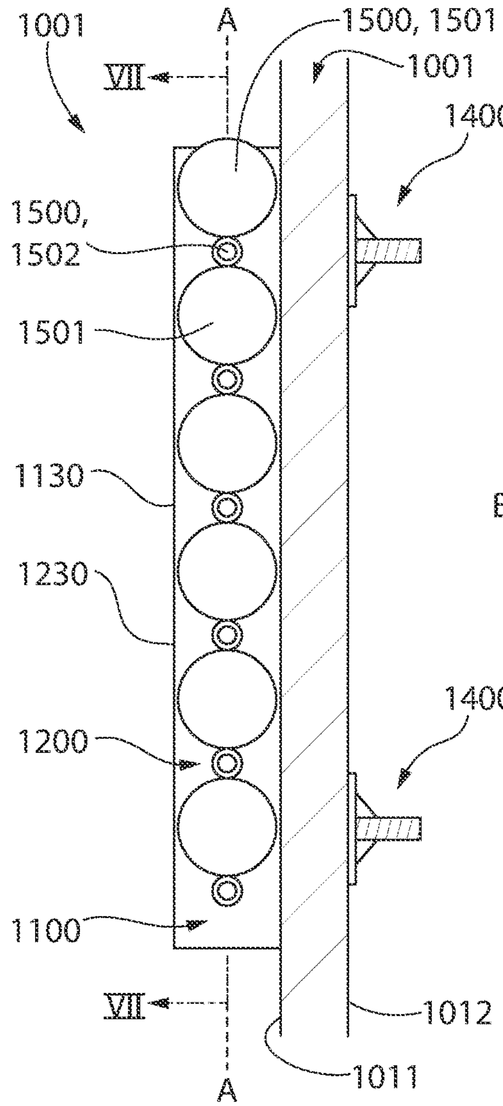
FIG. 18 is side view of the rack apparatus of FIG. 17 in the in-use state.
Figure 19:
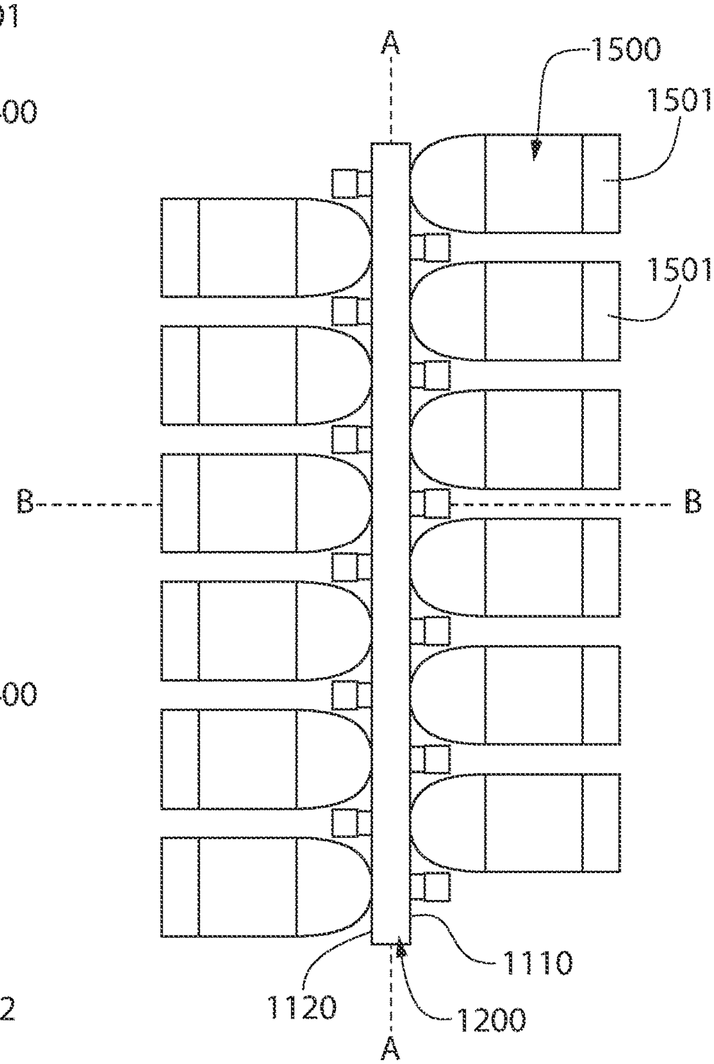
FIG. 19 is a front view of the rack apparatus of FIG. 17 in the in-use state.
Figure 20:
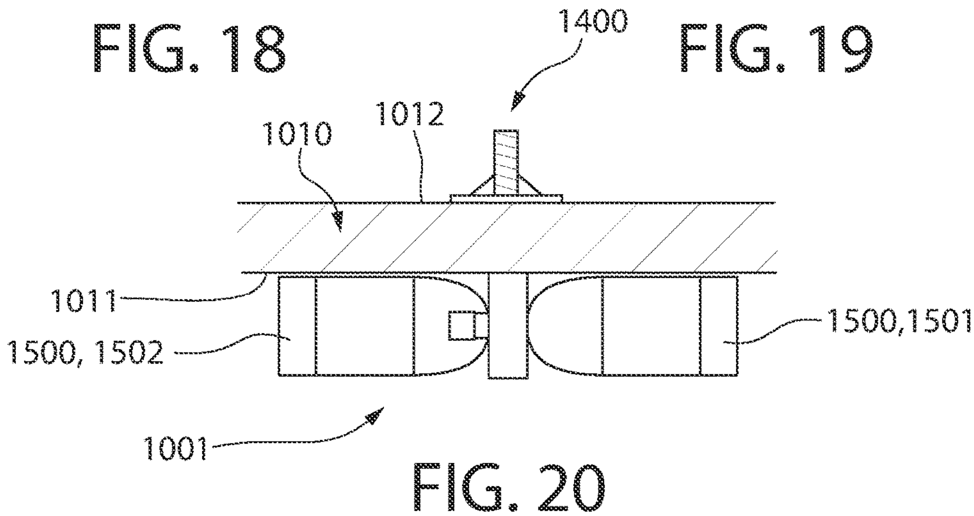
FIG. 20 is a top view of the rack apparatus of FIG. 17 in the in-use state.
Figure 21:
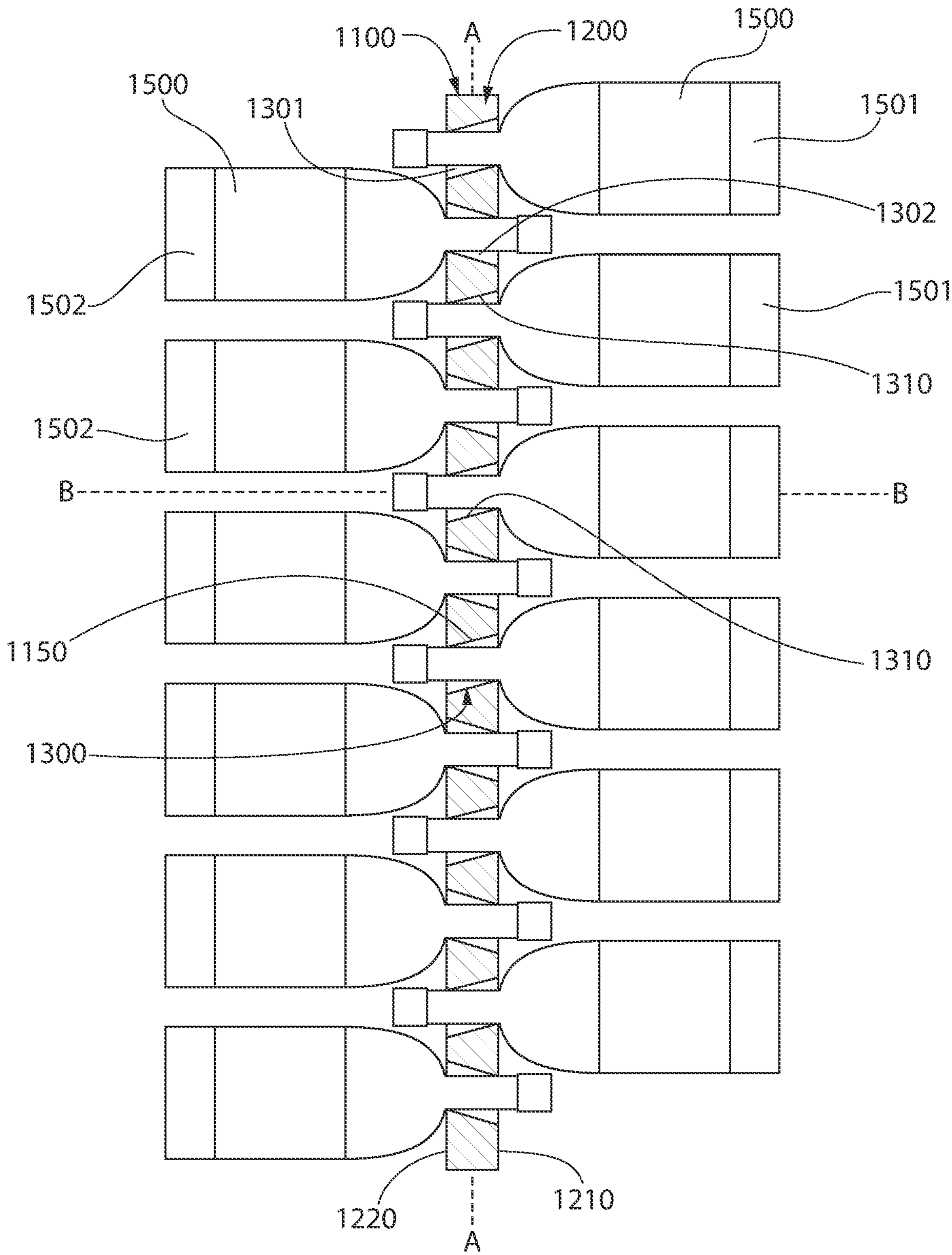
FIG. 21 is a cross-sectional view of the rack apparatus in the in-use state along line VII-VII of FIG. 18.

In some embodiments, referring to FIG. 11, the aperture side walls 313 may comprise a front aperture side wall 314 that is opposite a rear aperture side wall 315. As generally discussed with respect to the aperture side walls 313, the front aperture side wall 314 may extend between but does not penetrate the first and second major surfaces 210, 220 of the body 200 at an angle that is substantially parallel to the transverse axis B-B. In other embodiments as shown in FIG. 11, the front aperture side wall 314 may include a portion that is at an angle that is oblique to the transverse axis B-B.

With continuing reference to FIG. 11, as generally discussed with respect to the aperture side walls 313, the rear aperture side wall 315 may extend between but does not penetrate the first and second major surfaces 210, 220 of the body 200 at an angle that is substantially parallel to the transverse axis B-B as shown. In other embodiments, the rear aperture side wall 315 may include a portion that is at an angle that is oblique to the transverse axis B-B.

In some embodiments, the front aperture wall 314 may be a multi-directional surface having at least a first front portion 314*a* and a second front portion 314*b*. The first front portion 314*a* may extend at a first angle that is substantially parallel to the transverse axis B-B. In other embodiments, the first front portion 314*a* may extend from the first major surface 210 of the body 200 to the second front portion 314*b* at a first angle that is oblique to the transverse axis B-B as shown in FIG. 11. The second front portion 314*b* may extend from the first front portion 314*a* of the body 200 to the second major surface 220 of the body a second angle that is substantially parallel to the transverse axis B-B as shown. In other embodiments, the second front portion 314*b* may extend from the first front portion 314*a* to the second major surface 220 of the body 220 at a second angle that is oblique to the transverse axis B-B. The illustrated embodiment forms an asymmetric surface defining a partial frustoconical shaped wall surface and concomitantly shaped opening between front and rear first portions 314*a* and 315*a*, which is offset to towards the front surface 131 of the rack 100; the first front portion 314*a* being obliquely angled and non-perpendicular to the transverse axis B-B (see, e.g. FIG. 11). This places the front edge of the asymmetric surface defined by first front portion 314*a* closer to front surface 131 of rack 100 than the front edge of the circumferential surface defined by second front portion 314*b*.

The first and second angle of the first and second front portions 314*a*, 314*b* may be equal in lateral width. In other embodiments, the first and second angle of the first and second front portions 314*a* 314*b* may be different in lateral width with portion 314*a* being wider as shown in FIG. 11.

It bears noting that obliquely angled portion 314*a* of front wall 314 and obliquely angled portion 311*b* of upper wall 311 of the mounting apertures 300 may be considered to define sloped or inclined walls and surfaces. These sloped surfaces define the slot-shaped asymmetric frustoconical wall surface and opening as further described herein.

In some embodiments, the rear aperture wall 315 may be a multi-directional surface having at least a first rear portion 315*a* and a second rear portion 315*b*. The first rear portion 315*a* may extend from the first major surface 210 of the body 200 to the second rear portion 315*b* at a first angle that is substantially parallel to the transverse axis B-B as shown in FIG. 11. In other embodiments, the first rear portion 315*a* may extend from the first major surface 210 of the body 200 to the second rear portion 315*b* at a first angle that is oblique to the transverse axis B-B. The second rear portion 315*b* may extend from the first rear portion 315*a* of the body 200 to the second major surface 220 of the body a second angle that is substantially parallel to the transverse axis B-B as shown. In other embodiments, the second rear portion 315*b* may extend from the first rear portion 315*a* to the second major surface 220 of the body 220 at a second angle that is oblique to the transverse axis B-B.

The first and second angle of the first and second rear portions 315*a*, 315*b* may be equal in lateral width. In other embodiments, the first and second angle of the first and second rear portions 315*a*, 315*b* may be different in which the portion 315*b* may be wider.

As demonstrated by FIG. 11, a container 500 in the form of an elongated bottle may comprise a main liquid storage or body portion 512, a narrower elongated neck portion 510, and a top flange 508 at the mouth or opening of the container. Container 500 includes a bottom end 501 defined by main body portion 512 and an opposite top end 502 adjacent the top flange 508 which defines the mouth/opening for adding or extracting the liquid stored in the bottle. The body portion 512 and neck portion 510 may be generally cylindrical in shape in one embodiment as illustrated. Neck portion 510 is diametrically smaller than the body portion 512, and top flange 508 may be diametrically larger than the neck portion adjacent the top end 502. The neck portion 510 may have a greater length than the width of body 200 of the rack apparatus 100 as shown. This allows the neck portion and top flange 508 to be fully inserted through the openings in the body 200 for securing the containers 500 to the storage rack. It bears noting that in other embodiments of the bottle container, the main body portion 512 may have a shape other than cylindrical, such as for example without limitation polygonal (e.g. squared, hexagon, octagon, etc.). In such embodiments, neck portion 510 has a smaller cross-sectional area than that of the non-cylindrical body portions 512. The sidewalls of the body portion 512 may be straight as shown and/or have other profiles when viewed from the side such as bulbous or undulating configurations. The neck preferably remains cylindrical in shape in these alternate forms for engaging the container storage rack.

To put the rack apparatus 100 into use for storing containers, according to one non-limiting method, the top flange 508 and neck portion 510 of a container 500 (e.g. bottle) may be inserted laterally through the aperture 300 of the rack apparatus 100 such that the top flange 508 passes from the right first major surface 210 toward the left second major surface 220 of the body 200, and past the second major surface 220 of the body 200. Alternatively, for some of the apertures, the top flange 508 and neck portion 510 of another container may be inserted through the aperture 300 of the rack apparatus 100 such that the top flange 508 passes from the second major surface 220 toward the first major surface 210 of the body 200 and past the first major surface 210 of the body 200). The dimensions of the aperture 300 may be selected such that the passageway 150-1 has a diameter (or a height and width thought of another way) that is greater than the diameter of the top flange 508 and neck portion 510 of container 500. Having such diameter relationship allows for the top flange 508 to pass through the aperture 300 uninhibited. The aperture 300 however may have a diameter (height and width) which is smaller than the transverse cross-sectional area or diameter of the main storage portion 512 of the container (e.g. bottle).

Figure 6:
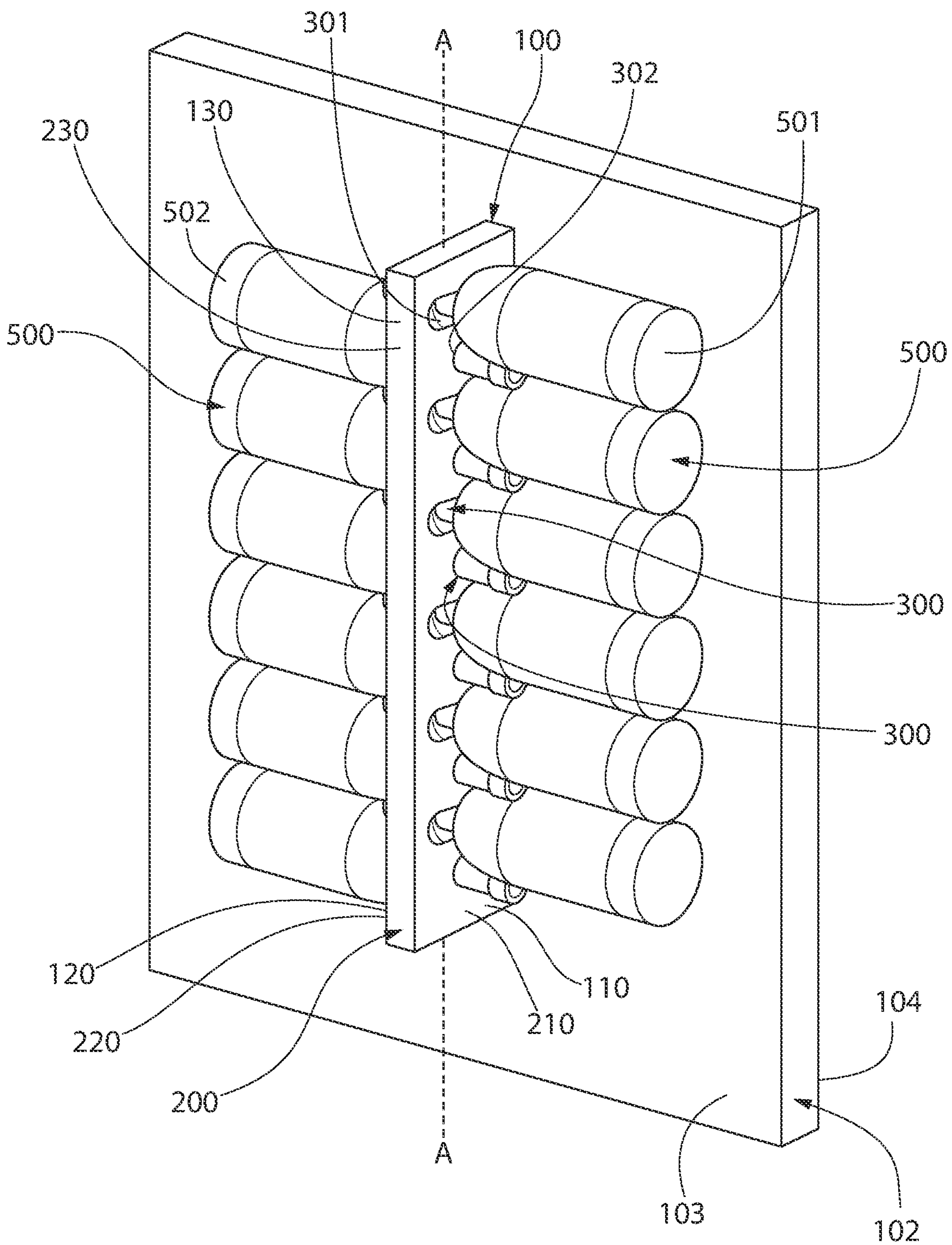
FIG. 6 is a perspective view of the rack apparatus of FIG. 1 in an in-use state.
Figure 7:
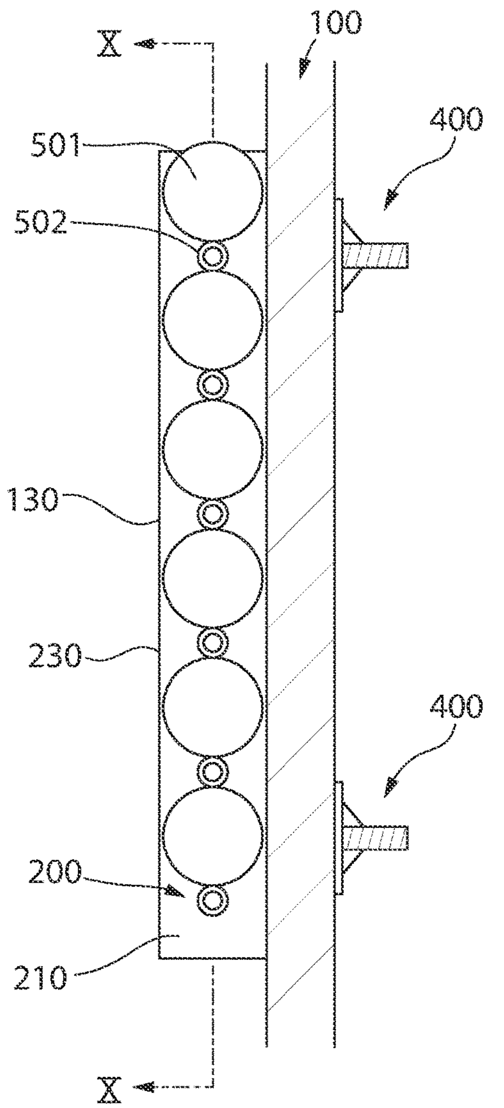
FIG. 7 is side view of the rack apparatus of FIG. 6 in the in-use state.
Figure 8:
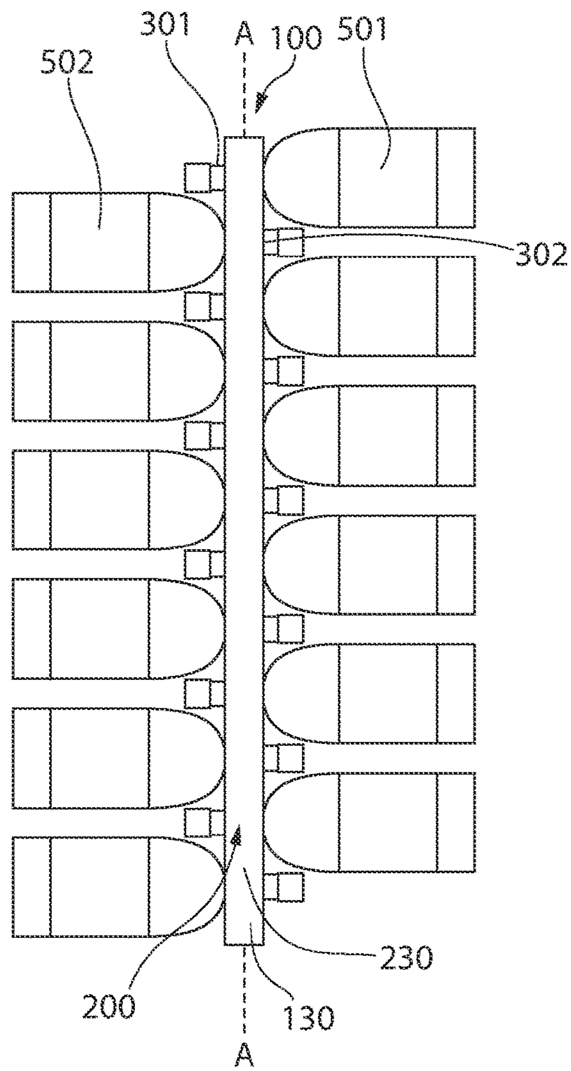
FIG. 8 is a front view of the rack apparatus of FIG. 6 in the in-use state.
Figure 9:
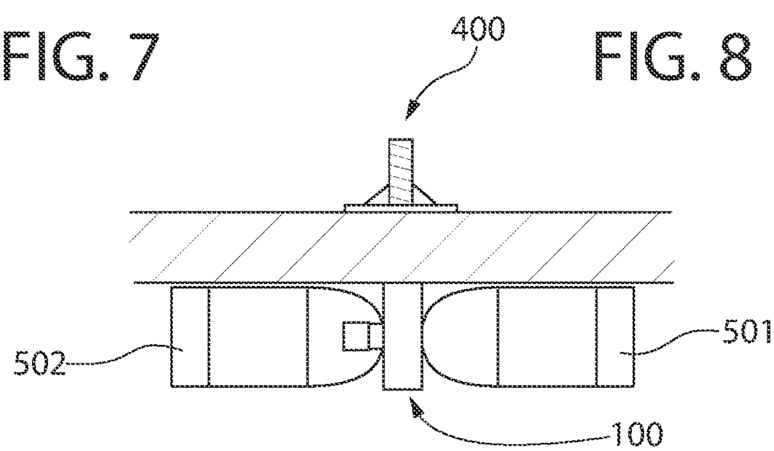
FIG. 9 is a top view of the rack apparatus of FIG. 6 in the in-use state.

During the insertion step, the container 500 is preferably inserted by passing its neck portion 510 through the larger obround entrance opening of mounting aperture 300 formed by the frustoconical shaped wall surface at one end of the mounting aperture rather than the smaller circular opening formed by the cylindrical shaped wall surface at the opposite end of the aperture (see, e.g. FIGS. 6 and 11). The obround entrance opening 300-1 thus may be considered to define an "entrance" opening 300-1 of each mounting aperture at one end having a larger transverse cross-sectional area than the transverse cross-sectional area of the smaller circular opening at the other end that defines an "exit" opening 300-2 through which the neck portion 510 of the container 500 is projected therethrough when the container is fully inserted through the mounting aperture 300. The entrance opening 300-1 gradually diminishes in cross-sectional area moving inwards from the lateral major surface it penetrates (i.e. right or left major surface 110 or 120 depending on the orientation of the mounting aperture 300) towards the central portion of the mounting aperture 300. The entrance opening 300-01 eventually merges with the exit opening towards the other end of the aperture 300 (see, e.g. FIG. 5). Thought of another way, the frustoconical shaped wall surface at one end of the mounting aperture merges with the cylindrical shaped wall surface at the opposite end of the aperture at a point between the major surfaces 110, 120 of the rack body 200.

Moreover, during the foregoing insertion step, the container 500 may be initially inserted into the aperture 300 in either a direction that is parallel to the transverse axis B-B, or for convenience and preferably oblique to the transverse axis B-B (and vertical plane defined by the wall surface 103 of wall 102). The larger entrance opening 300-1 of the mounting aperture 300 facilitates insertion of the container neck and guides the neck towards the smaller opposite exit opening 300-2 of the aperture. The asymmetric partial frustoconical wall surfaces of the entrance portion 300-1 may thus be thought of as a funnel which guides the container neck portions 510 through the aperture towards the exit opening.

When inserted into the aperture 300 at an oblique angle, a pivot point $P_P$ is created where the neck portion 510 of the container 500 is located at a point between the first and second major surfaces 110, 120 of the rack apparatus 100. The bottle 500 may then be rotated about the pivot point $P_P$ in a rotational direction $R_D$ such that the body portion 512 of the bottle 500 moves closer to the second vertical side surface 232 of the body 200. Stated otherwise, the bottle 500 may be rotated about the pivot point $P_P$ in a rotational direction $R_D$ such that the body portion 512 of the bottle 500 moves closer to the outer surface 103 of the support structure 102 in the storage system 101. In moving about the rotational direction $R_D$ towards the wall 102, the bottle 500 may move about the vertical longitudinal axis A-A as well as the transverse axis B-B depending on the specific configuration of the aperture walls 310.

Figure 10:
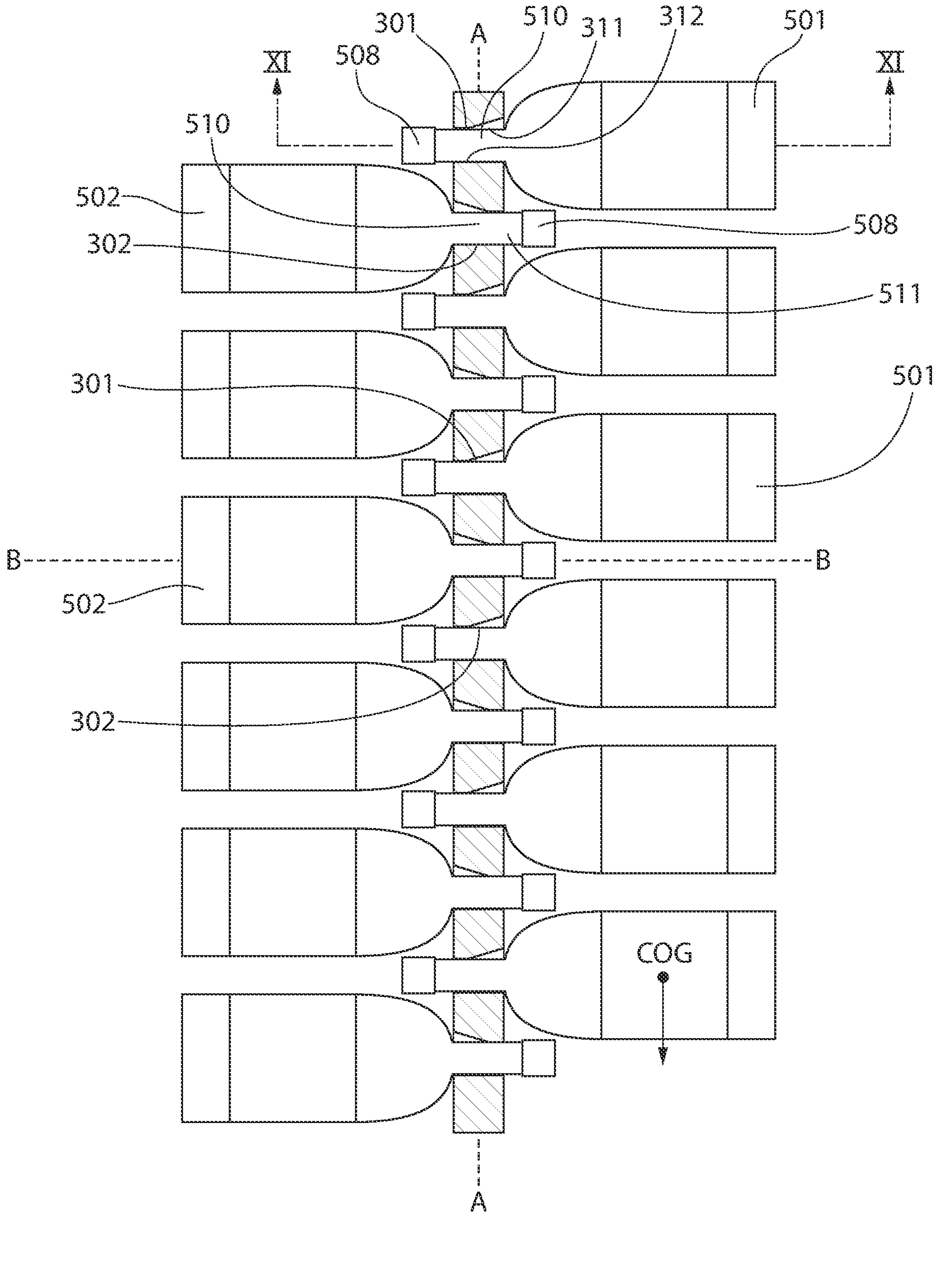
FIG. 10 is a cross-sectional view of the rack apparatus in the in-use state along line X-X of FIG. 7.

As demonstrated by FIGS. 10 and 11, once fully rotated about the pivot point $P_P$ along the rotational direction $R_D$, the upper wall 311 may engage a portion of the top outer surface 511 of the neck portion 510 of the container 500. Once fully rotated about the pivot point $P_P$ along the rotational direction $R_D$, the lower wall 312 may engage an opposite portion of the outer surface 511 of the neck portion 510 of the container 500. Once fully rotated about the pivot point $P_P$ along the rotational direction $R_D$, the front aperture side wall 314 and/or the rear aperture side wall 315 may engage a portion of the outer surface 511 of the neck portion 510 of the container 500.

The engagement between at least one of the aperture walls 310 with the outer surface 511 of the neck portion 510 of the container stabilizes and retains the container 500 in a set position in the mounting aperture 300 and rack 100. The straight section 311*a* of upper aperture wall 311 of mounting aperture 300 (oriented parallel to transverse axis B-B) located in the smaller diameter cylindrical portion of the aperture adjacent the symmetrical exit opening 300-2 retains the container 500 in the rack 100 via engagement with the top surface 511 of the neck portion 510 of the container once fully inserted in mounting aperture 300 about the pivot point $P_P$. Correspondingly, the entire lower aperture wall 312 of the mounting aperture (i.e. both sections 312*a* and 312*b* oriented parallel to transverse axis B-B) engages the bottom surface 511 of the container neck portion 510. In the set or fully engaged position, the container 500 extends out laterally from the longitudinal axis A-A such that the container 500 is oriented substantially parallel to the transverse axis B-B of the rack apparatus 100 and supported in a cantilevered manner. Because the center of gravity COG of the container 500 associated with the bottle and its contents is located to laterally offset from to one side major side or the other of the rack (see, e.g. FIGS. 10 and 11), this creates a moment about the pivot point $P_P$ which increases engagement with the walls in the mounting aperture to keep the container in position. The COG may therefore laterally offset from either lateral major surfaces 110 or 120 of the storage rack depending on the orientation of the container as seen in FIG. 10.

The distance between the upper aperture wall 311 and the lower aperture wall 312 is greater than the largest external vertical dimension (i.e. outer diameter of the neck portion 510 of the bottle 500). The distance between the front aperture side wall 314 and the rear aperture side wall 315 is also greater than the largest external horizontal dimension of the neck portion 510 of the bottle 500. The distance between the upper aperture wall 311 and the lower aperture wall 312 is also greater than the largest external dimension of the top flange 508 of the bottle 500 in bottles 500 which include a pronounced flange. The distance between the front aperture side wall 314 and the rear aperture side wall 315 may be greater than the largest external dimension of the top flange 508 of the bottle 500. Under this relationship, there is sufficient clearance between the aperture walls 310 of mounting aperture 300 and the top flange 508 and/or the neck portion 510 of the bottle 500 to allow the bottle to be fully inserted through mounting aperture 300 and into the rack apparatus 100.

It bears noting that the rack 100 may be used with containers/bottles which do not have a pronounced top flange 508 with equal benefit. The invention is expressly not limited for use with bottles having top flanges illustrated herein.

According to this embodiment, the distance between the upper aperture wall 311 and the lower aperture wall 312 may vary along the transverse axis B-B between the first and second major surface 210, 220 of the body 200 due to the obliquely angled portions 311*b* of the upper wall 311. This angled portion 311B of the upper aperture wall 331 does not generally engage the neck portion 510 of container 500 when fully seated and retained in the rack 100. Similarly, the obliquely angled portion 314*a* of front aperture wall 314 does not engage the neck portion of the container. According to this embodiment, the distance between the front aperture wall 314 and the rear aperture wall 315 may vary along the transverse axis B-B between the first and second major surface 210, 220 of the body 200 due to the presence of angled portion 314*a* of the front aperture wall 314.

Referring now to FIGS. 1, 2, 5, 6, and 10, the plurality of apertures 300 on the rack apparatus 100 of the present invention further comprises a first aperture section 301 and a second aperture section 302. In one embodiment, the first aperture sections 301 may be elongated slots in transverse configuration and the second aperture sections 302 may be round or circular in transverse configuration as shown. Accordingly, each aperture 300 may therefore include a first aperture section 301 forming an elongated obround or oval opening at one end to advantageously facilitate initial insertion of the container neck 510 into the aperture from one of the lateral major sides 210 or 220 of the rack body 200, and a circular opening at an opposite end configured for removably locking and securing the container 500 to the rack via the neck portion 510 and enlarged flange 508 at the top of the container (e.g. bottle).

Figure 1:
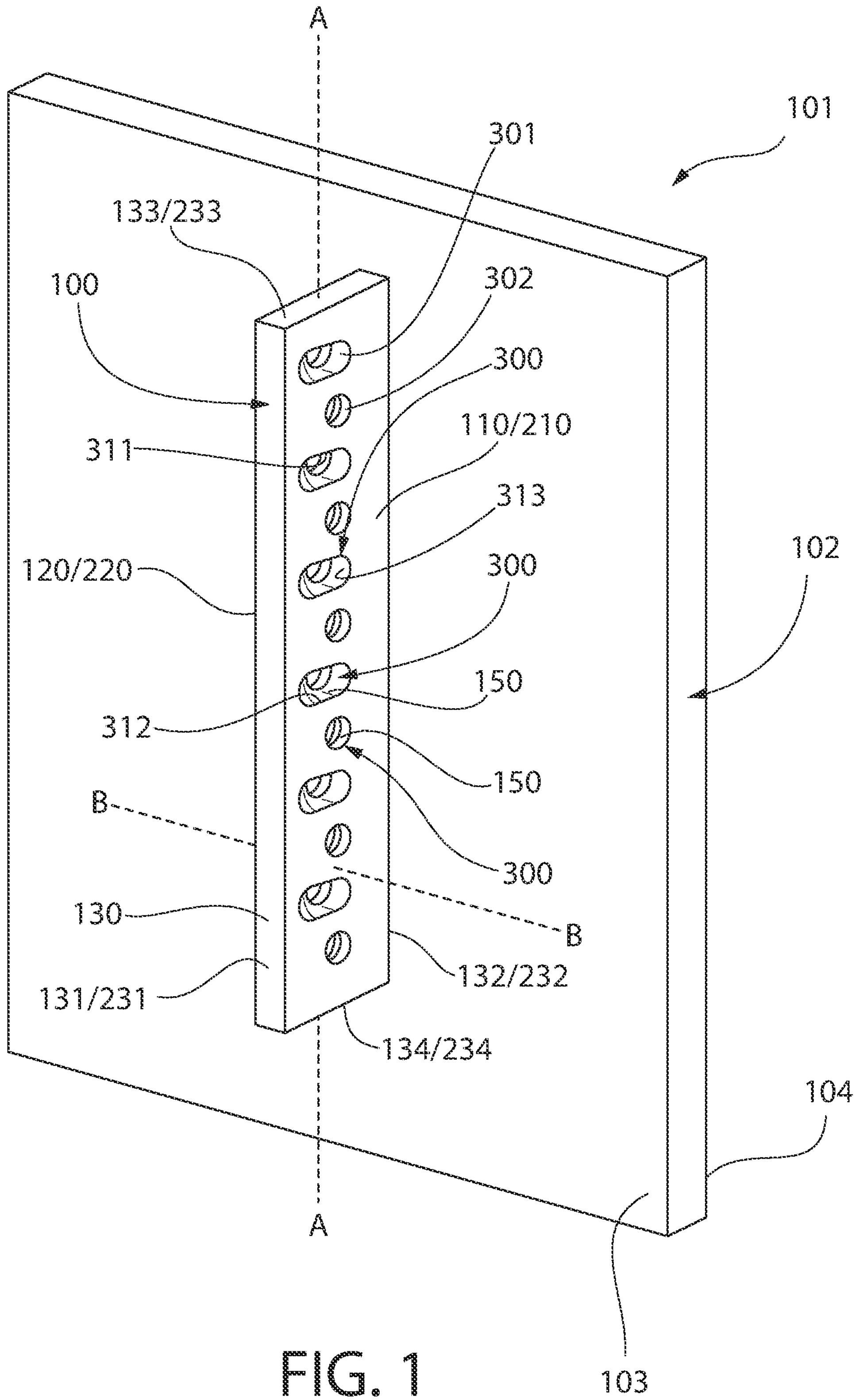
FIG. 1 is perspective view of a rack apparatus in an installed state on a support structure according an embodiment of the present invention.
Figure 2:
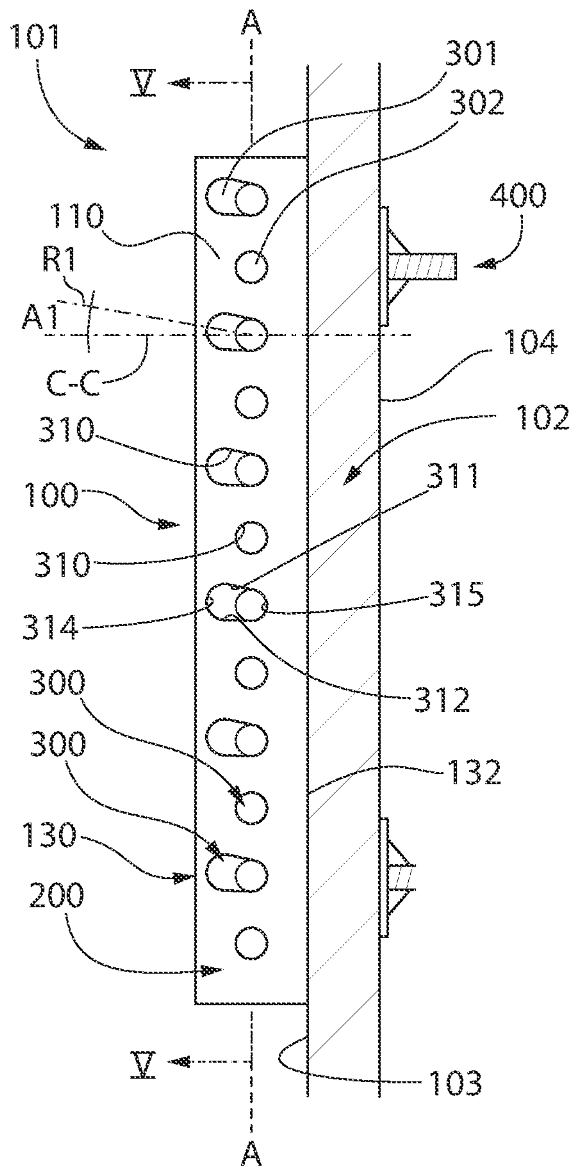
FIG. 2 is right side view of the rack apparatus of FIG. 1 in the installed state.

The slot-shaped first aperture sections 301 may be obliquely oriented in lateral side view rather than perpendicular to the longitudinal axis A-A and oblique to a horizontal axis C-C drawn front to rear of rack body 200 that extends through each slot (see, e.g. FIG. 2). Thus a reference line R1 drawn from the center of the rear wall 315 to the center of the front wall 314 is angled at an oblique angle A1 to the horizontal axis C-C. This obliquely angled orientation of slot-shaped aperture section 301 creates the obliquely angled portions 311*b* and 314*b* of each mounting apertures 300 previously described herein. It bears noting the arcuately curved surfaces of slot-shaped aperture sections 301 formed by oblique sections 311*b*, 314*b* are contiguous forming integral portions of the slots. Section 314*b* formed by front wall 314 extends upwards and then rearwards along the top wall 311 of each mounting aperture 300.

The mounting apertures 300 may be arranged in a spaced apart single linear array or column in rack 100 along longitudinal axis A-A. In one embodiment, the first and second aperture sections 301, 302 of each aperture 300 may be arranged array in an alternating pattern along longitudinal axis A-A in one embodiment as shown in FIG. 5. Every other mounting aperture 300 is laterally reversed in position horizontally as shown. For example, some of the apertures have the slot-shaped aperture sections 301 at the ends of the mounting apertures located at the right lateral major surface 110/210 of the rack, while every other one has the slot-shaped aperture sections at the left lateral major surface 120/220. The same applies by analogy to the circular-shaped second aperture sections 302. Because the circular shaped openings are configured to engage and retain the neck portions 510 (e.g. flange 508) of each bottle, this allows the bottles to be mounted in the alternating right-to-left arrangement as shown in FIG. 6. The larger main body portion 512 of each bottle will be located adjacent the slot-shaped section 301 of each mounting aperture 300, whereas the flange 508 at the top end of each bottle that defines the opening will be located adjacent to the circular shaped section 302 of the mounting aperture. The enlarged slot shaped sections 301 make it easier for the user to both insert and remove the bottles from the rack 100 with a minimal amount of accuracy.

The mounting apertures 300 each thus may have the same configuration and features described above, except that every other aperture moving in a vertical direction along the rack 100 has first and second aperture sections 301, 302 that are a mirrored image of the next adjacent mounting aperture along the longitudinal axis A-A (see, e.g. FIG. 5). The slot-shaped first aperture sections 301 have the greatest height the at open first end of the mounting apertures 300 and gradually diminish in height moving towards the opposite open second end of the aperture 300 having the circular aperture section 302 (see, e.g. FIG. 5). The upper wall 311*b* in the first section 310 of each aperture 300 is sloped and angled downwards at an oblique angle to transverse axis B-B moving between the lateral major surfaces 110, 120 from the first end towards the second end of the aperture. The upper wall 311*b* of the first section 301 of each aperture 300 is also sloped and angled downwards moving from the front surface 131 towards the rear surface 132 of the rack 100 (see, e.g. FIG. 2). The front wall 314*a* of the first section 301 of each aperture 300 is sloped or inclined rearwards moving from the open end at slot-shaped section 301 of the aperture towards the open end at circular-shaped section 302

(see, e.g. FIG. 11). The sloping/inclined upper and front walls 311, 314*a* wall collectively form the bell-shaped asymmetric partial-frustoconical shaped wall section and corresponding opening at one end of each container-mounting aperture 300 opposite the circular cylindrical shaped wall section and opening at the other end of the aperture, as previously described herein.

Under this foregoing configuration of the rack 100 and container mounting apertures 300, a plurality of containers 500 may be inserted into the first and second aperture sections 301, 302 of the rack apparatus 100, whereby the mirrored orientation of the first and second aperture sections 301, 302 allow for tight vertical packing of adjacent contains 500 along the longitudinal axis A-A. The phrase "tight vertical packing" refers to a first container 501 being inserted into the first aperture section 301 in a first direction along the transverse axis B-B and a second container 502 inserted into a second aperture section 302 in a second direction along the transverse axis B-B— whereby the first direction is a mirror of the second directions—and the body portion 512 of the first container 501 at least partially overlaps with the body portion 512 of the second container 502 in a direction orthogonal to the longitudinal axis A-A.

In some embodiments, the phrase "tight vertical packing" refers to two first containers 501 being inserted into first aperture sections 301 in the first direction and at least one second container 502 inserted into the second aperture section 302 in the second direction along the transverse axis B-B— whereby the body portion 512 of the second container 502 at least partially overlaps with the body portions 512 of the two first containers 501 in a direction orthogonal to the longitudinal axis A-A. Stated otherwise, each of the first and second containers 501, 502 being supported by the rack apparatus 100 such that the containers 501, 502 extend outward in a direction that is normal to the longitudinal axis A-A, and the neck portion 510 of a first container 501 may be located between two body portions 512 of two stacked second containers 502.

Under this foregoing arrangement, a vertical plane oriented substantially parallel to the longitudinal axis A-A and defined by either lateral major surface 110, 120 may intersect the neck portion 510 alone of a first container 501, and the larger main body portion 512 of an adjacent second container 502 when the container is fully inserted through the mounting aperture 300 in the rack 100 as seen in FIG. 10, or at least the neck portion adjoining the body portion if not fully inserted through the aperture.

As shown in FIGS. 10 and 11, it is important to note that in some case when mounting the containers 500 (e.g. bottles) in the rack 100, the diametrically enlarged top flanges 508 are not required to support and retain the containers in the container mounting apertures 300. If the containers were to become slightly dislodged from the illustrated positions such as by being bumped or during a seismic event, the flanges 508 act as failsafe mechanisms to catch the containers and prevent them from sliding out of the mounting apertures 300 in a lateral direction form either lateral major surfaces 110 or 120.

The vertical distance separating a first aperture section 301 and a second aperture section 302 of the next vertically adjacent mounting aperture 300 along the longitudinal axis A-A may be less than the largest width of the container 500 (i.e. at main portion 512). By emplacing the containers 500 in the rack 100 in opposing and alternating orientation as seen in FIG. 10, this allows tight packing of the containers to maximize the storage capacity of the rack and provide a visually interesting and attractive appearance suitable for public display in a restaurant or similar environment (as well as for private use in a personal dwelling).

It bears special mention that in some embodiments, only the front aperture wall 314 may include an obliquely angled portion 314*a* or the upper aperture wall 311 may include the obliquely angled portion 311*a*. In preferred but non-limiting embodiments, as shown herein with respect to FIGS. 1-11, each mounting aperture includes both obliquely angled wall portions 314*a* and 311*a* to maximize convenience of container insertion into the rack 100 for the user.

Referring now to FIGS. 12-22D, a rack apparatus 1100 and corresponding storage system 1001 is illustrated in accordance with another embodiment of the present invention. The storage system 1001 and rack apparatus 1100 is similar to the storage system 101 and rack apparatus 100 except as described herein below. The description of the storage system 1001 and rack apparatus 1100 above generally applies to the storage system 1001 and rack apparatus 1000 described below except with regard to the differences specifically noted below. A similar numbering scheme will be used for the storage system 1000 and rack apparatus 1100 as with the storage system 101 and rack apparatus 100 except that 1,000-series numbers will be used.

According to this embodiment, the apertures 1300 comprise aperture walls 1310 that may include an upper aperture wall 1311 that is opposite a lower aperture wall 1312. The aperture walls 1310 may further comprise at least one aperture side wall 1313 extending between the upper aperture wall 1311 and the lower aperture wall 1312. The upper aperture wall 1311, the lower aperture wall 1312, and the aperture side walls 1313 may form a continuous surface that collectively defines a closed-perimeter boundary of the aperture 1300. Each of the lower aperture wall 1312, upper aperture wall 1311, and/or the aperture side wall 1313 may be independently planar or curved.

According to this embodiment, the distance between the upper aperture wall 1311 and the lower aperture wall 1312 may remain substantially constant along the transverse axis B-B between the first and second major surface 1210, 1220 of the body 1200. According to this embodiment, the distance between the front aperture wall 1314 and the rear aperture wall 1315 may remain substantially constant along the transverse axis B-B between the first and second major surface 1210, 1220 of the body 1200.

Referring now to FIGS. 23-32, a rack apparatus 2100 and corresponding storage system 2001 is illustrated in accordance with another embodiment of the present invention. The storage system 2001 and rack apparatus 2100 is similar to the storage system 101 and rack apparatus 100 except as described herein below. The description of the storage system 2001 and rack apparatus 2100 above generally applies to the storage system 2001 and rack apparatus 2000 described below except with regard to the differences specifically noted below. A similar numbering scheme will be used for the storage system 2000 and rack apparatus 2100 as with the storage system 101 and rack apparatus 100 except that 2,000-series numbers will be used.

According to this embodiment, the apertures 2300 comprise aperture walls 2310 that may include an upper aperture wall 2311 that is opposite a lower aperture wall 2312. The aperture walls 2310 may further comprise at least one aperture side wall 2313 extending between the upper aperture wall 2311 and the lower aperture wall 2312. The upper aperture wall 2311, the lower aperture wall 2312, and the aperture side walls 2313 may form a continuous surface. The continuous surface of this embodiment does not form a closed-perimeter encapsulating the aperture 2300— rather the continuous surface collectively defines a C-shaped channel having an open-end. Each of the lower aperture wall 2312, upper aperture wall 2311, and/or the aperture side wall 2313 may be independently planar or curved.

According to this embodiment, the open-end of the C-shaped channel may be present on one of the side surfaces 2130 of the body 2200 such that each of the upper aperture wall 2311 and the lower aperture wall 2312 intersect the side surface 2130 of the body 2200. The open-end of the C-shaped channel allows for a container 2500 to be inserted into the aperture 2300 along a direction that is substantially orthogonal to both the longitudinal axis A-A and the transverse axis B-B. Specifically, the container 2500 may be inserted into the aperture 2500 be inserting a neck portion 2510 through the open-end on the side surface 2130 in a direction extending from the first vertical side surface 2131 toward the second vertical side surface 2132 of the rack apparatus 3100.

According to this embodiment, the distance between the upper aperture wall 2311 and the lower aperture wall 2312 may remain substantially constant along the transverse axis B-B between the first and second major surface 2210, 2220 of the body 2200. According to this embodiment, the distance between the upper aperture wall 2311 and the lower aperture wall 2312 may be substantially equal to the largest external dimension of the neck portion 2510 of the container 2500. Additionally, according to this embodiment, the distance between the upper aperture wall 2311 and the lower aperture wall 2312 may be smaller than the largest external dimension of the top flange 2508 of the container 2500.

Referring now to FIGS. 33-42, a rack apparatus 3100 and corresponding storage system 3001 is illustrated in accordance with another embodiment of the present invention. The storage system 3001 and rack apparatus 3100 is similar to the storage system 101 and rack apparatus 100 except as described herein below. The description of the storage system 3001 and rack apparatus 3100 above generally applies to the storage system 3001 and rack apparatus 3000 described below except with regard to the differences specifically noted below. A similar numbering scheme will be used for the storage system 3000 and rack apparatus 3100 as with the storage system 101 and rack apparatus 100 except that 3,000-series numbers will be used.

According to this embodiment, the apertures 3300 comprise aperture walls 3310 that may include an upper aperture wall 3311 that is opposite a lower aperture wall 3312. The aperture walls 3310 may further comprise at least one aperture side wall 3313 extending between the upper aperture wall 3311 and the lower aperture wall 3312. The upper aperture wall 3311, the lower aperture wall 3312, and the aperture side walls 3313 may form a continuous surface. The continuous surface of this embodiment does not form a closed-perimeter encapsulating the aperture 3300— rather the continuous surface collectively defines a C-shaped channel having an open-end. Each of the lower aperture wall 3312, upper aperture wall 3311, and/or the aperture side wall 3313 may be independently planar or curved.

According to this embodiment, the open-end of the C-shaped channel may be present on one of the side surfaces 3130 of the body 3200 such that each of the upper aperture wall 3311 and the lower aperture wall 3312 intersect the side surface 3130 of the body 3200. The open-end of the C-shaped channel allows for a container 3500 to be inserted into the aperture 3300 along a direction that is substantially orthogonal to both the longitudinal axis A-A and the transverse axis B-B. Specifically, the container 3500 may be inserted into the aperture 3500 be inserting a neck portion 3510 through the open-end on the side surface 3130 in a direction extending from the first vertical side surface 3131 toward the second vertical side surface 3132 of the rack apparatus 3100.

According to this embodiment, the distance between the upper aperture wall 3311 and the lower aperture wall 3312 may remain substantially constant along the transverse axis B-B between the first and second major surface 3210, 3220 of the body 3200. According to this embodiment, the distance between the upper aperture wall 3311 and the lower aperture wall 3312 may be substantially equal to the largest external dimension of the neck portion 3510 of the container 3500. Additionally, according to this embodiment, the distance between the upper aperture wall 3311 and the lower aperture wall 3312 may be smaller than the largest external dimension of the top flange 3508 of the container 3500.

According to this embodiment, the position of the upper aperture wall 3311 and the lower aperture wall 3312 may vary along the longitudinal axis A-A when moving from the first vertical side surface 3131 toward the second vertical side surface 3132. Specifically, each aperture 3300 may comprise a front portion and a rear portion, whereby the front portion is adjacent to the first vertical side surface 3131 and the rear portion is adjacent to the second vertical side surface 3132. The rear portion may comprise the upper and lower aperture wall 3311, 3312 in a lower vertical position along the longitudinal axis A-A relative to the front portion for a single aperture 3300. The result is the rear portion being dropped below the front portion such that when a neck portion 3510 is inserted into the aperture 3300, the container is held in place both vertically and horizontally in the aperture 3300 by the vertical offset of the rear portion relative to the front portion.

Figure 58:
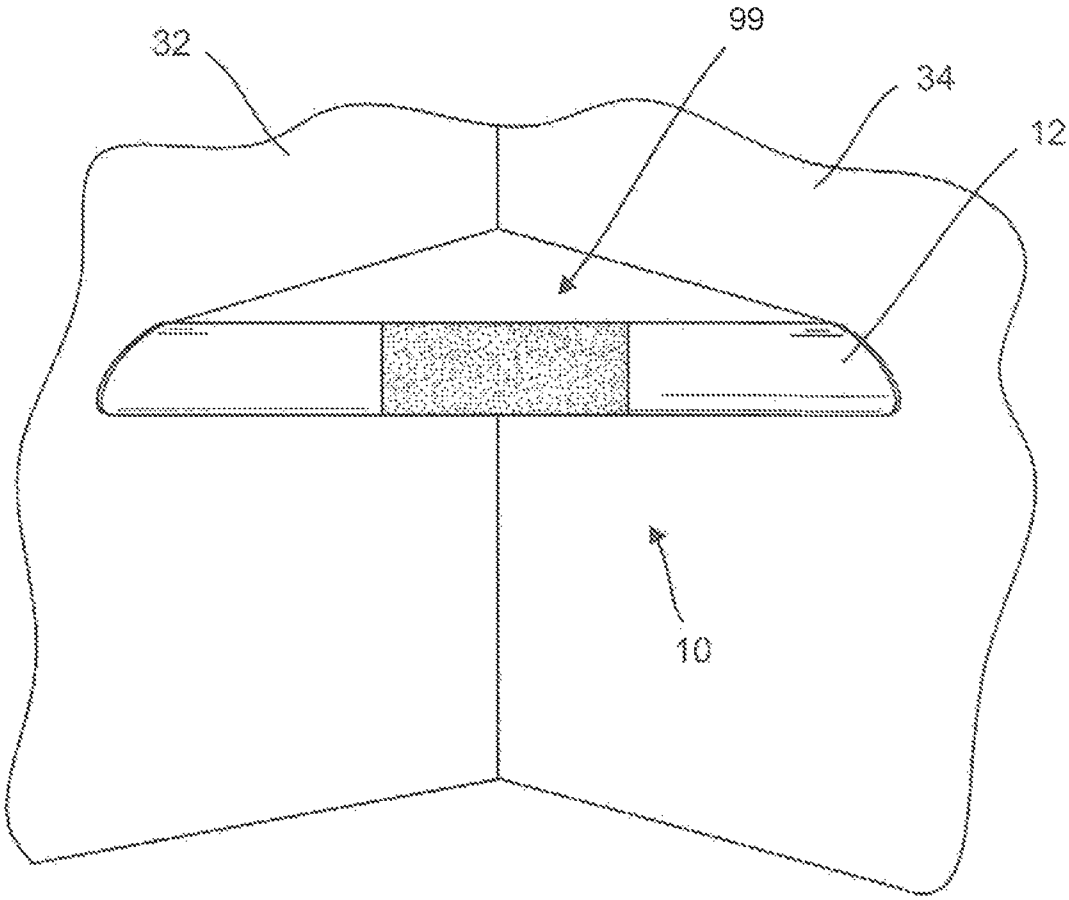
FIG. 58 is a perspective view of the support assembly in an assembled state, fixed to a structure that includes a cantilevered plate.
Figure 59:
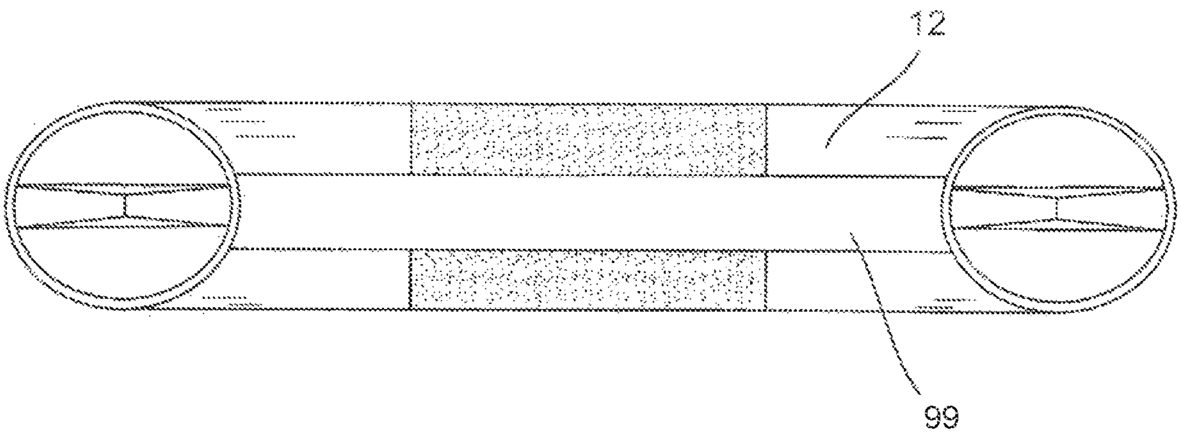
FIG. 59 is a rear view of FIG. 58.
Figure 60:
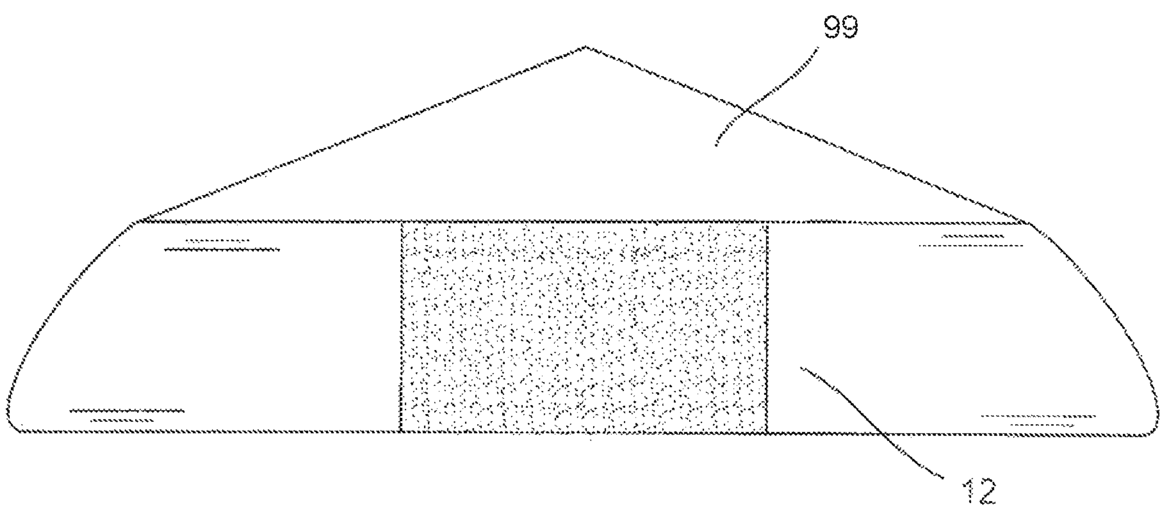
FIG. 60 is a front view of FIG. 58.

FIGS. 43-60 illustrate an embodiment of a support assembly, which is designated hereinafter by reference numeral 10. As will be described in more detail below, in general the support assembly 10 includes a substantially tubular member 12, a first insert 14, a second insert 16, a first end cap 18, a second end cap 20 and a plurality of fasteners 22A, 22B. The support assembly 10 can be used, for example, as a foot rest, a grab bar, a mounting structure in conjunction with bath accessories or as support for any structure (e.g., shelving). Although the support assembly 10 is shown as including a tubular member 12 that is substantially cylindrical, the tubular member 12 can be any supporting body of any shape that extends between at least a first end cap and a second end cap. For example, as shown in an embodiment in FIGS. 58-60, the support assembly includes a shelving support 99 that includes a cantilevered plate attached (e.g., welded) to a tubular member.

As shown in an embodiment in FIGS. 43-57, the tubular member 12 is an elongated hollow cylindrical structure that includes an outer surface 24 and an inner surface 26 and that is delimited between a first end 28 and a second end 30. The first end 28 and the second end 30 of the tubular member 12 are both angled such that a first plane extending along the first end 28 and a second plane extending along the second end 30 converge and intersect each other at a central point between the ends 28, 30 of the tubular member 12. As such, in an embodiment, the first angled end 28 and the second angled end 30 allow for the support assembly 10 to be mounted between two converging surfaces 32, 34 (See FIGS. 56 and 57) that are substantially perpendicular to each other. In an embodiment, the first end 28 and the second end 30 are both angled at approximately about 45 degrees.

As will be explained in more detail below, as shown in FIGS. 43, 44, and 47-50, a first opening 36 extends through the tubular member 12 substantially transverse to and near the first end 28 of the tubular member 12 and a second opening 38 extends through the tubular member 12 substantially transverse to and near the second end 30 of the tubular member 12.

Figure 44:
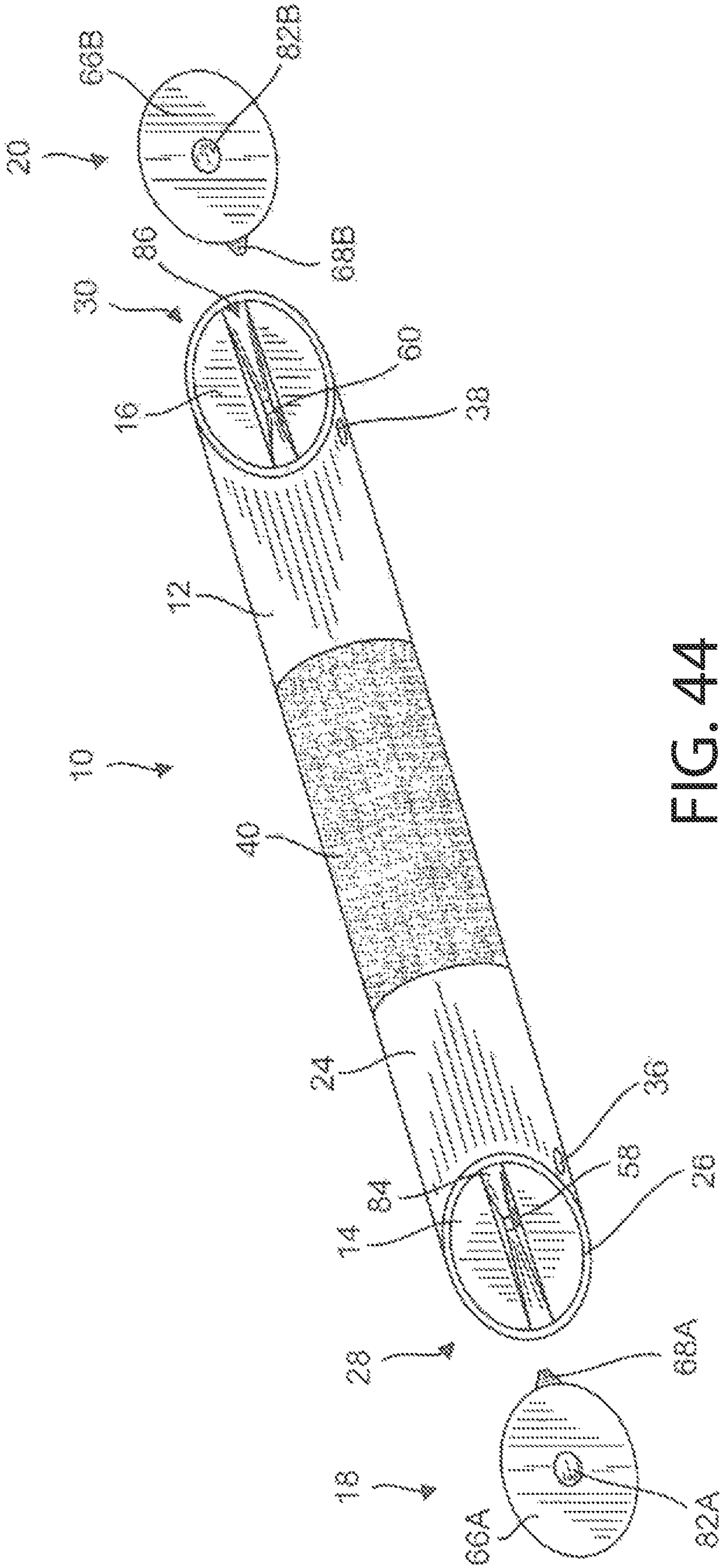
FIG. 44 is a perspective view of the support assembly of FIG. 43 with the end caps in an uninstalled state.
Figure 45:
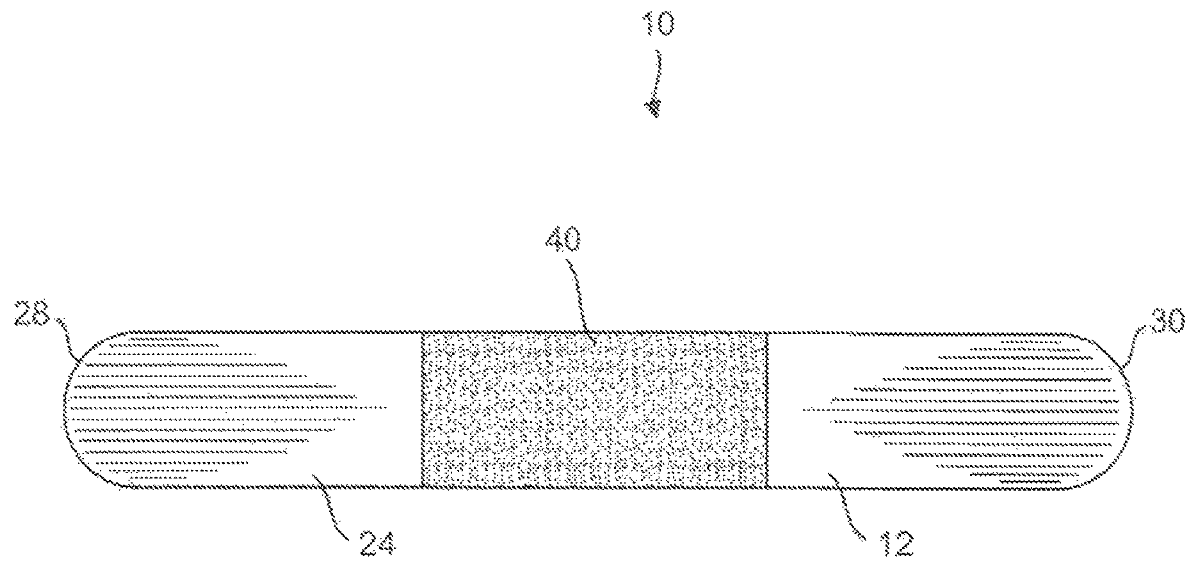
FIG. 45 is a front view of the support assembly of FIG. 43.
Figure 46:
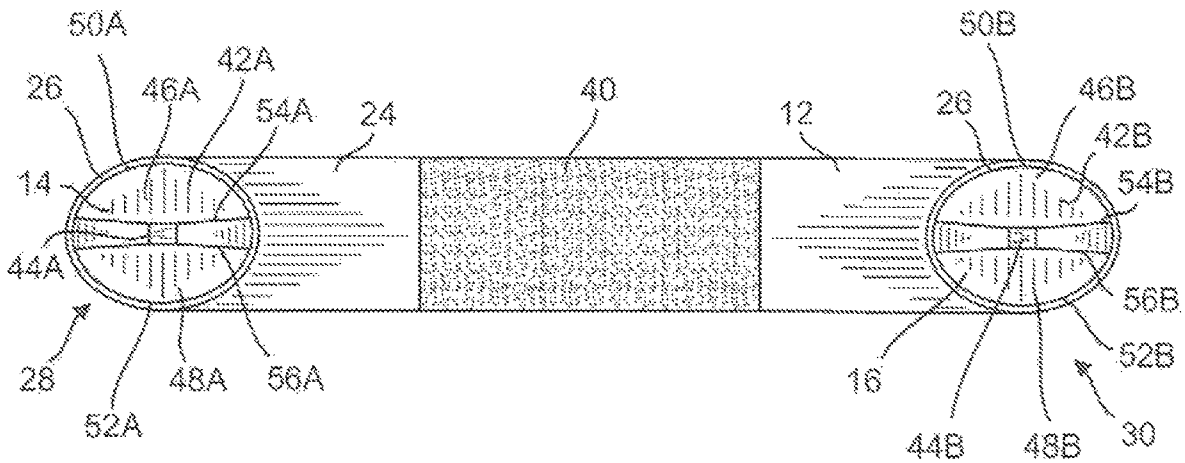
FIG. 46 is a rear view of the support assembly of FIG. 43.
Figure 47:
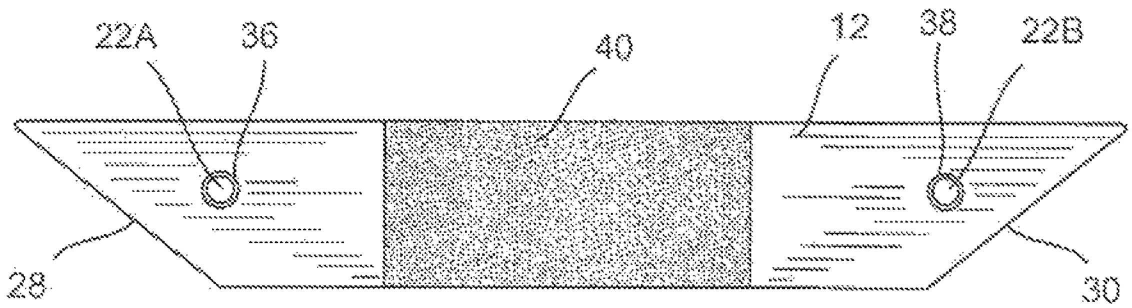
FIG. 47 is a bottom view of the support assembly of FIG. 43.
Figure 48:
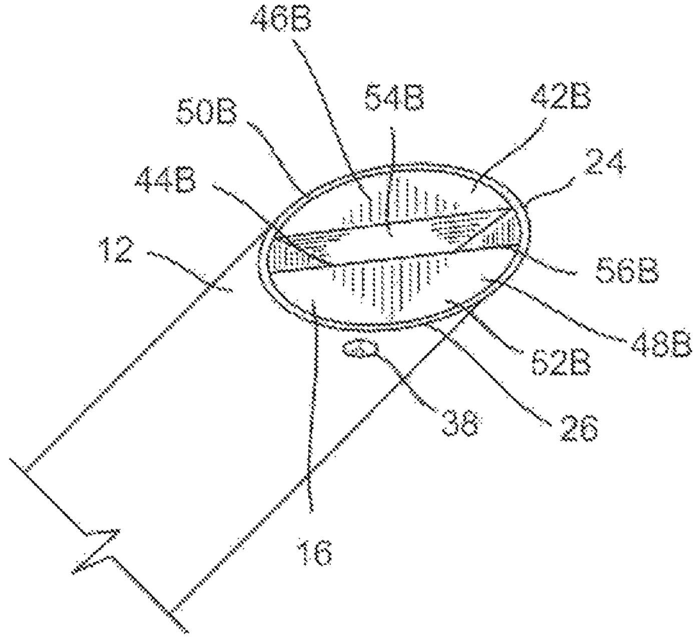
FIG. 48 is a first perspective view of an end of the support assembly of FIG. 43.

As shown in an embodiment in FIG. 44, the first end 28 and the second end 30 of the tubular member 12 are substantially ovoid. In an embodiment, the tubular member 12 is formed from metal such as stainless steel (e.g., 18/8 (304) stainless steel). However, the tubular member 12 can be formed from any material that is known or may become known that allows for sustaining a force to be applied thereto. As can be seen in an embodiment in FIG. 43, an anti-slip grip 40 can extend about at least a portion of the outer surface 24 of the tubular member 12.

As depicted, for example, in FIG. 44, the first insert 14 is fixed within the first end 28 of the tubular member 12 and the second insert 16 is fixed within the second end 30 of the tubular member 12. The first insert 14 and second insert 16 can be fixed within the tubular member by press fit, welding, bonding (e.g. using an adhesive), fastening or the like.

Figure 49:
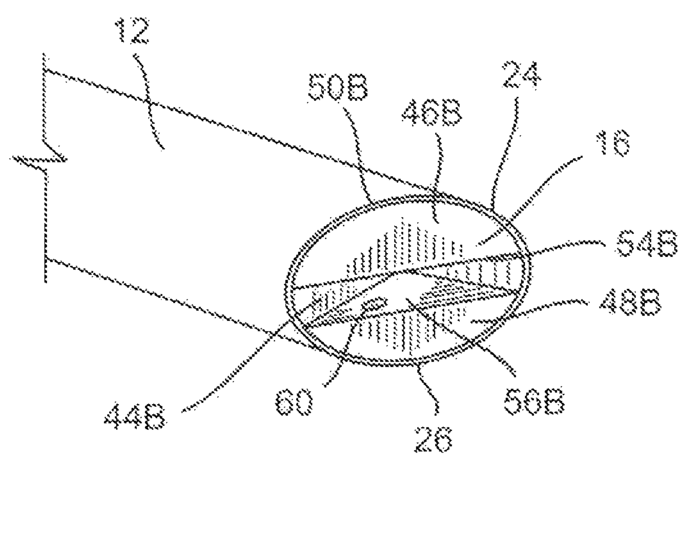
FIG. 49 is a second perspective view of an end of the support assembly of FIG. 43.
Figure 50:
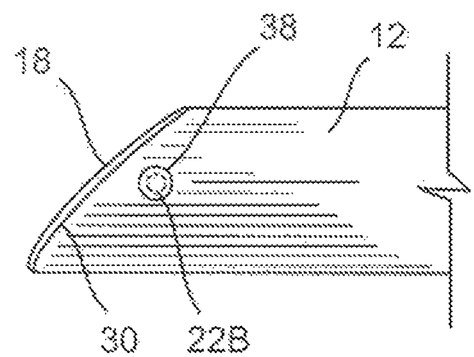
FIG. 50 is a partial bottom view of an end of the support assembly of FIG. 43.
Figure 51A:
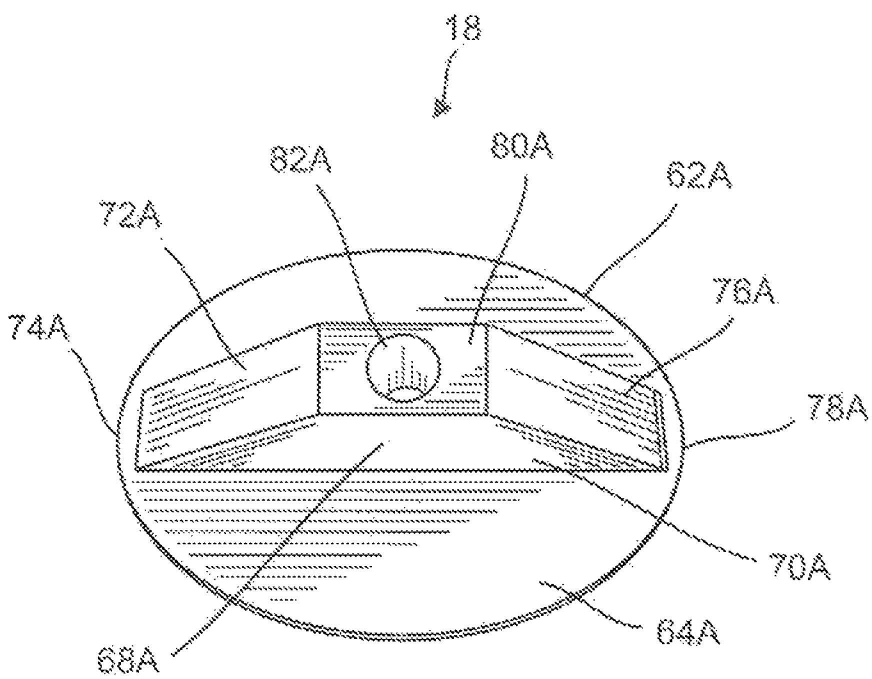
FIG. 51A is a perspective view of a first end cap of the support assembly of FIG. 43.
Figure 51B:
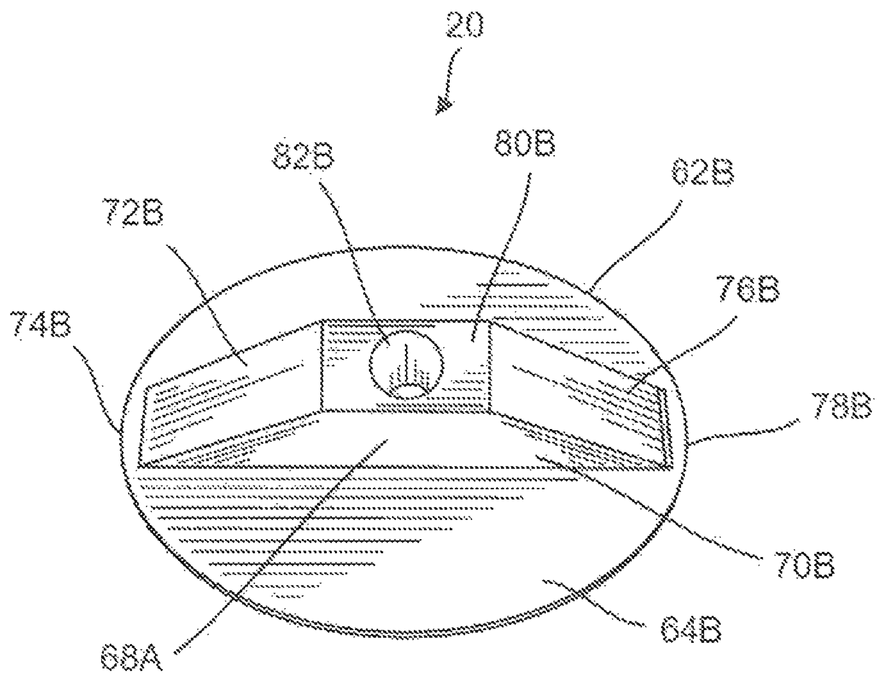
FIG. 51B is a perspective view of a second end cap of the support assembly of FIG. 43.
Figure 52A:
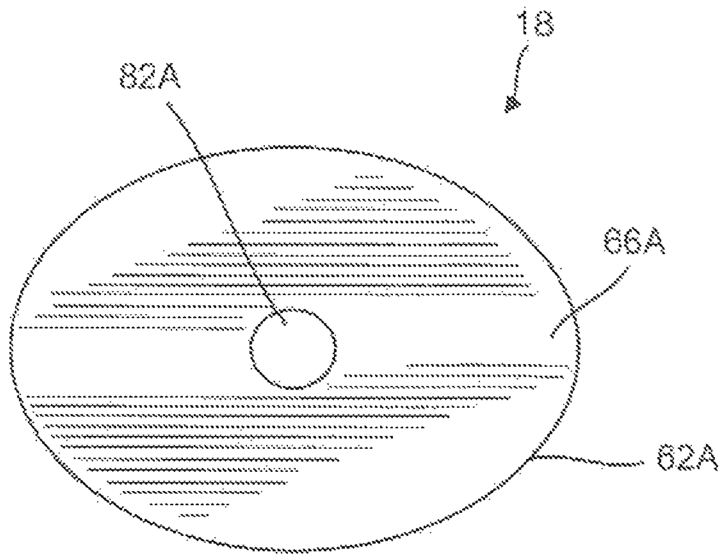
FIG. 52A is a front view of the first end cap of the support assembly of FIG. 43.
Figure 52B:
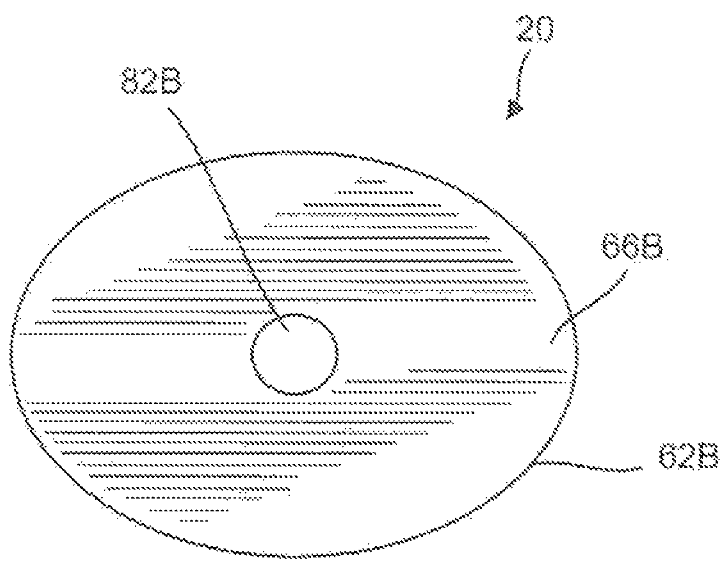
FIG. 52B is a front view of the second end cap of the support assembly of FIG. 43.
Figure 53A:
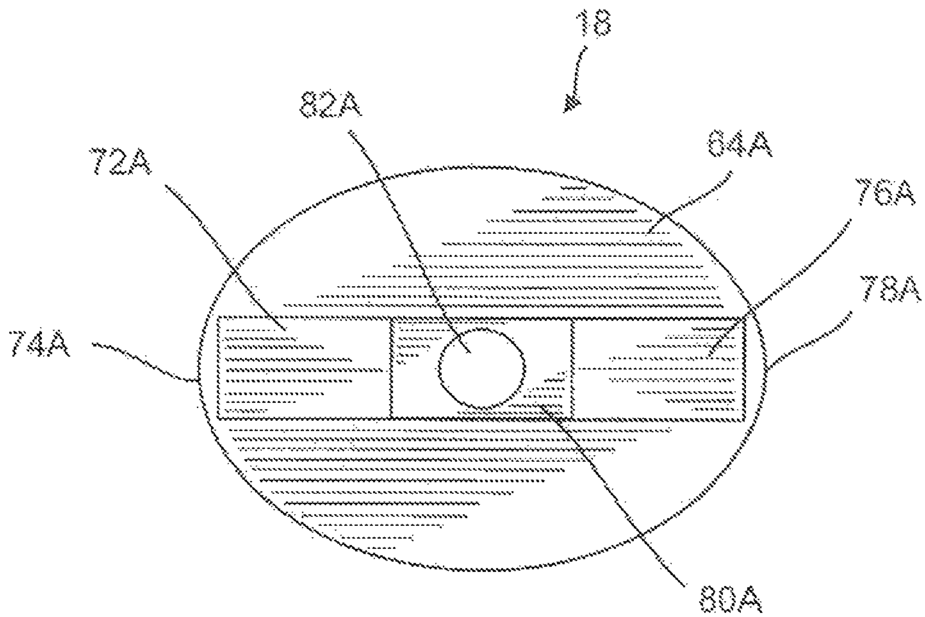
FIG. 53A is a rear view of the first end cap of the support assembly of FIG. 43.
Figure 53B:
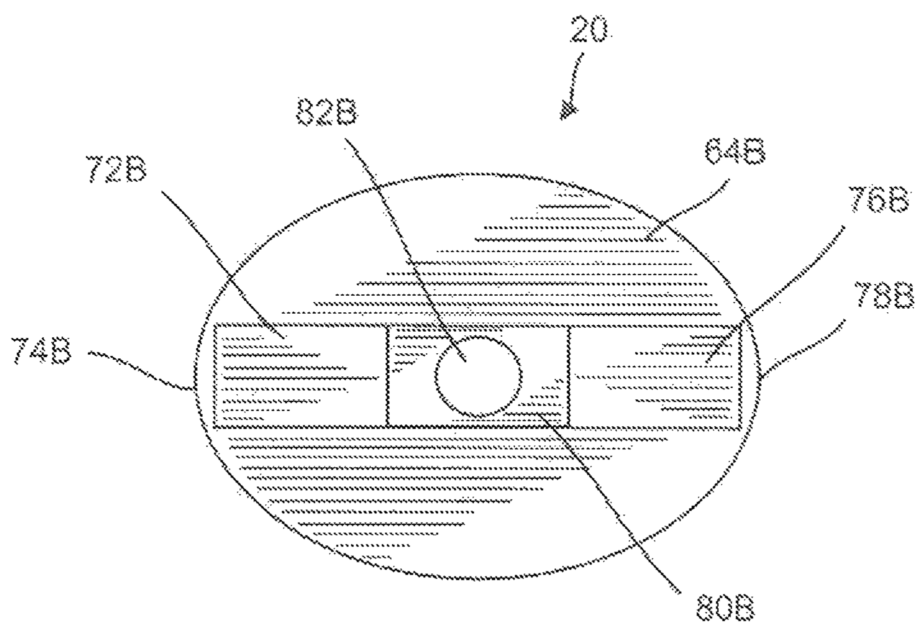
FIG. 53B is a rear view of the second end cap of the support assembly of FIG. 43.
Figure 54A:
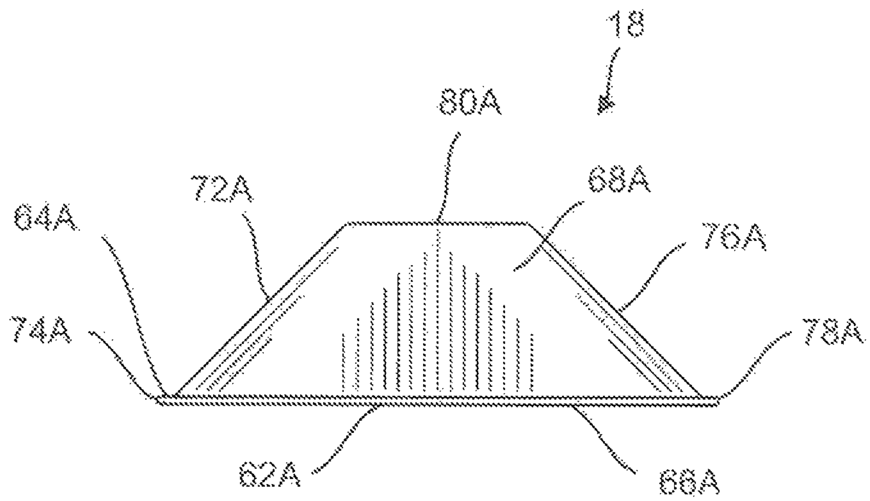
FIG. 54A is a top view of the first end cap of the support assembly of FIG. 43.
Figure 54B:
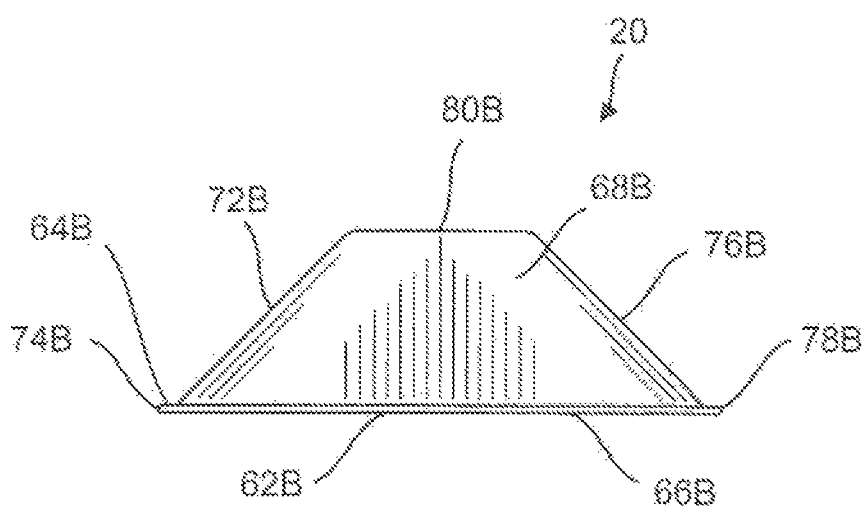
FIG. 54B is a top view of the second end cap of the support assembly of FIG. 43.
Figure 55A:
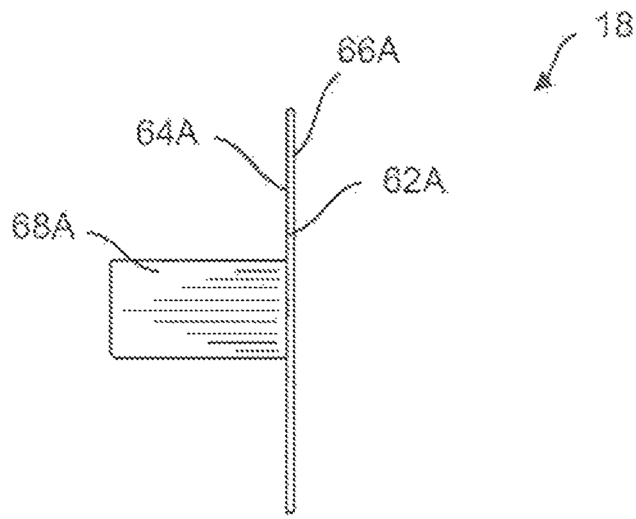
FIG. 55A is a side view of the first end cap of the support assembly of FIG. 43.
Figure 55B:
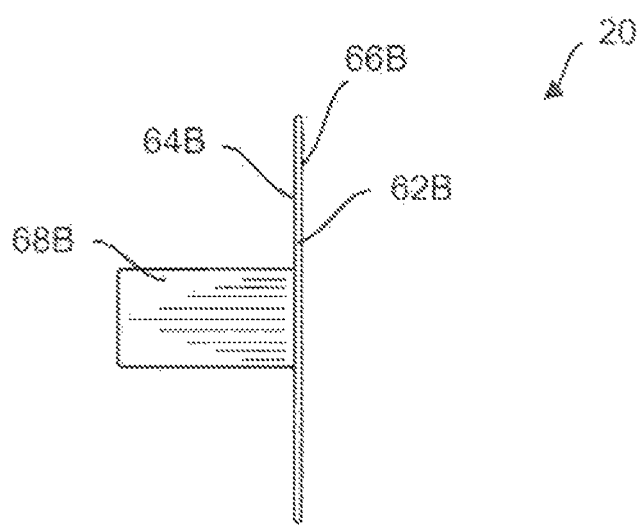
FIG. 55B is a side view of the second end cap of the support assembly of FIG. 43.

In an embodiment, the first insert 14 and the second insert 16, respectively include a body 42A, 42B that has a base 44A, 44B, a first projection 46A, 46B that extends from the base 44A, 44B in a first direction and a second projection 48A, 48B that is spaced from the first projection 46A, 46B and extends from the base 44A, 44B in the first direction as well. Both the first projection 46A, 46B and the second projection 48A, 48B include an outer surface 50A, 50B, 52A, 52B, respectively, that is contoured to be contactable with the inner surface 26 of the tubular member 12 and an inner surface 54A, 54B, 56A, 56B that extends substantially linearly from the base 44A, 44B of the first and second insert 14, 16, respectively. In an embodiment, the outer surfaces 50A, 50B, 52A, 52B of the inserts 14, 16 are substantially ovoid. As can be seen in FIG. 44, the first and second projections 46A, 46B, 48A, 48B extend at an angle from the base 44A, 44B that is substantially the same as the angle of the first end 28 of the tubular member 12. As such, the inner surfaces 54A, 54B, 56A, 56B of the projections 46A, 46B, 48A, 48B are substantially triangular. In an embodiment as shown in FIG. 49, the inner surfaces 54A, 54B, 56A, 56B of the first and second projection 46A, 46B, 48A, 48B each form a right triangle. However, the inserts 14, 16 can be configured to be any shape and/or size to accommodate the end caps 18, 20.

As shown in an embodiment in FIG. 44, a first hole 58 extends through one of the first projection 46A and the second projection 48A of the first insert 14 with the first insert 14 adaptable such that the first hole 58 is in alignment with the first opening 36 formed in the tubular member 12. As shown in FIGS. 44 and 49, a second hole 60 extends through one of the first projection 46B and the second projection 48B of the second insert 16, which is adaptable so that the second hole 60 is in alignment with the second opening 38. In an embodiment, the first hole 58 can be formed in both the first projection 46A and the second projection 48A of the first insert 14 and the second hole 60 can be formed in both the first projection 46B and the second projection 48B of the second insert 16.

FIGS. 51-55 illustrate an embodiment the first end cap 18 and the second end cap 20 that are configured to be arranged within the first insert 14 and the second insert 16, respectively, to fix the tubular member 12 to a structure. The first end cap 18 and the second end cap 20, respectively include a body 62A, 62B that has a first surface 64A, 64B and a second surface 66A, 66B, which opposes the first surface 64A, 64B. As shown in an embodiment in FIGS. 51-53, the body 62A, 62B of the first and second end cap 18, 20, respectively, is substantially ovoid. A trapezoidal element 68A, 68B extends, respectively, from the first surface 64A, 64B of the body 62A, 62B of the end caps 18, 20. In an embodiment, the body 62A, 62B is substantially ovoid. However, the end caps can be of any shape and the elements that extend from the end caps can also be of any shape that substantially matches the opening within the inserts 12, 14.

In an embodiment, the trapezoidal element 68A, 68B includes a first base 70A, 70B that substantially extends along longitudinal diameter from the first surface 64A, 64B of the body 62A, 62B of the end caps 18, 20, a first sidewall 72A, 72B extends at or near a first end 74A, 74B of the first base 70A, 70B at an angle, a second sidewall 76A, 76B extends at or near a second end 78A, 78B of the first base 70A, 70B at an angle and a second base 80A, 80B that is spaced from and substantially parallel to the first base 70A, 70B and that extends between the first sidewall 72A, 72B and the second sidewall 76A, 76B. With the trapezoidal element 68A, 68B encompassing the end caps 18, 20 and interacting with the inserts 14, 16, respectively, rotational forces are substantially mitigated.

Figure 56:
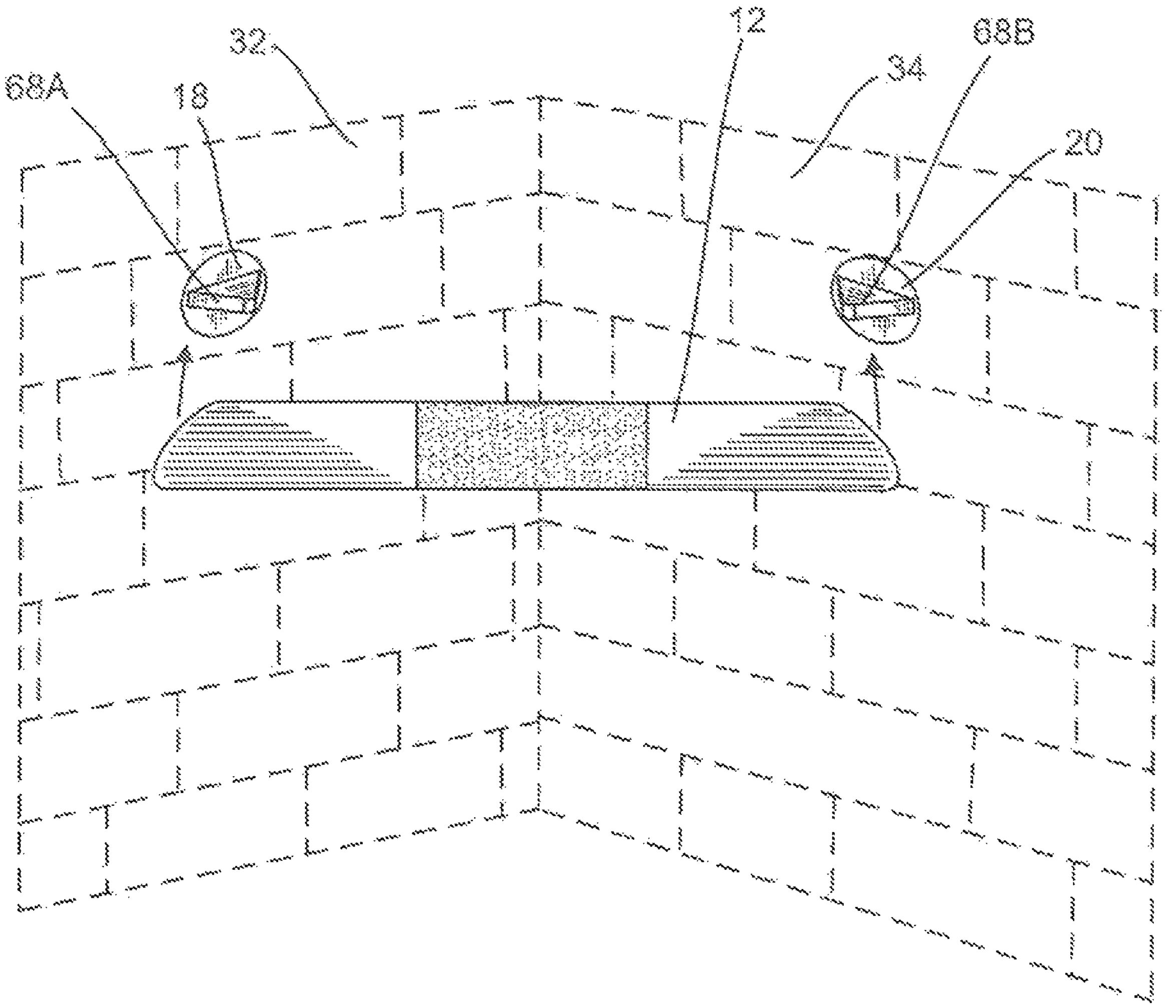
FIG. 56 is an installation view of the end caps and tubular member of the support assembly being fixed to a structure.
Figure 57:
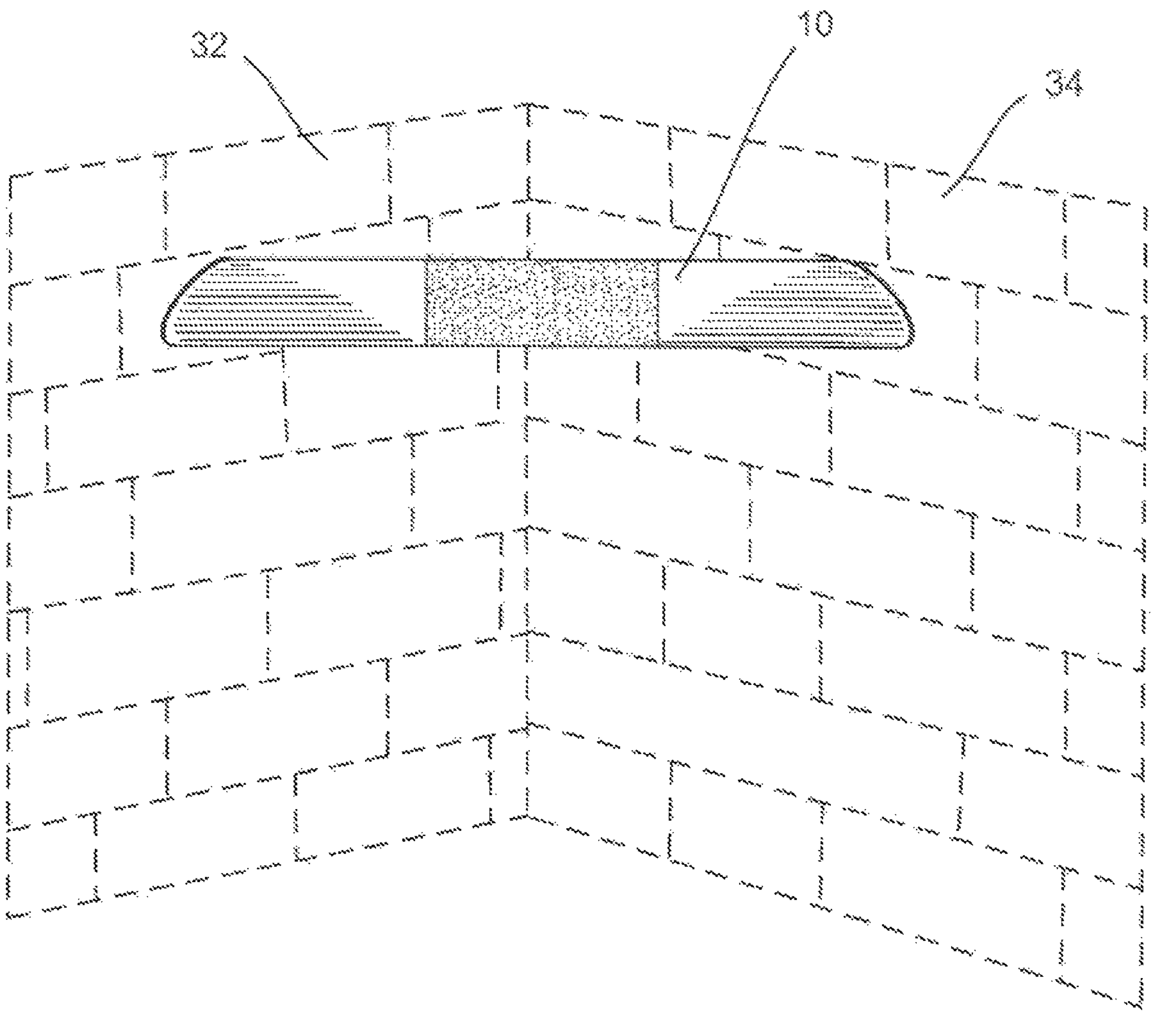
FIG. 57 is a perspective view of the support assembly in an assembled state, fixed to a structure.

In an embodiment, the trapezoidal element 68A, 68B includes an opening 82A, 82B through which a fastener (e.g., a screw) can extend to fix the trapezoidal element 68A, 68B to a structure (see e.g., FIGS. 56 and 57). As can be seen in an embodiment in FIGS. 51-53, the opening 82A, 82B extends centrally from the second surface 66A, 66B of the body 62A, 62B of each of the end caps 18, 20 through the first base 70A, 70B and second base 80A, 80B of the trapezoidal element 68A, 68B. The trapezoidal element 68A, 68B herein allow room for the head of a mounting screw.

As shown in FIG. 56, upon fastening the end caps 18, 20 to a structure, the tubular element 12 can be slide over the trapezoidal elements 68A, 68B, arranging the first trapezoidal element 68A within a slot 84 of the first insert 14 formed between the inner surface 54A, 56A of the first and second projections 46A, 48A and the second trapezoidal element 68B within the slot 86 formed between the inner surface 54B, 56B of the first and second projections 46B, 48B of the second insert 16. A first fastener 22A can be inserted through the first opening 36 in the tubular member 12 and the first hole 58 of the first insert 14 and contact the trapezoidal element 68A to fix the first end cap 18 within the tubular member 12 and a second fastener 22B can be inserted through the second opening 38 in the tubular member 12 and the second hole 60 of the second insert 48 and contact the trapezoidal element 68B to fix the second end cap 20 within the tubular member 12. In an embodiment, the first hole 58 of the first insert 46 and the second hole 60 of the second insert 48 include threading (not shown) extending about each opening 58, 60 and the fastener 22A, 22B is a set screw with threading that fixes the end caps 18, 20 within the inserts 46, 48 and to the tubular member 12.

Because the end caps 18, 20 are not mounted in parallel to each other the rotational axes of the end caps 18, 20 contrast each other and in turn stabilize the tubular element 12. The moment forces only exist in the area of the tubular element 12 that exceeds the axes of the end caps. As such, the moment forces are minimized and the torsion forces are negated by opposing each other resulting in an assembly that is stable and does not rotate upon a force being applied thereto.

Figure 61:
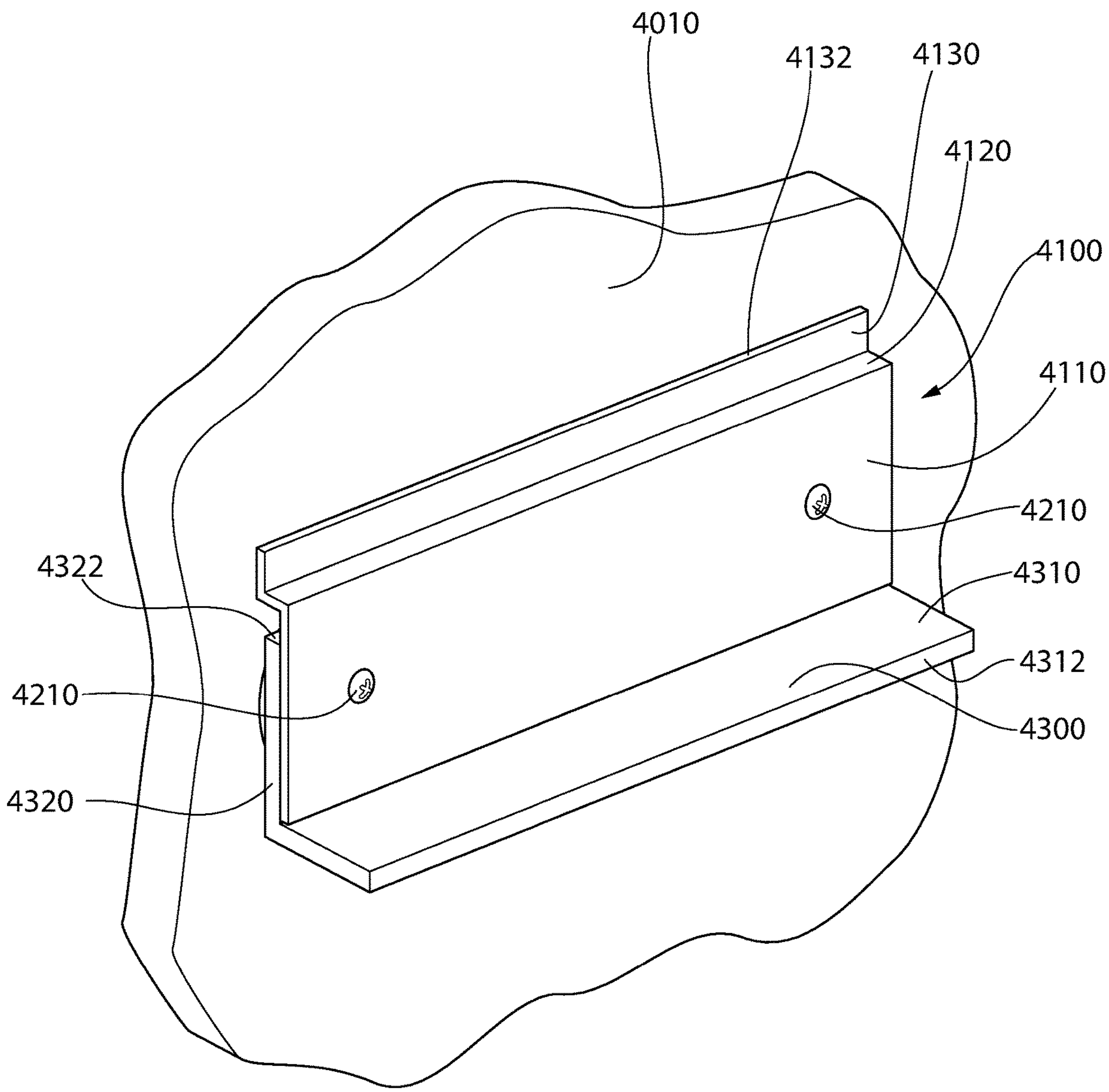
FIG. 61 is an upper perspective view of a mounting system with an accessory item in accordance with exemplary embodiments of the invention.

FIG. 61 shows an example of a fastening system in accordance with an embodiment of the invention in an assembled state. In this example, the fastening system includes a cover 4100 that covers a mountable accessory object or item, in this non-limiting case a shelf 4300, that is fastened to wall 4010 by fasteners 4200 (represented in this figure by fastener heads 4210). The cover 4100 and shelf 4300 may be horizontally elongated in one embodiment.

Figure 63:
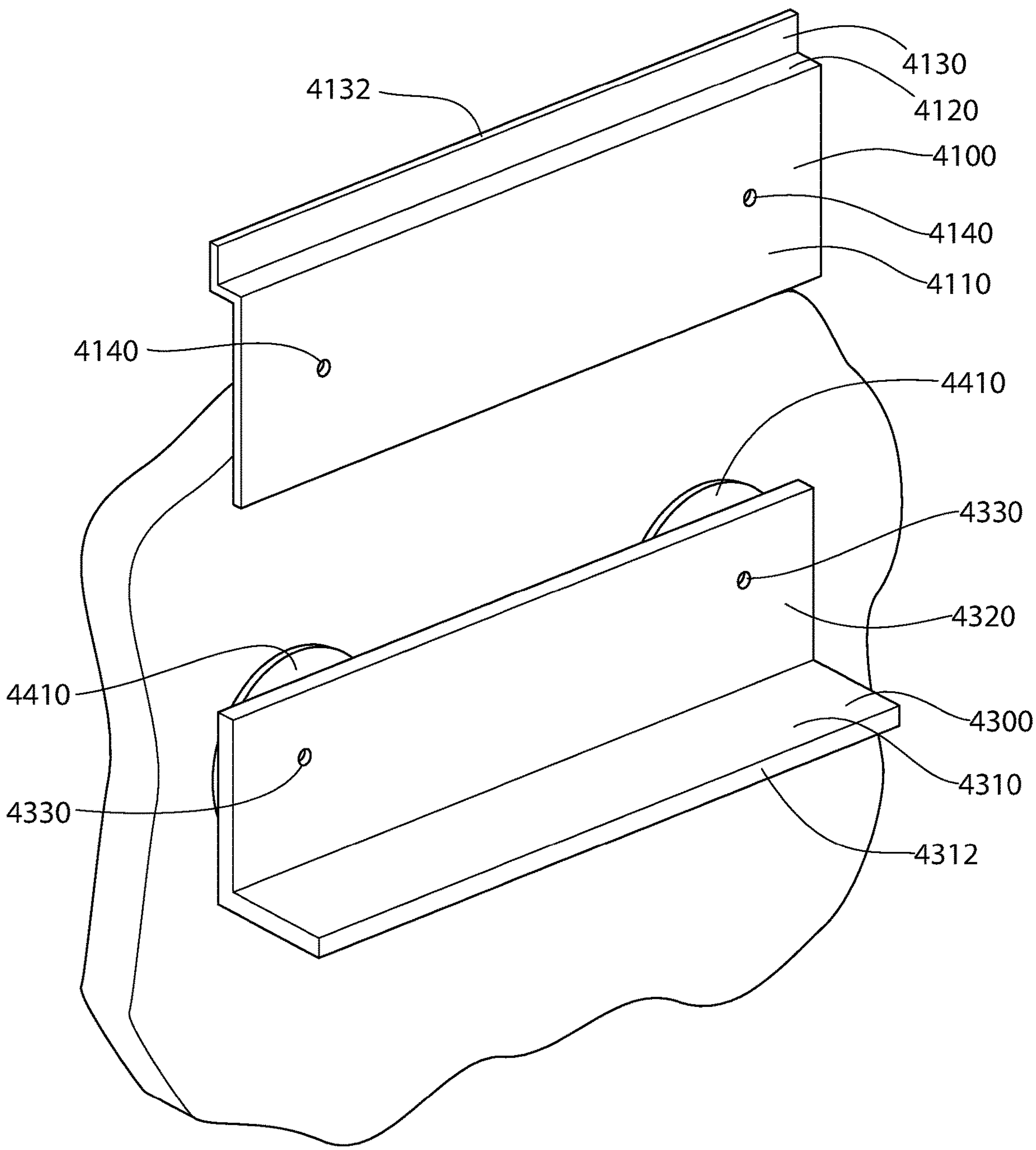
FIG. 63 is an upper perspective view of the mounting system of FIG. 61 in an unassembled state.

FIG. 63 shows the system of FIG. 61 in a partially disassembled state. FIG. 63 shows shelf 4300 and force-distributing plates 4410 in position on wall 4010, but with cover 4100 removed. If this system were to be installed without cover 4100, force-distributing plates 4410 would be visible, which can be esthetically undesirable. Cover 4100 provides an esthetically pleasing solution by covering force-distributing plates 4410 and an upper edge 4322 (e.g. horizontal) of shelf 4300.

Cover 4100 has a first section 4110 that, in this example, extends vertically parallel to an outer surface of wall 4010. First section 4110 defines a planar rear surface 4902 and opposing parallel planar front surface 4903. A second section 4130 extends, in this example, parallel to first section 4110 and is configured to press against the outer surface of wall 4010. Second section defines a planar rear surface 4906 and opposing parallel planar front surface 4901. Each section 4110, 4130 has a greater height/width than their respective thickness formed by the bent plate or welded construction. A planar ledge 4120 extends, in this example horizontally, between first section 4110 and second section 4130. Second section 4130 has an upper edge 4132 that, in this example, extends horizontally. In other examples, edge 4132 can be radiused, angled, or of some other shape that is esthetically pleasing and/or satisfies another purpose. Cover 4100 has two holes 4140 through which fasteners can extend. Although two holes 4140 are shown in this example, it is noted that fewer or more fasteners can be used and, as a result, fewer or more holes 4140 can be provided.

Shelf 4300 has, in this example, a first section 4310 that extends horizontally perpendicular to the exposed flat surface or face of wall 4010, and a second section 4320 that extends vertically parallel to the face of wall 4010 and perpendicular to the first section. Each section 4310, 4320 has a greater height/width than their respective thickness formed by the bent plate or welded construction. First section 4310 has a front edge 4312 that, in this example, extends horizontally and is vertically flat. In other examples, edge 4312 can be radiused, angled, or of some other shape that is esthetically pleasing and/or satisfies another purpose. Two holes 4330 are provided in second section 4320 through which fasteners can extend. Although two holes 4330 are shown in this example, it is noted that fewer or more fasteners can be used and, as a result, fewer or more holes 4330 can be provided. Because the same fasteners are used to fasten shelf 4300 and cover 4100 to wall 4010, holes 4330 correspond in location and number to holes 4140 which become concentrically aligned when the shelf and cover are assembled.

Shelf 4300, force-distributing plates 4410, and cover 4100 can be formed of the same or different suitable metals such as, for example, stainless steel, aluminum, titanium, or other. Non-metallic materials such as plastics or any other suitable material may be used for these components provided, they have sufficient strength and rigidity.

Two force-distributing plates 4410 are shown in FIG. 63. Force-distributing plates 4410 (discussed in more detail below) distribute the force exerted on the face of wall 4010 by the fasteners so that the fasteners are not pulled though wall 4010 or otherwise deform the outer surface of wall 4010. FIG. 63 illustrates how force-distributing plates 4410 can extend beyond (above in this example) the limits of second section 4320 of shelf 4300 (e.g. above horizontal top edge 4322 of second section 4320). This can produce an undesirable visual effect. As can be seen in FIG. 61, cover 4100 hides force-distributing plates 4410 to produce a more visually pleasing result. Cover 4100 also covers a gap between second section 4320 and the outer surface of wall 4010 caused by force-distributing plates 4410 (shown in more detail below).

It will be appreciated that in other possible constructions, force-distributing plates 4410 may have a height which is less than or flush with the top edge 4322 of shelf 4300. This situation would still create an esthetically displeasing appearance and gap between the wall and shelf which could also benefit from the use of cover 4100 to conceal the force-distributing plates and at least partially cover the gap.

Figure 62:
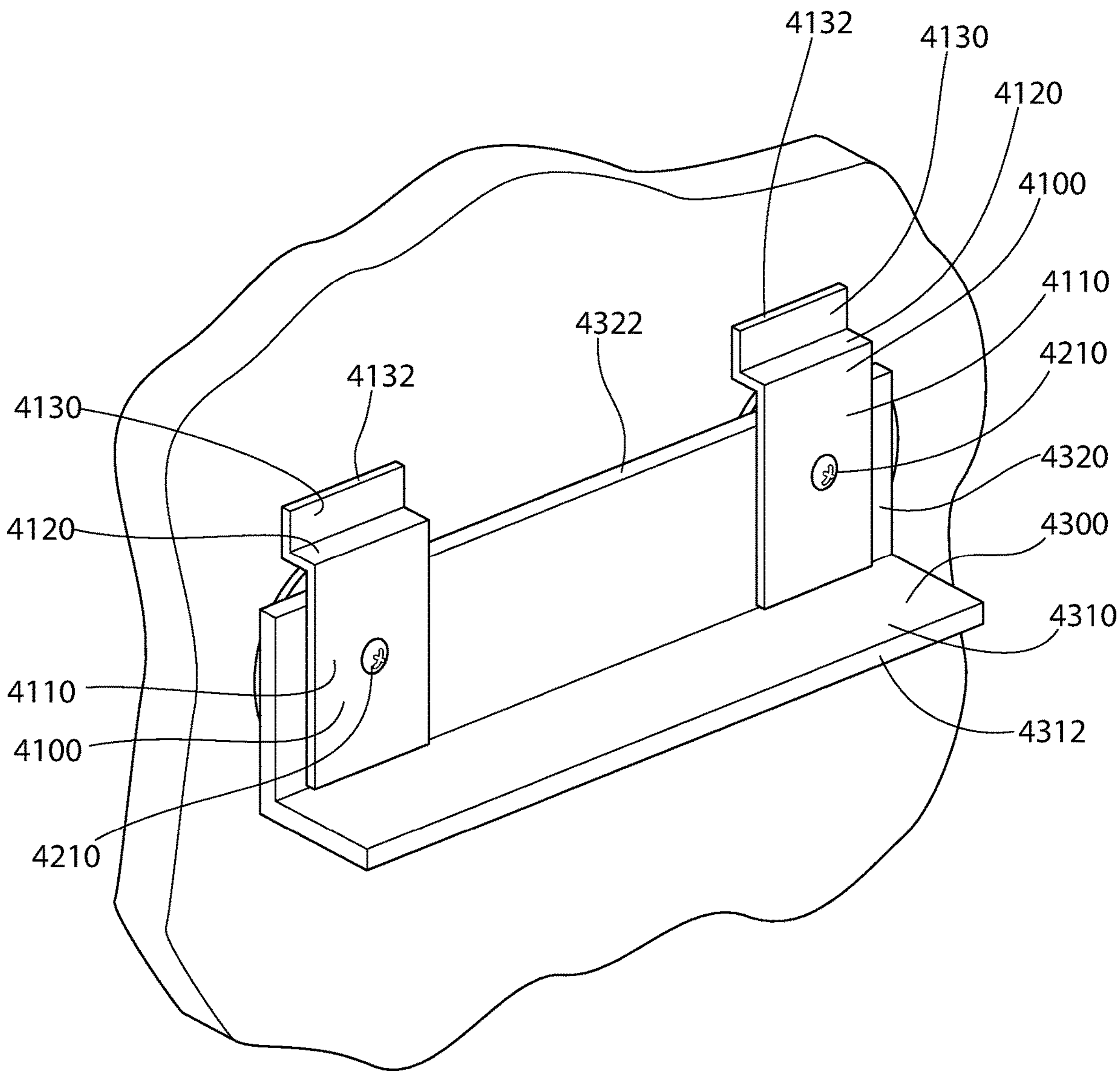
FIG. 62 is an upper perspective view of a mounting system in accordance with exemplary embodiments of the invention.

FIG. 62 shows another embodiment of the invention that is similar to the embodiment shown in FIG. 61, except that two covers 4100 are used instead of one. This embodiment covers force-distributing plates 4410 but gives a different visual appearance than the embodiment shown in FIG. 61 such that portions of the section 4320 of shelf 4300 remain visible, whereas in FIG. 61 the single cover 4100 has a horizontal length coextensive with the shelf and conceals the entirety of the section 4320. This present embodiment of FIG. 62 also exposes part of the gap between second section 4320 of shelf 4300 and the outer surface of wall 4010 and, as a result, allows an accessory (such as, for example, a condiment rack) to be hung over the top horizontal edge 4322 of the shelf.

Force-distributing plates 4410 are generally flat or planar broadened structures in the general form of a washer with a width/height greater than their thickness. Force-distributing plates 4410 and may have any suitable shape. In one embodiment, the plates 4410 may be circular as depicted. Other non-polygonal shapes and polygonal shapes including rectilinear shapes (e.g. square or rectangular) may be used. The invention is thus not restricted by the shape of the force-distributing plates.

Figure 64:
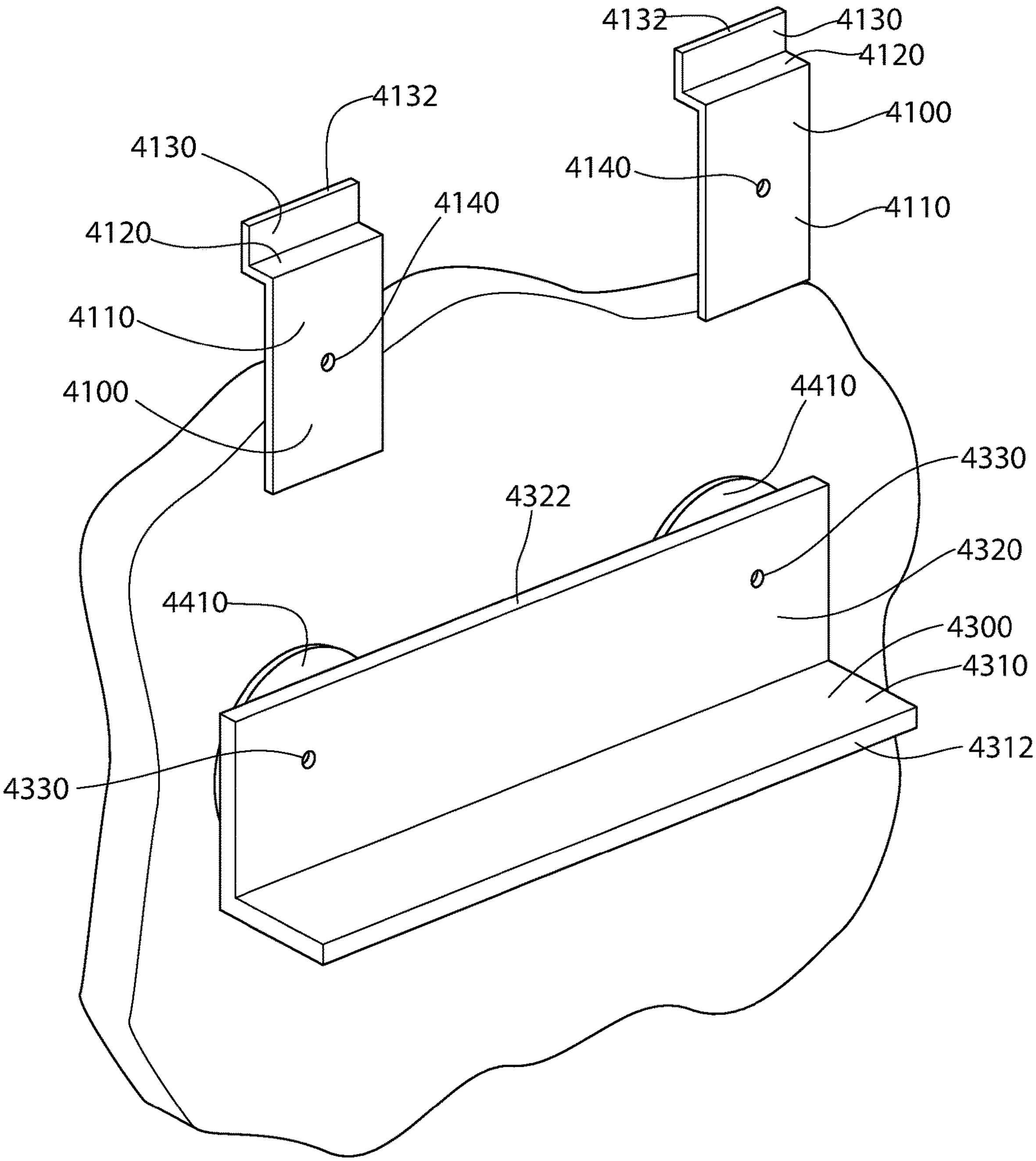
FIG. 64 is an upper perspective view of the mounting system of FIG. 62 in an unassembled state.

FIG. 64 shows the example shown in FIG. 62 in a partially disassembled state. FIG. 64 shows shelf 4300 and force-distributing plates 4410 in position on wall 4010, but with covers 4100 removed. If this system were to be installed without covers 4100, force-distributing plates 410 would be visible, which can be esthetically undesirable. Covers 4100 provide an esthetically pleasing solution by covering force-distributing plates 4410, while leaving a portion of edge 4322 of shelf 4300 exposed.

Figure 65:
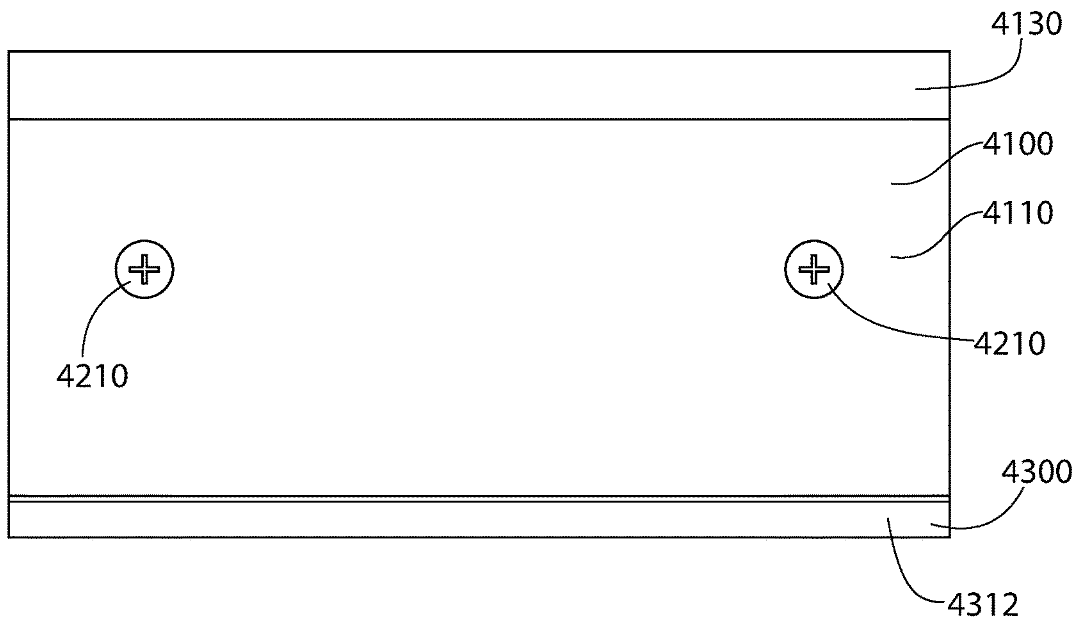
FIG. 65 is a front view of the mounting system of FIG. 61.

FIG. 65 is a front view of the embodiment shown in FIG. 61. In this example, fastener heads 4210 are shown as Phillip's head bolts. However, any suitable head or engagement portion can be used, such as, for example, an external hex head, an internal hex head, or a slotted head. However, in some embodiments, a smooth, rounded fastener head is desirable in order to removably engage a slot in an accessory that is used with the system (discussed below).

Figure 66:
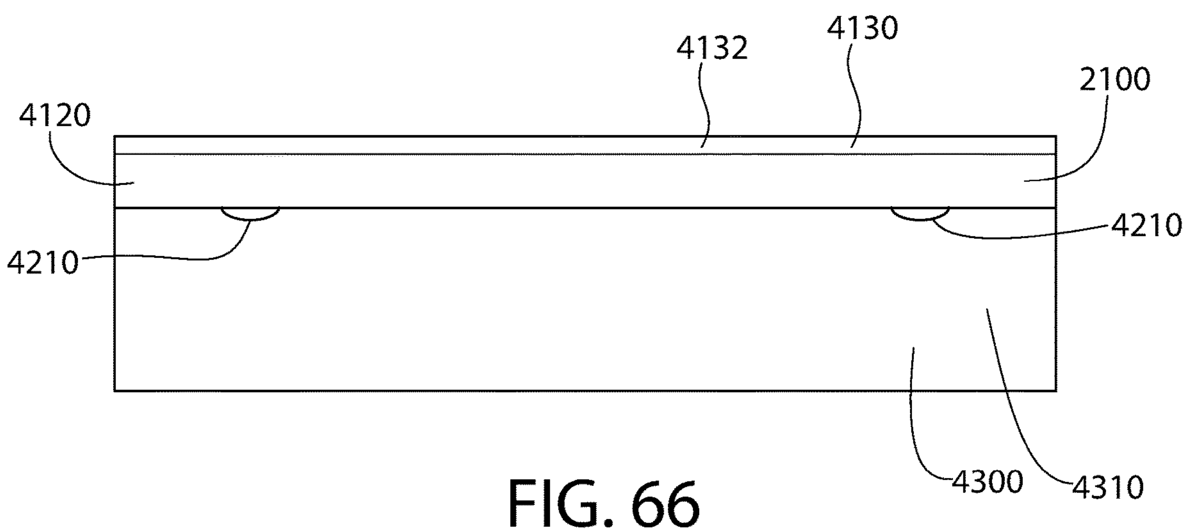
FIG. 66 is top view of the mounting system of FIG. 61.

FIG. 66 is a top view of the embodiment shown in FIG. 61. In this example fastener heads 4210 are rounded in order to removably engage a slot in an accessory that is used with the system (discussed below).

Figure 67:
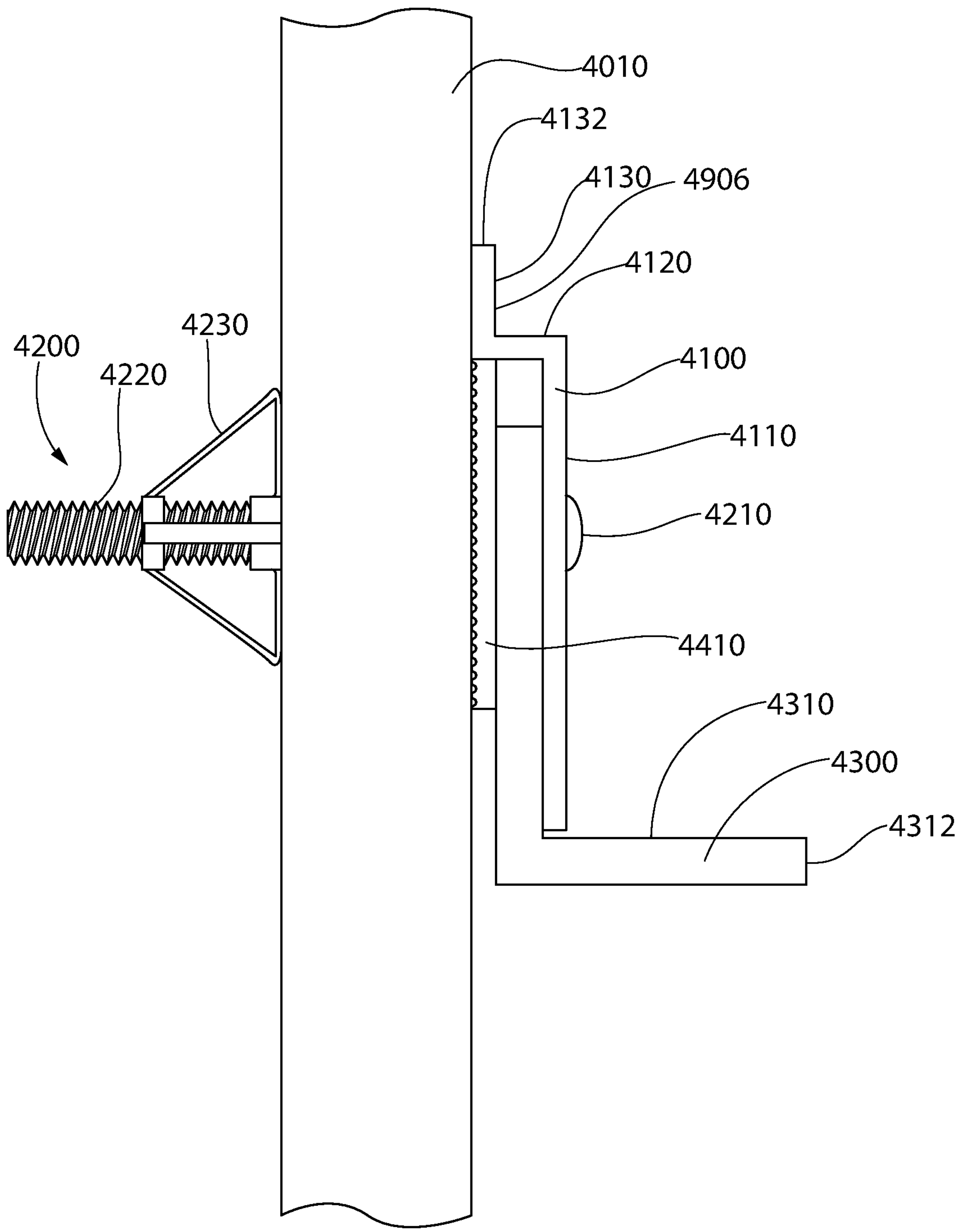
FIG. 67 is a side view of the mounting system of FIG. 61 in an installed state.
Figure 68:
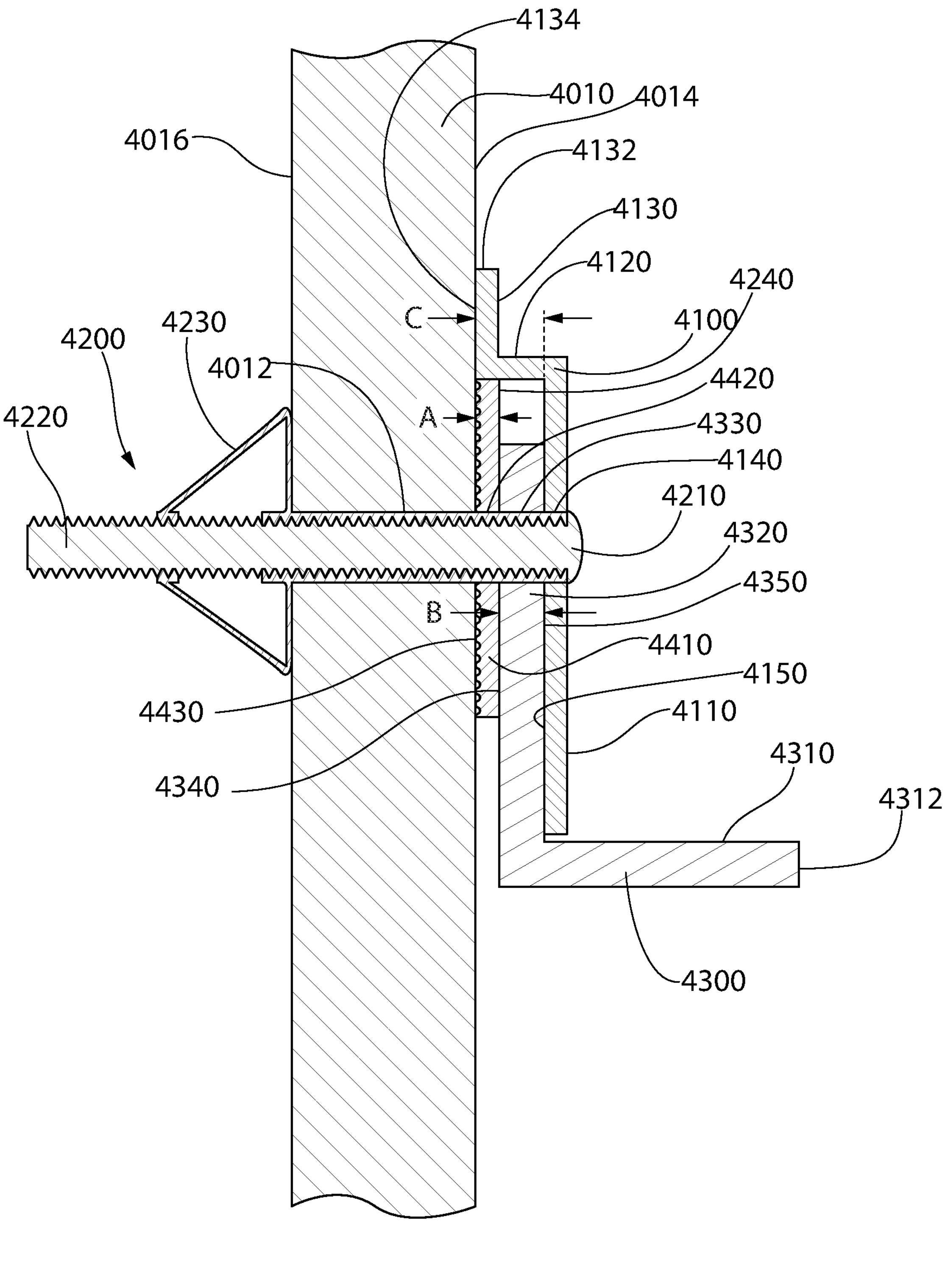
FIG. 68 is a side sectional view of the mounting system of FIG. 61 in an installed state.

In FIGS. 67 and 68 the example of FIG. 61 is shown mounted to wall 4010. A method for fastening the item (e.g. shelf 4300 or other) to the wall will now be briefly summarized. It bears noting the method and these figures also apply to the example shown in FIG. 62 using two force-distributing plates 4410. In these figures, fastener 4200 has a head 4210, a threaded shaft 4220 and an expansion element or part 4230 (e.g. expansion anchor) for use with a hollow wall that generally comprises two or more deformable triangular shaped arms in one embodiment as shown. Such expansion parts 44230 or anchors are coupled to the shaft of fastener 200, and are well known in the art and commercially available. Other types of expansion anchors/parts may be used and does not limit the invention.

Starting with expansion part 4230 in an unexpanded state, threaded shaft 4220 and expansion part 4230 of fastener 4200 are inserted (in order) through hole 4140 in cover 4100, hole 4330 in shelf 4300, a hole 4420 in force-distributing plate 4410, and a pre-drilled hole 4012 in hollow wall 4010; the holes being all concentrically aligned with each other. If the holes in the cover, shelf, and force-distributing plate are not large enough in diameter to pass the expansion part 4230 therethrough, the threaded shaft 4220 of fastener 4200 may alone be passed through those three holes and the expansion part may be then threaded or inserted over the shaft before inserting the shaft and expansion part through the hole 4010 pre-drilled in the hollow wall 4010. Either assembly scenario is acceptable.

The diametrically enlarged head 4210 of fastener 4200 prevents fastener 4200 from passing all the way through first section 4110 of cover 4100. Head 4210 is engaged by a turning tool (e.g. manual screwdriver or electric drill/driver) and turned to rotate threaded shaft 4220, which causes expansion part 4230 to expand outward and press against an inner face 4016 of wall 4010 as the fastener is tightened and the shaft advances through the wall. This secures the shelf 4300 assembly to the wall in rigid manner.

As can be seen from FIGS. 67 and 68, a planar rear surface or face 4430 of force-distributing plate 4410 is pressed against and abuttingly engages the planar outer surface or face 4014 of wall 4010 when the assembly is fastened to wall 4010. A planar surface or rear face 4340 of second section 4320 of shelf 4300 is pressed against a planar front surface or face 4440 of force-distributing plate 4410 in this assembled state. Also, a planar rear surface or face 4150 of first section 4110 of cover 4100 is pressed against a planar front surface or face 4350 of second section 4320 of shelf 4300 while a planar rear surface or face 4134 of second section 4130 of cover 4100 is pressed against planar outer surface or face 4014 of wall 4010. The front surface or face 4906 is exposed. As can be seen from FIGS. 67 and 68, in this example, the sum of a thicknesses A of force-distributing plate 4410 and a thickness B of second portion 4320 of shelf 4300 equals a length C of ledge 4120 so that rear face 4134 of second section 4130 of cover 4100 and rear face 4430 of force-distributing plate 4410 are co-planar. This configuration results in the compressive fastening force being exerted on the outer surface of wall 4010 via tightening fastener 4200 by both the second section 4130 and force-distributing plate 4410, and that force being substantially equal. The force-distributing plate 4410 and cover both advantageously distribute the force over a collectively larger surface area of the wall to prevent damaging the wall yet provide a secure mount.

In other embodiments, the dimensions of one or more parts can be altered so that rear face 4134 of second section 4130 and rear face 4430 of force-distributing plate 4410 are not co-planar. For example, it may be desirable for the sum of thicknesses A and B be slightly more than length C so that rear face 4134 of second portion 4130 barely rests against outer face 4014 of wall 4010 while rear face 4430 of force-distributing plate 4410 slightly depresses outer face 4014 of wall 4010. This can be desirable when the system is mounted to a particularly delicate wall surface so that no depression of the wall surface is visible when the system is in the installed state. In another example, it may be desirable for the sum of thicknesses A and B be slightly less than length C so that rear face 4134 of second portion 4130 depresses outer face 4014 of wall 4010 more than rear face 4430 of force-distributing plate 4410 depresses outer face 4014 of wall 4010. This can be desirable when it is particularly important that nothing can fall between upper ledge 4132 and wall 4010.

Figure 69:
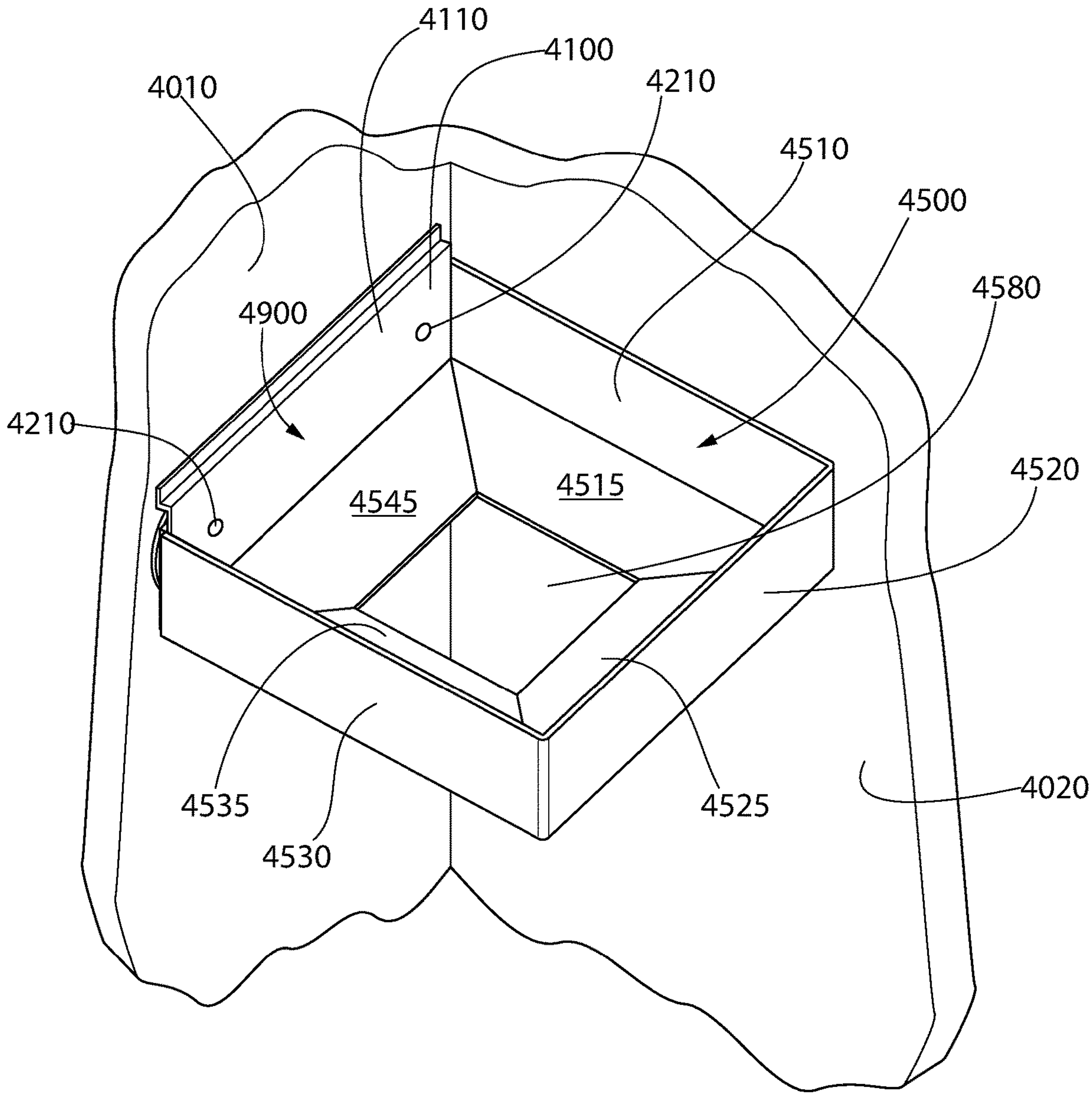
FIG. 69 is an upper perspective view of a mounting system with a perimeter frame support structure for supporting an accessory in accordance with exemplary embodiments of the invention.
Figure 70:
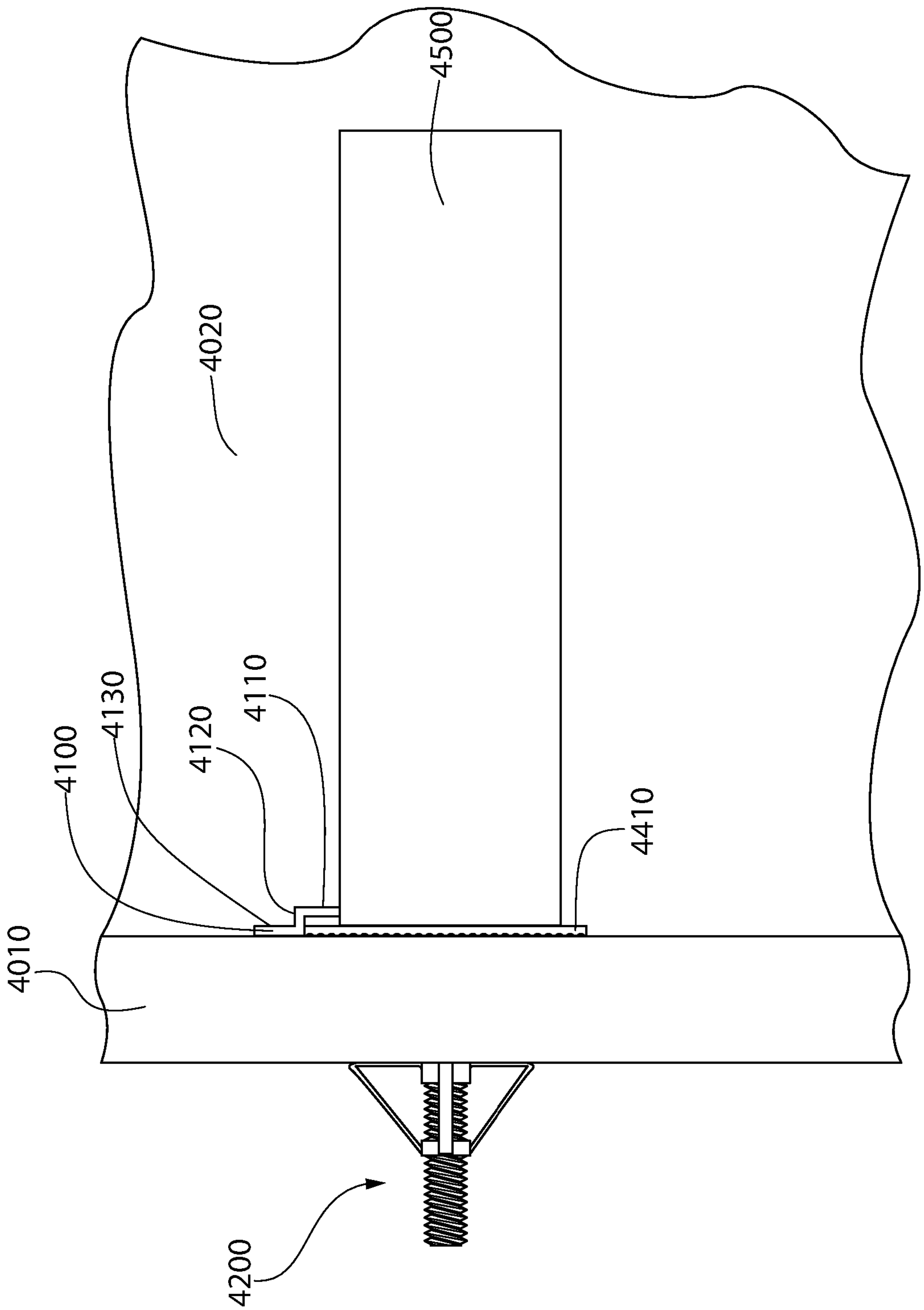
FIG. 70 is a side view of the mounting system and support of FIG. 69 in an installed state.
Figure 71:
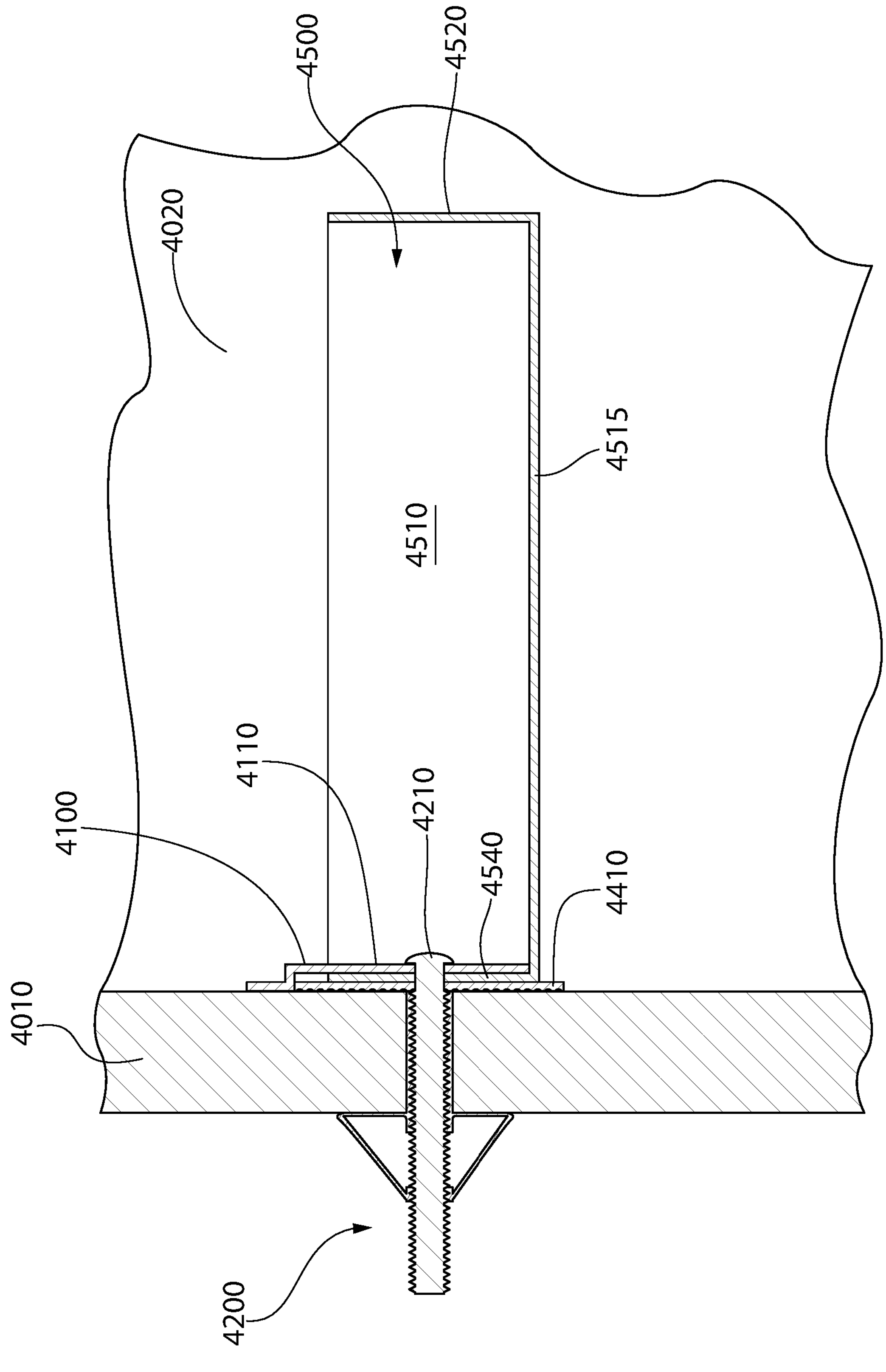
FIG. 71 is a side sectional view of the mounting system and support of FIG. 69 in an installed state.

FIGS. 69-71 show an embodiment of a fastening or mounting system comprising an accessory support structure 4500 in the form of a perimeter frame with optionally open, partially open, or fully closed bottoms which can be fastened to wall 4010. The perimeter frame support structure 44500 may be mounted directly to the wall 4010 with fasteners 4200, or alternatively may utilize the wall mounting system assembly previously described herein with respect to FIGS. 61-68 including the force-distributing plate 4410 and cover 4100 to fasten the support structure 4500 to wall 4010 in a cantilevered manner. Support structure 4500 may be used to support various interchangeable items or accessories such as, for example, shelves, soap dispensers, racks, light fixtures, or any other accessory in a cantilevered manner.

It bears noting that although the perimeter frame support structure 500 is shown as having a generally square shape in FIGS. 69-71, in other embodiments the perimeter frame may be elongated having a rectangular shape with two long front/rear sides and shorter lateral left/right sides. The support structure 4500 may have any length and projection from the wall depending on the particular intended use of the support structure.

Perimeter 4300, force-distributing plates 4410, and cover 4100 can be formed of the same or different suitable metals such as, for example, stainless steel, aluminum, titanium, or other. Non-metallic materials such as plastics or any other suitable material may be used for these components provided, they have sufficient strength and rigidity.

In this example, support structure 4500 has a rectilinear frame-like structure generally formed by four intersecting vertically-oriented side elements or members 4510, 4520, 4530, 4540 (also referred to herein as "sides" for brevity). Side 4510 includes a horizontal portion 4515 extending from side 4510 toward a central opening 4580 of support structure 4500. Side 4520 includes a horizontal portion 4525 extending from side 4520 toward opening 4580. Side 4530 includes a horizontal portion 4535 extending from side 4530 toward opening 4580. Side 4540 includes a horizontal portion 4545 extending from side 4540 toward opening 4580. The horizontal portions thus define the opening 4580. The vertical portions of sides 4510-4540 may be arranged to create the rectilinear perimeter frame configuration forming perpendicular corners between each pair of the intersecting and adjacent sides. In this example, the foregoing horizontal portions are intersecting such that the diagonal edges of the horizontal portions contact the diagonal edges of the adjacent horizontal portions to create continuous shelf around opening 4580. The diagonal edges may be welded together in one embodiment. In other examples, the diagonal edges of the horizontal portions do not contact the diagonal edges of the adjacent horizontal portions. In yet other examples, the horizontal portions converge in the central area of support 4500 such that no opening 4580 exists.

In this example shown in FIGS. 69-72, side 4510 of the perimeter frame contacts wall 4020 but is not fastened to wall 4020 which meets wall 4010 at a corner. This represents a corner mounting situation of the support structure 4500. In other examples, side 4520 may be fastened to wall 4020 in the same manner that side 4540 is fastened to wall 4010 using force-distributing plates 4410 and covers 4100. This provides two sides and places of support for the perimeter frame to hold the weight of heavy objects supported by the frame. In other examples, the perimeter frame may be attached to a section of wall 4010 or 4020 not adjacent a corner such that side 4510 does not contact wall 4020. In this situation, the perimeter frame is supported in an entirely cantilevered manner.

FIG. 71 shows in sectional view that support structure 4500 is fastened to wall 4010 in the same manner that shelf 4300 is fastened to wall 4010 in FIG. 68.

Figure 72:
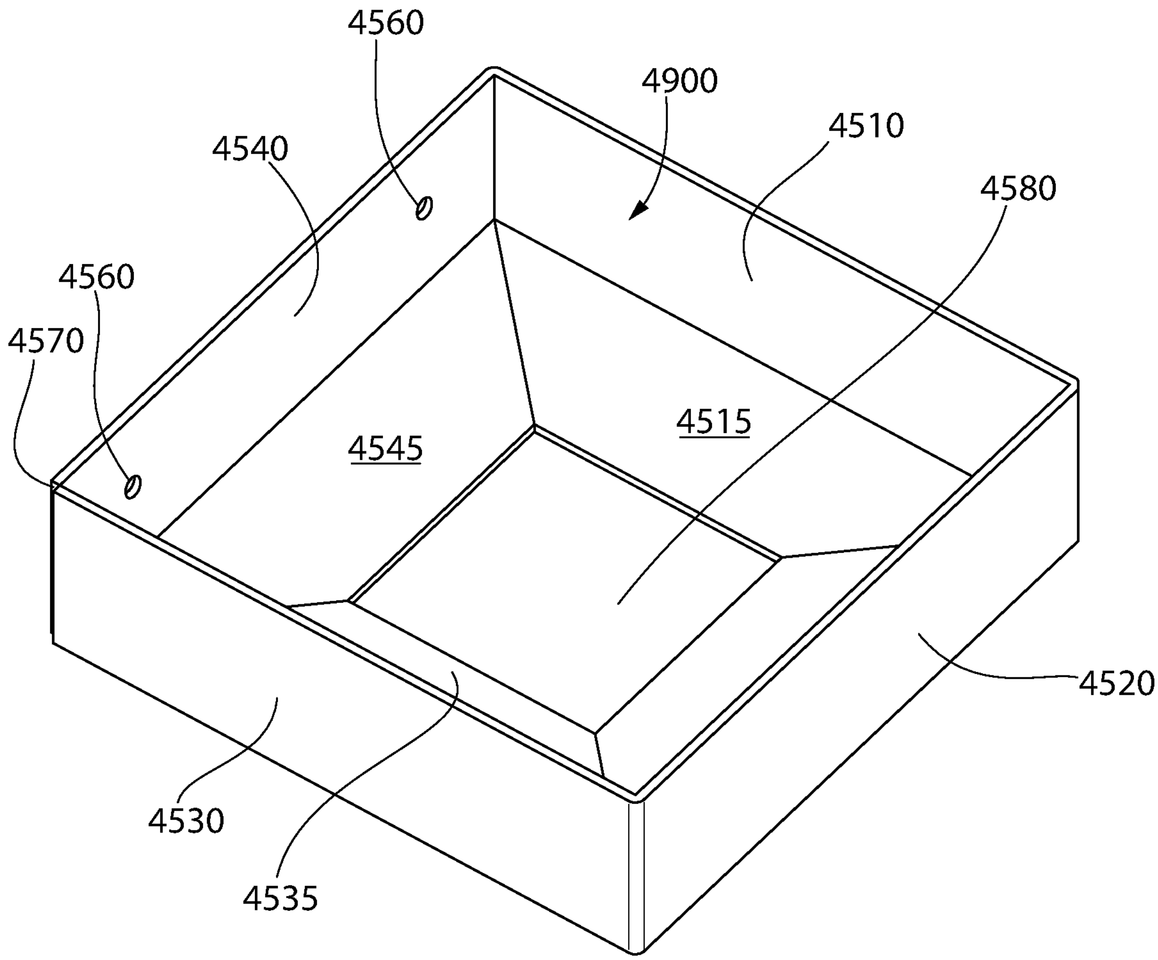
FIG. 72 is an upper perspective view of the support of FIG. 69.

FIG. 72 shows support structure 4500 as having two holes 4560 in side 4540. Holes 4560 serve the same purpose as holes 4330 of shelf 4300. Due to the fabrication method used in this example, a continuous corner exists between sides 4540 and 4510, between sides 4510 and 4520, and between sides 4520 and 4530. In contrast, a joint 4570 exists between sides 4530 and 4540 (explained further below).

Figure 73:
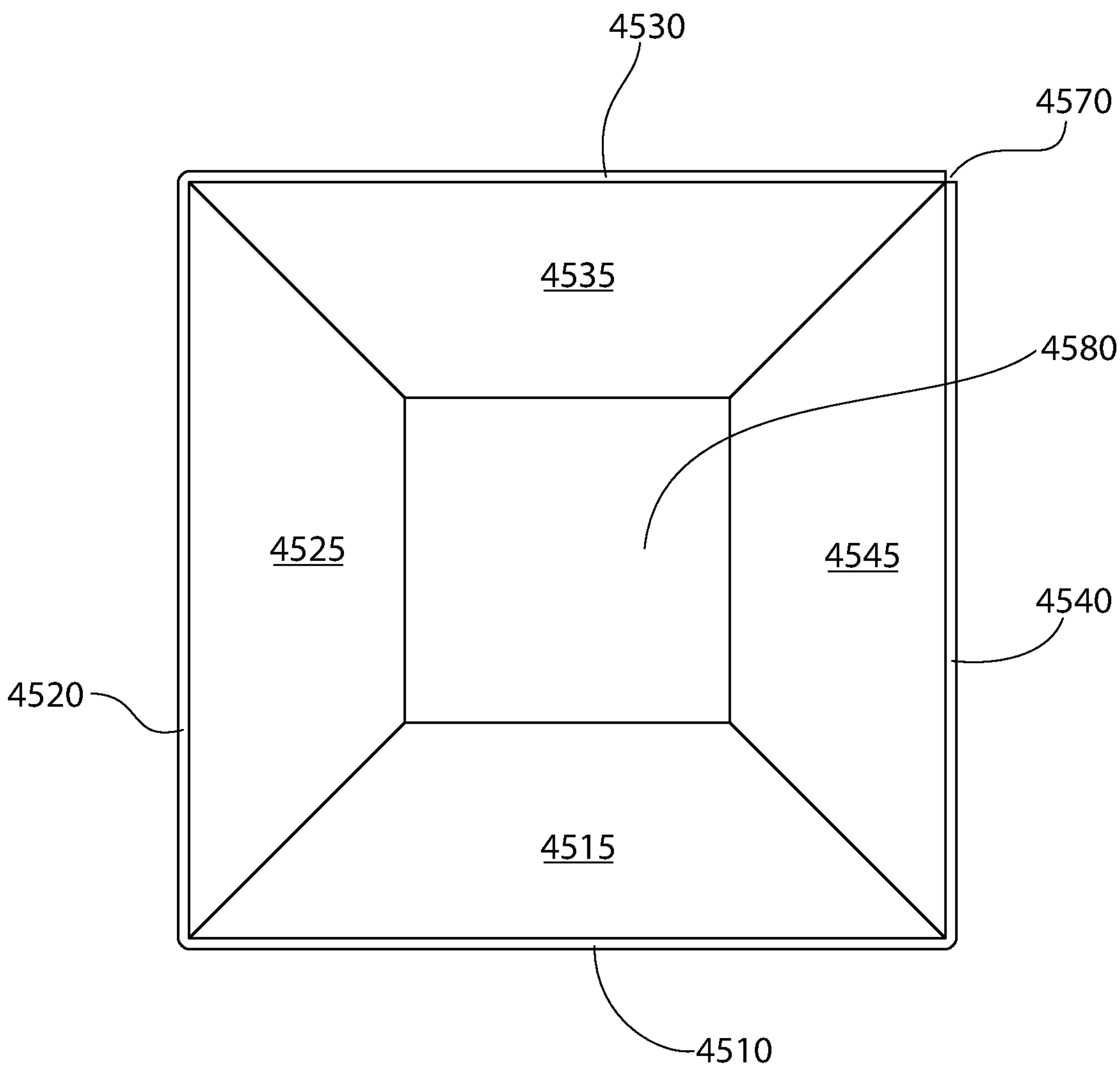
FIG. 73 is a top view of the support of FIG. 69.

FIG. 73 is a top view of support structure 4500 and shows opening 4580 and joint 4570.

Figure 74:
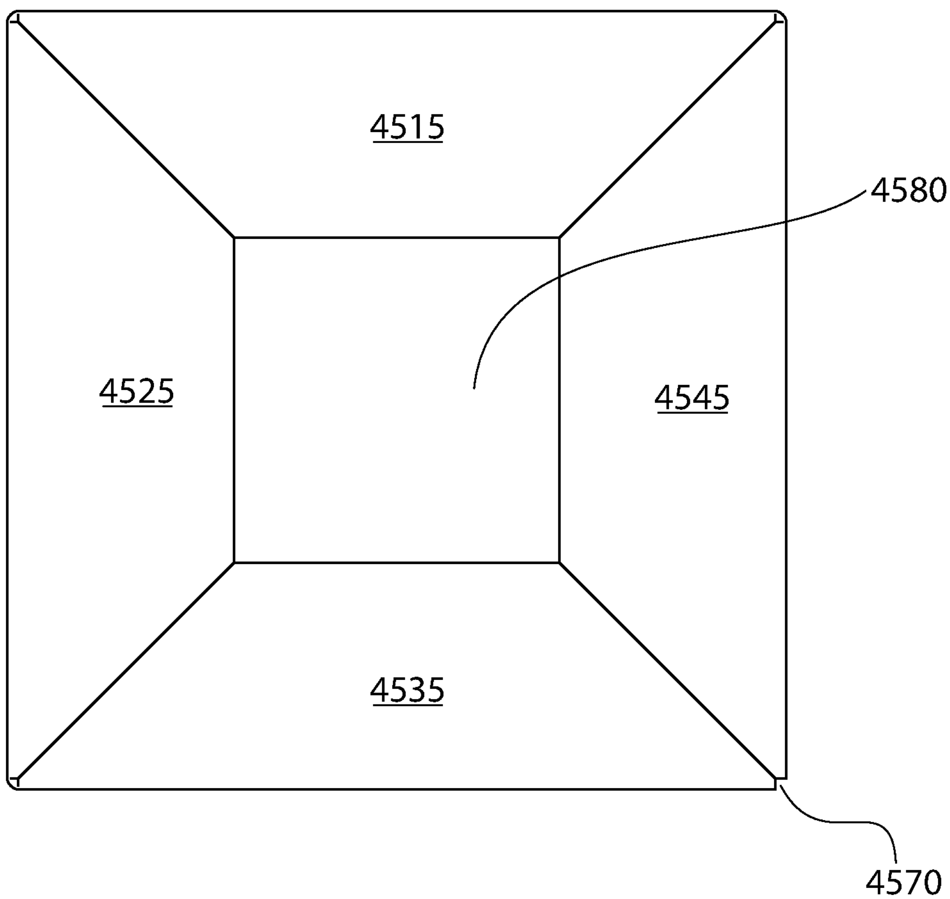
FIG. 74 is a bottom view of the support of FIG. 69.

FIG. 74 is a bottom view of support structure 4500 and shows opening 4580 and joint 4570.

Figure 75:
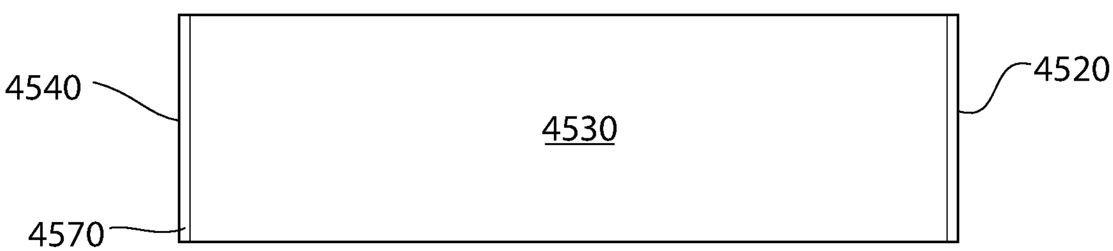
FIG. 75 is a side view of the support of FIG. 69.

FIG. 75 is a side view of support structure 4500 and also shows joint 4570.

Figure 76:
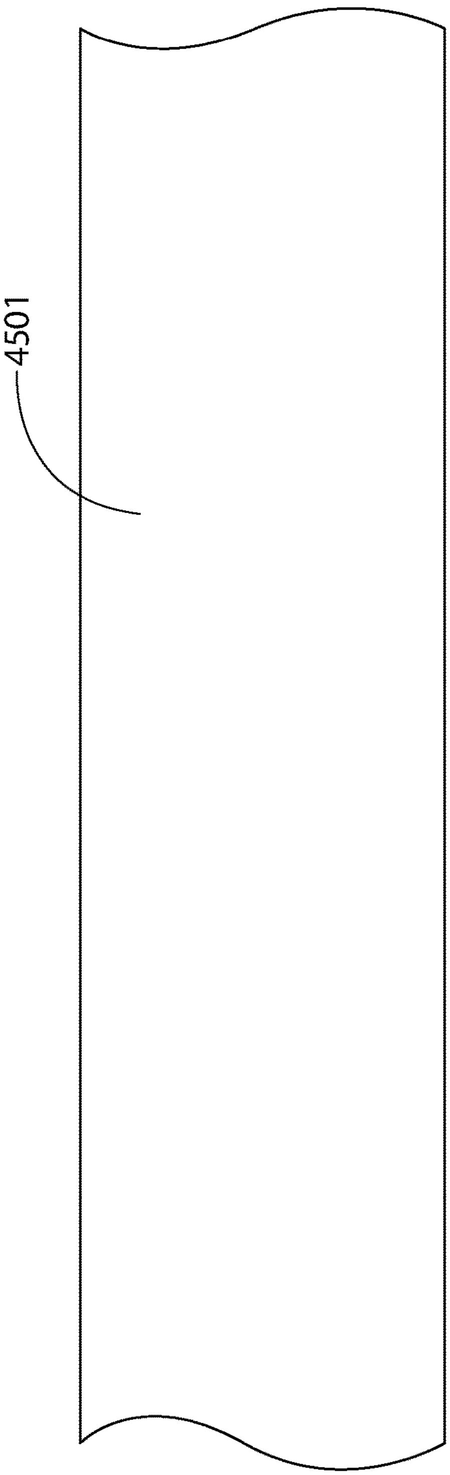
FIG. 76 is a production or workpiece blank used to fabricate the support of FIG. 69 prior to cutting.
Figure 77:
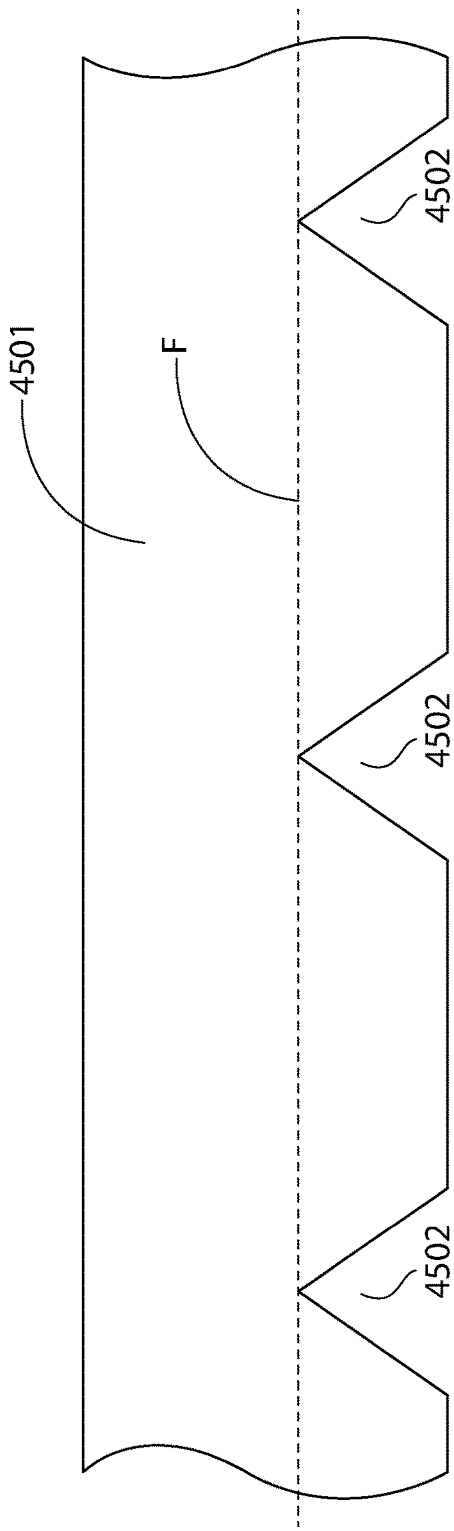
FIG. 77 is the production blank of FIG. 16 after being cut to shape to be used to fabricate the support of FIG. 69.

FIGS. 76 and 77 will be used to illustrate one fabrication method of support structure 4500. In this method, a workpiece blank 4501 can be a suitable metal such as, for example, stainless steel, aluminum, titanium, or other. Nonmetallic materials such as plastics or any other suitable material may be used provided, they have sufficient strength and rigidity. Blank 4501 has sections cut out of it to form notches 4502. The flaps resulting from the notches are folded, in this example, at a 90 degree angle along fold line F to form horizontal portions 4515, 4525, 4535, 4545. Ninety degree bends are then made along lines that are perpendicular to fold line F extending from the apex of each notch 4502. These bends form the corners of support structure 4500. The free ends of the resulting structure form joint 4570. The edges along notches 4502 (which now contact each other) can be welded together, joined in some other fashion, or simply left unjoined. Similarly, the free ends that come together as joint 4570 can be welded together, joined in some other fashion, or simply left unjoined. In the case of unjoined edges or ends, the material from which support structure 4500 is made can be sufficiently strong to not require joining.

Figure 78:
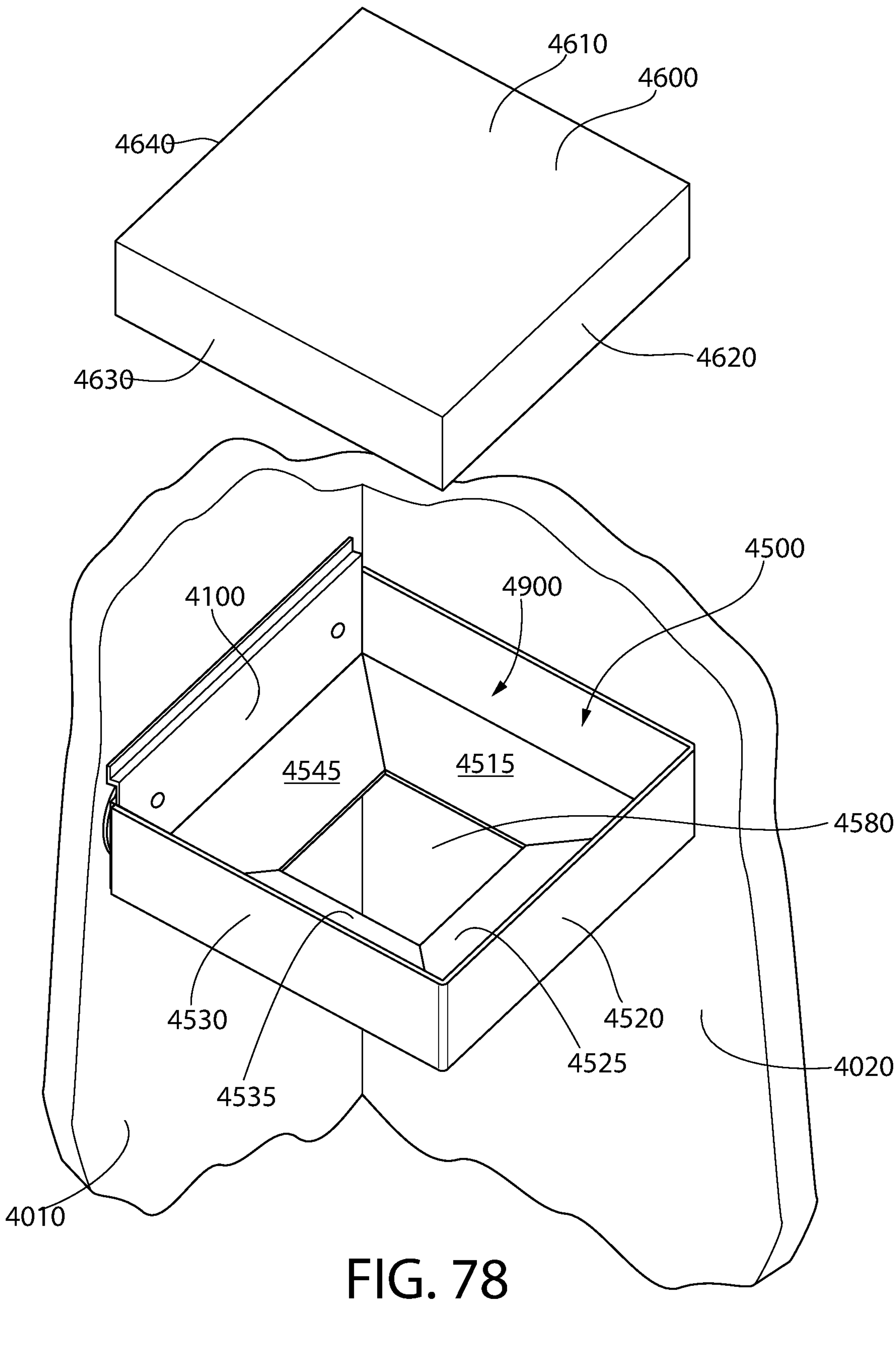
FIG. 78 is an exploded upper perspective view of a shelf unit and the mounting system and support of FIG. 69.
Figure 79:
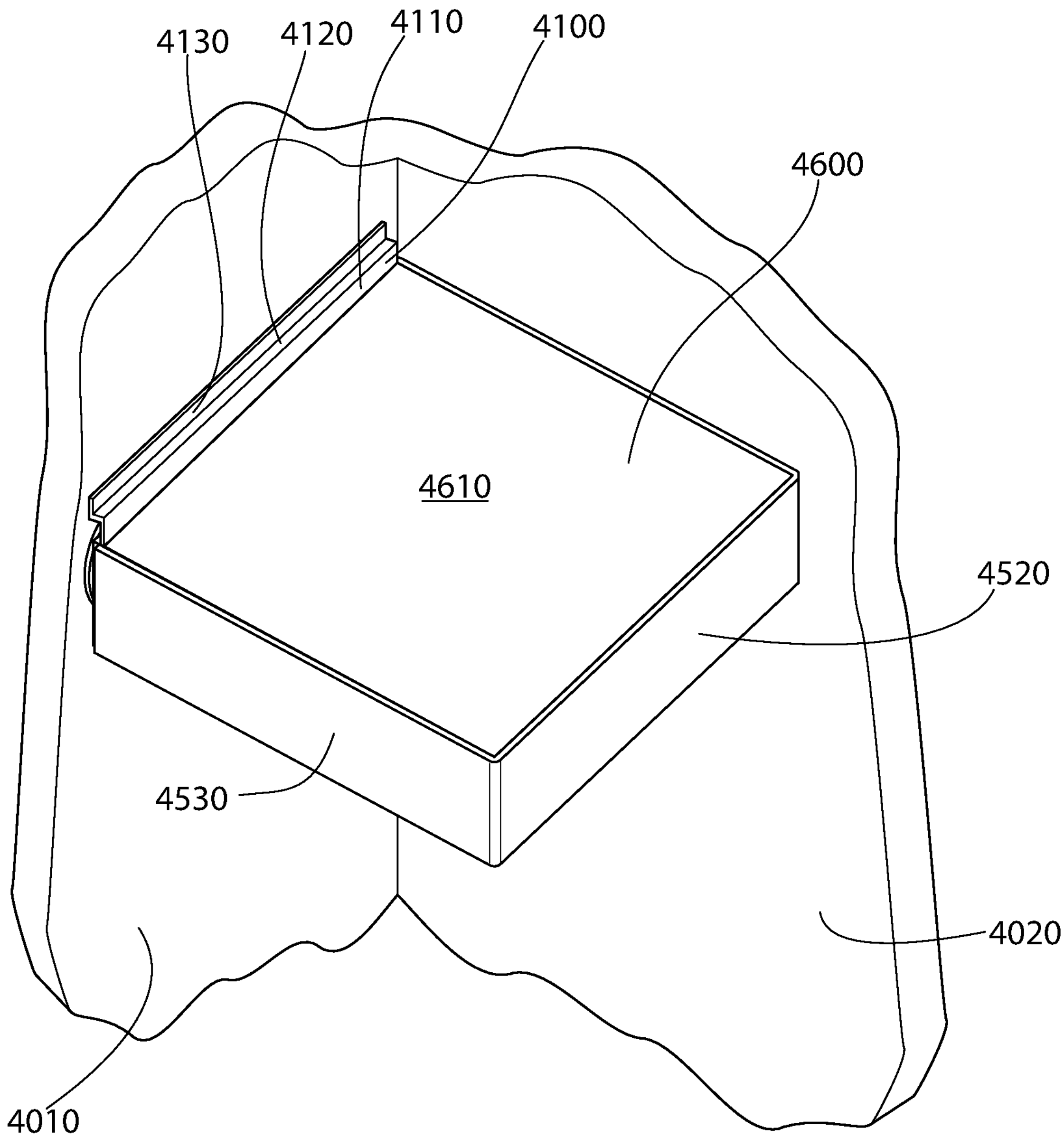
FIG. 79 is an upper perspective view of the shelf unit, mounting system, and support of FIG. 78 in an assembled state.

FIG. 78 shows a shelf insert 4600 above support structure 4500. FIG. 79 shows shelf insert 4600 in an installed position in support structure 4500. The perimeter frame support structure 4500 defines an upwardly open receptacle 4900 configured to receive at least a portion, or in some examples the entirety of shelf insert 4600 therein (see also FIG. 69). Shelf insert 4600 has a top surface 4610, plurality of sides including opposing lateral right/left sides 4620, and opposing front side 4630 and rear side 4640. In this example, shelf insert 4600 slides into support structure 4500 with a slight interference fit between its sides and sides 4510, 4520, 4530, 4540 until top surface 4610 is substantially flush with the upper edges of sides 4510, 4520, 4530, 4540. In other embodiments, top surface 4610 is above or below the upper edges of sides 4510, 4520, 4530, 4540.

Figure 80:
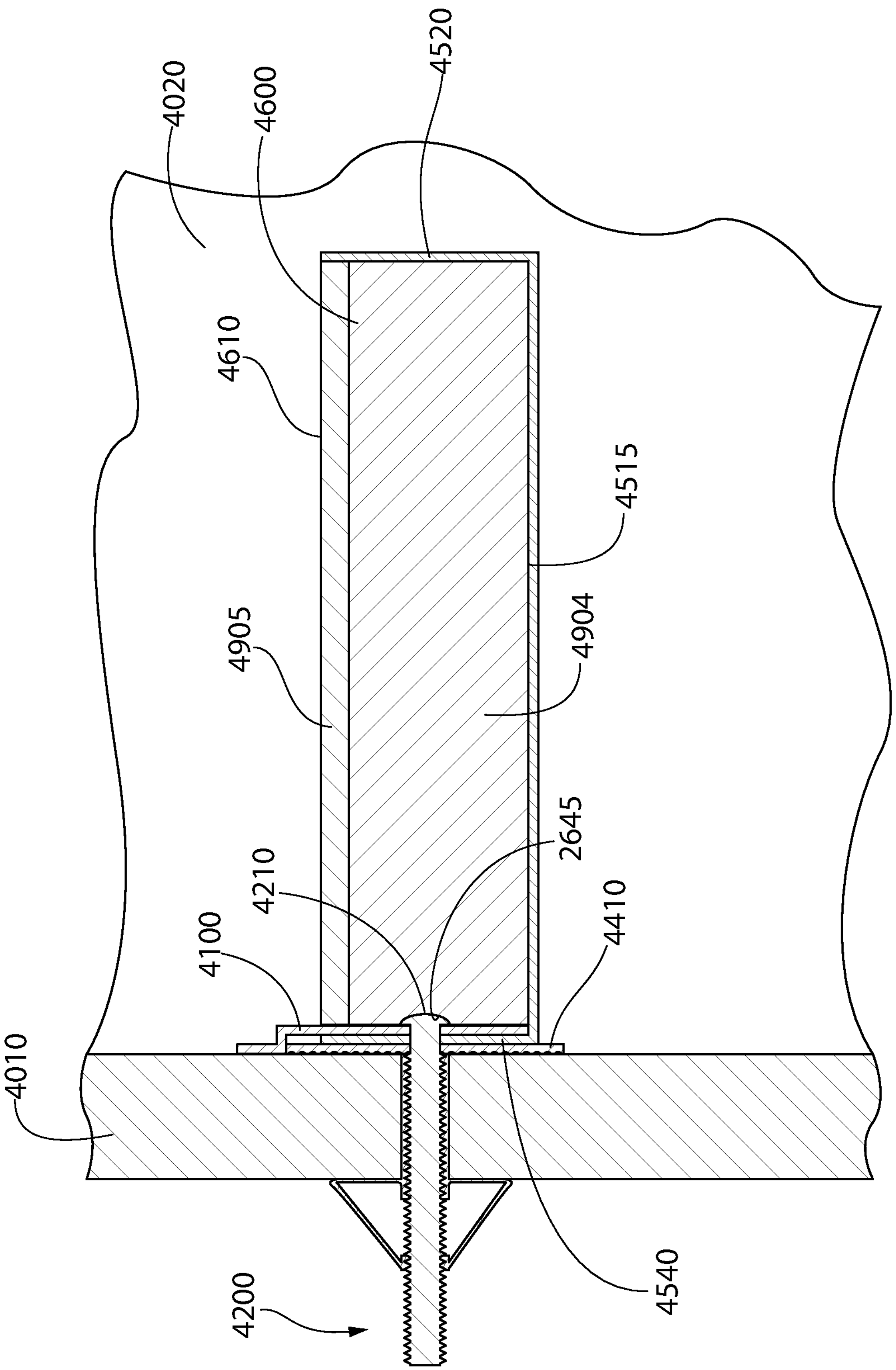
FIG. 80 is a side sectional view of the shelf unit and mounting system and support of FIG. 79.

FIG. 80 shows a side sectional view of shelf insert 4600 in the installed position in support structure 4500. In this example, shelf insert 4600 has a groove 4645 that runs horizontally along the side that contacts side 4540 of support structure 4500. Groove 4645 is configured to accept heads 4210 of fasteners 4200 and can provide a locking feature that is not permanent. Shelf insert 4600 is, in this example, pressed into support structure 4500 until heads 4210 engage groove 4645, locking shelf insert 4600 into place. Shelf insert 4600 can then be removed by pushing it upward to disengage heads 4210 from groove 4645. Access to the bottom of shelf insert 4600 is available through opening 4580 (see FIG. 82). In other examples, individual indentations are provided for each head 4210 instead of a single groove 4645 that receives all heads 4210.

Shelf insert 4600 may be made of any suitable material, including for example without limitation wood, marble, plastics, synthetic materials, glass, or others. In some embodiments, shelf insert may have a composite construction formed of two or more materials laminated or adhesively glued together as shown in FIG. 80. The shelf insert depicted includes a veneered decorative top portion layer 4905 of suitable thickness and a bottom core portion or layer 4904 which formed of a different material than the veneer layer. Top layer 4905 is substantially thinner in thickness than the core layer 4904 which supported the decorative layer. Advantageously, this construction allows a less expensive but strong core layer 4904 to be used for supporting objects placed on the shelf insert 4600 which may not be so aesthetically pleasing (e.g. plywood, MDF, particle board, etc.), whereas the decorative top layer 4905, which is exposed and visible to room occupants, can be esthetically pleasing (e.g. hardwood veneers, stone or marble veneers, synthetic veneers with decorative patterns, etc.). This construction is possible in the present embodiment because the core layer 4904 is fully inserted inside the perimeter frame support structure 4500 and not visible to the occupants. The cost of the shelf insert 4600 using the foregoing composite construction can be significantly reduced.

As shown in FIG. 80, the top surface 4610 defined by veneered decorative top layer 4905 may be substantially flush with the top edges of the perimeter frame (i.e. side members 4510-4540). Only the top surface 4610 is thus visible after assembling the shelf insert 4600 into the perimeter frame. In other variations, an upper side portion of the top layer 4905 may extend above the top edges of the perimeter frame such that the top surface 4610 is raised above the top edges of the perimeter frame.

Figure 81:
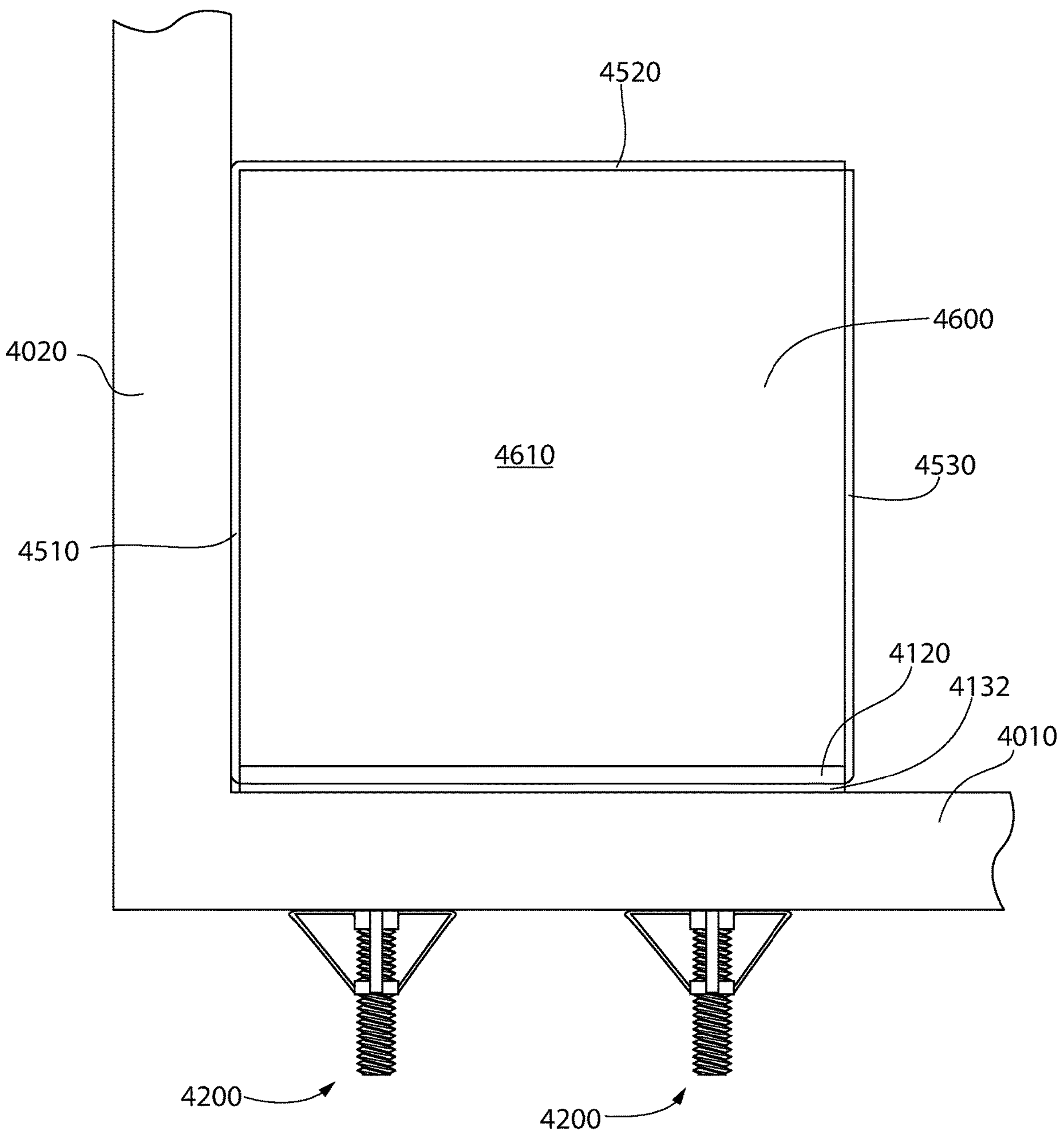
FIG. 81 is a top view of a shelf unit and the mounting system and support of FIG. 69 in an assembled state.
Figure 82:
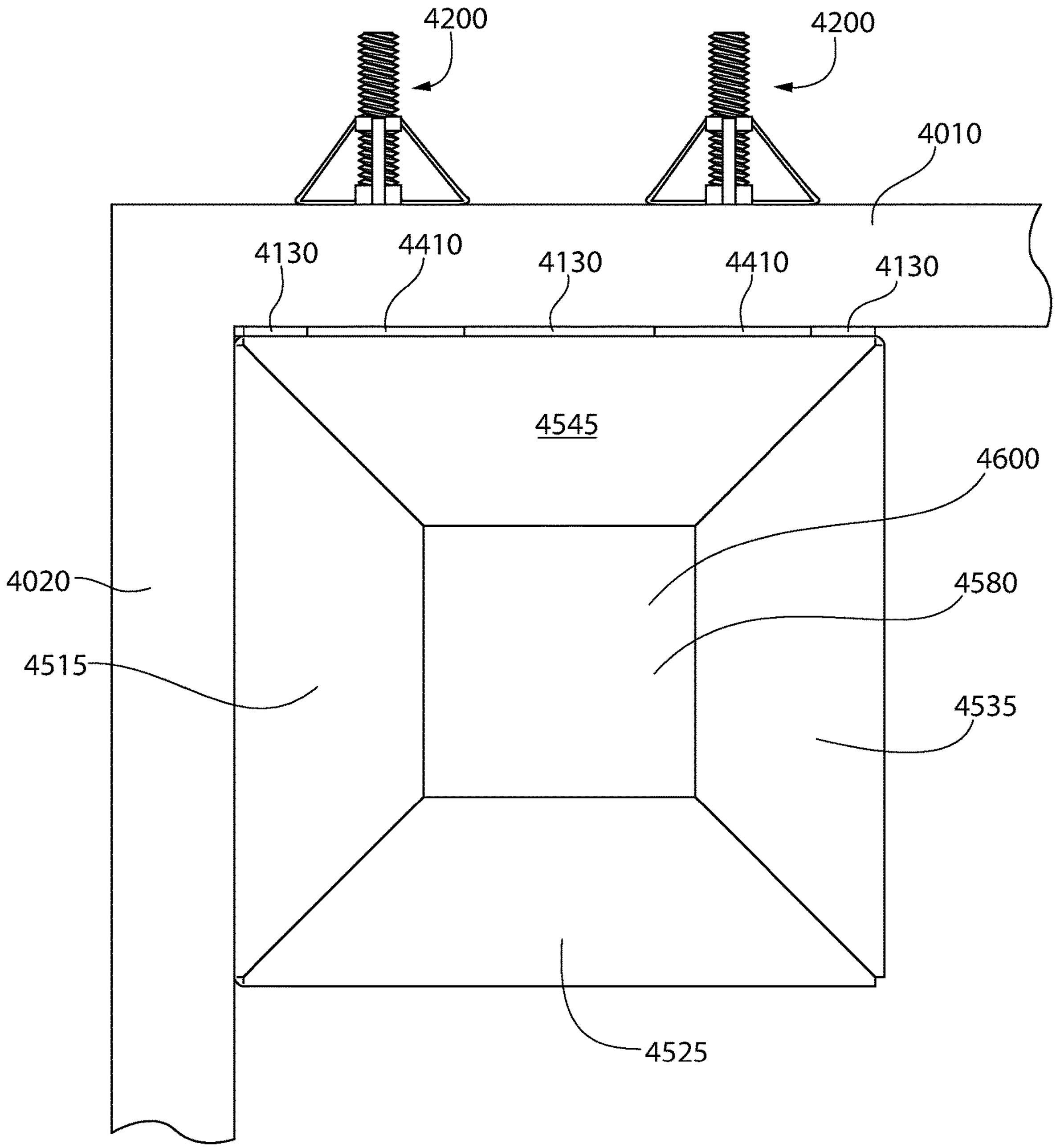
FIG. 82 is a bottom view of a shelf unit and the mounting system and support of FIG. 69 in an assembled state.
Figure 83:
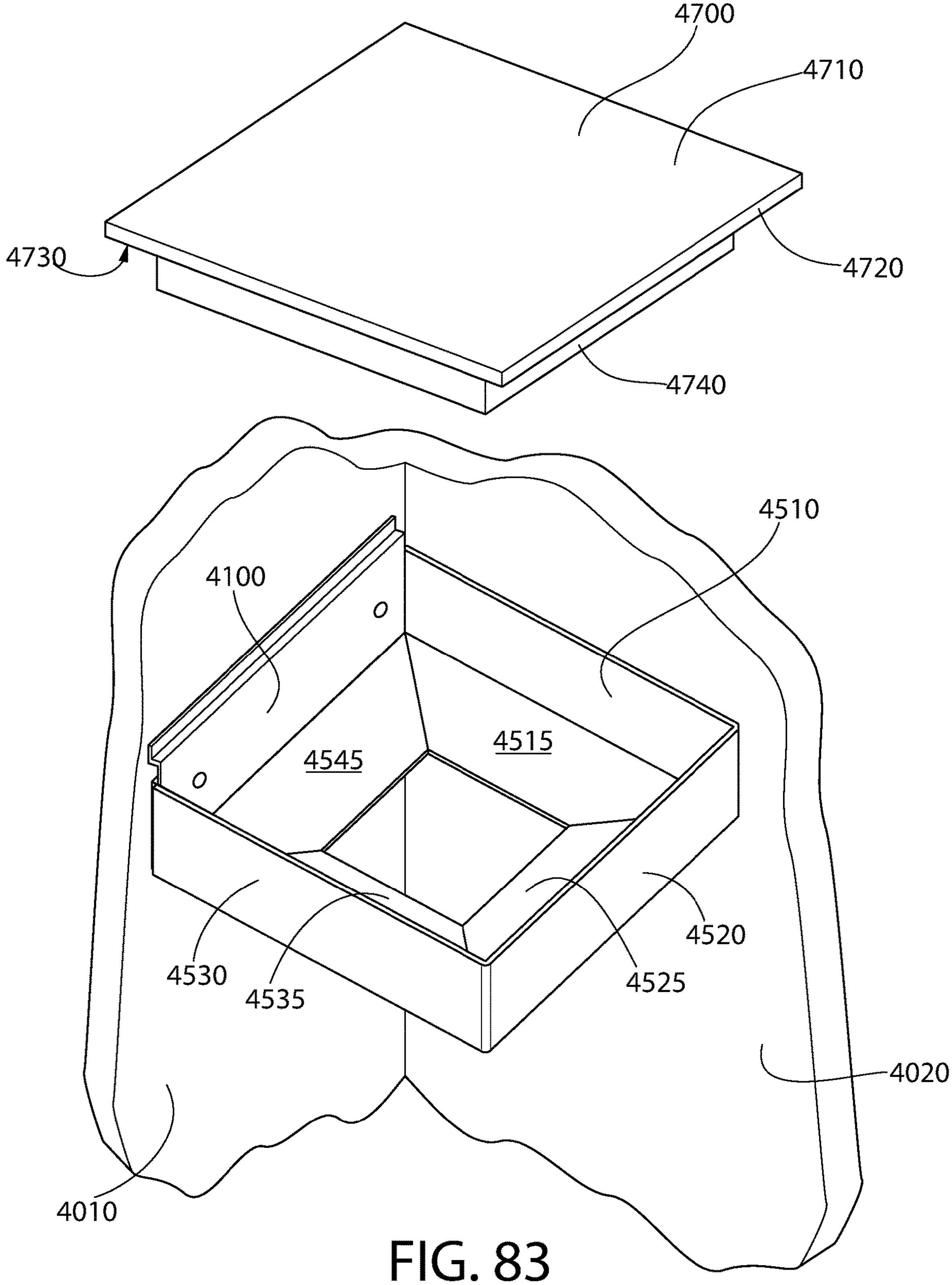
FIG. 83 is an exploded upper perspective view of a second embodiment of a shelf unit and the mounting system and support of FIG. 69.

FIG. 81 is a top view of shelf insert 4600 in the installed position. FIG. 82 is a bottom view of shelf insert 4600 in the installed position. The bottom of shelf insert 4600 can be seen through opening 4580 in FIG. 82.

FIGS. 83-87 show another example of a shelf insert 4700 that can be used with support structure 4500. Insert 4700 comprises an upper portion 4709 defining an exposed top surface 4710 of the shelf and a lower insert portion 4740 configured for insertion into open receptacle 4900 of the perimeter frame support structure 4500. Upper portion 4709 has greater lateral dimensions (e.g. width and depth) measured across top surface 4710 than the lower insertion portion 4740. In this example, shelf insert 4700 has a top surface 4710 that extends beyond the perimeter frame and the downwardly projecting insert portion 4740 forming cantilevered overhangs 4711 such that an edge 4720 of shelf insert 4700 is visible. This is in contrast to shelf insert 4600 previously described herein which has a top that does not extend beyond its sides and the perimeter frame (see, e.g. FIGS. 79 and 80).

Figure 85:
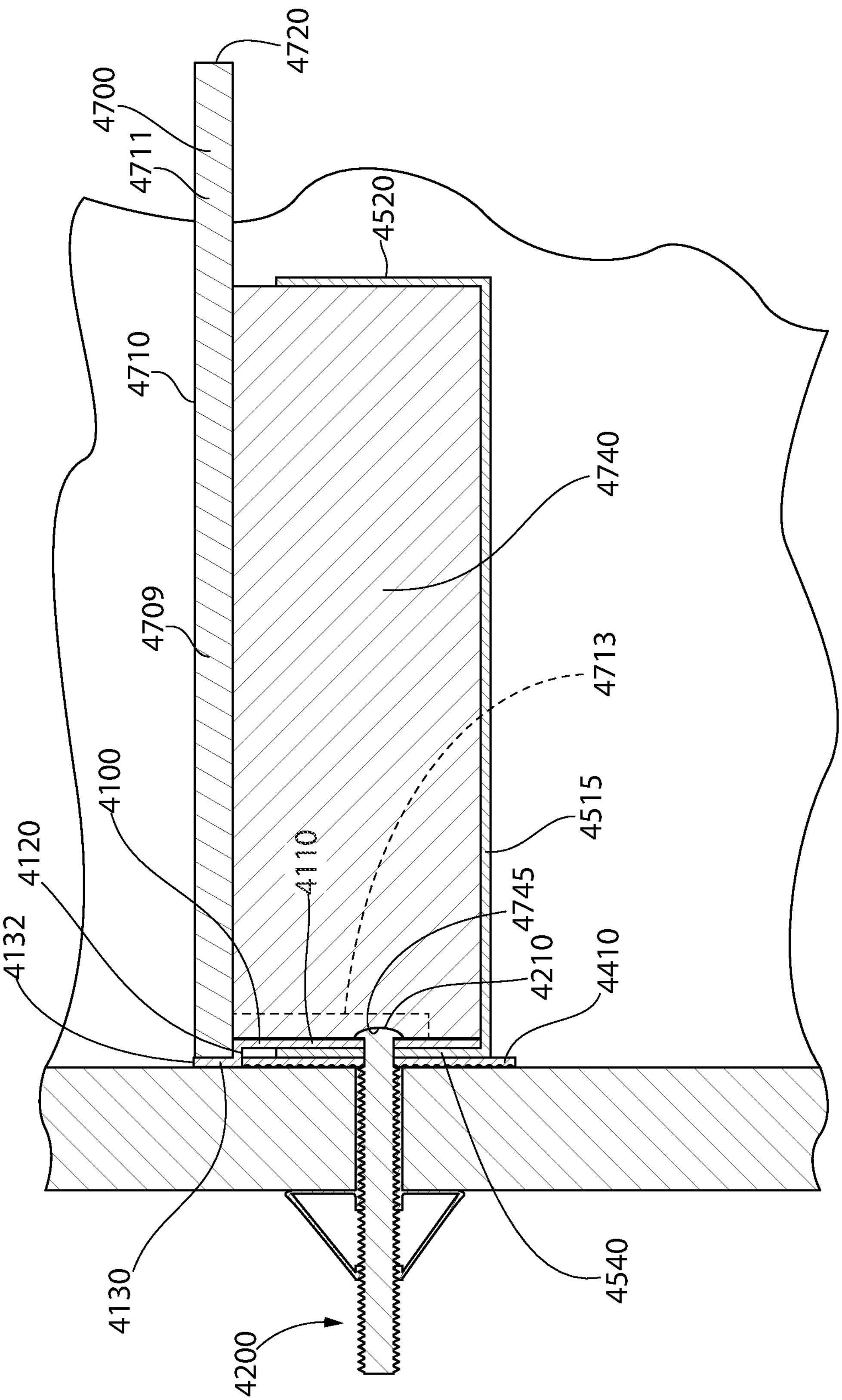
FIG. 85 is a side sectional view of the shelf unit and mounting system and support of FIG. 83.

Shelf insert 4700 can be dimensioned so that when it is lowered into the perimeter frame support structure 4500, the insert's bottom surface contacts and rests on horizontal portions 4515, 4525, 4535, 4545 of the support structure (see FIG. 85). In this position, shelf insert 4700 rests on ledge 4120 of cover 4100 and top surface 4710 is flush with upper edge 4132 of cover 4100. The cantilevered overhangs 4711 formed by the upper portion 4709 that extend perimetrically around the upper portion 4709 and which are located above the upper edges of sides 4520 and 4530 of support structure 4500 extend further from insert portion 4740 than does the overhang 4711 that is located above the upper edge of side 4510 of support structure 4500. This is because, in this example, wall 4020 prevents the overhang that is located above the upper edge of side 4510 from extending more than the thickness of side 4510. In other examples where support structure 4500 is not corner mounted and in contact with a wall perpendicular to wall 4010 such as wall 4020, the overhangs of shelf insert 4700 can extend beyond all four the sides of perimeter frame support structure 4500.

As shown in FIG. 85, the upper portion 4709 of the shelf insert 4600 does not contact sides 4510-4540 and is spaced vertically apart from perimeter frame support structure 4500. In other possible embodiments, the shelf insert 4600 and perimeter frame support structure 4500 may be configured so that the overhangs 4711 of the upper portion 4709 may rest on the top edges of the lateral sides 4510, 4530 and front side 4520 of the perimeter frame.

Figure 84:
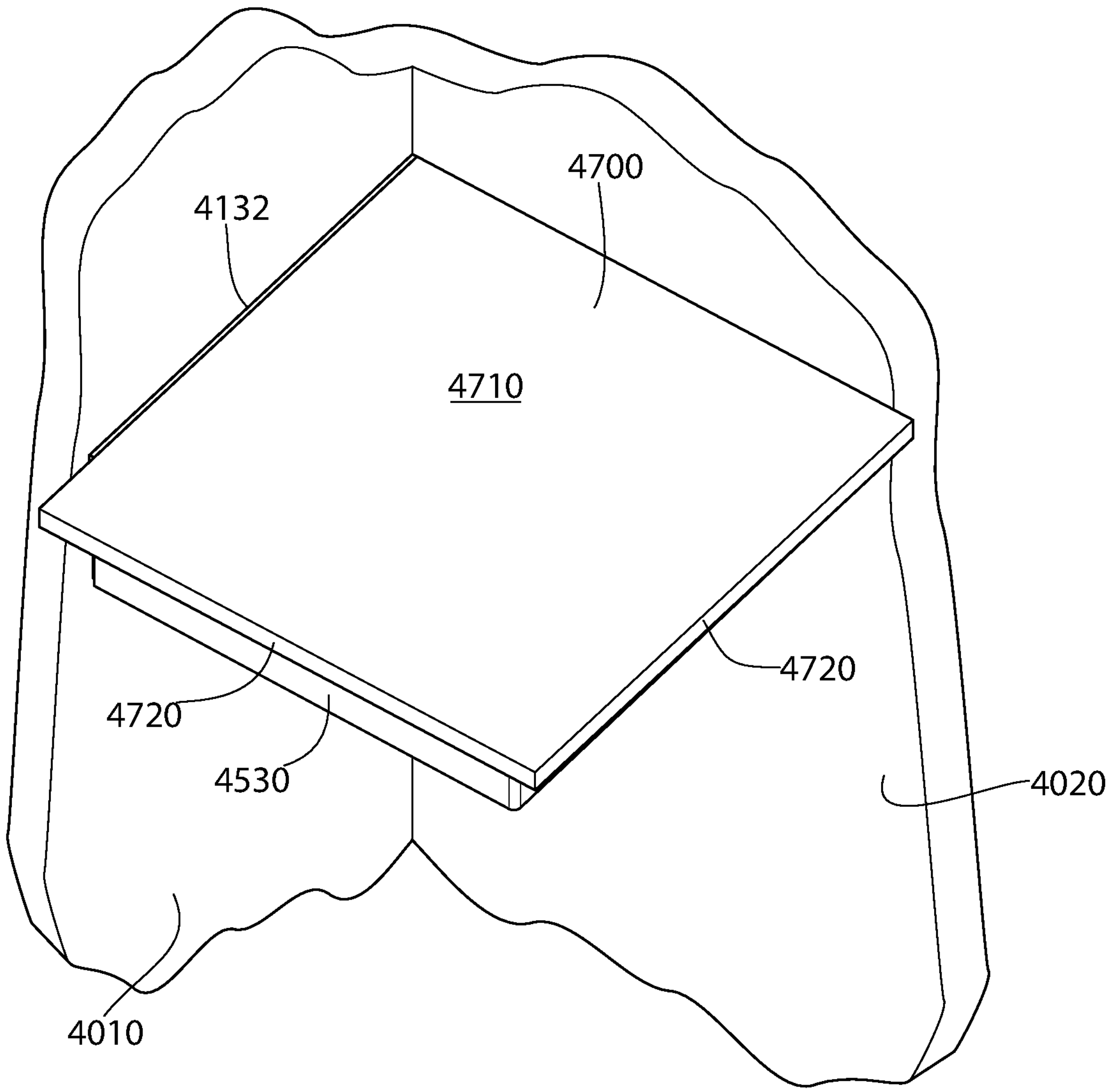
FIG. 84 is an upper perspective view of the shelf unit and mounting system and support of FIG. 23 in an assembled state.

FIG. 84 shows shelf insert 4700 installed in support structure 4500. In this view, upper edge 4132 of cover 4100 is visible. In some embodiments, upper edge 4132 is flush with top surface 4710 of shelf insert 4700. In other embodiments, upper edge 4132 extends above top surface 4710. In other embodiments, upper edge 4132 and ledge 4120 of cover 4100 extend above top surface 4710. In some embodiments where upper edge 4132 and ledge 4120 extend above top surface 4710, an underside 4730 of top surface 4710 rests on the upper edges of sides 4510, 4520, 4530 instead of, or in addition to, the bottom of shelf insert 4700 contacting horizontal portions 4515, 4525, 4535, 4545 of support structure 4500.

FIG. 85 is a side sectional view of shelf insert 4700 installed in support structure 4500. In this example, shelf insert 4700 has a groove 4745 that runs horizontally along the side that contacts side 4540 of support structure 4500. Groove 4745 is configured to accept the protruding heads 4210 of fasteners 4200 and can provide a locking feature that is not permanent. Shelf insert 4700 is, in this example, pressed into support structure 4500 until heads 4210 engage groove 4745, thereby locking shelf insert 4700 into place. Shelf insert 4700 can then be removed by pushing it upward to disengage heads 4210 from groove 4745. Access to the bottom of shelf insert 4700 is available through opening 4580 (see FIG. 87). In other examples, individual indentations are provided for each head 4210 instead of a single groove 4745 that receives all heads 4210. In other possible constructions, a non-locking shelf insert 4600 may be provided which includes a large single rear facing cavity 4713 (represented by dashed lines) formed in lower insert portion 4740 of the shelf insert for receiving the fastener heads 4210. Alternatively, two individual smaller individual cavities 4713 (i.e. one for each fastener head) may instead be provided. In yet other constructions, flat head fasteners 4200 may be used and the mounting holes 4560 in rear side 4540 of the support structure may be countersunk to eliminate the need for the rear cavities or groove where a self-locking shelf insert 4600 is not required.

Figure 86:
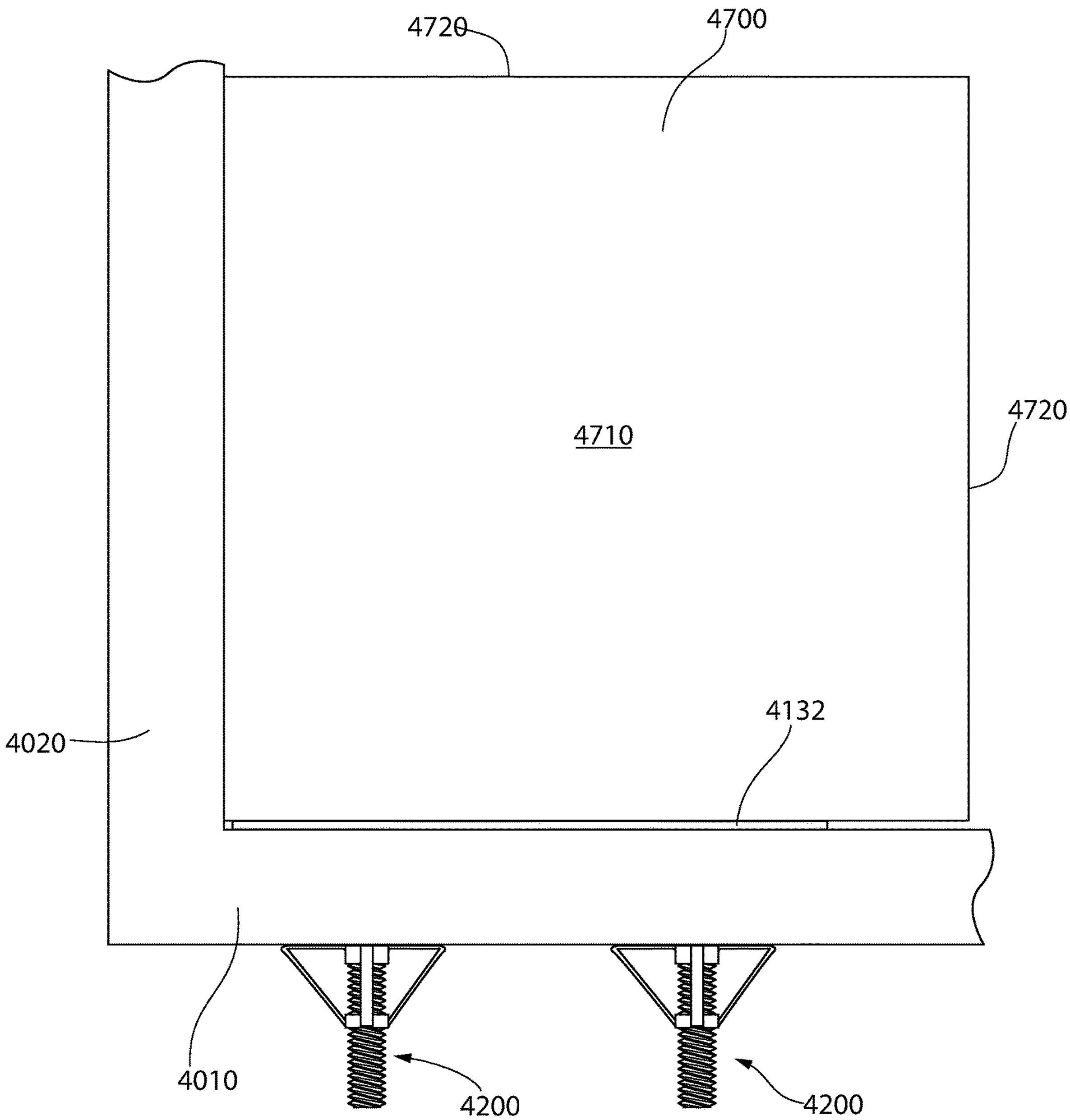
FIG. 86 is a top view of the shelf unit and mounting system and support of FIG. 83.
Figure 87:
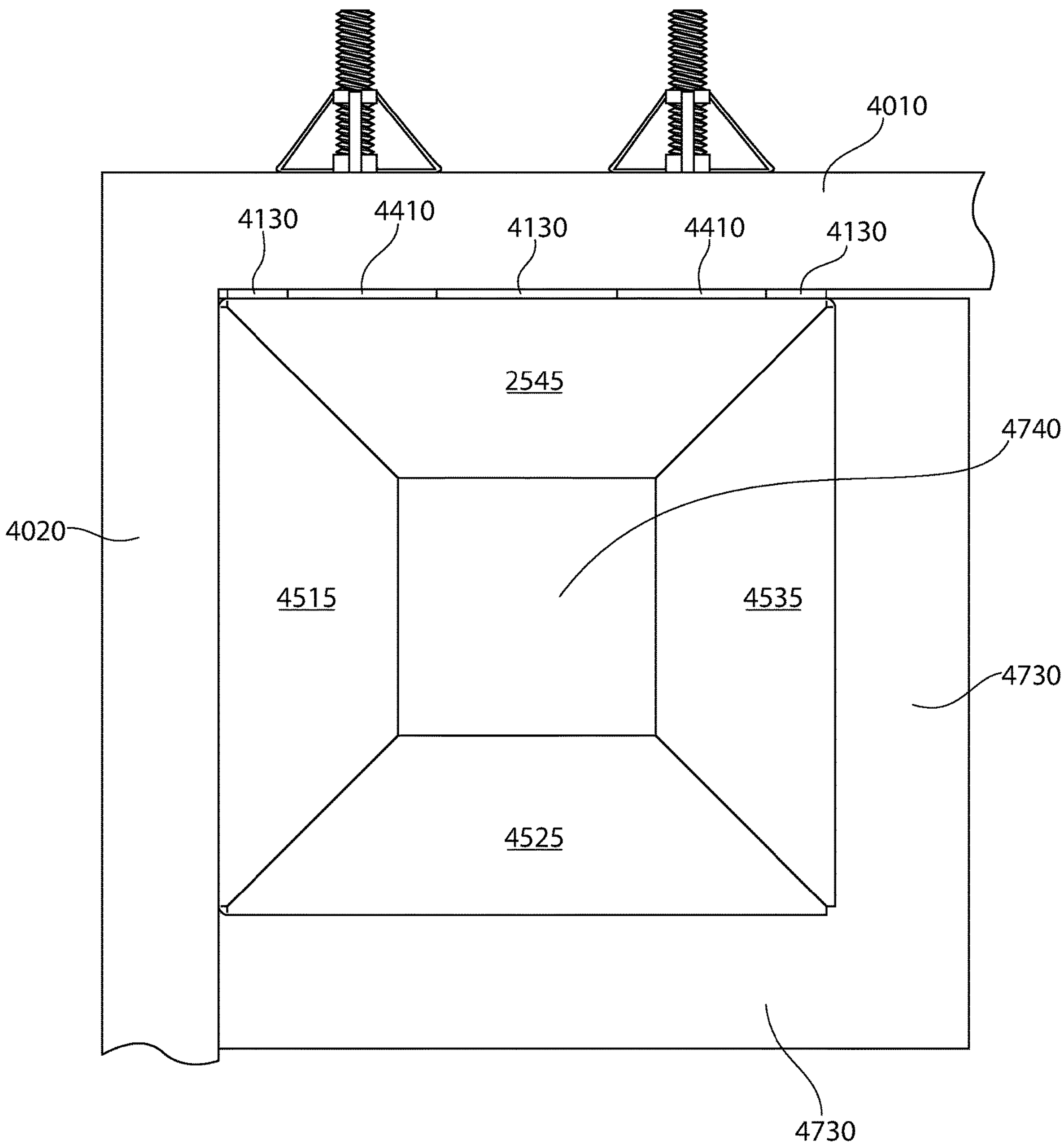
FIG. 87 is a bottom view of the shelf unit and mounting system and support of FIG. 83.

FIG. 86 is a top view of shelf insert 4700 in the installed position. FIG. 87 is a bottom view of shelf insert 4700 in the installed position. In FIG. 87, the bottom of shelf insert 4700 can be seen through opening 4580 and the underside 4730 of top surface 4710 can be seen extending beyond sides 4520 and 4530 of support structure 4500.

It bears noting that the lower insert portion 4740 may be formed of a stronger core material which is not esthetically pleasing while the visible upper portion 4709 is made of a different more esthetically pleasing material in appearance. In other embodiments, the upper and lower portions may be parts of a monolithic unitary structure formed of a single material.

Figure 88:
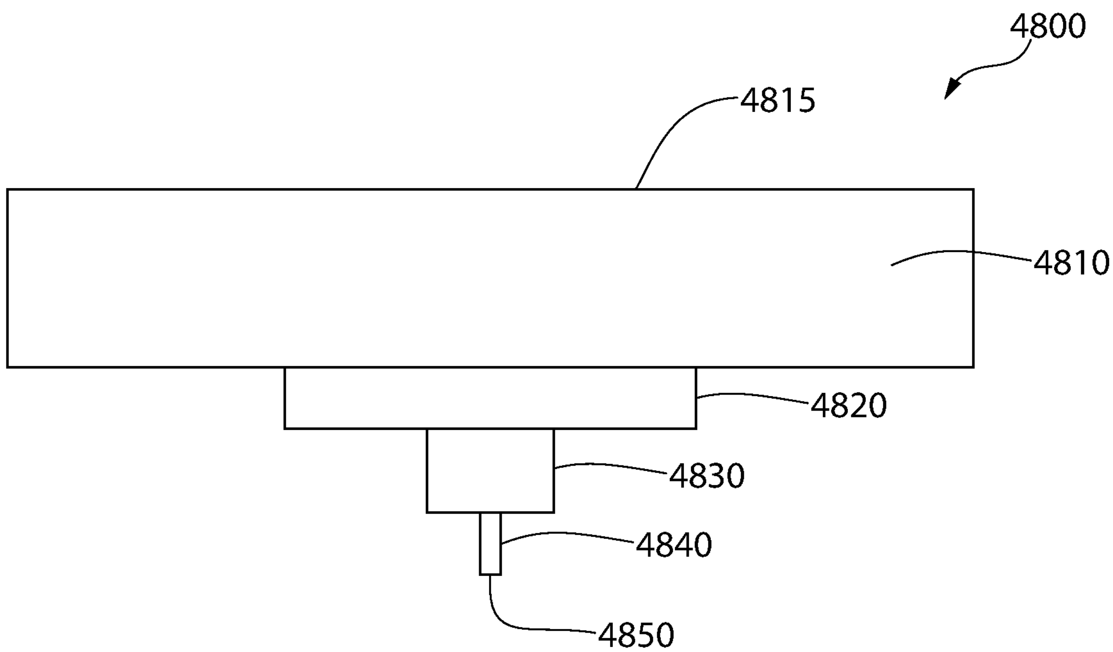
FIG. 88 is side view of a soap dispenser in accordance with embodiments of the invention.
Figure 89:
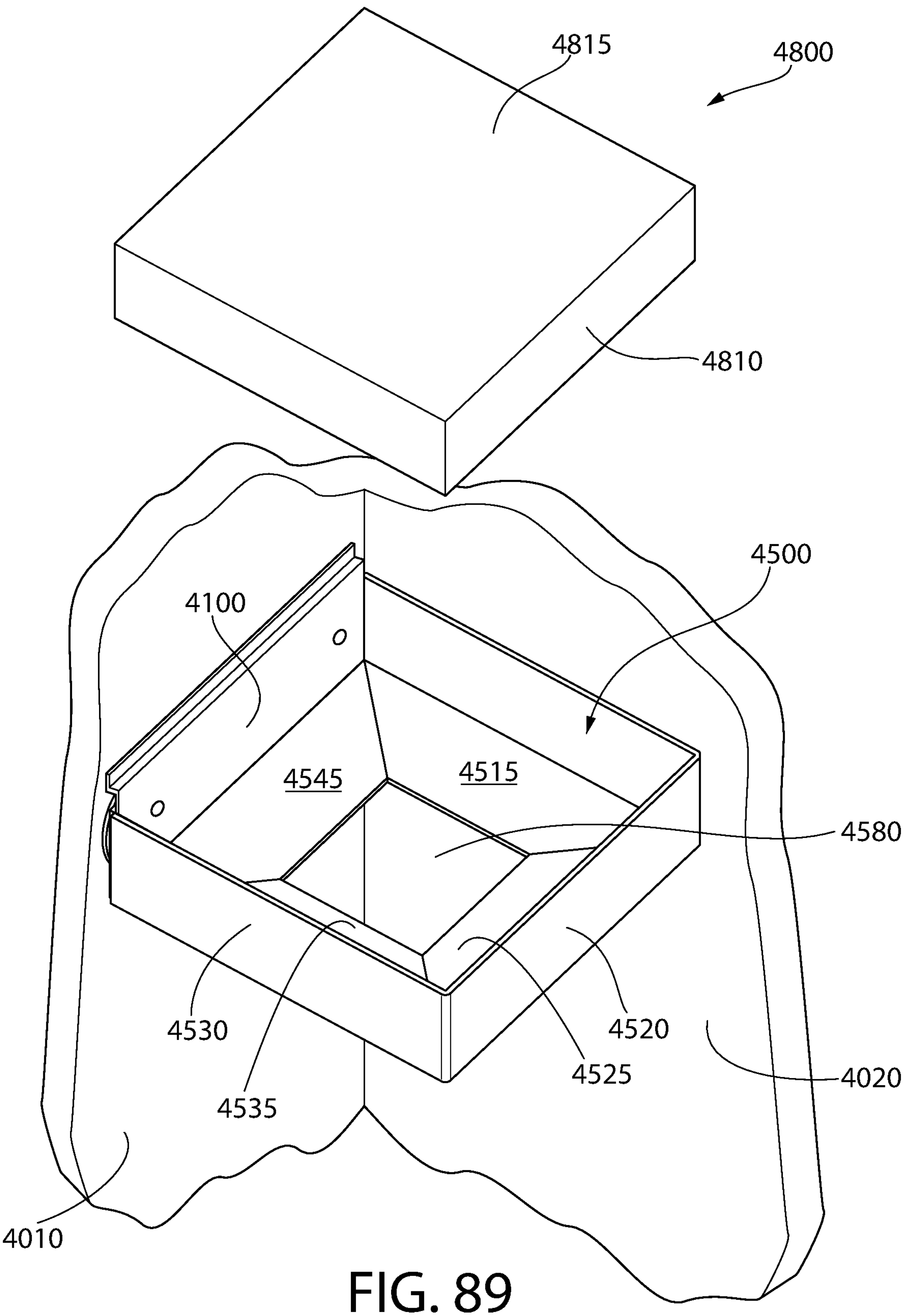
FIG. 89 is an exploded upper perspective view of the soap dispenser of FIG. 88 and the mounting system and support of FIG. 69.
Figure 90:
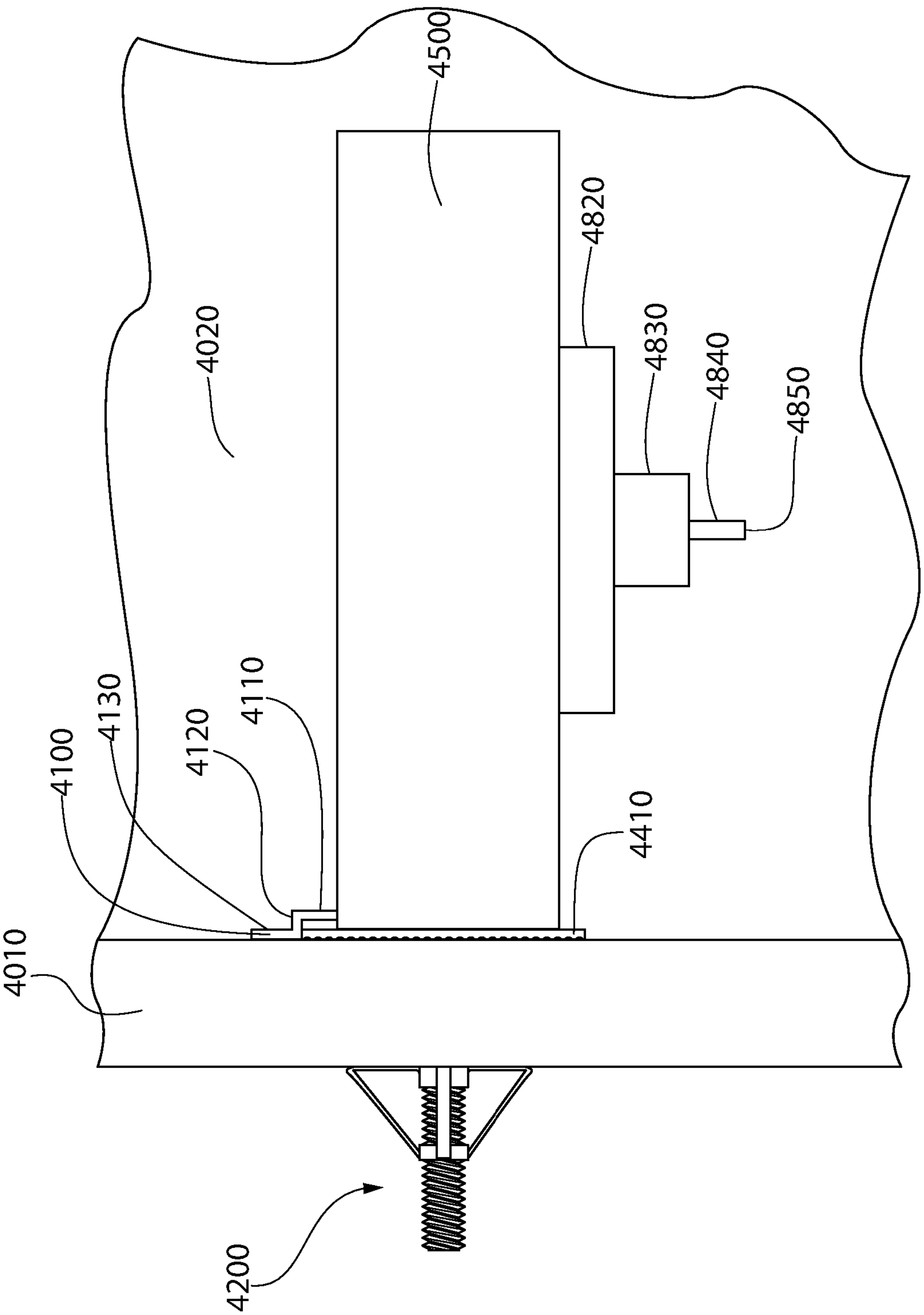
FIG. 90 is a side view of the soap dispenser and mounting system and support of FIG. 29 in an assembled state.
Figure 91:
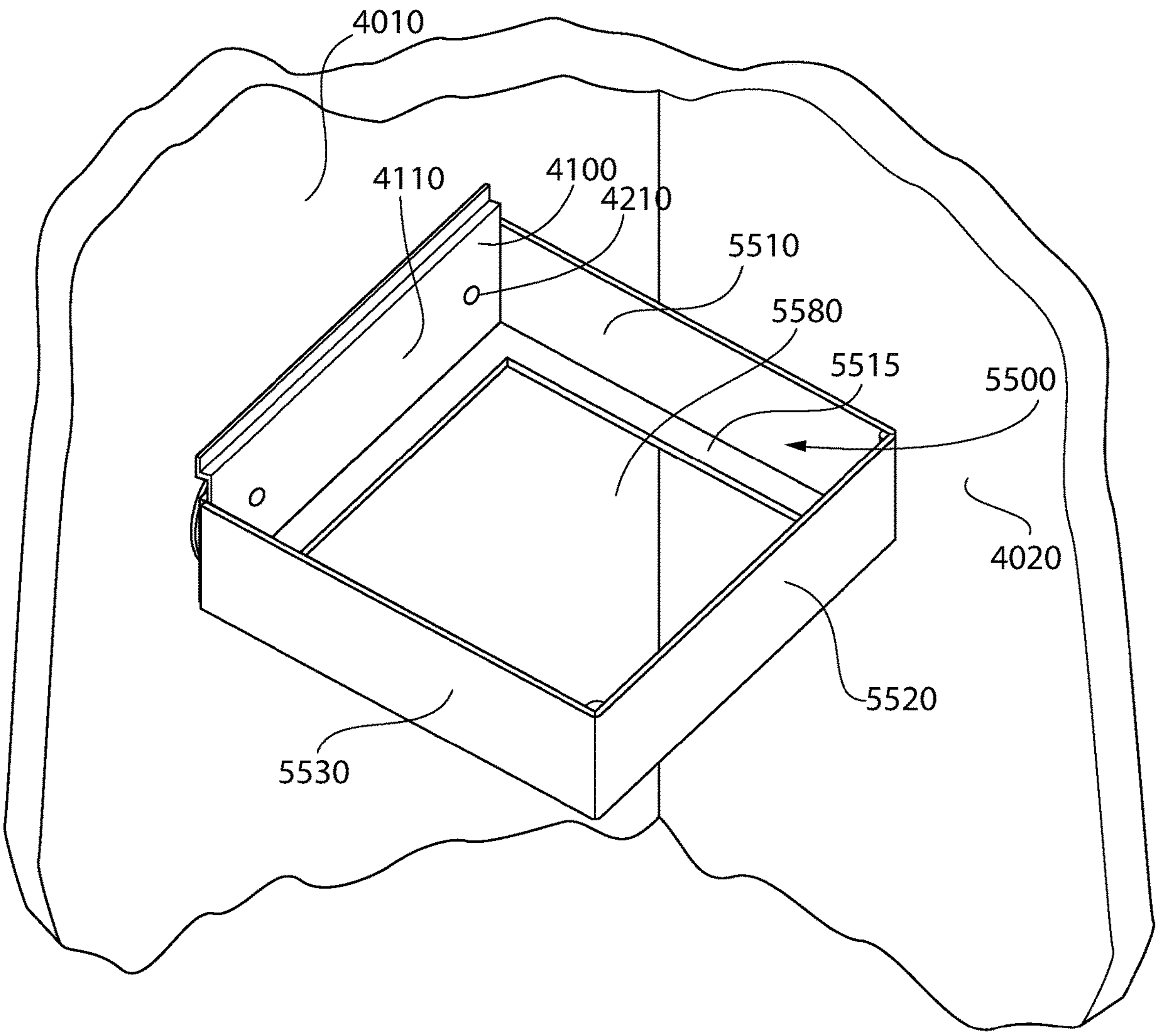
FIG. 91 is an upper perspective view of a mounting system and support in accordance with exemplary embodiments of the invention.

FIGS. 88-90 show an example of an accessory other than a shelf that can be install in support structure 4500. This example shows a soap dispenser 4800, but any accessory that can be supported by support structure 4500 can be substituted for soap dispenser 4800.

FIG. 88 shows soap dispenser 4800 having a reservoir 4810 that holds soap to be dispensed by soap dispenser 4800. In this example, reservoir 4810 fits completely inside of support structure 4500 such that an upper surface 4815 is flush with the upper edges of the sides of support structure 4500. A first extension 4820 extends down from reservoir 4810 and, when installed in support structure 4500, extends through opening 4580 (see FIG. 90). A second extension 4830 extends down from first extension 4820 and can house a pump that expels soap from soap from soap dispenser 4800. A distributing tube 4840 extends down from second extension 4830 and terminates with a nozzle opening 4850 through which soap is dispensed.

FIG. 90 shows soap dispenser 4800 in an installed position with first extension 4820, second extension 4830, and distributing tube 4840 extending out of opening 4580 and below support structure 4500.

FIGS. 91-94 show an example of an alternate embodiment of the invention. In this example, support structure 5500 has four side elements or members 5510, 5520, 5530, 5540 (also referred to as "sides" for brevity). Unlike other examples that have four horizontal portions, this example has a single horizontal portion 5515 extending from all four sides 5510, 5520, 5530, 5540 toward a central opening 5580 of support structure 5500. In other examples, the four horizontal portions could have their adjacent edges attached to each by welding or some other means. In this example, the vertical edges between the adjacent ones of sides 5510, 5520, 5530, 5540 are attached to each other by welding or some other means. In other examples, the vertical edges of sides 5510, 5520, 5530, 5540 contact the vertical edges of the adjacent sides, but are not attached to those adjacent vertical edges. In other examples, the vertical edges of sides 5510, 5520, 5530, 5540 do not contact the vertical edges of the adjacent sides. In some examples, horizontal portion 5515 is solid such that no opening 5580 exists. In this example, side 5510 does not contact wall 4020. In other examples, side 5510 contacts wall 4020 but is not fastened to wall 4020. In other examples, side 5520 is fastened to wall 4020 in the same manner that side 5540 is fastened to wall 4010.

Figure 92:
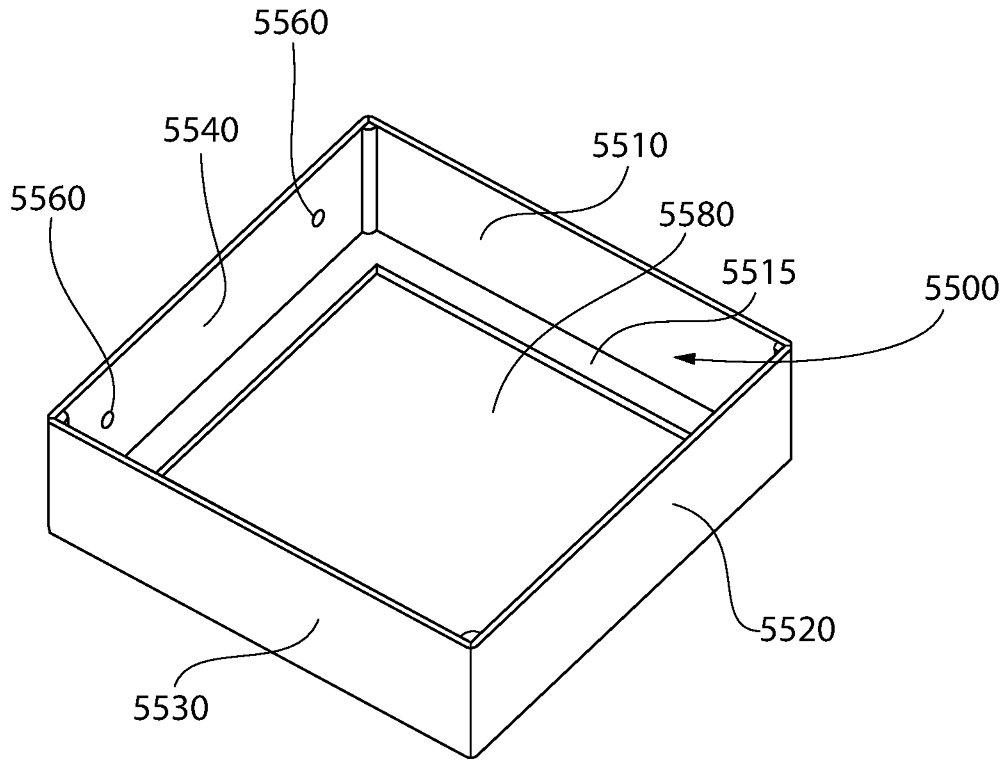
FIG. 92 is an upper perspective view of the support of FIG. 91.

FIG. 92 shows support structure 5500 as having two holes 5560 in side 5540. Holes 5560 serve the same purpose as holes 4330 of shelf 4300 (FIG. 64). Due to the fabrication method used in this example, a continuous corner exists between side 5510 and horizontal portion 5515, between side 5520 and horizontal portion 5515, between side 5530 and horizontal portion 5515, and between side 5540 and horizontal portion 5515. In contrast, a joint exists between each of the adjacent edges of sides 5510, 5520, 5530, 5540 (explained further below).

Figure 93:
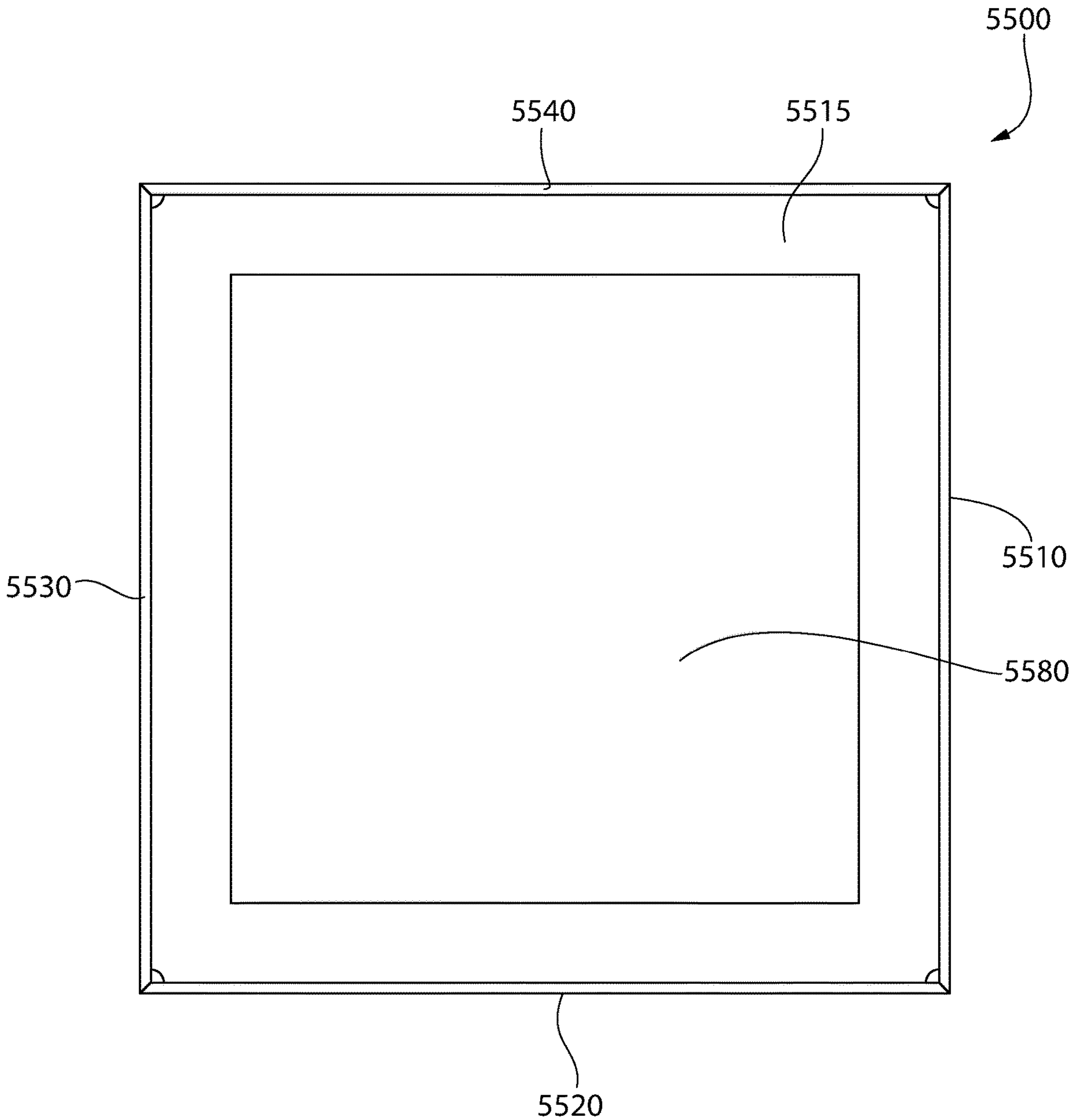
FIG. 93 is a top view of the support of FIG. 91.

FIG. 93 is a top view of support structure 5500 and shows opening 5580 and the joints at each of the corners between sides 5510, 5520, 5530, 5540.

Figure 94:
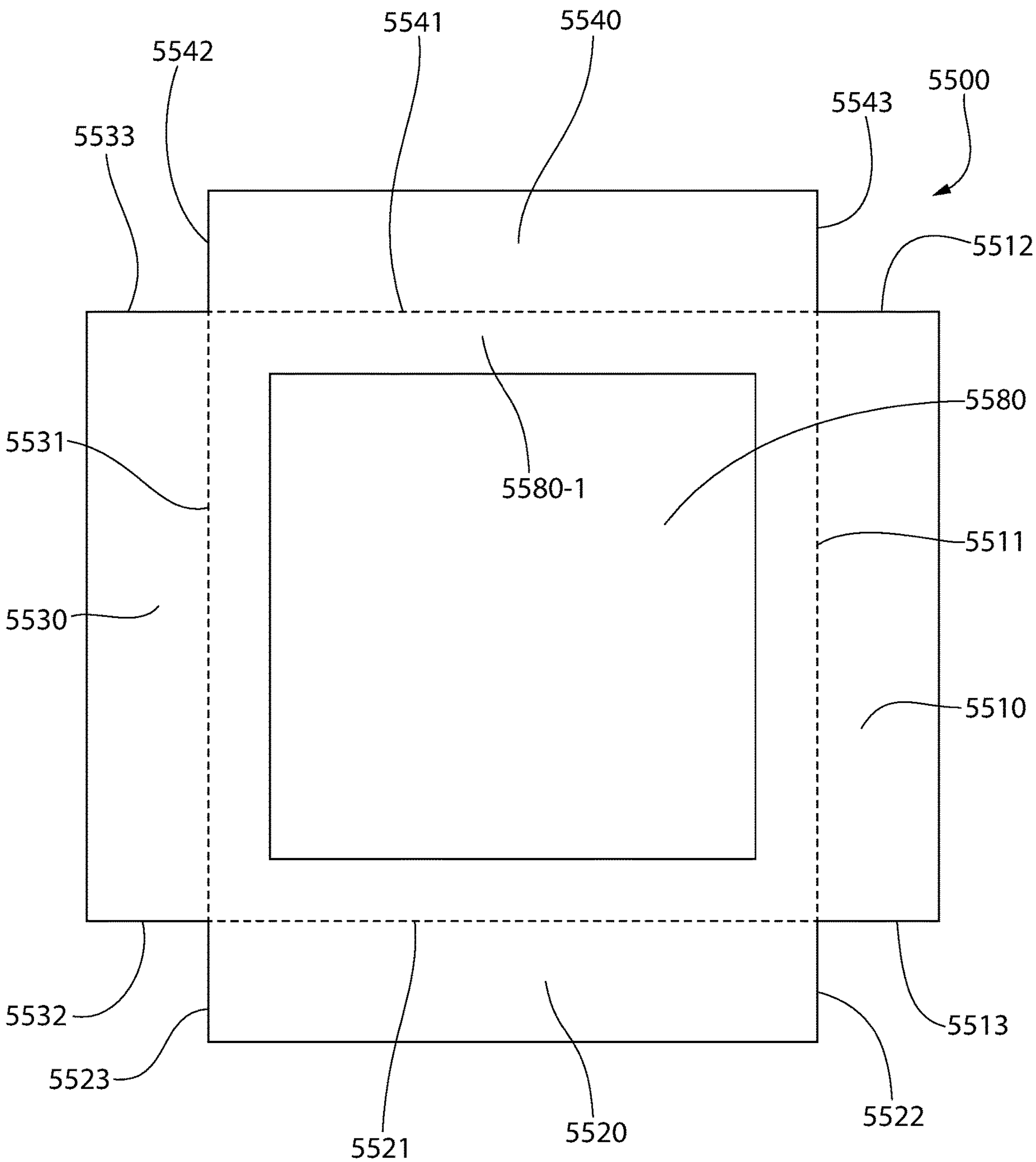
FIG. 94 is a top view of the support of FIG. 91 showing a workpiece blank in an unassembled state prior to being bent to shape.

FIG. 94 is a plan view of the perimeter frame support structure 5500 prior to assembly. This view shows a flat piece of workpiece material or blank after being cut to shape, but before being folded/bent and, in some examples, welded. In this view, horizontal portion 5515 is shown surrounding central opening 5580 as is the case after assembly. However, sides 5510, 5520, 5530, 5540 are shown in the same plane as horizontal portion 5515 prior to bending. Side 5510 is bent at, in this example, 90 degrees along line 5511. Side 5520 is bent at, in this example, 90 degrees along line 5521. After sides 5510 and 5520 are bent into position, edge 5513 of side 5510 and edge 5522 of side 5520 come into contact with each other and, in this example, are welded together. Side 5530 is bent at, in this example, 90 degrees along line 5531. After sides 5520 and 5530 are bent into position, edge 5523 of side 5520 and edge 5532 of side 5530 come into contact with each other and, in this example, are welded together. Side 5540 is bent at, in this example, 90 degrees along line 5541. After sides 5530 and 5540 are bent into position, edge 5533 of side 5530 and edge 5542 of side 5540 come into contact with each other and, in this example, are welded together. After sides 5540 and 5510 are bent into position, edge 5543 of side 5540 and edge 5512 of side 5510 come into contact with each other and, in this example, are welded together. This assembly procedure results in the box-shaped support structure 5500 shown in FIG. 92. While welding is used in this example, other examples can use other joining methods. Still other examples do not join the edges of the sides, but instead rely on the strength of the material alone to maintain the desired shape. For example, a stainless steel or other materials of sufficient thickness can be used without welding the edges and still provide the required rigidity and strength. It bears noting that using the present workpiece to fabricate the perimeter frame may be more expedient and cost effective than the workpiece blank shown in FIGS. 76-77. For example, the rectilinear annular bottom horizontal portion 5580-1 of perimeter frame 5500 has a contiguous and continuous structure. This contrasts to the perimeter frame 4500 seen for example in FIG. 72 in which the horizontal portions is formed by multiple segments each associated with a vertical side portion of side elements 510-540 which create diagonal seams/joints between the horizontal portion, which are then optionally welded together alone the joints for rigidity.

Figure 95:
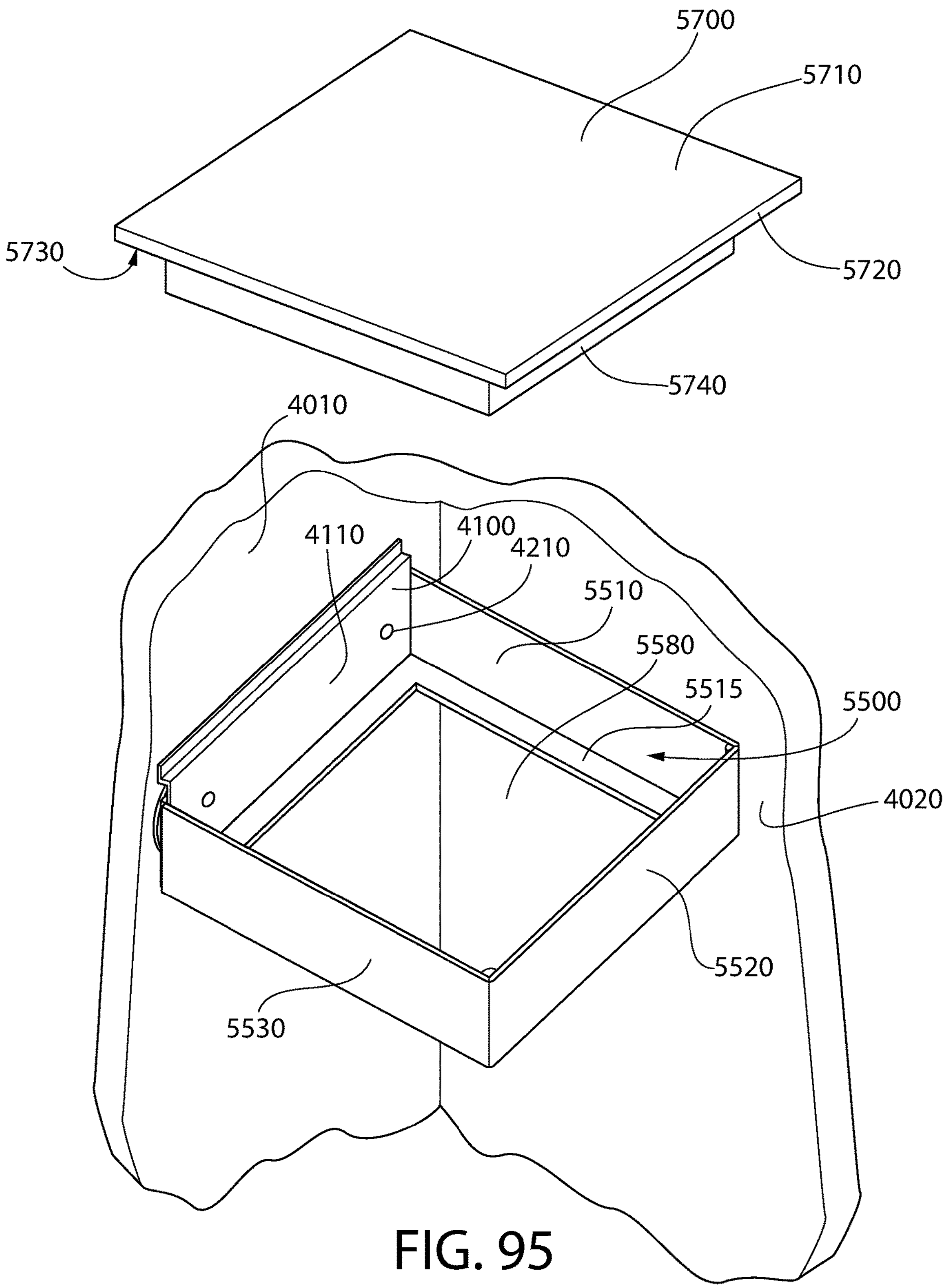
FIG. 95 is an exploded upper perspective view of a shelf unit and the mounting system and support of FIG. 91.
Figure 96:
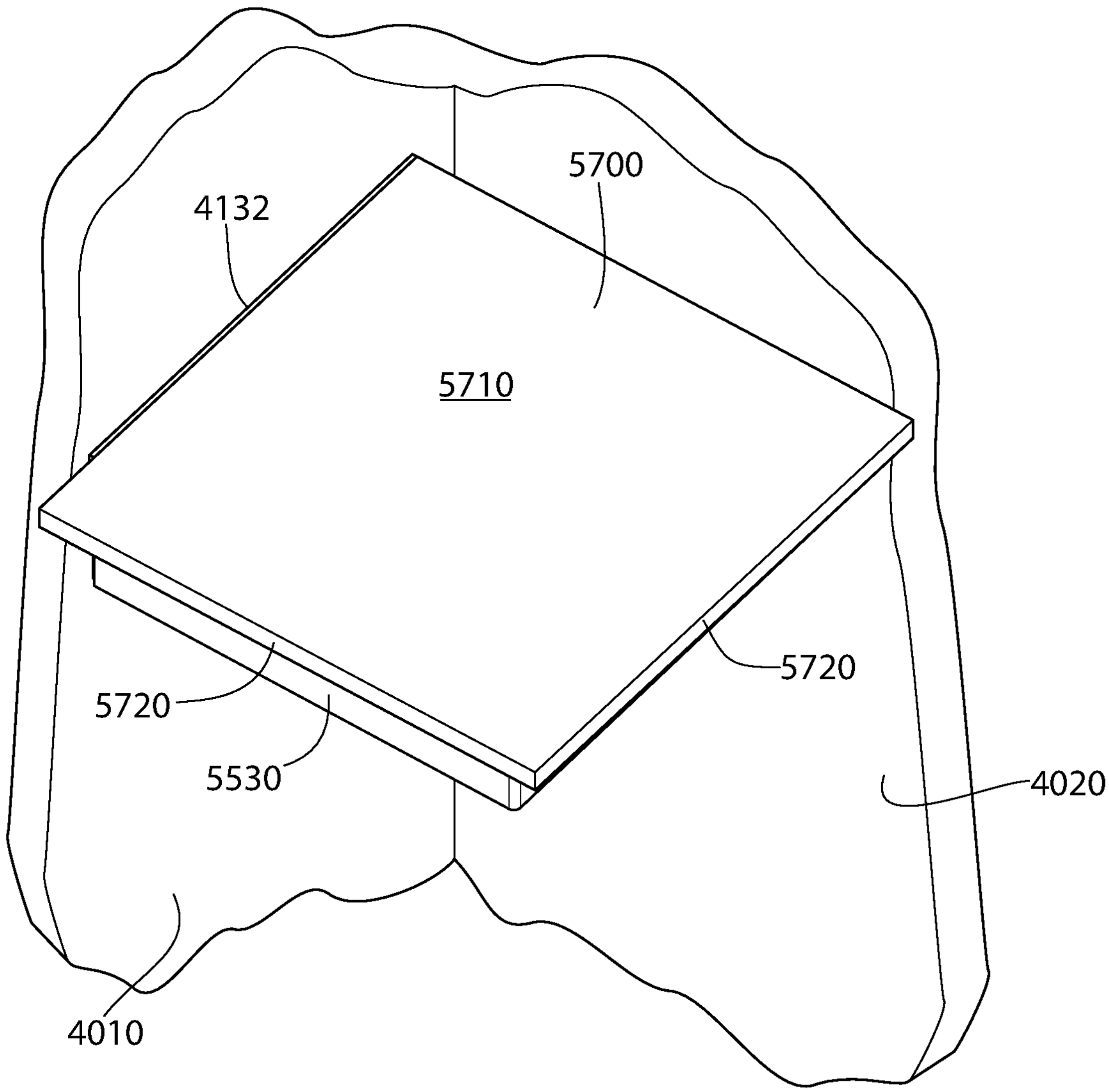
FIG. 96 is an upper perspective view of the shelf unit, mounting system, and support of FIG. 95 in an assembled state.

FIGS. 95 and 96 show an example of a shelf insert 5700 that can be used with support structure 5500. In this example, shelf insert 5700 has a top surface 5710 that extends beyond an insert portion 5740 such that an edge 5720 of shelf insert 5700 is visible. This is in contrast to shelf inserts which have a top that does not extend beyond its sides. Shelf insert 5700 is lowered into support structure 5500 until an under side 5730 of shelf insert 5700 contacts the upper edges of sides 5510, 5520, 5530, 5540. In some embodiments, this coincides with a bottom surface of insert portion 5740 contacting horizontal portion 5515 of support structure 5500. In some embodiments, only the bottom surface of insert portion 5540 contacts horizontal portion 5515 of support structure 5500, and underside 5730 does not contact the upper edges of sides 5510, 5120, 5530, 5540. In this position, in some embodiments, shelf insert 5700 rests on ledge 4120 of cover 4100 and top surface 5510 is flush with upper edge 4132 of cover 4100. The overhangs that are located above the upper edges of sides 5510, 5520, 5530 of support structure 5500 extend further from insert portion 4740 than does the overhang that is located above the upper edge of side 5540 of support structure 5500. This is because of cover 4100 preventing the overhang located above side 5540 from extending beyond a certain amount. In other examples, wall 4020 prevents the overhang that is located above the upper edge of side 5510 from extending more than the thickness of side 5510.

FIG. 96 shows shelf insert 5700 installed in support structure 5500. In this view, upper edge 4132 of cover 4100 is visible. In some embodiments, upper edge 4132 is flush with top surface 5710 of shelf insert 5700. In other embodiments, upper edge 4132 extends above top surface 5710. In other embodiments, upper edge 4132 and ledge 4120 of cover 4100 extend above top surface 5710. In some embodiments where upper edge 4132 and ledge 4120 extend above top surface 5710, underside 5730 of top surface 5710 rests on the upper edges of sides 5510, 5520, 5530 instead of, or in addition to, the bottom of shelf insert 5700 contacting horizontal portion 5515 of support structure 5500.

Figure 97:
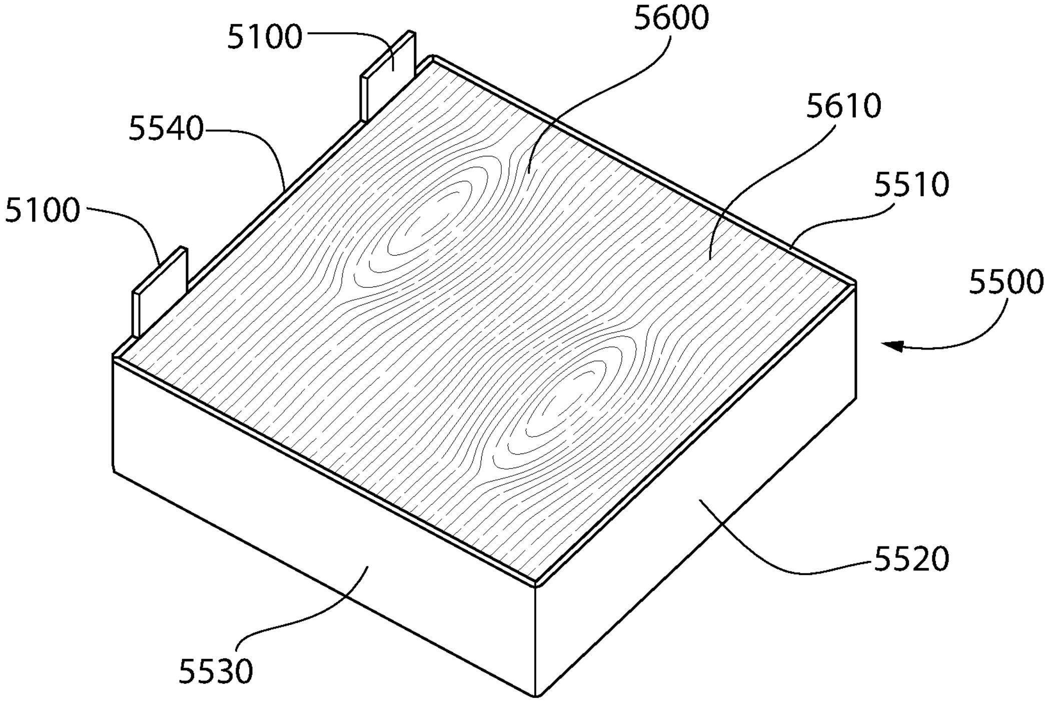
FIG. 97 is an upper perspective view of a shelf unit, mounting system, and support in accordance with exemplary embodiments of the invention in an assembled state.
Figure 98:
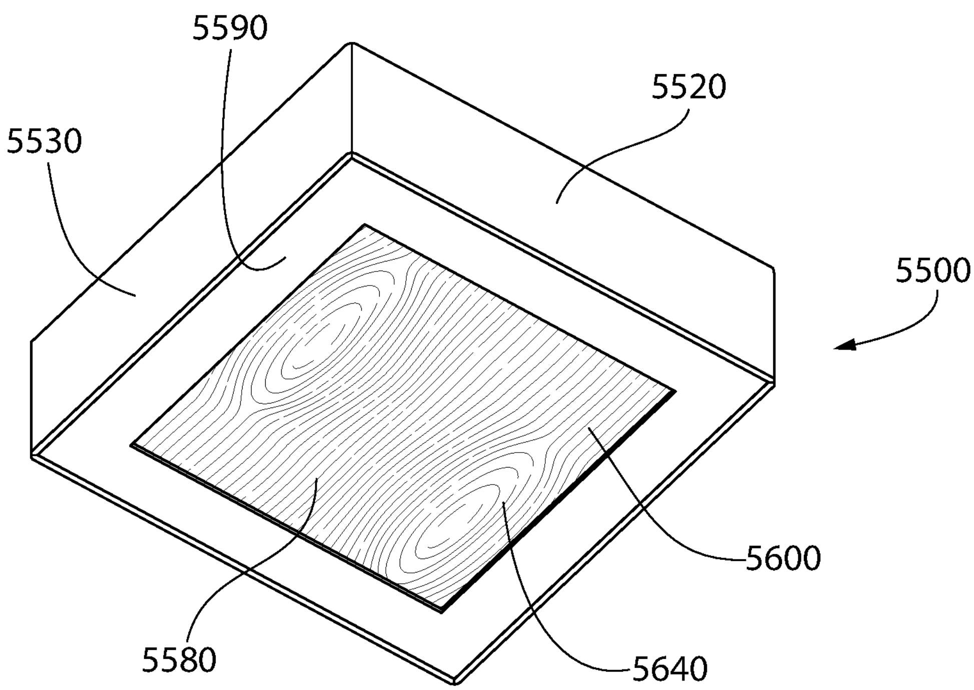
FIG. 98 is a lower perspective view of the assembly of FIG. 97.

FIG. 97 shows shelf insert 5600 in an installed position in support structure 5500. Shelf insert 5600 has a top surface 5610. In this example, shelf insert 5600 slides into support structure 5500 with a slight interference fit between its sides and sides 5510, 5520, 5530, 5540 until top surface 5610 is flush with the upper edges of sides 5510, 5520, 5530, 5540. In other embodiments, top surface 5610 is above or below the upper edges of sides 5510, 5520, 5530, 5540. In some embodiments, shelf insert 5600 slides into support structure 5500 with no interference between its sides and sides 5510, 5520, 5530, 5540. FIG. 98 shows a bottom view of shelf insert 5600 and support structure 5500. In this view the bottom surface 5640 of shelf insert 5600 is visible through central opening 5580 of support structure 5500. In this example, bottom surface 1640 of shelf insert 5600 rests on horizontal portion 5515 and top surface 5610 is even with the upper edges of sides 5510, 5520, 5530, 5540. In the example shown in FIGS. 97 and 98 shelf insert 5600 is made of wood. In other examples, shelf inserts can be made of metal, plastic, composites, or any other appropriate material.

Figure 99:
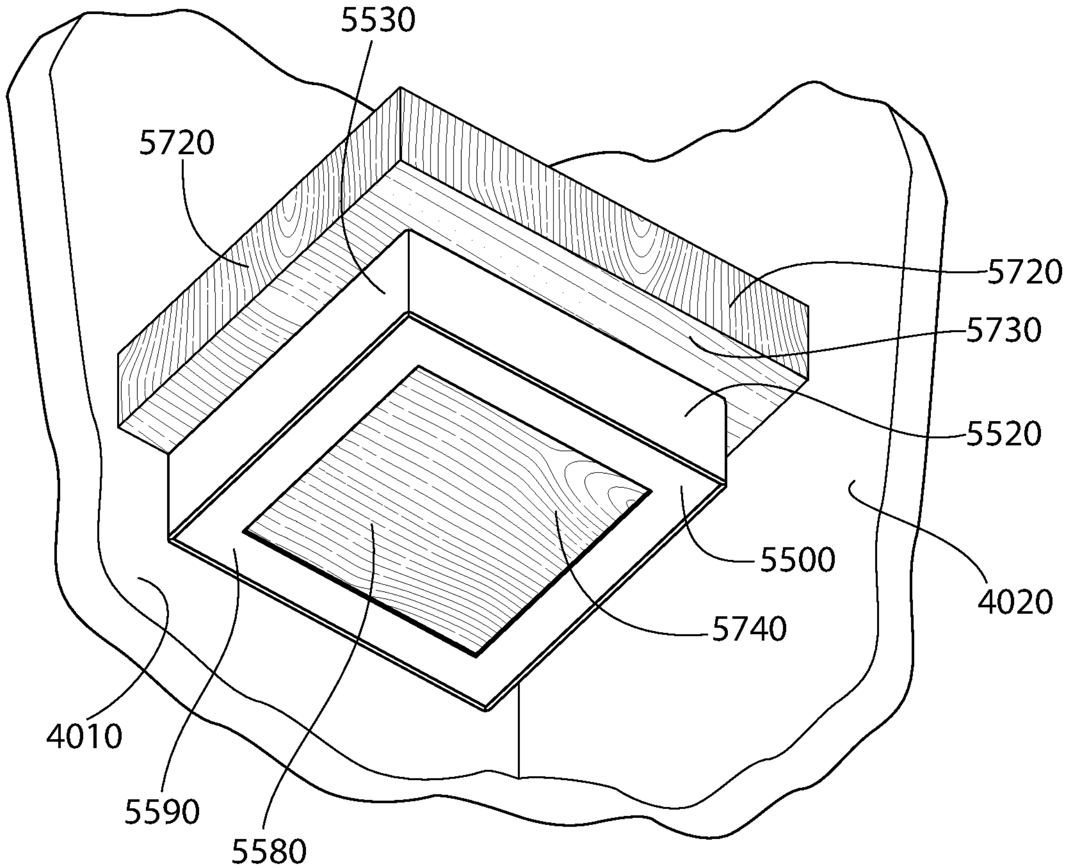
FIG. 99 is a lower perspective view of a shelf unit, mounting system, and support in accordance with exemplary embodiments of the invention in an assembled state.
Figure 100:
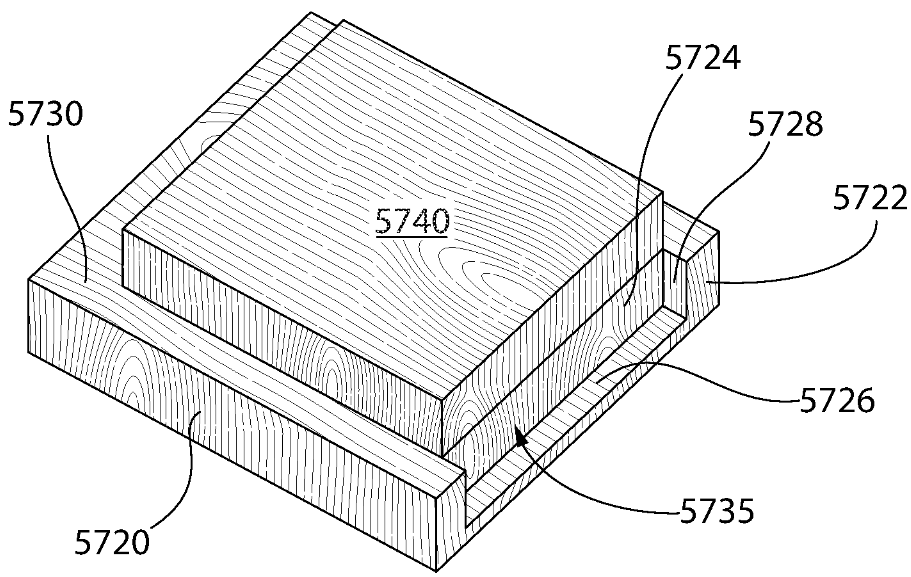
FIG. 100 is an upper perspective view of the underside of the shelf unit of FIG. 99.

FIG. 99 shows shelf insert 5700 in an installed position in support structure 5500. Shelf insert 5700 has a bottom surface 5740. In this example, shelf insert 5700 slides into support structure 5500 with a slight interference fit between its sides and sides 5510, 5520, 5530, 5540 until bottom surface 5740 contacts and rests on horizontal portion 5515 of support structure 5500 and/or underside 5730 rests on the upper edges of sides 5510, 5520, 5530, 5540. In some embodiments, shelf insert 5700 slides into support structure 5500 with no interference between its sides and sides 5510, 5520, 5530, 5540. FIG. 100 shows a bottom view of shelf insert 5700 and support structure 5500. In this view the bottom surface 5740 of shelf insert 5700 is visible through central opening 5580 of support structure 5500. In the example shown in FIGS. 99 and 100 shelf insert 5700 is made of wood. In other examples, shelf inserts can be made of metal, plastic, composites, or any other appropriate material.

The example shown in FIGS. 99 and 100 has a recess 5735 in the rear side of shelf insert 5700 that is adjacent to, in this case, wall 4010. The following can also be applied to multiple sides of shelf insert 5700 if support structure 5500 is attached to multiple walls. Recess 5735 is provided to allow shelf insert 5700 to fit above and cover the attachment hardware used to attach support structure 5500 to the wall. This attachment hardware can include, for example, one or more covers 44100, fasteners 4200, and force-distributing plates 4410. In this example, recess 5735 is bounded by rear facing surface 5724, and opposing inward lateral surfaces 5726 and 5728. Surface 5724 of recess 5735 is coplanar with the adjacent side of the portion of shelf insert 5700 that sits inside of support structure 5500. In other embodiments, surface 5724 of recess 5735 is on a different plane than the adjacent side of the portion of shelf insert 5700 that sits inside of support structure 5500. The edge 5720 of shelf insert 5700 that is adjacent to the wall when installed is reduced in area by recess 5735 to a smaller surface 5722. In the example shown in FIGS. 99 and 100, shelf insert 5700 is shown as two parts. However, in other embodiments shelf insert 5700 is one piece, or more than two pieces. The dimensions of recess 5735 can be dictated by the size of the hardware that is used and needs to be covered.

Figure 101:
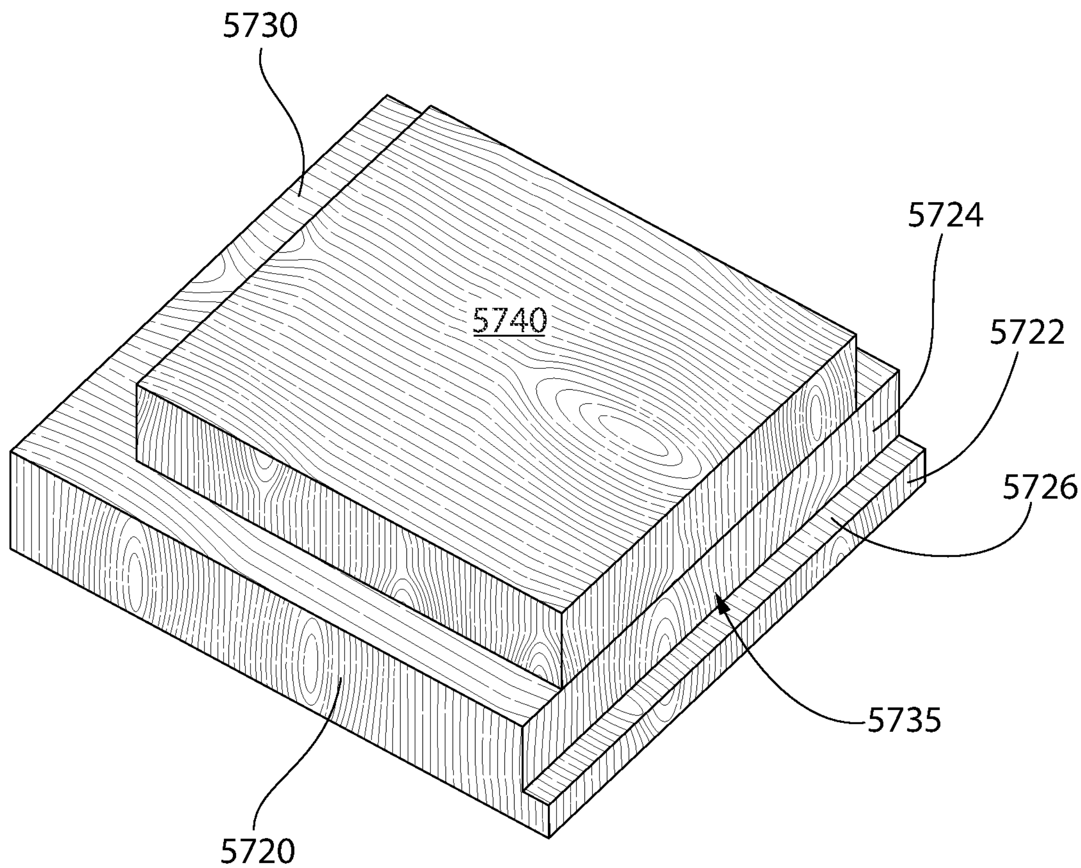
FIG. 101 is an upper perspective view of the underside of a shelf unit in accordance with exemplary embodiments of the invention.

A slightly different embodiment of shelf insert 5700 is shown in FIG. 101. In this example, recess 5735 extends the entire width of shelf insert 5700. This embodiment might be easier to manufacture and does not contact the wall along the entire height of shelf insert 5700. This embodiment can be more universal due to its ability to fit over attachment hardware having a greater width than can the example shown in FIGS. 99 and 100. Surface 5724 of recess 5735 is coplanar with the adjacent side of the portion of shelf insert 5700 that sits inside of support structure 5500. In other embodiments, surface 5724 of recess 5735 is on a different plane than the adjacent side of the portion of shelf insert 5700 that sits inside of support structure 5500. The edge 5720 of shelf insert 5700 that is adjacent to the wall when installed is reduced in area by recess 5735 to a smaller surface 5722. In this example, shelf insert 5700 is shown as two parts. However, in other embodiments shelf insert 5700 is one piece, or more than two pieces. The dimensions of recess 5735 can be dictated by the size of the hardware that is used and needs to be covered.

Figure 102:
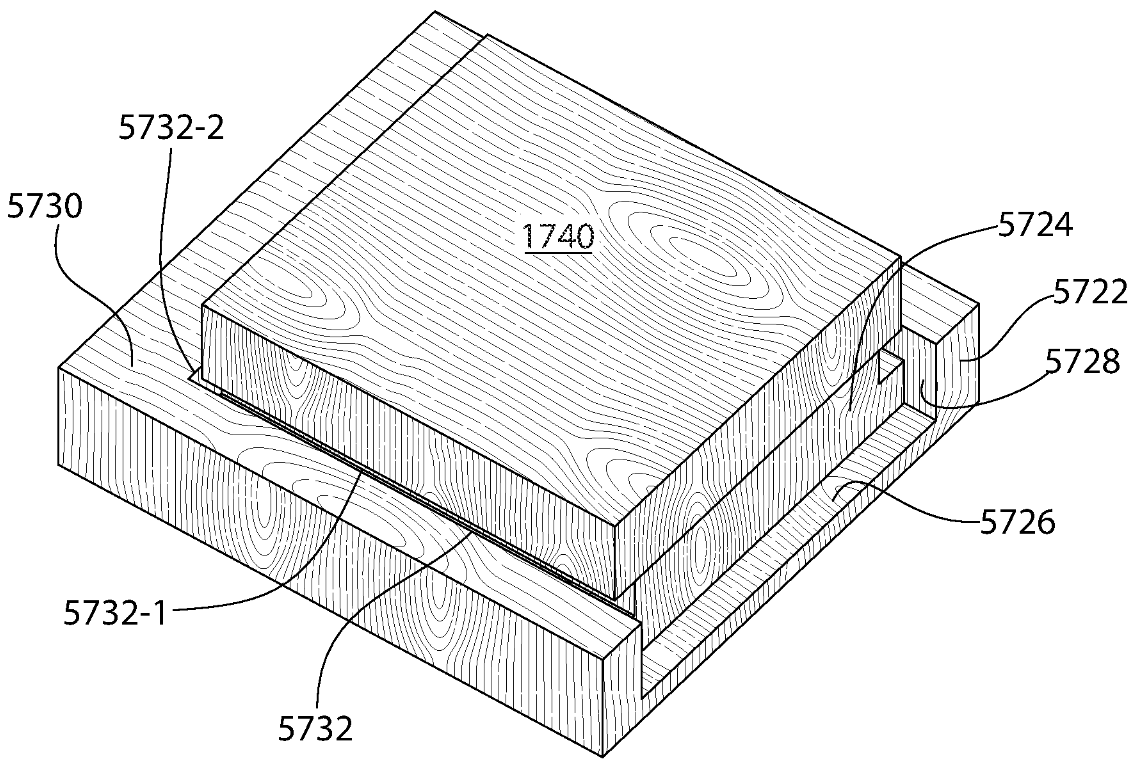
FIG. 102 is an upper perspective view of the underside of a shelf unit in accordance with exemplary embodiments of the invention.

FIG. 102 shows an example of shelf insert 5700 that is similar to the example shown in FIG. 100. However, the example shown in FIG. 102 has a rectilinear groove 5732 formed in underside 5730 of shelf insert 5700 and extends around the portion of shelf insert 5700 that sits inside of perimeter frame support structure 5500. The groove 5732 is U-shaped including two parallel groove sections 5732-1 that extend front to back and perpendicularly to the rear side of shelf insert 5700 (and wall 4010 when the insert is mounted), and a transverse groove section 5732-2 extending right to left between the front ends of the groove sections 5732-1. The rear ends of groove sections 5732-1 may be open. Groove 5732 has a width just slightly larger than the thickness of the side elements 5510-5540 of the perimeter frame. Groove 5732 allows the top edges of side elements 5510, 5520, 5530 of support structure 5500 to extend upwards beyond underside 1730 and into groove 1732 so that the top edges of side elements 5510, 5520, 5530 of the perimeter frame cannot be seen. The lower portions of the perimeter frame (side elements 5510-5530) remain exposed and are visible. This can provide a different and cleaner look than other embodiments disclosed herein having the bottom edges of sides 5510, 5520, 5530 simply abut underside 5730 of the shelf insert 5700. This also can advantageously result in shelf insert 5700 being more positionally constrained by support structure 5500. Groove 5732 has a depth (measured between the top and bottom surfaces of shelf insert 5700) which is less than the height of the side elements 5510-5530 of the perimeter frame (support structure 5500).

Figure 103:
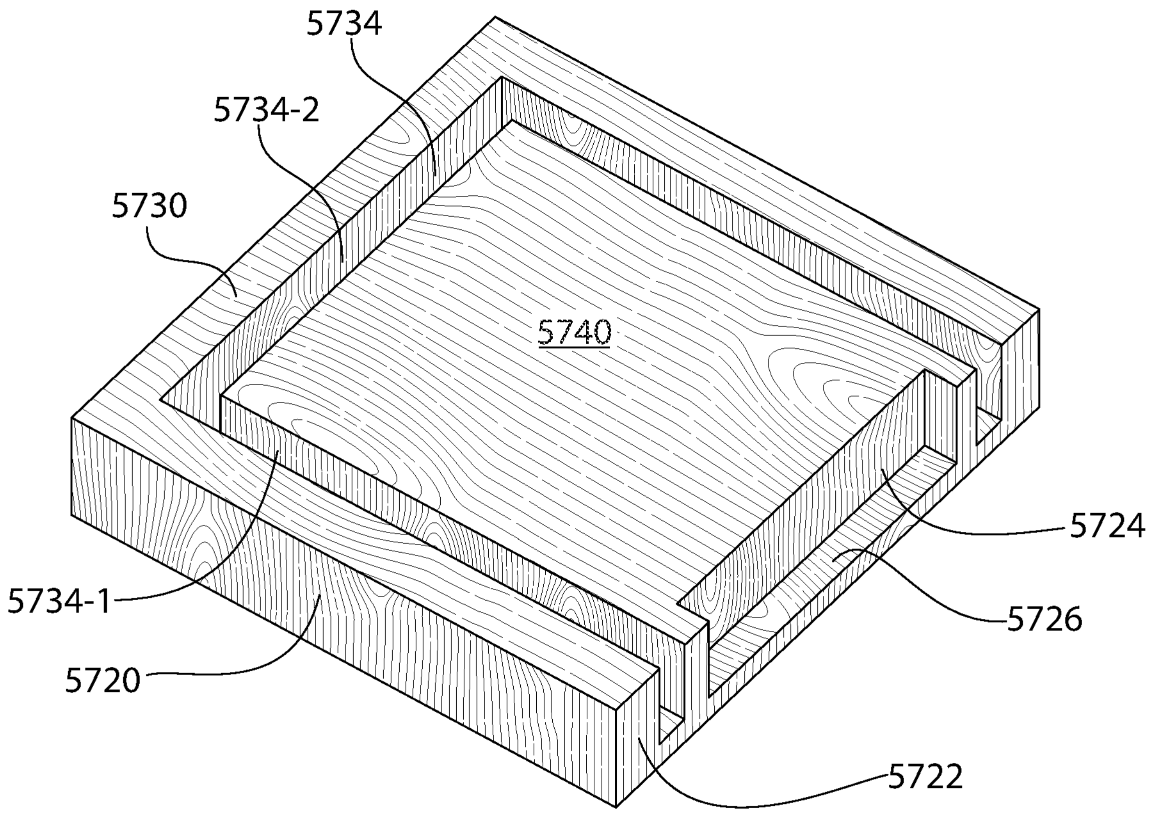
FIG. 103 is an upper perspective view of the underside of a shelf unit in accordance with exemplary embodiments of the invention.
Figure 104:
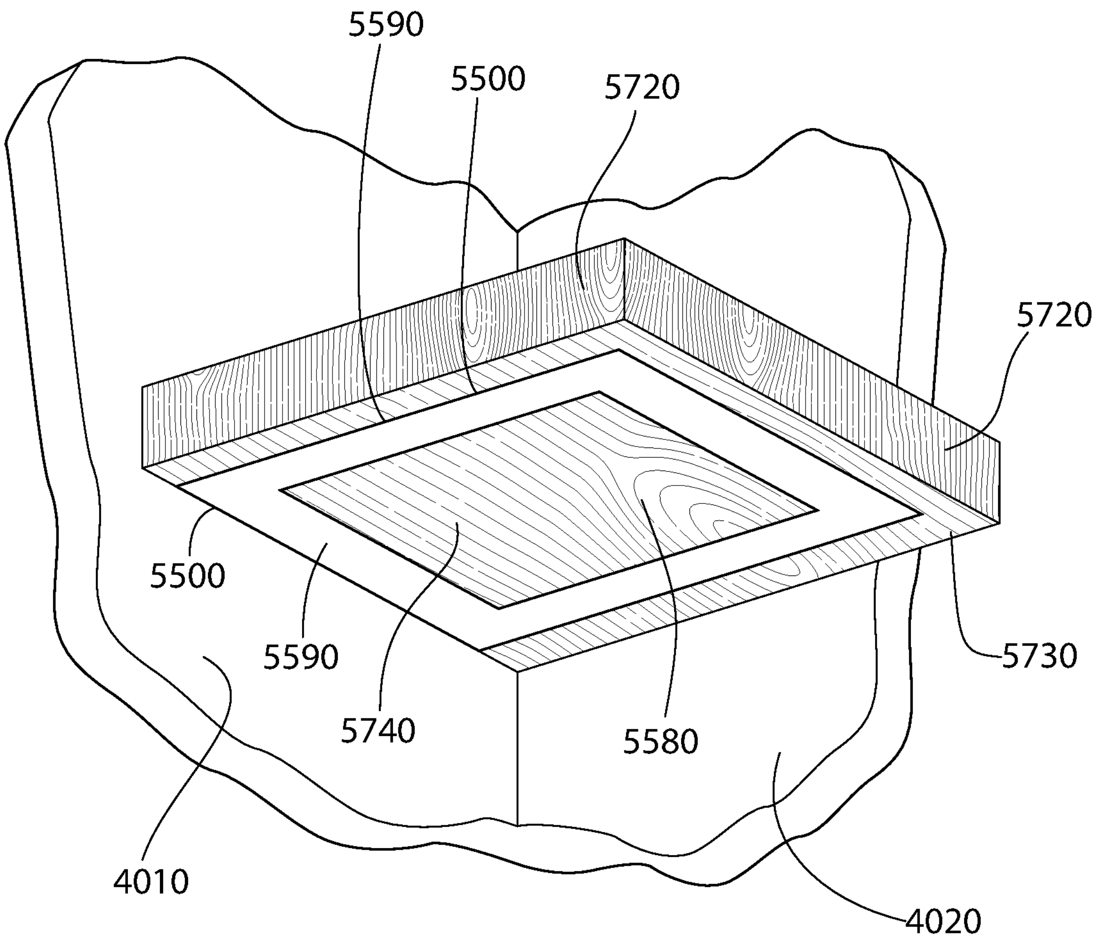
FIG. 104 is a lower perspective view of a shelf unit of FIG. 103, a mounting system, and a support in accordance with exemplary embodiments of the invention in an assembled state.

FIG. 103 shows an example of shelf insert 5700 that has a rectilinear channel 5734 formed in underside 5730 of shelf insert 5700. The channel 5734 is U-shaped including two parallel channel sections 5734-1 that extend front to back and perpendicularly to the rear side of shelf insert 5700 (and wall 4010 when the insert is mounted), and a transverse channel section 5734-2 extending right to left between the front ends of the channels sections 5734-1. The rear ends of groove sections 5732-1 may be open. In contrast to groove 5732 above, channel 5734 may have a width substantially larger than the thickness of the side elements 5510-5540 of the perimeter frame (e.g. 2 times or more). Channel 5734 has a depth (measured between the top and bottom surfaces of shelf insert 5700) which is at least coextensive with the height of the side elements 5510-5530 of the perimeter frame (support structure 500) which are completely inserted into the channel to fully conceal the sides of the frame from view. Channel 5734 allows the top edges of side elements 5510, 5520, 5530 of support structure 5500 to extend beyond underside 5730 and upwards into channel 5734 so that side elements 5510, 5520, 5530 are completely concealed. This can provide a shelf that shows the material of shelf insert 5700 on all three of sides 5720, and also completely hides the otherwise exposed sides 5510, 5520, 5530 of perimeter frame support structure 5500 which are fully inserted into the channel. FIG. 104 shows this embodiment from underneath. Advantageously, because the sides 5510-5530 of the perimeter frame support structure 500 are not visible, all side elements 5510-5540 can be formed of unfinished metal which reduces material and fabrication costs. In embodiments where the side elements of the perimeter frame may be visible (see, e.g. side elements 4410, 4420, and 4430 of support structure 4500 not mounted to wall 4010 seen in FIGS. 79 and 84, and side elements 5510, 5520, and 5530 seen in FIGS. 97-98), the side elements preferably have an external finished and esthetically pleasing appearance (e.g. polished/anodized metal, painted metal, etc.).

With either use of the groove 5732 or channel 5734 previously described herein in shelf insert 5700, the horizontal portions of the perimeter frame support structure 5500 will engage the underside of the central portion of the shelf insert circumscribed by the groove or channel to advantageously provide additional stability to the mount. In any of the embodiments with or without grooves/channels disclosed herein, threaded fasteners (e.g. screws) may be driven upwards through the horizontal portions of the perimeter frame support structures 4500 or 5500 (not visible to room occupants) into the underside of shelf inserts 4600, 4700, or 5700 for more semi-permanent fixation and stability. Any suitable type of screws may be used for this purpose. The horizontal portions of the perimeter frames may include fastener holes to facilitate this semi-permanent fixation of the shelf inserts to the frames.

It is noted that features of certain embodiments can be combined with other embodiments to create embodiments not specifically shown in any of the drawings. As a non-exclusive example, recess 5735 can be included in the embodiments shown in any of the drawings.

FIGS. 105-108 show one non-limiting embodiment of a sliding door mounting system 6100 according to the present disclosure, which in this case controls operation of a double door system. It will be appreciated that in other embodiments, the door mounting system may instead control operation of a single sliding door.

The door mounting system 6100 generally includes a support rail 6102, one or more wall mounts such as mounting standoffs 6110 for anchoring the support rail to a vertical support surface 6104 in the illustrated embodiment, and at least one door bracket 6120 for each of two doors 6101 which are configured for mounting to the top rail 6103 of the doors. Support rail 6102 provides a track for the sliding door 6101. The support rail 6102 has a body which is horizontally elongated in length and defines a horizontal longitudinal mounting axis MA of the door mounting system for convenience of reference. Mounting axis MA defines a direction or path of travel of sliding doors 6101. The support rail 6102 may have a rectilinear configuration in one embodiment as shown; however, other polygonal and non-polygonal shapes may be used. In the non-limiting illustrated embodiment, support rail 6102 has a rectangular prismatic configuration with a corresponding rectangular transverse cross section. Support rail 6102 may include a combination of planar or flat surfaces including a horizontal top surface 6102*a*, opposing horizontal bottom surface 6102*b*, vertical front surface 6102*c*, and opposite vertical rear surface 6102*d* as shown. The support rail 6102 may be hollow or solid in construction depending on the required weight of the door to be supported. A suitable metal such as without limitation steel (including stainless steel), aluminum, titanium, or others may be used for the support rail. The support rail has a length sufficient to accommodate the desired full range of motion for the double doors 6101 to provide a fully open position and access to and through the doorway.

The mounting standoffs 6110 each include a fixed end 6113 fixedly coupled to the rear surface 6102*d* of the support rail 6102 and an opposite free mounting end 114 configured for anchoring to a vertical support surface 104 such as a wall, beam, joist, stud, or any other structural support surface of the building structure. The standoffs 6100 extend perpendicularly from the support rail 6102 and space the rail horizontally/laterally apart from the support surface by a clearance distance. In one embodiment, at least two standoffs may be provided. Additional standoffs 6110 can be provided for added support depending on the weight of the door(s) 6101 and range of motion needed. The standoffs 6110 are arranged so as to not interference with the sliding action of the door. Each standoff 6110 may have an elongated body or shaft which may be cylindrical in one embodiment with circular cross section; however, other non-polygonal or polygonal shapes including rectilinear may be used. The standoffs 6110 may be hollow or solid in construction similarly to the support rail depending on the required weight of the door to be supported. The mounting end 6114 may comprise an enlarged mounting plate 6112 configured for anchoring to the wall or support surface 104 of the building structure. In one embodiment, the mounting plate 6112 may be dimensionally enlarged (e.g. diametrically in the present configuration) relative to the cylindrical shaft 6111 of the standoff 6110 for added support and attachment to the support surface 6104. The mounting plate 6112 may be oriented perpendicularly to the cylindrical shaft 6111 and can include holes for using threaded fasteners to anchor the standoff to the wall. Although a circular mounting plate is shown, other non-polygonal or polygonal shapes (e.g. hexagonal, octagonal, square, rectangular, etc.) may be used which need not match the cross-sectional shape of the shaft 6111. A suitable metal such as without limitation steel, aluminum, titanium, or others may be used for the standoff assemblies.

Although a door system comprising two sliding doors and support rail with two standoffs is shown, the same system may be used for mounting a single door which would comprises only one of the doors shown in FIG. 105 sufficient in width to fully cover and close the doorway. Regardless of the number of doors 6101 provided in the door system, each door may have an associated single or dual door brackets 6120 for mounting the door in a suspended sliding manner from the support rail depending on the weight and size of the door(s). In addition, it bears noting that the support rail 6102 may instead be mounted to a horizontal support surface such as a ceiling or other overhead structure in which case the standoffs 6110 are vertically oriented and attached to the top surface 6102*a* of the rail.

Figure 120:
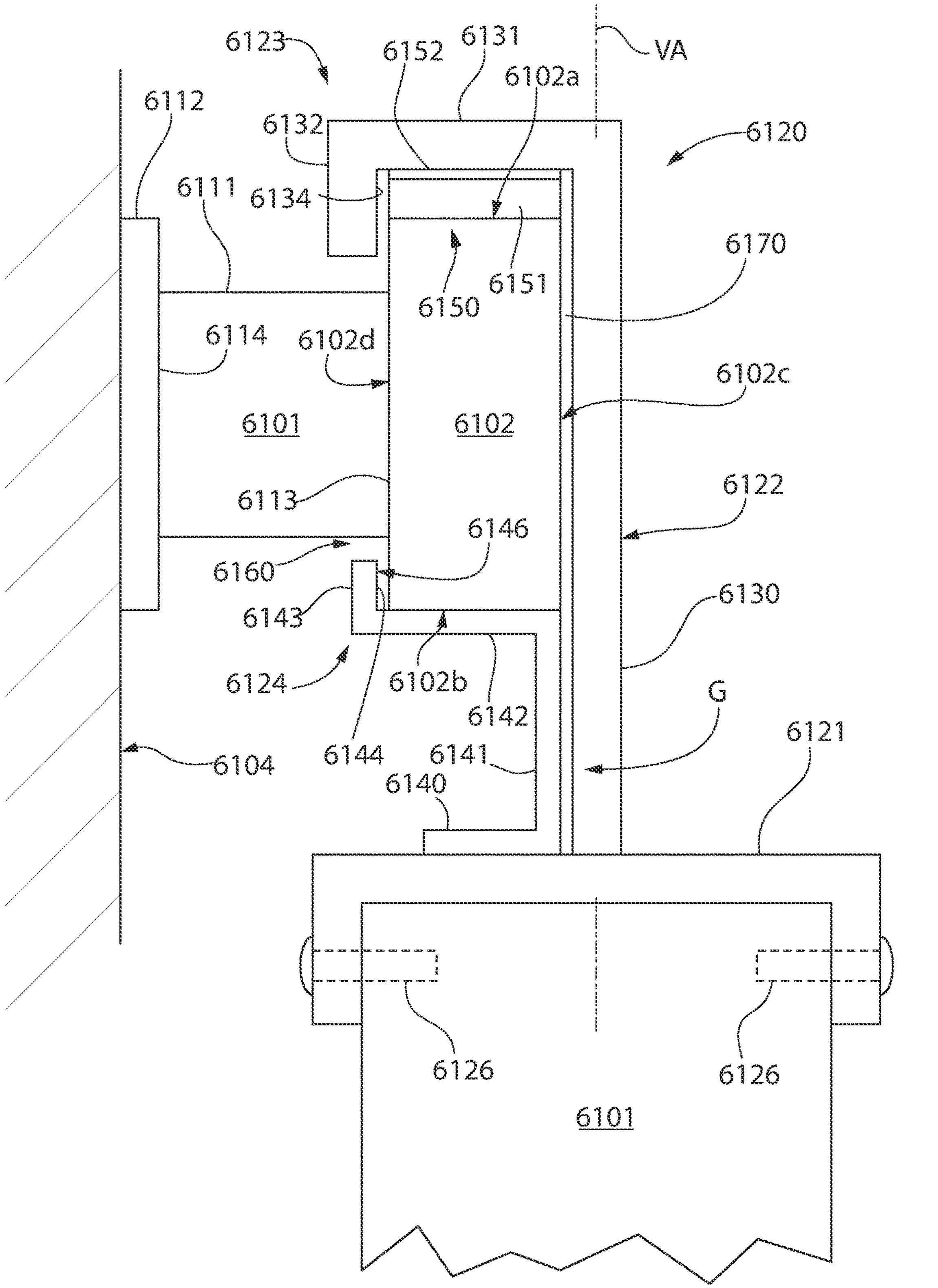

FIGS. 113-118 show the door brackets 6120 in additional detail. Referring generally to FIGS. 105-108 and 9-14, the door brackets 6120 which are attached to the doors are the movable component of the door mounting system 6100 while the support rail 6102 rigidly attached to the vertical support surface wall 6104 is the fixed component. The door brackets 6120 are thus slideably/rollingly mounted to support rail and include features which enhance smooth linear translation and operation of the door. In one embodiment, each door bracket 6120 may be a compound structure including a generally horizontal door mount base plate 6121, a hanger 6122 having a recurvant hooked end 6123 for engaging the support rail, and an anti-sway clip 6124. The anti-sway clip 6124 and hanger 6122 may each be separately attached to the base plate 6121 as shown. The base plate 6121 is configured for mounting to the top rail 6103 of the door(s) 6101. Other than the top rail 6103 which preferably is solid in construction, the remainder of the door beneath this rails may be substantially hollow or solid. In the illustrated embodiment, the base plate 6121 may comprise a flat horizontal metal plate which is configured for attaching to the top rail of the door. A plurality of fastener holes 6125 may be provided in the base plate for securing the mounting bracket 6120 to the door 6101 with threaded fasteners 6126. For aesthetics, a channel 6127 may optionally be routed or otherwise formed in the top rail 6103 of the door 6101 so that the base plate 6121 is recessed and not visible to the user in some embodiments. In other possible embodiments, the base plate 6121 may be shaped as a clevis having an inverted U-shape which slips over the top rail of the door with parallel portions or arms of the clevis engaging the front and rear surfaces of the door via fasteners (see, e.g. FIG. 120). The shape of the base plate 6121 and method of attachment to the top rail 6103 of door 6101 is not limiting of the invention. Any type of door may be used with the door bracket, including for example without limitation wooden doors, composite doors, metal doors, glass doors with metal or wooden top rails for mounting the door bracket, or other.

The hook-shaped hanger 6122 of door bracket 6120 may generally be considered to have a substantially inverted J-shaped configuration in one embodiment. Hanger 6122 includes a vertical front wall section 6130 attached to the base plate 6121 and extending upwards therefrom, a horizontal top wall section 6131 extending perpendicularly and laterally therefrom, and a downward turned vertical rear first flange wall section 6132 extending perpendicular and downwardly therefrom. In one embodiment, the vertical wall section 6130 of hanger 6122 may be centered on the base plate 6121. The centerline of wall section 6130 defines a vertical axis VA of the mounting bracket 6120, which is transversely and perpendicularly oriented to the longitudinal mounting axis MA of the support rail 6102. The vertical axis may be laterally offset from the mounting axis. The hanger wall sections 6130-6132 may be formed as integral parts of a unitary monolithic metal plate-like structure which is cast, extruded, forged, machined, and/or otherwise formed into the configuration shown. The base plate 6121 may be integrally formed with and as part of the monolithic hanger 6122 in some embodiments. In other embodiments, the hanger 6122 and base plate 6121 assembly may have a welded construction wherein some or all of the hanger wall sections are welded together to form an integral construction.

The downward turned rear first flange wall section 6132 of the hanger 6122 has a shorter vertical height than the vertical wall section 6130. The height vertical section added to the thickness of the base plate 6121 defines a height of the door bracket 6120. The first flange wall section 132 is spaced horizontally/laterally apart from and parallel to the vertical wall section 130 and defines downwardly open interior upper recess 6134 beneath the top wall section 6131 for receiving the upper portion of the support rail 102 and a flat linear needle roller bearing 150 assembly (see, e.g. FIGS. 108 and 119), as further described herein.

The anti-sway clip 6124 may generally be considered to have a substantially C-shaped configuration in one embodiment. The anti-sway clip includes a horizontal bottom wall section 6140 attached to the base plate 6121 of the door bracket 6120, a vertical wall section 6141 extending perpendicularly and upwards therefrom, a top wall section 6142 extending perpendicularly and horizontally/laterally therefrom, and an upward turned second flange wall section 6143 extending perpendicularly upwardly therefrom. Similarly to the hanger 6122, the wall sections 6140-6143 of the anti-sway clip 6124 may be formed as integral parts of a unitary monolithic metal plate structure which is cast, extruded, forged, machined, and/or otherwise formed into the configuration shown. The upward turned second flange wall section 143 may have a shorter vertical height than the vertical wall section 141 of the anti-sway clip. The second flange wall section 6143 is spaced horizontally/laterally apart from the vertical wall section 141 and defines an interior lower recess 6144 above the bottom wall section for receiving the lower portion and bottom wall of the support rail (see, e.g. FIG. 108).

As shown, in one embodiment the anti-sway clip 6124 may be shorter in height than the hook-shaped hanger 6122 and/or have a horizontal/longitudinal length which is coextensive to the length of hanger. The base plate 6121 of the hanger may have the same or a greater length than the hanger 6122 and anti-sway clip 6124 to provide a larger purchase area for door fasteners 6126.

The hanger 6122 and anti-sway clip 6124 collectively define a rearwardly open horizontal extending cavity or channel 6160 configured for slideably receiving the support rail 6102 therein. The rear opening of the channel 6160 has a height defined between the first and second flange wall sections 6132, 6143 of the hanger and anti-sway clip respectively which is smaller than the height of the support rail 6102 as shown in FIG. 105. This prevents the support rail 6102 from being laterally/horizontally withdrawn from the channel 6160 in a direction transverse to the longitudinal mounting axis MA of the mounting assembly and captures the support rail in the channel. During assembly of the door mounting system 6100, the support rail 6102 may be inserted in a direction parallel to the horizontal/longitudinal mounting axis MA into the channel 6160 through one of the two open ends 6148 of the bracket 6120.

Advantageously, the second flange wall 6143 of the anti-sway clip 6124 prevents the door 101 from moving or swaying/swinging rearwards in a plane transverse to the sliding direction of the door and longitudinal mounting axis MA if inadvertently pushed against by a user. Flange wall 6143 of anti-sway clip 6124 defines a stop surface 6146 facing inwards towards channel 6160. Stop surface 6146 is arranged to engage the rear surface 6102*d* of the support rail 6102 if the user inadvertently pushes door 6101 in an outward forward direction away from the vertical support surface 6104 (e.g. wall) in the plane transverse to the mounting axis MA. This arrests undesired swaying motion of the door 6101 and prevents damage to the vertical support surface such as a wall behind the door when the door 6101 is in a partially or fully open position, or edges of the adjacent doorway when in a closed position. It bears noting that the combination of the hanger 6122 and anti-sway clip 6124 of the door bracket 6120 via the first and second flange wall sections 6132, 6143 provide fully guided motion of the door 6101 along the support rail 6102 without the need for any additional or separate type of guide elements which are not part of the door bracket 6120.

In one embodiment, the vertical wall section 6141 of the anti-sway clip 6124 may be spaced horizontally/laterally apart from the corresponding vertical wall section 6130 of the hanger 6122, thereby forming a gap G therebetween (see, e.g. FIG. 108). A nylon gasket 6170, which may comprise a sheet of nylon in one embodiment, may be inserted in the gap to abuttingly engage the front wall of the support rail. The nylon gasket 6170 provides a low friction surface arranged to slideably engage the vertical front surface 6102*c* of the support rail 6102 when the bracket is slid along the support rail to open/close the door. In the event the user happens to push inwardly and rearwardly on the door 6101 towards the vertical support surface 6104 (e.g. wall) when sliding the door thereby applying a rearward force acting in a plane transverse to the mounting axis MA of the support rail, nylon gasket 6170 on hanger 6122 will engage the front surface 6102*c* of stationary support rail 6102 ensuring smooth and quiet operation of the door. The nylon gasket 6170 may extend for the full vertical height of the channel 6160 in the mounting bracket in one embodiment. In some embodiments, the nylon gasket 6170 may further extend along the top and first flange walls sections 6131, 6132 of the hanger 6122 within the upper recess 6134. The nylon gasket 6170 may be secured to the vertical wall section 6130 of hanger 6122 by any suitable means such for example adhesives, fasteners, press or frictional fit, clips, fasteners, or other measures. In other possible embodiments, the nylon gasket and gap may be omitted. In yet other embodiments, a felt pad may be substituted for the nylon gasket.

The door bracket 6120 and its foregoing components may be formed of a suitable metal with sufficient thickness and strength to support the weight of the door in a rigid manner without undue deformation or deflection. The door bracket may be formed of steel (including stainless steel), aluminum, titanium, or other metals. When the door mounting system will be used in environments exposed to moisture, the support rail 6102, standoffs 6110, and door bracket 6120 may preferably be constructed of a corrosion resistant material such as without limitation stainless steel or others.

Depending on the width and weight of the door to be hung from the support rail 6102, the door brackets 6120 may have a length which is sufficient to allow a single bracket to be used for each door provided. In other embodiments, preferably two or more door brackets may be used for each door as needed.

The foregoing flat linear needle roller bearing 6150 is disposed at an interface between the support rail 6102 and the hanger 6122 of door bracket 6120. In one embodiment, the roller bearing 6150 may be mounted within the horizontally-extending channel 6160 of the door bracket 6120 on the underside of the top wall section 6131 of the hanger 6122 as shown in FIG. 105. Accordingly, the needle roller bearing 6150 is integrated into the door bracket 6120 and visually concealed for both aesthetics and to avoid dust/debris accumulation which might impede operation of the rollers. The roller bearing 6150 provides a combination of sliding and rolling action of the door bracket 6120 along the support rail 6102 for smooth operation of the door.

Figure 119:
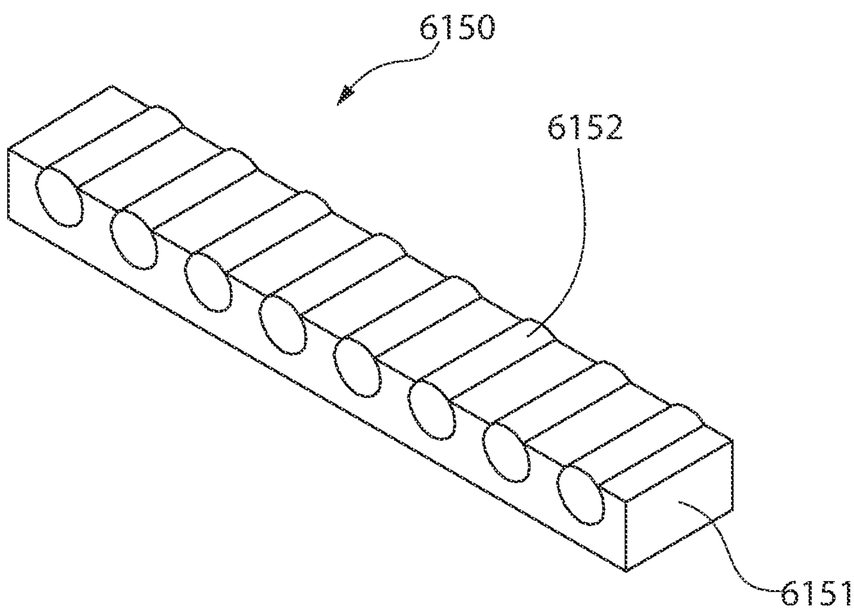

Linear needle roller bearings are well known and commercially available from numerous sources. FIG. 119 schematically depicts the components of a typical needle roller bearing usable with the present door mounting system. The roller bearing 6150 generally includes a plurality of cylindrical radial needle rollers 6152 having a low profile which are mounted in linear horizontal spaced apart relationship in an axially elongated cage strip 6151 (e.g. base retainer). The needle rollers 6152 are each mounted in roller pockets formed in the cage strip 6151 in a manner which allows the rollers to rotate relative to the cage strip. The cage strip 6151 has a straight and relatively flat and somewhat thin configuration. The case strip may preferably be formed of plastic (e.g. nylon, etc.) in one embodiment, or alternatively metal in other embodiments. The needle rollers 6152 may preferably be made of a strong plastic (e.g. polypropylene, etc.) in one embodiment with a hardness capable to withstand rolling engagement with metal support rail and support the weight of the door without substantial deformation which adversely affects the ability of the rollers to rotate in the cage strip. In one embodiment, both the cage strip 6151 and rollers 6152 may be plastic with the hardness of the rollers being preferably harder than the cage strip. Other possible embodiments may use metal needle rollers with metal or plastic cage strips.

In one non-limiting example construction, the cage strip 6151 may have a thickness less than 0.5 inches and the needle rollers 6152 may have a diameter less than the cage strip. In one embodiment, the cage strip (base retainer) may be about 0.375 inches thick and the needle rollers may be about 0.25 inches in diameter. Other sizes/dimensions may of course be used. The cage strip and rollers are constructed to withstand compressive forces transmitted thereon by the horizontal top wall section 6131 of the hook member 6122 of the door bracket created by the weight of the door suspended from the bracket. In operation, the weight of the door is transmitted from the hanger 6122 through the needle roller bearing 6150 to the top surface 6102*a* of the support rail (see, e.g. FIG. 108).

The needle roller bearing 6150 when be mounted to the underside of the top wall section 6131 of the hanger within upper recess 6134 is oriented with the rollers 6152 facing downwards to engage the top surface of the support rail 6102 in the position shown in FIG. 108. Any suitable means may be used for attaching the cage strip 6151 of the roller bearing to the hanger 6122, such as for example without limitation adhesives, retaining clips, tabs, rails, etc. The manner of mounting used is not limiting of the invention. Mounting the needle roller bearing 6150 on the moving door bracket 6120 inside the channel 6160 of the hanger 6122 advantageously minimizes the length of the roller bearing needed to reduce costs. In one embodiment, needle roller bearing 6150 may have a length substantially coextensive with the horizontal length of the door bracket 6120.

Notably, the needle roller bearing 6150 overcomes the high momentum "runaway" door problem encountered with prior suspended sliding door mounting systems noted above. In lieu of large diameter pulley or other style wheels used in the past, use of the present roller bearing 6150 creates less momentum when the door is moved between the open and closed positions. This is attributable to the fact that the multiplicity of needle rollers 6152 provided for the roller bearing each have a substantially smaller diameter (e.g. 0.25 inches diameter) than comparable large prior pulley style wheels previously used which thereby creates less angular momentum than large diameter wheels created by sliding the door open or closed. Typically, one or two significantly larger wheels have been provided heretofore to support the weight of the door in rolling manner. In short, the needle roller bearing 6150 advantageously generates less momentum and linear velocity of the door 6101 itself than prior wheeled barn-style door mounting approaches to avoid damaging the door mounting system hardware at the ends of the track and/or walls adjacent to the track.

In other possible alternative embodiments, the needle roller bearing 6150 may instead be mounted to the top surface 6102*a* of the support rail 6102 in the position shown in FIGS. 109-112. The roller bearing 6150 is oriented in this alternative arrangement with needle rollers 6152 facing upwards to engage the hanger 6106 (specifically, the underside of its horizontal top wall section 6131). In such a configuration, the cage strip 6151 of the roller bearing may have a length extending for at least a majority of, or substantially the entire length of the support rail 6102 as shown. Any suitable means may be used for attaching the cage strip 6151 of the roller bearing 6150 to the support rail 6102, such as for example without limitation adhesives, retaining clips, tabs, rails, etc. In one embodiment, a horizontally-extending channel (not shown but similar to channel 6127 routed in the top of door 6101 seen in FIG. 108) may be routed into the top of the support rail 6102 to at least partially recess the roller bearing 6150 in the rail such that the needle rollers 6152 still protrude upwards beyond the top of the support rail to rollingly engage the hanger 6122 (see, e.g. FIG. 112).

A method for using a door mounting system for sliding translation of the door 6101 will now be briefly described. In one embodiment, the method may include: providing components of the door mounting system 6100 including a longitudinally elongated support rail 6102 defining a mounting axis MA, a pair of elongated wall mounts 6110 rigidly attached to the support rail, a door bracket 6120 including an opposing pair of open ends 6148 and a rearwardly open channel 6160 extending between the ends, and a linear roller bearing 6150 disposed inside the channel; attaching the door bracket to a door; anchoring the support rail to a vertical support surface of a building; lifting the door with attached door bracket; inserting the support rail through the open ends of the door bracket into the channel; engaging the linear roller bearing with a top surface of the support rail; and sliding the door in one of two direction on the support rail. The method may further include the door bracket further including an anti-sway clip; applying a lateral transverse force against the hung door; and engaging a stop surface of the anti-sway clip with the support rail to arrest motion of the door in a plane transverse to the mounting axis. Variations in steps and sequence of the foregoing method are possible.

FIGS. 121-128 depict an alternative embodiment of a customized and modified linear roller bearing 6250 usable in generally a similar manner to roller bearing 6150 previously described herein. Roller bearing 6250 may be mounted within the horizontally-extending channel 6160 of the door bracket 6120 on the underside of the top wall section 6131 of the hanger 6122 as shown in FIG. 121. This is a similar use and mounting arrangement to previous roller bearing 6150 shown in FIG. 108.

Whereas roller bearing 6150 was a generally flat bearing comprising a plurality of needle rollers 6152 arranged in a cage strip 6151 extending linearly in a single horizontal direction or plane, roller bearing 6250 on the other hand includes a multi-directional cage strip. As seen in FIG. 108, roller bearing 6150 when mounted within the horizontally-extending channel 6160 of the door bracket 6120 is positioned and operable to receive the vertical dead weight load or forces of the door 6101 acting in a vertical direction. These forces are transmitted by the bearing to the support rail 6102. By contrast, roller bearing 6250 is configured to absorb both vertical and laterally/horizontally acting loads/forces by virtue of its two-way load bearing design, as described below.

Roller bearing 6250 has a generally elongated U-shaped body which extends axially along mounting axis MA when mounted in door bracket 6120 between opposing ends 6255, 6256. The roller bearing 6250 comprises a cage strip 6259 including a horizontal top wall 6251 and opposing vertical sidewalls 6253 projecting downwards therefrom. Sidewalls 6253 are horizontally/laterally spaced apart defining a downwardly open recess 6262 configured for receiving the top portion of door bracket 6120 therein as shown in FIG. 128. In one embodiment, sidewalls 6253 are arranged perpendicularly to top wall 6251.

A plurality of cylindrical top needle rollers 6252 having a low profile are mounted in linear horizontal spaced apart relationship in the elongated horizontal wall 6251 of the cage strip 6259 (similar to cage strip 6151 and needle rollers 6152 of roller bearing 6150). Needle rollers 6252 are horizontally oriented.

Figure 122:
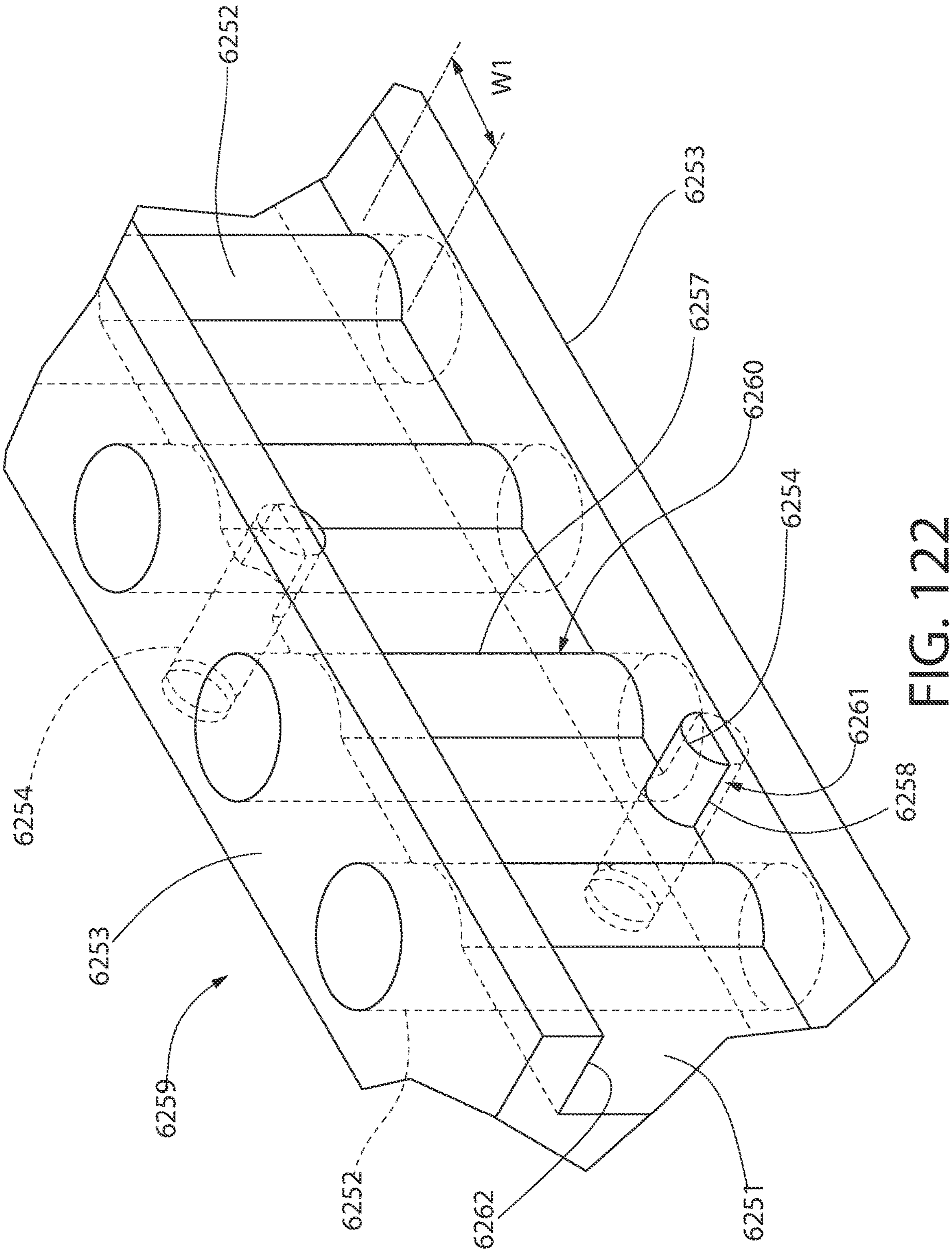

The top needle rollers 6252 are each mounted in respective complementary configured and elongated roller pockets 6257 formed in the horizontal wall 6251 in a manner which allows the rollers to rotate relative to the cage strip. Roller pockets 6257 are arranged perpendicularly to be mounting axis MA when roller bearing 6250 is in a mounted position in door bracket 6120. As best shown in FIG. 122, the roller pockets 6257 each define elongated windows or openings 6260 facing inwards towards recess 6262 and through which only a portion of the diameter of needle rollers 252 are exposed and project upwards above horizontal wall 6251 to rollingly engage the top surface of support rail 6102 (see, e.g. FIG. 128). Openings 6260 have an axial width W1 measured in the direction of mounting axis MA which is less than the diameter of rollers 6252 to trap the rollers in the cage strip 6259, yet allow rotation of the rollers and engagement with support rail 6102.

Each of the sidewalls 6253 of roller bearing 6250 in one embodiment also includes a plurality of axially spaced apart and elongated lateral needle rollers 6254 having a similar cylindrical configuration to rollers 6252. Lateral needle rollers 6254 are oriented vertically and perpendicularly to top needle rollers 6252. Lateral needle rollers 6254 are each similarly mounted in respective roller pockets 6258 having openings 6261 facing inwards towards recess 6262 of the cage strip 259, and through which only a portion of the diameter of needle rollers 6254 are exposed and project laterally inwards into recess 6262 beyond sidewalls 6253 (see, e.g. FIG. 128). Roller pockets 6258 are configured to retain the rollers 6254 in the cage strip in a similar manner to rollers 6252. The lateral needle rollers 6254 are arranged to engage the lateral side surfaces of support rail 6102. In one embodiment, each sidewall 6253 of cage strip 6259 includes at least one pair of lateral needle rollers 6254 as shown for engaging the support rail 6102 (i.e. vertical front and rear surfaces 6102*c*, 6102*d*) at two different points of rolling contact. Advantageously, the lateral needle rollers 6254 prevent rubbing and friction between the lateral side surfaces of support rail 6102 and the door bracket 6120 to ensure smooth rolling movement of door bracket and door 6101 along the support rail during opening and closing sliding motions of the door. In addition, these lateral needle rollers 6254 advantageously also resist any front-to-back swaying motion of the door at the top of support rail 6102, whereas stop surface 6146 formed on anti-sway clip 6124 and facing inwards towards channel 6160 resists any front-to-back swaying motion of the door at the bottom of the support rail 6102 (see, e.g. FIG. 128). This combination of top and bottom anti-sway features advantageously enhances lateral support and resistance to swaying door motions to ensure smooth rolling of the door 6102 along the support rail 6102 even if the user pushes against the door while rolling it open or closed.

In other possible embodiments, only the rear sidewall 6253 of roller bearing 6250 in one embodiment may include a plurality of axially spaced apart and elongated lateral needle rollers 6254 to arrest motion of the door in a plane transverse to the mounting axis MA if the user pushes against the door. In such embodiments, the front sidewall 6253 of the roller bearing 6250 may optionally be omitted in some embodiment, or alternatively retained but without lateral needle rollers 6254. In yet other embodiments having only rear lateral needle rollers 6254 and no front sidewall 6253, such a roller bearing 6250 construction may be used in conjunction with nylon gasket 6170 on hanger 6122 previously described herein.

To ensure the lateral needle rollers 6254 are securely retained in the U-shaped cage strip 6259, a portion of the roller pockets 6258 and rollers 6254 extend at least partially into top wall 6251 of the cage strip (referring FIGS. 121-122 and 124-127). This advantageously maximizes the length of the rollers 6254 while minimizing the height of the cage strip 6250 to allow for a compact bearing mounting arrangement. In one embodiment, at least half of the length of rollers 6254 (e.g. upper portions) may be embedded in the top wall 6251 of the cage strip (see, e.g. cross section of FIG. 126). Accordingly, only the lower portion of rollers 6254 are exposed in cage strip recess 6262 to engage the support rail 6102.

In one embodiment, the lateral needle rollers 6254 may each be interspersed between the top needle rollers 6252. Advantageously, this minimizes the size and profile of the cage strip 6259 allowing for a compact construction. Because the laterally-acting loads or forces imparted to the cage strip 6259 by the door bracket 6120 bracket caused by swaying of door 6101 into/out of the plane of the door are significantly less than the vertically-acting loads or forces caused by the dead weight the door, the lateral needle rollers 6254 may be smaller in diameter and/or length than the top needle rollers 6252 in some embodiments as shown. This further contributes to the compactness of the cage strip 6259. In addition, the lateral needle rollers 6254 may be smaller in number than the top needle rollers 6252. In some embodiments, the lateral needle rollers 6254 may be spaced farther apart than the top needle rollers 6252.

The case strip 6259 may preferably be formed of plastic (e.g. nylon, etc.) in one embodiment, or alternatively metal in other embodiments. The needle rollers 6252, 6254 may preferably be made of a suitably strong plastic (e.g. polypropylene, etc.) in one embodiment to withstand engagement with the metal support rail 6102 for supporting the weight of the door without deformation. Other possible embodiments may use metal needle rollers. Accordingly, any combination of metal or plastic rollers and cage strip materials may be used together. In a preferred but non-limiting embodiment, a plastic case strip 6259 and rollers 6252, 6254 are used. The foregoing same combinations of materials may be used for roller bearing 6150 previously described herein.

FIG. 128 shows the present multi-directional roller bearing 6250 in a mounted position within the horizontally-extending channel 6160 of the door bracket 6120 on the underside of the top wall section 6131 of the hanger 6122. Roller bearing 6250 may have a length substantially coextensive with the horizontal length of the hanger 6122 (in a similar vane to roller bearing 6150 previously described herein). In operation, the top needle rollers 6252 of bearing 6250 ride along the horizontal top surface 6102*a* of the support rail 6102 as the door 6103 is rolled back and forth on the rail. The needle rollers 6252 support the weight of the door and any attached hardware such as door brackets 6120, as previously described herein. If the user happens to push and apply an inward or outward directed force acting normally to the door (i.e. towards the left or right in FIG. 128) while sliding the door axially along mounting axis MA, this will cause the door to tilt or cant out of its normal vertical hanging plane about the hanger 6122 at top which suspends the door 6101 from the mounting rail 6102. The lateral needle rollers 6254, however, advantageously provides lateral guidance for door 6101 via rolling engagement with the lateral vertical front surface 6102*c* and/or opposite vertical rear surface 6102*d* of the support rail 6102. This not only helps stabilize the door, but advantageously reduces friction between the door bracket 6120 and support rail 6102 to ensure smooth gliding motion of the door.

FIG. 129 shows an alternative embodiment of mounting door bracket 6120 configured for mounting to hollow door 6300 which may lack a solid top rail 6103 as described in previous embodiments. This allows a low cost and extremely light weight sliding door system to be provided. Door 6300 includes substantially planar non-structural front panel 6302 and rear panel 6303 each of which define a major exterior surface. Panels 6302 and 6303 may have a solid construction and be arranged in spaced parallel relationship, thereby collectively defining a substantially hollow interior 6301 of the door. The interior 6301 may or may not optionally include suitable acoustic sound insulation (e.g. fiberglass, mineral wool, etc.) in some embodiments to reduce sound transference from one building space to the adjacent one. In some embodiments, the interior 6301 may include a paper or fiberglass honeycomb cellular core insert comprising a plurality of open cells if added strength is desired to structurally reinforce the door.

The opposing lateral front and rear edges 6121*a* of the door mount base plate 6121 on the bottom of door bracket 6120 are fixedly embedded in and secured within door interior 6301 to the front and rear panels 6302, 6303. The embedment may include the use of suitable industrial adhesives in some embodiment to permanently affix the base plate 6121 to the panels. Base plate 6121 is positioned for mounting at the upper or top portion of door 6300 as shown. It bears noting that in addition to fixing the base plate 6121 of door bracket 6120 to the door 6300, the base plate also serves the role of structurally coupling the front and rear door panels 6301, 6302 together at the top of the door. To couple the panels together near the bottom of the door, an embedment plate 6304 of similar construction and size to base plate 6121 may be provided having front and rear edges 6304*a* also embedded in the panels in similar fashion. Each of base plate 6121 and embedment plate 6304 may have a planar rectangular shape similar to that further shown in FIG. 113 for door bracket 6120. The base plate 6121 and/or embedment plate 6304 may have axial widths that extend for less than a majority of the axial width of the door 6300 (similar to that shown in FIG. 105 for door 6101), or alternatively more than a majority of the width for firmly securing the front and rear panels together. The base plate 6121 and embedment plate 6304 may have the same or different widths.

FIG. 130 is a longitudinal cross sectional view representative of both of the linear needle roller bearings 6150, 6250 of the door mounting system brackets of FIGS. 108 and 128 with respect to engagement of the needle rollers 6152, 6252 with the top surface 6102*a* of the mounting rail 6102. This sectional view is taken along a bisecting vertical plane as indicated in FIGS. 108 and 128 through the central portion of the roller bearings 6150, 6250 so that the vertical needle rollers 6254 of the door hanger embodiment of roller bearing 6250 is not visible in FIG. 130. As seen, the horizontal oriented needle rollers 6152, 6252 rollingly engage the top surface 6102*a* of mounting rail 6102 when the door(s) is/are operated.

Referring now to FIG. 131, the present invention is directed to a floating shelf apparatus 7010 that comprises a shelf 7100 and a mounting bracket 7200. In some embodiments, the invention may be directed to the shelf 7100 and its structure, in other embodiments the invention may be directed to the mounting bracket 7200 and its structure, and in still other embodiments the invention may be directed to the floating shelf apparatus 7010 in its entirety, which includes the shelf 7100, the mounting bracket 7200, and possibly some additional components as described herein.

The floating shelf apparatus 7010 may also comprise one or more fasteners 7300 and/or a first adhesive component 7400 for coupling the mounting bracket 7200 to a support surface such as a wall 7000. In some embodiments the one or more fasteners 7300 may be used without the first adhesive component 7400, in other embodiments the first adhesive component 7400 may be used without the one or more fasteners 7300, and in still other embodiments both the fasteners 7300 and the first adhesive component 7400 may be used. As used herein, the terms "support surface" and "wall" may refer to any interior wall-like surface whether it be formed from drywall, gypsum board, plasterboard, or the like. Furthermore, the "support surface" or "wall" may include tile or other decorative features thereon and the floating shelf apparatus 7010 may be coupled thereto without having to remove the tile or decorative elements. In some embodiments, the support surface or wall is a vertical surface, although this is not required in all embodiments. The support surface or wall may be a wall surrounding a shower or bathtub or another wall located within a bathroom. However, the invention is not to be limited to the location at which the floating shelf apparatus is hung; rather, the above are merely provided for example only.

Thus, the floating shelf apparatus 7010 may be attached to a wall 7000, whether the wall 7000 is bare, covered with paint, covered with tile, covered with other decorative features, or the like. The wall 7000 may comprise a first surface 7011 and a second surface 7012 opposite the first surface 7011. The first surface 7011 is the surface of the wall 7000 that is exposed and to which the mounting bracket 7200 is directly coupled. The second surface 7012 is generally hidden from view. The first and second surfaces 7011, 7012 may be planar and they may be vertical (i.e., perpendicular to the horizon), although this is not required in all embodiments.

In the exemplified embodiment, the first adhesive component 7400 is located between the first surface 7011 of the wall 7000 and the mounting bracket 7200. This may serve two purposes: (1) to provide for an offset between the mounting bracket 7200 and the wall 7000 so that the shelf 7100 can more easily mount to the mounting bracket 7200; and (2) to waterproof the installation. In the exemplified embodiment, there is an offset between a portion of the mounting bracket 7200 and the wall 7000 even when the first adhesive component 7400 is not used, as will be discussed in more detail below.

The first adhesive component 7400 may be a double-sided adhesive tape such as, for example without limitation, 3M™ VHB™ tape. Of course, any other type of double-sided adhesive tape may alternatively be used. Furthermore, the first adhesive component 7400 may be a glue rather than a tape. Moreover, in other embodiments the first adhesive component 7400 may be omitted and not used in the floating shelf apparatus 7010 as it may not be needed for acceptable operation and use of the floating shelf apparatus 7010.

Referring to FIGS. 131-134, the shelf 7100 of the floating shelf apparatus 7010 will be further described. In some embodiments, the shelf 7100 may be formed entirely from metal, such as for example without limitation stainless steel, aluminum, or the like. Of course, the invention is not to be so limited and in other embodiments the shelf 7100 could be made from wood, plastic, plastic coated with a metal such as stainless steel, or other materials. Furthermore, although in some embodiments the shelf 7100 may be solid, in other embodiments it may be hollow. The shelf 7100 generally comprises a ledge portion 7110 and a mounting portion 7150. The mounting portion 7150 is configured to couple the shelf 7100 to the mounting bracket 7200 and the ledge portion 7110 is configured to hold items thereon for display or any other reason. As will be described herein, based on the interaction between the mounting bracket 7200 and the mounting portion 7150 of the shelf 7100, the ledge portion 7110 may be oriented perpendicular to the wall 7000 or it may be oriented at a slight upward angle (i.e., 1-5°, or more specifically 1-3° off from perpendicular) so that a front edge of the ledge portion 7110 is slightly higher than a rear edge of the ledge portion 7110. The purpose of upwardly angling the ledge portion 7110 is to prevent items from falling off the shelf 7100 when the shelf 7100 is used in a wet environment such as a bathtub or shower.

The ledge portion 7110 comprises a top surface 7111, a bottom surface 7112 opposite the top surface 7111, and a sidewall surface 7113 extending between the top and bottom surfaces 7111, 7112. The top and bottom surfaces 7111, 7112 are generally planar and parallel to one another, although it may only be necessary for the top surface 7111 and not also the bottom surface 7112 to be planar in alternative embodiments because the top surface 7111 of the ledge portion 7110 forms at least a portion of a support surface 7101 of the shelf 7100. In still other embodiments the top surface 7111 may have a texture or be wavy or the like so that it is also not exactly planar. The sidewall surface 7113 includes a front or distal portion 7114, a rear or proximal portion 7115, and side portions 7116, 7117 that extend between the front and rear portions 7114, 7115.

In the exemplified embodiment, the shelf 7100 is elongated along a longitudinal axis A-A that extends from one of the side portions 7116 of the sidewall surface 7113 to the other of the side portions 7117 of the sidewall surface 7113. When mounted to the mounting bracket 7200 and hanging from the wall 7000, the rear portion 7115 of the sidewall surface 7113 is adjacent to and faces the wall 7000 and the front portion 7114 is the distal-most portion furthest from the wall. Furthermore, the top surface 7111 of the ledge portion 7110 of the shelf 7100 may extend generally perpendicularly from the wall 7000 so that items stored thereon will not slide off, even in a wet environment. In some embodiments, the top surface 7111 of the ledge portion 7110 of the shelf 7100 may be oriented at a slight angle ⊖2 (see FIG. 136C) relative to the wall 7000, such as being angled upwardly thereby forming an acute angle of between 80° and 89°, more specifically between 85° and 89°, and still more specifically between 87° and 89° relative to the front surface 7011 of the wall 7000. This will enhance the ability of the shelf 7100 to maintain items thereon without sliding off even under wet conditions (such as when the shelf 7100 is hung from a wall in a shower or bath or near a sink).

As noted above, the mounting portion 7150 of the shelf 7100 is the portion that facilitates the mounting of the shelf 7100 to the mounting bracket 7200, the details of which will be described below. The mounting portion 7150 of the shelf 7100 extends from the rear portion 7115 of the sidewall surface 7113 of the ledge portion 7110 of the shelf 7100.

The mounting portion 7150 of the shelf 7100 comprises a vertical wall 7151 that extends from the rear portion 7115 of the sidewall surface 7113 of the ledge portion 7110 of the shelf 7100. In the exemplified embodiment, the vertical wall 7151 extends downwardly from the bottom surface 7112 of the ledge portion 7110 but does not also extend upwardly beyond the top surface 7111 of the ledge portion 7110. In other embodiments, an example of which is provided in FIG. 139 which will be described briefly below, the vertical wall 7151 may extend upwardly from the top surface 7111 of the ledge portion 7110 instead of downwardly from the bottom surface 7112 of the ledge portion 7110. This modification will not affect the operability and function of the floating shelf apparatus 710. The vertical wall 7151 has a front surface 7152 and a rear surface 7153 that is opposite to the front surface 7152. The front surface 7152 of the vertical wall 7151 faces away from the mounting bracket 7200 and the wall 7000 and the rear surface 7153 of the vertical wall 7151 faces the mounting bracket 7200 and the wall 7000. The ledge portion 7110 of the shelf 7100 extends from the front surface 7152 of the vertical wall 7151. In the exemplified embodiment, the ledge portion 7110 extends perpendicularly from the front surface 7152 of the vertical wall 7151, but it may be oriented at a slight angle in other embodiments.

The mounting portion 7150 of the shelf 7100 also comprises a sidewall 7154 extending from the rear surface 7153 of the vertical wall 7151 to a distal end 7155. The sidewall 7154 comprises an inner surface 7160 and an outer surface 7161. Furthermore, the sidewall 7154 comprises an upper portion 7156, a lower portion 7157, a first side portion 7158, and a second side portion 7159. In the exemplified embodiment, the upper portion 7156 of the sidewall 7154 is parallel to the top surface 7111 of the ledge 7110. Although described herein with each of the portions 7156-7159 of the sidewall 7154 extending from the vertical wall 7151, in some embodiments the upper portion 7156 may extend directly from the rear portion 7115 of the sidewall surface 7113 of the ledge portion 7110 of the shelf 7100. Specifically, the vertical wall 7151 may merely extend from the bottom surface 7112 of the ledge portion 7110 and the upper portion 7156 may not be coupled directly to the vertical wall 7151. However, for purposes of this application, the vertical wall 7151 is considered to extend all the way to the top surface 7111 of the ledge portion 7110 and the upper portion 7156 of the sidewall 7154 is considered to extend from the vertical wall 7151. Thus, the vertical wall 7151 may include the rearmost portion of the ledge portion 7110 of the shelf 7100.

In some embodiments, the support surface 7101 of the shelf 7100 is formed collectively by an outer surface 7169 of the upper portion 7156 of the sidewall 7154 and the top surface 7111 of the ledge 7110. In such embodiments, the outer surface 7169 of the upper portion 7156 of the sidewall 7154 and the top surface 7111 of the ledge 7110 may be flush with one another. Thus, the outer surface 7169 of the upper portion 7156 of the sidewall 7154 and the top surface 7111 of the ledge 7110 form a continuous and unbroken surface upon which items can be held. The inner surface 7160 of the sidewall 7154 and the rear surface 7153 of the vertical wall 7151 collectively define a mounting cavity 7162 of the mounting portion 7150 of the shelf 7100. Thus, the rear surface 7153 of the vertical wall 7151 forms a floor of the mounting cavity 7162 and the sidewall 7154 forms a boundary wall that surrounds the mounting cavity 7162. The mounting cavity 7162 has an open rear end 7163 located at the distal end 7155 of the sidewall 7154.

The upper portion 7156 of the sidewall 7154 may have a first length L1 measured from the vertical wall 7151 to the distal end 7155 and the lower portion 7157 of the sidewall 7154 may have a second length L2 measured from the vertical wall 7151 to the distal end 7155. In some embodiments, the second length L2 may be greater than the first length L1. In some embodiments, the difference between the second length L2 and the first length L1 may be between 0.1 mm and 3 mm, more specifically between 0.5 mm and 72.5 mm, and still more specifically between 1 mm and 2 mm.

The mounting portion 7150 of the shelf 7100 also comprises a mounting element 7170 that is configured to interact with a portion of the mounting bracket 7200 to mount the shelf 7100 to the mounting bracket 7200 and thereby hang the shelf 7100 from a wall to which the mounting bracket 7200 is coupled. In the exemplified embodiment, the mounting element 7170 comprises the upper portion 7156 of the sidewall 7154 and a flange portion 7165 that extends from the distal end 7155 of the upper portion 7156 of the sidewall 7154 in a direction into the mounting cavity 7162. The flange portion 7165 may extend generally perpendicularly from the upper portion 7156 of the sidewall 7154, although the transition between the upper portion 7156 of the sidewall 7154 and the flange portion 7165 may be formed by a curved surface. Thus, the first mounting element 7170 may be generally L-shaped, although there may be some curvature between the linear sections (i.e., the upper portion 7156 of the sidewall 7154 and the flange portion 7165) of the "L."

In the exemplified embodiment, there is a second adhesive component 7500 coupled to the rear surface 7153 of the vertical wall 7151 of the mounting portion 7150 of the shelf 7100. The shelf 7100 may be sold to consumers with the second adhesive component 7500 pre-applied thereon with a release liner covering its outer surface Of course, in other embodiments the second adhesive component 7500 may be coupled to the shelf 7100 after purchase by a consumer.

The second adhesive component 7500 may be, similarly to the first adhesive component 7400, a double-sided adhesive tape such as, for example without limitation, 3M™ VHB™ tape. Of course, any other type of double-sided adhesive tape or other adhesives may alternatively be used. This includes foam-based double-sided adhesive tape, plastic sheet-based double-sided adhesive tape, glue dots, or the like. Furthermore, the first adhesive component 7400 may be a glue rather than a tape in still other embodiments. In the exemplified embodiment, the second adhesive component 7500 is located along a lower-most portion of the rear surface 7153 of the vertical wall 7151 such that a bottom edge of the second adhesive component 7500 is in contact with the lower portion 7157 of the sidewall 7154. Of course, in other embodiments the second adhesive component 7500 may be spaced slightly apart from the lower portion 7157 of the sidewall 7154. However, the second adhesive component 7500 should be positioned along a lower portion of the rear surface 7153 of the vertical wall 7151 to ensure that it is aligned with a portion of the mounting bracket 7200, as described in more detail below. Thus, at least a portion of the second adhesive component 7500 should be located at a position that is between 1/16 inch and 1/4 inch, and more specifically between 1/16 inch and 1/8 inch from the bottom portion 7157 of the sidewall 7154.

The second adhesive component 7500 may extend along an entirety of a length of the vertical wall 7151 (in a direction of the longitudinal axis A-A), although this is not required in all embodiments and it could be formed by a plurality of spaced apart adhesive portions, sections, dots, linear segments, or the like. In some embodiments, the second adhesive component 7500 may extend from the bottom corner of the mounting cavity 7162 (i.e., adjacent to the lower portion 7157 of the sidewall 7154) to a height of about 1/4 inch, although the exact size and dimensions of the second adhesive component 7500 are not to be limiting of the present invention in all embodiments. As will be better appreciated from the description below with specific reference to FIGS. 136A-136C, the second adhesive component 7500 may prevent accidental disassembly of the shelf 7100 from the mounting bracket 7200 by forming an adhesive bond therebetween.

Referring now to FIGS. 131 and 135, the mounting bracket 7200 will be described in greater detail. The mounting bracket 7200 has a front surface 7201 and a rear surface 7202 opposite the front surface 7201, the rear surface 7202 being the surface that faces the wall 7000 when the mounting bracket 7200 is coupled to the wall 7000. The mounting bracket 7200 comprises a first portion 7210, a second portion 7230, and a third portion 7250. The first portion 7210 is the portion that is coupled directly to the wall 7000 (or indirectly via the first adhesive component 7400) and the second and/or third portions 7230, 7250 assist in the mounting of the shelf 7100 to the mounting bracket 7200. The second and third portions 7230, 7250 therefore have a very specific structure that aids in the mounting of the shelf 7100 to the mounting bracket 7200.

The first portion 7210 of the mounting bracket 7200 comprises a front surface 7211 and a rear surface 7212 opposite the front surface 7211. The front surface 7211 of the first portion 7210 forms a part of the front surface 7201 of the mounting bracket 7200 and the rear surface 7212 of the first portion 7210 forms a part of the rear surface 7202 of the mounting bracket 7200. In the exemplified embodiment, the front and rear surfaces 7211, 7212 of the first portion of the mounting bracket 7200 are planar and parallel to one another. In other embodiments, the rear surface 7212 of the first portion 7210 of the mounting bracket 7200 may be planar but the front surface 7211 may be non-planar. The rear surface 7212 of the mounting bracket 7200 is the surface that faces the wall 7000 when the mounting bracket 7200 is coupled to the wall 7000. Therefore, forming the rear surface 7212 to be planar may be desirable to ensure that the first portion 7210 of the mounting bracket 7200 can be abutted directly against the front surface 7011 of the wall 7000 (or the first adhesive component 7400 thereon). The rear surface 7212 of the mounting bracket 7200 may be in direct contact with the first surface 7011 of the wall 7000 if the first adhesive component 7400 is omitted, but if the first adhesive component 7400 is included than the rear surface 7212 of the mounting bracket 7200 is in direct contact with the first adhesive component 7400. In the exemplified embodiment, the rear surface 7212 of the first portion 7210 of the mounting bracket 7200 lies in a plane P-P. When the mounting bracket 7200 is coupled to the wall 7000, the plane P-P is parallel to the front surface 7011 of the wall 7000.

Furthermore, the first portion 7210 of the mounting bracket 7200 extends from a first end 7213 to a second end 7214 along a longitudinal axis B-B. In the exemplified embodiment, the mounting bracket 7200 is a monolithic, integral structure formed from metal, although plastic or the like may be used in alternative embodiments. Thus, the first, second, and third portions 7210, 7230, 7250 of the mounting bracket 7200 are merely portions of a monolithic structure and the mounting bracket 7200 is a unitary structure rather than being formed from separate structures that are coupled together. Of course, the bracket 7200 could be comprised of separate structures that are coupled together in alternative embodiments. The mounting bracket 7200 should have sufficient strength and rigidity to support the shelf 7100 and any items stored thereon without the mounting bracket 7200 detaching from the wall 7000 and without the mounting bracket 7200 bending or otherwise causing the shelf 7100 coupled thereto to bend downwardly under the force of the items stored thereon.

As shown in FIG. 131, the first portion 7210 of the mounting bracket 7200 may include one or more mounting holes 7290 that extend from the front surface 7211 to the rear surface 7212. Each mounting hole 7290 is configured to receive one of the fasteners 7300 so that the mounting bracket 7200 can be coupled to the wall 7000, thereby attaching the mounting bracket 7200 to the first surface 7011 of the wall 7000. In the exemplified embodiment, the fasteners 7300 are depicted as nails, however, they could be screws or other items of hardware in other embodiments. Moreover, the fasteners 7300 could be omitted if the first adhesive component 7400 has sufficient bonding strength to support the weight of the mounting bracket 7200, the shelf 7100, and any items stored on the shelf 7100.

The second portion 7230 of the mounting bracket 7200 is a generally S-shaped portion that extends upwardly from the first end 7213 of the first portion 7210 of the mounting bracket 7200. Thus, the second portion 7230 of the mounting bracket 7200 comprises three legs that form the S-shape. Specifically, the second portion 7230 of the mounting bracket 7200 comprises a first leg 7231 that extends upwardly from the first end 7213 of the first portion 7210 of the mounting bracket 7200 in a direction away from the plane P-P, a second leg 7232 that extends upwardly from the first leg 7231 in a direction towards the plane P-P, and a third leg 7233 that extends from the second leg 7232 in a direction away from the plane P-P. In the exemplified embodiment, the third leg 7233 does not extend upwardly, but instead extends horizontally.

More specifically, the first leg 7231 extends at an oblique angle relative to the plane P-P in a direction away from the plane P-P. Thus, the first leg 7231 extends along an axis C-C that is oblique to the plane P-P. In some embodiments, the angle formed between the plane P-P and the axis C-C may be between 35° and 55°, and more specifically between 40° and 50°, and more specifically approximately 45°, although other ranges are possible. The second leg 7232 extends from the first leg 7231 back towards the plane P-P and the second leg 7232 is also oblique to the plane P-P. Thus, the second leg 7232 extends along an axis D-D that is oblique to the plane P-P. In some embodiments, the angle formed between the plane P-P and the axis C-C may be between 35° and 55°, and more specifically between 40° and 50°, and still more specifically approximately 45°, although other ranges are possible. Furthermore, an angle formed between the axis C-C and the axis D-D may be between 85° and 95°, and more specifically approximately 90°. The third leg 7233 extends from the second leg 7232 in a direction away from the plane P-P and is generally perpendicular to the plane P-P. Thus, the third leg 7233 extends along an axis E-E that is generally perpendicular to the plane P-P. An angle formed between the axis E-E and the axis D-D may be between 40° and 50° in some embodiments.

The third leg 7233 has a top surface 7234 that forms a top surface of the second portion 7230 of the mounting bracket 7200, which is also a top surface of the mounting bracket 7200. In the exemplified embodiment, the top surface 7234 of the third leg 7233 is planar and is perpendicular to the plane P-P. The third leg 7233 terminates at a distal end 7235. In the exemplified embodiment, the distal end 7235 forms a surface that is parallel to the plane P-P.

The second portion 7230 of the mounting bracket 7200 does not have pointed corners at the junctions of the first, second, and third legs 7231, 7232, 7233. Rather, the second portion 7230 of the mounting bracket 7200 has a first bent portion (or curved portion) 7236 as the junction of the first and second legs 7231, 7232 and a second bent portion (or curved portion) 7237 at the junction of the second and third legs 7232, 7233. The first bent portion 7236 is a convex portion of the front surface 7201 of the mounting bracket 7200 and the second bent portion 7237 is a convex portion of the rear surface 7202 of the mounting bracket 7200. In the exemplified embodiment, the first bent portion 7236 and the distal end 7235 of the third leg 7233 lie in a common plane Q-Q. However, in other embodiments the first bent portion 7236 could be recessed relative to the plane Q-Q without affecting the function of the floating shelf apparatus 710.

The second bent portion 7237 faces the plane P-P in which the rear surface 7212 of the first portion 7210 of the mounting bracket 7200 lies. Thus, when the mounting bracket 7200 is coupled to the wall 7000, the second bent portion 7237 faces the wall 7000. However, the second bent portion 7237 (and specifically an apex thereof) is spaced apart from the plane P-P (and hence also the wall 7000) by a gap G. The apex of the second bent portion 7237 may be aligned with the axis B-B of the first portion 7210 of the mounting bracket 7200 in some embodiments, although this is certainly not required in all embodiments so long as the apex of the second bent portion 7237 is offset or otherwise spaced apart from the plane P-P.

In the exemplified embodiment, the third portion 7250 of the mounting bracket 7200 is a linear portion that extends downwardly from the second end 7214 of the first portion 7210 in a direction away from the plane P-P. The third portion 7250 extends along an axis F-F that is oblique to the plane P-P. The third portion 7250 terminates at a distal end 7251. In the exemplified embodiment, the distal end 7251 forms a surface that is parallel to the plane P-P and that lies in the plane Q-Q, although this is not required in all embodiments and it is possible that the distal end 7251 may extend beyond or be recessed relative to the plane Q-Q in other embodiments, one example of which will be described below with reference to FIG. 138.

The axis F-F along which the third portion 7250 extends and the axis C-C along which the first leg 7231 of the second portion 7230 extends diverge with increasing distance from the plane P-P as those axes C-C, F-F extend in a direction away from the plane P-P towards the bent portion 7236 and the distal end 7251, respectively. Thus, while the first leg 7231 of the second portion 7230 extends upwardly from the first end 7213 of the first portion 7210, the third portion 7250 extends downwardly from the second end 7214 of the first portion 7210.

Referring to FIGS. 136A-136C, the process or method of installing the floating shelf apparatus 7010 on the wall 7000 will be described. Although not shown in this embodiment, the first step may be to couple the first adhesive component 7400 either to the wall 7000 or to the rear surface 7212 of the first portion 7210 of the mounting bracket 7200. Either way, the first adhesive component 7400 will be disposed between the rear surface 7212 of the first portion 7210 of the mounting bracket 7200 and the first surface 7011 of the wall 7000, although this is not illustrated in this embodiment (it is illustrated in the embodiment depicted in FIGS. 138A-138C, described below, and it should be appreciated that the first adhesive component 7400 may be included in this embodiment as well).

Next, the fasteners 7300 are inserted through the mounting holes 7290 in the mounting bracket 7200 to couple the mounting bracket 7200 to the wall 7000. The fasteners 7300 may also extend through mounting holes 490 in the first adhesive component 7400, illustrated in FIG. 131, although the mounting holes 490 may not be required in all embodiments. In FIG. 136A, the mounting bracket 7200 is already coupled to the wall 7000 and the shelf 7100 is being held in preparation for mounting to the mounting bracket 7200. In that regard, the shelf 7100 is positioned with the mounting portion 7150 adjacent to the mounting bracket 7200 to facilitate the mounting of the shelf 7100 to the mounting bracket 7200.

Next, referring to FIG. 136B, the mounting portion 7150 of the shelf 7100 is moved towards the mounting bracket 7200 so that the mounting element 7170 of the mounting portion 7150 of the shelf 7100 engages the second portion 7230 of the mounting bracket 7200. Specifically, the flange portion 7165 of the mounting element 7170 is inserted into the gap G that exists between the second bent portion 7237 of the second portion 7230 of the mounting bracket 7200 and the first surface 7011 of the wall 7000 (which lies in the plane P-P). In this position, the mounting element 7170 wraps around the second bent portion 7237 of the second portion 7230 of the mounting bracket 7200 and the top surface 7111 of the ledge portion 7110 of the shelf 7100 extends upwardly at an oblique angle relative to the first surface 7011 of the wall 7000. During this procedure, the ledge portion 7110 is held at an angle relative to the wall 7000 so that an acute angle is formed between the front surface 7011 of the wall 7000 and the top surface 7111 of the ledge portion 7110.

FIG. 136C illustrates the floating shelf apparatus 7010 in the fully assembled state with the shelf 7100 mounted to the mounting bracket 7200 and the mounting bracket 7200 coupled to the wall 7000. Moving from FIG. 136B to FIG. 136C in the assembly process, the shelf 7100 rotates downwardly until the top surface 7111 of the ledge portion 7110 of the shelf 7100 is oriented at an approximately perpendicular angle relative to the first surface 7011 of the wall 7000 (an approximately perpendicular angle including angles that are between 87° and 93° relative to the first surface 7011 of the wall 7000). When the shelf 7100 is mounted to the mounting bracket 7200, the mounting bracket 7200 is located within the mounting cavity 7162 of the mounting portion 7150 of the shelf 7100. In the exemplified embodiment, an entirety of the mounting bracket 7200 is located within the mounting cavity 7162, although in other embodiments only portions of the mounting bracket 7200 may be located within the mounting cavity 7162. However, it is preferable that the mounting bracket 7200 be entirely concealed by the shelf 7100 to provide the shelf with the appearance that it is "floating" or "suspended" on the wall 7000.

Furthermore, the upper portion 7156 of the sidewall 7154 (which forms a portion of the mounting element 7170) rests atop of the top surface 7234 of the third leg 7233 of the second portion 7230 of the mounting bracket 7200 (said top surface 7234 also forming the top surface of the mounting bracket 7200). Furthermore, the flange portion 7165 of the mounting element 7170 extends into the gap G between the bent portion 7237 and the wall 7000. Thus, the mounting element 7170 of the mounting portion 7150 of the shelf 7100 rests atop the third leg 7233 of the second portion 7230 of the mounting bracket 7200 and extends into the gap G between the bent portion 7237 of the second portion 7230 of the mounting bracket 7200 and the wall 7000 or plane P-P. This interaction between the mounting element 7170 of the mounting portion 7150 of the shelf 7100 and the second portion 7230 of the mounting bracket 7200 achieves a mounting of the shelf 7100 to the mounting bracket 7200. In this position, the shelf 7100 is supported on the wall 7000 by the mounting bracket 7200 which is coupled to the wall 7000.

Because the inner surface of the mounting element 7170 is curved between the flange portion 7165 and the upper portion 7156 of the sidewall 7154, the shelf 7100 can pivot/rotate upwardly and downwardly until it is essentially locked into position. Specifically, the curved inner surface of the mounting element 7170 can rotate/pivot around the second bent portion 7237 of the mounting bracket, as shown in FIGS. 136B and 7136C.

In addition to the above, when the shelf 7100 is mounted to the mounting bracket 7200 as shown in FIG. 136C, the distal end 7251 of the third portion 7250 of the mounting bracket 7200 contacts or otherwise engages the second adhesive component 7500 that is located on the rear surface 7153 of the vertical wall 7151 of the mounting portion 7150 of the shelf 7100. The contact between the distal end 7251 of the third portion 7250 of the mounting bracket 7200 and the second adhesive component 7500 stops disassembly of the shelf 7100 relative to the mounting bracket 7200 (i.e., locks the shelf 7100 into place relative to the mounting bracket 7200). Specifically, without having the mounting bracket 7200 contact the second adhesive component 7500, applying an upward force onto the bottom surface 7112 of the ledge portion 7110 of the shelf 7100 would cause the shelf 7100 to tilt/rotate upwardly. However, because the third portion 7250 of the mounting bracket 7200 contacts the second adhesive component 7500, this creates a coupling or adhesive bond between the third portion 7250 of the mounting bracket 7200 and the lower part of the mounting portion 7150 of the shelf 7100 via the second adhesive component 7500, which prevents such tilting of the shelf 7100 even if bumped as noted above.

As noted above, in some embodiments the lower portion 7157 of the sidewall 7154 of the mounting portion 7150 of the shelf 7100 has a greater length than the upper portion 7156 of the sidewall 7154 of the mounting portion 7150 of the shelf 7100. Thus, when the shelf 7100 is mounted to the mounting bracket 7200, the lower portion 7157 of the sidewall 7154 will cause the shelf 7100 to be inclined relative to the wall 7000 rather than being perpendicular to the wall 7000. However, because the difference in the lengths between the lower and upper portions 7157, 7156 of the sidewall 7154 is small (i.e., 1-2 mm), the angle ⊖2 of the shelf 7100 relative to the wall 7000 may be between 85° and 89°, and more specifically between 87° and 89°. Of course, in other embodiments the shelf 7100 may be oriented perfectly or approximately perpendicular relative to the first surface 7011 of the wall 7000.

Referring now to FIG. 137, a mounting bracket 7600 is illustrated in accordance with an alternative embodiment of the present invention. The mounting bracket 7600 is very similar to the mounting bracket 7200 except for the differences described herein. Thus, the features and components of the mounting bracket 7600 will be similarly numbered to the mounting bracket 7200 except that the 7600-series of numbers will be used. For similarly numbered features, it should be appreciated that the description provided above with regard to the mounting bracket 7200 is applicable unless specifically stated otherwise herein.

The mounting bracket 7600 comprises a first portion 7610, a second portion 7630, and a third portion 650. The second portion 7630 comprises a first leg 7631, a second leg 7632, and a third leg 7633. The first and second portions 7610, 7630 of the mounting bracket 7600 are identical to the first and second portions 7210, 7230 of the mounting bracket 7200. In this embodiment, the distal end 7635 of the third leg 7633 is aligned with the first bent portion 7636 (i.e., they lie in a common plane R-R). However, in this embodiment the distal end 7651 of the third mounting portion 7650 is not also aligned with the distal end 7635 of the third leg 7633. Rather, the third mounting portion 7650 extends through and beyond the plane R-R. Stated another way, in this embodiment the rear surface 7612 of the first portion 7610 of the mounting bracket 7600 lies in a plane P1-P1. The distal end 7635 of the third leg 7633 is located a first distance D1 from the plane P1-P1 and the distal end 7651 of the third portion 7650 is located a second distance D2 from the plane P1-P1, the second distance D2 being greater than the first distance D1. As can be seen, the first and second distances D1, D2 are measured in a direction that is perpendicular to the plane P1-P1.

FIGS. 138A-138C illustrate the manner in which the shelf 7100 is mounted to the mounting bracket 7600. This process is identical to the process described above with regard to FIGS. 136A-136C and thus a detailed description will not be provided herein the interest of brevity, but rather the drawings can speak for themselves along with a review of the description of FIGS. 136A-136C. However, it will be mentioned that in FIGS. 138A-138C, the first adhesive component 7400 is illustrated between the mounting bracket 7600 and the wall 7000 and that the first adhesive component 7400 can be similarly positioned in the embodiment of FIGS. 136A-136C.

Furthermore, the only difference in FIGS. 138A-138C relative to that shown and described with reference to FIGS. 136A-136C is that because D2 is greater than D1, the top surface 7101 of the shelf 7100 may be at a slightly greater upwardly inclined angle relative to the wall 7000. Specifically, the distal end 7651 of the third portion 7650 of the mounting bracket 7600 being spaced further from the wall 7000 than the distal end 7635 of the third leg 633 of the second portion 7630 of the mounting bracket 7600 may cause the top surface 7101 of the shelf 7100 to be angled relative to the wall 7000. The angle ⊖1 may be between 85° and 89° in some embodiments.

FIG. 139 illustrates an alternative embodiment of a floating shelf apparatus 710*a* whereby the mounting bracket 7200 is used to mount a shelf 7100*a* to the wall 7000. Thus, the mounting bracket 7200 is the one previously described, but the shelf 7100*a* has a slightly different configuration. Specifically, in this embodiment the vertical wall 7151*a* of the mounting portion 7150*a* extends upwardly from the top surface 7111*a* of the ledge portion 7110*a* of the shelf 7100*a* rather than downwardly from the bottom surface as with the shelf 7100 that was previously described. Other than this minor difference, the shelf 7100*a* is identical to the shelf 7100 and thus the description provided above is applicable and the shelf 7100*a* will not be described in greater detail in the interest of brevity.

Finally, referring to FIG. 140, a floating shelf apparatus 710*b* is illustrated in still another embodiment in an assembled state. In this embodiment, the mounting bracket is not visible, but it should be appreciated that it may be identical to the mounting bracket 7200 or the mounting bracket 7600 previously described herein. In this embodiment, the floating shelf apparatus 710*b* comprises a shelf 7100*b* that is different in structure than the shelves 7100, 7100*a* described previously. Specifically, in this embodiment the ledge portion 7110*b* of the shelf 7100*b* is two-tiered such that it includes an upper ledge 7180*b* and a lower ledge 7181*b* that are spaced apart from one another by a gap. The upper ledge 7180*b* comprises a top surface 7183*b* and a wall 7182*b* protruding upwardly from the top surface 7183*b* along the perimeter of the upper ledge 7180*b*. The wall 7182*b* may prevent items from rolling or falling off of the upper ledge 7180*b*. The mounting of the shelf 7100*b* to the mounting bracket 7200, 7600 is identical to that which has been described above. Thus, the shelf 7100*b* includes a mounting portion 7150*b* that is identical the mounting portion 7150 of the shelf 7100 described above.

Referring first to FIGS. 141 and 142, a shelf system 8000 is illustrated in accordance with an embodiment of the present invention. In FIG. 141, the shelf system 8000 is fully assembled and mounted to a support structure 8005, whereas FIG. 142 illustrates the shelf system 8000 with the component parts exploded and separated to illustrate each of the components that make up the shelf system 8000. The shelf system 8000 provides an aesthetically pleasing and efficient apparatus for mounting a shelf to a support structure, ensuring ease of installation and robust structural integrity. In the exemplified embodiment, the support structure 8005 is a wall as that is the most typical location for installation or mounting of a shelf. However, the invention is not to be so limited in all embodiments and the support structure 8005 may be structures other than a wall in other embodiments, such as an outer wall of a cabinet, dresser, or other piece of furniture, an exterior wall rather than an interior wall such as drywall, or the like. Furthermore, the support structure 8005 may be a wall formed from any material, such as a brick wall, a wall formed from drywall or plasterboard, a wood wall, etc.

The shelf system 8000 generally comprises a mounting bracket assembly 8110 comprising a first mounting bracket 8020 and a second mounting bracket 8120, a first wall fastener 8050 and a second wall fastener 8150 that are used to mount the mounting bracket assembly 8110 to the support surface 8005, a shelf 8010, a first shelf fastener 8030 and a second shelf fastener 8130 which are coupled to the shelf 8010 and used to attach the shelf 8010 to the mounting bracket assembly 8010, and a first hook member 8060 and a second hook member 8160. The first and second hook members 8060, 8160 may be considered accessories and they may not be included in all embodiments of the shelf system 8000. Thus, the first and second hook members 8060, 8160 may serve as optional components because they do not facilitate the mounting of the shelf 8010 to the support surface 8050 and could readily be omitted without affecting the structural integrity of the shelf system 8000 or the ability to mount the shelf system 80000 to the support structure 8005. The first and second hook members 8060, 8160 are merely additional components that provide an additional benefit to a user as a place to hang items such as coats, umbrellas, hats, keys, or the like.

The mounting bracket assembly 8110 is the component or components that are mounted directly to the support structure 8005 and to which the shelf 8010 is coupled to hang the shelf from the support structure 8005. Thus, the shelf 8010 is not attached directly to the support structure 8005, but rather the shelf 8010 is attached to the mounting bracket assembly 8110, and the mounting bracket assembly 8110 is attached to the support structure 8005.

In the exemplified embodiment, the mounting bracket assembly 8110 comprises the first mounting bracket 8020 and the second mounting bracket 8120. The first mounting bracket 8020 comprises a wall engaging portion 8021 and a first shelf engaging portion 8022 and the second mounting bracket 8120 comprises a second wall engaging portion 8121 and a second shelf engaging portion 8122. The first and second wall engaging portions 8021, 8121 are the portions of the first and second mounting brackets 8020, 8120 that are in contact with or abutted against the support structure 8005 when mounted to the support structure 8005. The first and second shelf engaging portions 8022, 8122 are the portions of the first and second mounting brackets 8020, 8120 which facilitate the attachment of the shelf 8010 to the first and second mounting brackets 8020, 8120. Although two of the shelf engaging portions 8022, 8122 are shown in the exemplified embodiment, more than two shelf engaging portions 8022, 8122 could be used to accommodate a shelf having a longer width. Furthermore, it may be possible to attach the shelf 8010 using a mounting bracket assembly having a single shelf engaging portion in other embodiments.

Although in the exemplified embodiment the mounting bracket assembly 8110 comprises the first and second mounting brackets 8020, 8120 which are separate and distinct components, the invention is not to be so limited in all embodiments. Specifically, in other embodiments the mounting bracket assembly may be a singular component such that the singular mounting bracket assembly includes the first and second shelf engaging portions as a part of a unitary structure. Thus, for example, the mounting bracket assembly 8110 may include a singular wall engaging portion and the first and second shelf engaging portions 8022, 8122 may extend from that singular wall engaging portion, albeit in a spaced apart manner. In other words, the first and second wall engaging portions 8021, 8121 as shown in FIGS. 141 and 142 could be connected to form a singular component. Thus, whether the mounting bracket assembly 8110 comprises a singular component, two components, or more than two components is not to be limiting of the invention in all embodiments. Moreover, in some embodiments the wall engaging portions 8021, 8121 may be omitted and the mounting bracket assembly 8110 may comprise only the shelf engaging portions 8022, 8122, which may be abutted against the support structure 8005 and also serve as the connection point for the shelf 8010. The mounting bracket assembly 8110, and specifically the first and second mounting brackets 8020, 8120 thereof, may be formed from metal such as stainless steel in some embodiments, although other materials may be used in other embodiments such as plastic, wood, or the like.

Returning to the exemplified embodiment, the shelf system 8000 includes the first and second mounting brackets 8020, 8120 for securing the shelf 8010 to the support structure 8005. Each of the first and second mounting brackets 8020, 8120 includes the wall engaging portion 8021, 8121 and the shelf engaging portion 8022, 8122. In the exemplified embodiment, the wall engaging portions 8021, 8121 are flat plate-like structures, but it need not be limited as such in all embodiments. The wall engaging portions 8021, 8121 have a square shape and act as the base for the first and second mounting brackets 8020, 8120. Although the wall engaging portions 8021, 8121 are square in shape in the exemplified embodiment, they may be rectangular, triangular, circular, or any other shape in other embodiments. The wall engaging portions 8021, 8121 have a front surface 8023, 8123 and a rear surface 8024, 8124 opposite the front surface 8023, 8123, and a thickness measured between the front and rear surfaces 8023, 8123, 8024, 8124. The rear surfaces 8024, 8124 of the wall engaging portions 8021, 8121 of the mounting brackets 8020, 8120 are in contact with the support structure 8005 when the shelf apparatus 8001 is mounted thereto.

As mentioned above, the first and second mounting brackets 8020, 8120 acts as the intermediary between the shelf 8010 and the support structure 8005. As such, the first and second mounting brackets 8020, 8120 provide an offset space for the shelf 8010 such that a rear edge 8012 of the shelf 8010 does not come in surface contact with an exposed outer surface 8008 of the support structure 8005. This offset space is directly proportional to the length of the first and second mounting brackets 8020, 8120 measured from the rear surface 8024, 8124 of the wall engaging portions 8021, 8121 to a distal end 8025, 8125 of the shelf engaging portions 8022, 8122. The greater the length of the first and second mounting brackets 8020, 8120, the greater the offset space between the shelf 8010 and the support structure 8005. Similarly, the smaller the length of the first and second mounting brackets 8020, 8120, the smaller the offset space between the shelf 8010 and the support structure 8005. An offset space provides the added benefit of being able to store larger items on a shelf apparatus 8001 without the item extending past a front edge 8011 of the shelf 8010 which is opposite the support structure 8005. Additionally, the offset space helps to prevent larger household items that are placed on the shelf apparatus 8001 from coming in-contact-with and damaging the support structure 8005. Therefore, the offset space helps to minimize or prevent larger household items from falling off of the shelf 8010 while also minimizing or preventing the further damaging or scuffing of the support structure 8005.

Referring to FIGS. 142 and 143, the first mounting bracket 8020 of the mounting bracket assembly 8110 will be described in greater detail. In the exemplified embodiment, the second mounting bracket 8120 is an exact replica of the first mounting bracket 8020 such that the first and second mounting brackets 8020, 8120 are structurally identical. Thus, features of the second mounting bracket 8120 will be numbered in the same manner as features of the first mounting bracket 8020, except that the numbering used will start with a "1," and this will be done even where that specific structure is not being called out with reference to the second mounting bracket 8120.

As noted above, the first mounting bracket 8020 comprises the wall engaging portion 8021 and the shelf engaging portion 8022. The wall engaging portion 8021 could be omitted in some embodiments and the first mounting bracket 8020 could include just the shelf engaging portion 8022. In the exemplified embodiment, the wall engaging portion 8021 comprises the front surface 8023 and the rear surface 8024, with the rear surface 8024 of the wall engaging portion 8021 forming the rear surface of the first mounting bracket 8020. When mounted to the support surface (i.e., the wall) 8005, the rear surface 8024 of the wall engaging portion 8021 of the first mounting bracket 8020 (or at least a portion thereof) is in direct contact with the support surface 8005. The wall engaging portion 8021 has a square shape in the exemplified embodiment, but this is not to be limiting of the invention in all embodiments and the wall engaging portion 8021 could take on other shapes including circular, rectangular, other polygonal shapes, irregular shapes, or the like.

The shelf engaging portion 8022 of the first mounting bracket 8020 protrudes from the front surface 8023 of the wall engaging portion 8021 and terminates at the distal end 8025. Thus, when the mounting bracket assembly 8110 is mounted to the support surface 8005, the shelf engaging portion 8022 extends from the support surface 8005 to the distal end 8025, which is spaced a distance from the support surface 8005. In the exemplified embodiment, the shelf engaging portion 8022 is in the shape of a square prism. However, the invention is not to be so limited in all embodiments and the shelf engaging portion 8022 may be in the shape of a cylinder in other embodiments, or the shelf engaging portion 8022 may be a prism having different polygonal base shapes. The shape of the shelf engaging portion 8022 may be determined based on a desired aesthetic and are not to be limiting of the present invention in all embodiments. The shelf engaging portion 8022 is tubular in shape (without limitation to the transverse cross-sectional shape of the tube) because it has a hollow interior, as described in greater detail below.

The first mounting bracket 8020 is a unitary and integral structure, such that the shelf engaging portion 8022 and the wall engaging portion 8021 are integrally coupled together as a single, unitary part. In other embodiments, the shelf engaging portion 8022 could be manufactured separately from the wall engaging portion 8021 and coupled thereto using fasteners, adhesive, welding, or the like.

The first mounting bracket 8020 comprises a first mounting aperture 8026 which facilitates both the mounting of the first mounting bracket 8020 to the support structure 8005 and the coupling or mounting of the shelf 8010 to the first mounting bracket 8020. The first mounting aperture 8026 extends from a first opening 8027 formed into the distal end 8025 of the shelf mounting portion 8022 to a second opening 8028 formed into the rear surface 8024 of the wall mounting portion 8021. In embodiments that omit the wall mounting portion 8021, the first mounting aperture 8026 may simply extend entirely through the shelf mounting portion 8022. The first mounting aperture 8026 extends from the rear surface 8024 of the wall mounting portion 8021 to the distal end 8025 of the shelf mounting portion 8022 along a cavity axis A-A. Thus, the first mounting aperture 8026 extends entirely through the first mounting bracket 8020 along the full length of the first mounting bracket 8020 so that fasteners can be inserted into the first mounting aperture 8026 through one end of the first mounting bracket 8020 and then extend out through the other end for purposes of mounting the first mounting bracket 8020 to the support structure 8005, as described in more detail below.

The shelf mounting portion 8022 of the first mounting bracket 8020 comprises a sidewall 8200 that extends from the wall mounting portion 8021 to the distal end 8025. The sidewall 8200 comprises an outer surface 8201 and an inner surface 8202, with the inner surface 8201 defining and surrounding the first mounting aperture 8026 (or at least a portion thereof which extends through the shelf mounting portion 8022). The inner surface 8202 of the sidewall 8200 of the shelf mounting portion 8022 of the first mounting bracket 8020 comprises a shoulder 8203. In the exemplified embodiment, the shoulder 8203 comprises a ledge portion 8204 that extends in a direction that is perpendicular to the cavity axis A-A and a tapering portion 8205 that extends in a direction that is oblique to the cavity axis A-A and oblique to the ledge portion 8204. The tapering portion 8205 is located between the ledge portion 8204 and the rear surface 8024 of the first mounting bracket 8020. In some embodiments, the tapering portion 8205 may be omitted and the shoulder 8203 may include only the ledge portion 8204.

Thus, the shoulder 8203 separates the first mounting aperture 8026 into a first portion 8206 which extends from the distal end 8025 to the shoulder 8203 and a second portion 8207 which extends from the rear surface 8024 to the shoulder 8204. The first portion 8206 of the first mounting aperture 8026 forms a cavity of the first mounting aperture 8026 within which the shelf fasteners 8030, 8130 are disposed when the shelf 8010 is coupled to the first and second mounting brackets 8020, 8120. The first portion 8206 of the first mounting aperture 8026 has a first transverse cross-sectional area. The second portion 8207 of the first mounting aperture 8026 has a second transverse cross-sectional area, which is smaller than the first transverse cross-sectional area.

The shelf mounting portion 8022 of the first mounting bracket 8020 also comprises a first locking aperture 8208 which extends from the outer surface 8201 of the sidewall 8200 to the inner surface 8202 of the sidewall 8200. Thus, the first locking aperture 8208 forms another passageway into the first mounting aperture 8026 which is distinct from the first opening 8027 in the distal end 8025 of the shelf mounting portion 8022 and from the second opening 8028 in the rear surface 8024 of the wall mounting portion 8021. The first locking aperture 8208 extends from the outer surface 8201 to the inner surface 8202 in a direction that is perpendicular to the cavity axis A-A. The first locking aperture 8208 is configured to receive a first set screw 8040 (shown in FIG. 142). Furthermore, the shelf mounting portion 8122 of the second mounting bracket 8120 comprises a second locking aperture (not shown, but identical to the first locking aperture 8208 since the second mounting bracket 8120 is identical to the first locking bracket 8020). The second locking aperture of the shelf mounting portion 8122 of the second mounting bracket 8120 is configured to receive a second set screw 8140 (see FIG. 142). It is being reiterated here that in the exemplified embodiment, the second mounting bracket 8120 is identical to the first mounting bracket 8020 and thus all features, structures, shapes, and materials described herein with reference to the first mounting bracket 8020 are applicable to the second mounting bracket 8120.

Referring briefly to FIG. 144, a bottom view of the shelf system 8000 is provided with the shelf system 8000 in an assembled state. FIG. 144 provides a view of the first and second set screws 8040, 8140 coupled to the first and second shelf engaging portions 8022, 8122 of the first and second mounting brackets 8020, 8120. The first and second set screws 8040, 8140 can be tightened to lock the shelf 8010 to the mounting bracket assembly 8110 and loosened to unlock the shelf 8010 from the mounting bracket assembly 8110 to allow for disassembly of the shelf system 80000.

The hook members 8060, 8160 are also shown in FIG. 144, although these may be omitted in other embodiments as mentioned above.

Referring to FIGS. 145A and 145B, the first and second wall fasteners 8050, 8150 will be further described in accordance with one exemplary and non-limiting embodiment of the present invention. FIGS. 145A and 145B will be described with reference to the first wall fastener 8050, it being understood that the second wall fastener 8150 is identical to the first wall fastener 8050. Thus, while the description is provided with reference to the first wall fastener 8050, it is entirely applicable to the second wall fastener 8150. The first wall fastener 8050 is an expandable fastener that may be used to secure the first mounting bracket 8020 to the support structure 8005, whereas the second wall fastener 8150 is identical to the first wall fastener 8050 and may be used to secure the second mounting bracket 8120 to the support structure 8005. The support structure 8005 may be a hollow wall, such as drywall, plasterboard, or the like in some embodiments, although the support structure 8005 is not limited to these structures in all embodiments as discussed above.

In the exemplified embodiment, the first wall fastener 8050 comprises a sheath portion 8051 and a central threaded bolt 8053 which is positioned within an interior of the sheath portion 8051. That is, the sheath portion 8051 is positioned around the central threaded bolt 8053 so as to surround the central threaded bolt 8053. The sheath portion 8051 comprises a plurality of bendable columns 8052, a cup portion 8054, and a head 8055. The cup portion 8054 may comprise threads on its inner surface that mate with the threads on the central threaded bolt 8053 to couple the sheath portion 8051 to the central threaded bolt 8053 and to facilitate altering of the first wall fastener 8050 between the unexpanded and expanded states shown in FIGS. 145A and 145B, respectively.

Due to the threaded coupling between the cup portion 8054 and the central threaded bolt 8053, rotating the central threaded bolt 8053 relative to the sheath portion 8051 will cause the cup portion 8054 to move axially along the central threaded bolt 8053 to allow altering of the first wall fastener 8050 between the unexpanded and expanded states. Thus, from the unexpanded state shown in FIG. 145A, a user can rotate the central threaded bolt 8053 clockwise relative to the sheath portion 8051, which causes the cup portion 8054 to move downwardly along the length of the central threaded bolt 8053. Continued rotation of the central threaded bolt 8053 causes the cup portion 8054 to continue to move axially along the length of the central threaded bolt 8053 until the first wall fastener 8050 is in the fully expanded state as shown in FIG. 145B. In the expanded state, the sheath portion 8051 comprises wings 8056 that are oriented perpendicularly relative to the axis of the central threaded bolt 8053. These wings 8056 are able to engage a rear surface of a wall or other support structure (such as support structure 8005 shown in FIG. 141) to prevent the first wall fastener 8050 from being removed from the support structure 8005 once installed and altered into the expanded state. This is shown in FIG. 141 with reference to the second wall fastener 8150, and the components of the second wall fastener 8150 are numbered identically to the first wall fastener 8050 except that the 8100 series of numbers are used. The first and second wall fasteners 8050, 8150 are identical in the exemplified embodiment. Additional details about the first and second wall fasteners 8050, 8150 may be found in U.S. Pat. No. 9,453,524, issued on Sep. 27, 2016, the entirety of which is incorporated herein by reference.

Referring to FIGS. 143, 145A, and 145B, while in the unexpanded state as shown in FIG. 145A, the first wall fastener 8050 can be inserted into the first mounting aperture 8026 of the first shelf engaging portion 8022 through the first opening 8027. The first wall fastener 8050 can be moved axially within the first mounting aperture 8026 until a portion of the first wall fastener 8050 extends through the second opening 8028 in the rear surface 8024 of the first mounting bracket 8020. Once fully inserted, the head 8055 of the first wall fastener 8050 remains within the first mounting aperture 8026 of the first mounting bracket 8020 because the head 8055 of the first wall fastener 8050 has a greater cross-sectional area than the second portion 8207 of the first mounting aperture 8026, which prevents the first wall fastener 8050 from passing entirely through the first mounting aperture 8026. Thus, a lower flange of the head 8055 rests against the shoulder 8203 of the first mounting bracket 8020 and prevents the first wall fastener 8050 from passing entirely through the first mounting aperture 8026. This will be described in greater detail below with reference to FIG. 147.

Once the portion of the first wall fastener 8050 passes through the second opening 8028 in the rear surface 8024 of the first mounting bracket 8020 and into an opening in the support structure 8005 (such as opening 8006 shown in FIG. 142), the central threaded bolt 8053 may be rotated clockwise. As described above, and with reference to FIG. 145B, such rotation of the first wall fastener 8050 causes the cup portion 8054 to move downwardly along the central threaded bolt 8053 in the direction of the head 8055. As mentioned above, the cup portion 8054 may have threads that engage or mate with threads on the central threaded bolt 8053 to facilitate the movement of the cup portion 8054 during rotation of the central threaded bolt 8053. This movement of the cup portion 8054 causes the four bendable columns 8052 to fold outwardly, forming the wings 8056. The first wall fastener 8050 can be rotated until the four bendable columns 8052 reach the state shown in FIG. 145B, which is the fully expanded state of the first wall fastener 8050. In such a state, ends of the bendable columns 8052 which form the wings 8056 will abut against the surface of the support structure 8005 which is opposite to the exposed surface, to securely mount the first mounting bracket 8020 to the support structure 8005. FIG. 141 illustrates the second wall fastener 8150 with its wings 8056 abutted against the non-exposed surface 8007 of the support structure 8005.

The specific embodiment of the wall fastener 8050 described with reference to FIGS. 145A and 145B is merely one exemplary embodiment of the wall fastener 8050. In other embodiments, the wall fastener 8050 may be a conventional screw, which may be used alone or in conjunction with a wall anchor to mount the first mounting bracket 8020 (and the mounting bracket assembly 8110) to the support structure 8005. Other fasteners can also be used in other embodiments. For example, if the support structure 8005 is a wall and it includes studs, a screw screwed into the studs or a nail hammered into the studs may provide sufficient support for the shelf assembly 8001 and any items held thereon. The particular first and second wall fasteners 8050, 8150 described herein may be more applicable for a hollow support structure that does not have studs or when the shelf assembly 8001 is being mounted at a location that does not include studs. However, it should be appreciated the first and second wall fasteners 8050, 8150 described herein are not needed for mounting the mounting bracket assembly 8110 to the support structure 8005 in all embodiments, and other more generic fasteners such as screws, bolts, nails, and the like could be used for this purpose in other embodiments.

Referring to FIGS. 141, 142, and 146, the shelf 8010 will be described in more detail. The shelf 8010 comprises the front edge 8011, the rear edge 8012, a first side edge 813, a second side edge 8014, an upper surface or support surface 8015, and a lower surface 816. The upper surface 8015 is the surface of the shelf 8010 that supports any items placed thereon. In general, it is desirable for the upper surface 8015 of the shelf 8010 to be oriented perpendicular to the support structure (i.e., wall) 8005 so that any items placed thereon do not fall off of the shelf 8010. The shelf 8010 may be formed from wood in some embodiments. In other embodiments, the shelf 8010 may be formed from other materials including metal, plastic, or the like. In the exemplified embodiment, a first blind hole 8017 and a second blind hole 8018 are formed into the rear surface 8012 of the shelf in a spaced apart manner. The first and second blind holes 8017, 8018 extend a distance into the shelf 8010, but do not extend all the way through to the front edge 8011 of the shelf 8010. Although two of the blind holes 8017, 8018 are utilized in this embodiment, it is noted that fewer or more fasteners can be used, and as a result, fewer or more blind holes can be provided. Further, although the two blind holes 8017, 8018 are equally spaced from the corresponding side edges 8013, 8014 of the shelf 8010, the two blind holes 8017, 8018 may be positioned anywhere along the rear face 8012 of the shelf 8010 in other embodiments.

The first and second shelf fasteners 8030, 8130 comprise a first portion 8031, 8131 and a second portion 8032, 8132. The second portion 8032, 8132 of the first and second shelf fasteners 8030, 8130 are threaded in the exemplified embodiment and the first portions 8031, 8131 of the first and second shelf fasteners 8030, 8130 are not threaded in the exemplified embodiment. The first and second shelf fasteners 8030, 8130 are coupled to the shelf 8010 so that the second portions 8032, 8132 of the first and second shelf fasteners 8030, 8130 are embedded within the shelf 8010 and the first portions 8031, 8131 of the first and second shelf fasteners 8030, 8130 protrude from the rear edge 8012 of the shelf 8010. The threads on the second portions 8032, 8132 of the first and second shelf fasteners 8030, 8130 may facilitate the coupling of the first and second shelf fasteners 8030, 8130 to the shelf 8010. The first shelf fastener 8030 may be coupled to the shelf 8010 within the first blind hole 8017 and the second shelf fastener 8130 may be coupled to the shelf 8010 within the second blind hole 8018. In some embodiments, the first and second shelf fasteners 8030, 8130 may create the first and second blind holes 8017, 8018 when being coupled to the shelf 8010. In other embodiments, the first and second blind holes 8017, 8018 may be formed first (such as by drilling), and then the first and second shelf fasteners 8030, 8130 may be coupled to the shelf 8010 within the first and second shelf fasteners 8030, 8130. In some embodiments, the first and second shelf fasteners 8030, 8130 may be attached to the shelf 8010 by the manufacturer so that the shelf 8010 is sold with the first and second shelf fasteners 8030, 8130 already attached.

The second portions 8032, 8132 of the first and second shelf fasteners 8030, 8130 need not be threaded in all embodiments. The threads facilitate the coupling of the first and second shelf fasteners 8030, 8130 to the shelf 8010 in the exemplified embodiment, but other techniques can be used to achieve this coupling. For example, the second portions 8032, 8132 of the first and second shelf fasteners 8030, 8130 may have a diameter that ensures a very tight interference or friction fit between the first and second shelf fasteners 8030, 8130 and the shelf 8010. In other embodiments, adhesives or welding can be used to couple the first and second shelf fasteners 8030, 8130 to the shelf 8010. Thus, although in the exemplified embodiment the second portions 8032, 8132 of the first and second shelf fasteners 8030, 8130 are threaded for coupling to the shelf 8010, the invention is not to be so limited and other techniques, structures, or the like may be used.

In the exemplified embodiment, the shelf 8010 may be formed from wood and the first and second shelf fasteners 8030, 8130 may be formed from metal. However, the invention is not to be so limited. In other embodiments, the shelf 8010 and the first and second shelf fasteners 8030, 8130 may all be formed from wood. In still other embodiments, the shelf 8010 and the first and second shelf fasteners 8030, 8130 may all be formed from metal. In such an embodiment, the first and second shelf fasteners 8030, 8130 may be welded to the shelf 8010. In some embodiments, an adhesive may be used to secure the first and second shelf fasteners 8030, 8130 to the shelf 8010, and in such embodiments the second portions 8032, 8132 of the first and second shelf fasteners 8030, 8130 may not be threaded. The first and second shelf fasteners 8030, 8130 may alternatively be formed from plastic and secured to the shelf 8010 using threads, adhesive, welding, or any other means.

Referring to FIGS. 147A-147D and 8148, the process of mounting the shelf system 8000 to the support structure 8005 will be described. FIG. 148 illustrates the fully assembled and mounted shelf system 8000 and should be viewed in conjunction with each of FIGS. 147A-147D for a full understanding of the invention and structural cooperation among the components. Referring first to FIG. 147A in conjunction with FIG. 148, the first and second mounting brackets 8020, 8120 of the mounting bracket assembly 8110 are positioned adjacent to an exposed outer surface 8008 of the support structure 8005. In this embodiment, there are two holes pre-drilled into the support structure 8005, identified as openings 8006. The openings 8006 can be pre-drilled with a drill in some embodiments. In other embodiments, there may not be pre-drilled openings 8006. The first and second mounting brackets 8020, 8120 are positioned with their rear surfaces 8024, 8124 facing the exposed outer surface 8008 of the support structure 8005 and positioned so that the first and second mounting apertures 8026, 8126 are aligned with the pre-drilled holes 8006 in the support structure 8005.

The first and second mounting brackets 8020, 8120 are mounted to the support structure 8005 as follows. The first wall fastener 8050 (in the unexpanded state) is inserted into the first mounting aperture 8026 through the first opening 8027 in the distal end 8025 of the shelf support portion 8022 of the first bracket 8020. The first wall fastener 8050 is moved axially through the first mounting aperture 8026 until the head 8055, which forms an annular flange 41 that extends from the threaded portion of the first wall fastener 8050, abuts against the shoulder 8203 of the inner surface 8202 of the shelf support portion 8022 of the first bracket 8020. The head 8055 of the first wall fastener 8050 cannot fit into the second portion 8207 of the first mounting aperture 8026 due to the diameter of the head 8055 being greater than the diameter of the second portion 8206 of the first mounting aperture 8026. Thus, upon the head 8055 abutting against the shoulder 8203, the first wall fastener 8050 cannot be moved axially any further in the direction of the support structure 8005.

When the first wall fastener 8050 is fully inserted into the first mounting aperture 8026, the head 8055 (i.e., a first portion of the first wall fastener) is positioned within the first portion 8206 of the first mounting aperture 8026 and the annular flange 41 formed by the head 8055 abuts against the shoulder 8203. Furthermore, a second portion 57 of the first wall fastener 8050 is positioned within the second portion 8207 of the first mounting aperture 8026. Finally, a third portion 8058 of the first wall fastener 8050 protrudes from the rear surface 8024 of the first bracket member 8020. The second and third portions 8057, 8058 of the first wall fastener 8050 comprise threaded portions of the central threaded bolt 8053. As the first wall fastener 8050 is moved axially through the first mounting aperture 8026 of the first mounting bracket 8020, the third portion 8058 of the first wall fastener 8050 extends into the opening 8006 in the support structure 8005. Once the first wall fastener 8050 is in its final position, the first wall fastener 8050 is rotated as described above with reference to FIGS. 145A and 145B to alter the first wall fastener 8050 from its unexpanded state to its expanded state, which is what is shown in FIG. 148. In the expanded state, the wings abut against the non-exposed surface 8007 of the support structure 8005 and prevent the first wall fastener 8050 from being removed from the support structure 8005.

Although the description above is made with regard to the first wall fastener 8050 which has an unexpanded and expanded state, as noted above the mounting of the first (and the second) mounting bracket 8020 to the support structure 8005 can be achieved with a conventional screw or other fastener in other embodiments. That is, a screw can be inserted into the first mounting aperture 8026 so that the flange of the head of the screw abuts against the shoulder 8203. The portion of the screw that protrudes from the rear surface 8024 of the first mounting bracket 8020 enters into the support structure 8005 and is coupled thereto using traditional means, such as the screw being in direct contact with the support structure 8005 or with the use of additional wall anchors.

The same process is then performed with the second wall fastener 8150 and the second mounting bracket 8120. Specifically, the second wall fastener 8150 is inserted into the second mounting aperture 8126 through the first opening 8127 in the distal end 8125 of the shelf support portion 8122 of the second mounting bracket 8120. The second wall fastener 8150 is moved axially towards the support surface 8005 until the head 8155 of the second wall fastener 8150 abuts the shoulder of the second mounting bracket 8120. The second wall fastener 8150 can then be altered from the unexpanded state to the expanded state if the second wall fastener 8150 has the structure shown and described with reference to FIGS. 145A and 145B. Of course, as noted above, the first and second wall fasteners 8050, 8150 could be screws used alone or in conjunction with wall anchors, which would negate the need and ability to alter them between unexpanded and expanded states.

Upon the first and second wall fasteners 8050, 8150 being inserted into the first and second mounting apertures 8026, 8126 of the first and second bracket members 820, 8120 of the mounting bracket assembly 8110 and coupled to the support structure 8005, the mounting bracket assembly 8110 is mounted to the support surface 8005. As shown in FIG. 147A, the first and second shelf fasteners 8030, 8130 are coupled to the shelf 8010 so that the first portions 8031, 8131 of the first and second shelf fasteners 8030, 8130 protrude from the rear surface 8012 of the shelf 8010. The first portions 8031, 8131 of the first and second shelf fasteners 8030, 8130 may comprise one or more recesses 8033, 8133 (or an annular recess) which will cooperate with the set screws 8040, 8140 to lock the shelf 8010 to the first and second mounting brackets 8020, 8120 and prevent disassembly until the set screws 8040, 8140 are disengaged from the first and second shelf fasteners 8030, 8130.

Next, the shelf 8010 is mounted or coupled to the mounting bracket assembly 8110. Referring to FIG. 147B in conjunction with FIG. 148, the rear surface 8012 of the shelf 8010 is positioned facing the support structure 8005 and the distal ends 8025, 8125 of the shelf support portions 8022, 8122 of the first and second bracket members 8020, 8120. In the exemplified embodiment, the first and second hook members 8060, 8160 are also used and mounted to the support structure 8005. Thus, in this embodiment, the first and second hook members 8060, 8160 are positioned in between the rear surface 8012 of the shelf 8010 and the distal ends 8025, 8125 of the first and second bracket members 820, 8120. The first and second hook members 8060, 8160 each comprise a mounting portion 8061, 8161 and a hook portion 8062, 8162. The mounting portions 61, 8161 are configured for mounting the hook members 8060, 8160 between the shelf 8010 and the first and second mounting brackets 8020, 8120 and the hook portions 8062, 8162 hang beneath the shelf 8010 so that articles can be hung therefrom. In the exemplified embodiment, the mounting portions 8061, 8161 of the first and second hook members 8060, 8160 each comprise a through-hole 8063, 8163. When assembled, the first portions 8031, 8131 of the first and second shelf fasteners 8030, 8130 extend through the through-holes 8063, 8163 of the mounting portions 8061, 8161 of the first and second hook members 8060, 8160, respectively. The first portions 8031, 8131 of the first and second shelf fasteners 8030, 8130 may be inserted through the through-holes 8063, 8163 of the hook members 8060, 8160 prior to coupling the shelf 8010 to the first and second mounting brackets 8020, 8120. Alternatively, the first and second hook members 8060, 8160 may be placed against the distal ends 8025, 8125 of the first and second bracket members 8020, 8120 and then the first portions 8031, 8131 of the first and second shelf fasteners 8030, 8130 may be inserted through the through-holes 8063, 8163 as the first and second shelf fasteners 8030, 8130 are being inserted into the first and second mounting apertures 8026, 8126 of the first and second bracket members 8020, 8120. Moreover, as noted above, in still other embodiments the first and second hook members 8060, 8160 could be omitted.

Once the shelf 8010 is positioned so that the first portions 8031, 8131 of the first and second shelf fasteners 8030, 8130 are aligned with the first and second mounting brackets 8020, 8120 as shown in FIG. 147B, the shelf 8010 is moved towards the first and second mounting brackets 8020, 8120 and therefore towards the exposed surface 8008 of the support structure 8005. The shelf 8010 is moved towards the first and second mounting brackets 8020, 8120 until the first portions 8031, 8131 of the first and second shelf fasteners 8030, 8130 extend through the first openings 8027, 8127 in the distal ends 8025, 8125 of the first and second shelf engaging portions 8022, 8122 of the first and second mounting brackets 8020, 8120. As noted, the first and second hook members 8060, 8160 may be positioned between the rear edge 8012 of the shelf 8010 and the distal ends 8025, 8125 of the first and second shelf engaging portions 8022, 8122 of the first and second mounting brackets 8020, 8120. In other embodiments, the first and second hook members 8060, 8160 may be omitted. In either case, the rear edge 8012 of the shelf 8010 is adjacent to the distal ends 8025, 8125 of the first and second shelf engaging portions 8022, 8122 of the first and second mounting brackets 8020, 8120. If the hook members 8060, 8160 are omitted, the rear edge 8012 may be in direct contact with (i.e., abutting contact with) the distal ends 8025, 8125 of the first and second shelf engaging portions 8022, 8122 of the first and second mounting brackets 8020, 8120. If the first and second hook member 8060, 8160 are included as shown, the mounting portions 8061, 8161 of the first and second hook members 8060, 8160 are disposed between the rear edge 8012 of the shelf 8010 and the distal ends 8025, 8125 of the first and second mounting brackets 8020, 8120. In either case, the rear edge 8012 of the shelf 8010 is spaced from the support structure 8005 by at least the length of the first and second mounting brackets 8020, 8120 (also by the thickness of the mounting portions 8061, 8161 of the first and second hook members 8060, 8160 when they are used as a part of the shelf system 8000).

Referring to FIGS. 147C and 148, upon the first portions 8031, 8131 of the first and second shelf fasteners 8030, 8130 being fully inserted into the first and second mounting apertures 8026, 8126, the set screws 8040, 8140 may be tightened to lock the shelf 8010 to the mounting bracket assembly 8110. When the first portions 8031, 8131 of the first and second shelf fasteners 8030, 8130 are fully inserted within the first and second mounting apertures 8026, 8126 of the first and second shelf engaging portions 8022, 8122 of the mounting bracket assembly 8110, at least one of the recesses 8033, 8133 of the shelf fastener 8030 will be aligned with the locking aperture 8208 of the first and second mounting brackets 8020, 8120. The set screws 8040, 8140 are then inserted through the locking aperture 8208 such that the tips of the set screws 8040, 8140 nest within one of the recesses 8033, 8133 of the first and second shelf fasteners 8030, 8130 to frictionally engage the first and second shelf fasteners 8030, 8130 and prevent any subsequent movement. Once fully secured, a head of the set screws 8040, 8140 may be flush with the exterior surface of the sidewall 8200 of the first and second shelf engaging portions 8022, 8122, as best shown in FIG. 148

In the exemplified embodiment, the second portions 8032, 8132 of the first and second shelf fasteners 8030, 8130 are threaded, but this is not required in all embodiments. In alternative embodiments the second portions 8032, 8132 of the first and second shelf fasteners 8030, 8130 could be a nail or any other fastener that is suitable for securing the shelf 8010 to the mounting brackets 8020. Further, although the first portions 8031, 8131 of the first and second shelf fasteners 8030, 8130 are unthreaded in the exemplified embodiment, this could be accomplished instead through the use of threads or any other suitable means for retaining an element within an aperture. Moreover, the recesses 8033, 8133 of the first and second shelf fasteners 8030, 8130 could be threaded or annular recesses to more securely engage the set screws 8040, 8140. In another embodiment, the set screws 8040, 8140 and recesses 8033, 8133 could be replaced with a hitch pin, slotted bolt, screw, or any other remove able fastener for preventing the movement of the first and second shelf fasteners 8030, 8130.

Thus, the first and second set screws 8040, 8140 may be tightened until a tip portion of the set screws 8040, 8140 enters into the recesses 8033, 8133 of the first portions 8031, 8131 of the first and second shelf fasteners 8030, 8130. The set screws 8040, 8140 do not provide any additional structural support for the shelf system 8000, but merely prevent inadvertent disassembly of the shelf system 8000. Specifically, in order to disassemble the shelf assembly 8081, the set screws 8040, 8140 need to be loosened in order for the shelf 8010 and the first and second shelf fasteners 8030, 8130 to be detached from the mounting bracket assembly 8110.

FIG. 147D illustrates the shelf system 8000 fully mounted on the support surface 8005, although the hook members 8060, 8160 have been omitted in FIG. 147D. As noted above, the hook members 8060, 8160 are an optional addition to the shelf system 8000 in some embodiments and are in not required for the shelf system 8000 to be complete. This embodiment may be useful when installing multiple shelf systems 8001 in a vertical array because the presence of the hook members 8060, 8160 would otherwise interfere with the shelf space for each of the shelf assemblies below.

As seen in FIG. 148, the first portion 8031 of the shelf fastener 8030 and the head 8055 of the wall fastener 8050 are both positioned within the first portion 8206 of the first mounting aperture 8026 of the first mounting bracket 8020. However, the lengths of the shelf fastener 8030 and the wall fastener 8050 are such that a gap (i.e., an axial space) exists within the first mounting aperture 8026 between a distal end 8035 of the shelf fastener 8030 and an end 8059 of the wall fastener 8050 that is defined by the head 8055 of the wall fastener 8050. This ensures that the shelf fasteners 8030 do not abut against the wall fasteners 8050 in such a way that might prevent the shelf 8010 from being fully assembled onto the mounting bracket assembly 8110. It should be noted that the cavity axis A-A is oriented perpendicular to the support structure 8005 and parallel to the upper surface 8015 of the shelf 8010.

Moreover, although in the exemplified embodiment the first and second mounting brackets 8020, 8120 are secured to the support structure 8005 by inserting the wall fasteners 8050, 8150 into the mounting apertures 8026, 8126 of the first and second mounting brackets 8020, 8120, the invention is not to be so limited in all embodiments. In an alternative embodiment, a plurality of apertures may be formed through the wall engaging portion 8021, 8121 of the first and second mounting brackets 8020, 8120, and screws can be inserted into the apertures in the wall engaging portions 8021, 8121 to couple the first and second mounting brackets 8020, 8120 to the support structure 8005. However, the exemplified embodiment may be desirable due to its aesthetic appeal whereby no screws or fasteners are visible in the fully assembled shelf system 8000 (other than the set screws 8040, 8140, but only when the shelf system 8000 is viewed from below).

Furthermore, as seen in FIG. 148, the hook portion 8062 of the first hook member 8060 is offset from the rear edge 8012 of the shelf 8010 towards the front edge 8011 of the shelf 8010. This is due, in part, to the hook member 8060 comprising a horizontal wall 8064 extending between the mounting portion 8061 and the hook portion 8062 of the hook member 8060. The horizontal wall 8064 ensures that the hook portion 8062 is positioned inward of the rear edge 8012 of the shelf 8010. The horizontal wall 8064 could be omitted in alternative embodiments and the hook portion 8062 could therefore be aligned with the rear edge 8012 of the shelf 8010.

In the exemplified embodiment, the first and second wall fasteners 8050, 8150 and the first and second shelf fasteners 8030, 8130 are both placed through the same opening in the distal ends 8025, 8125 of the first and second mounting brackets 8020, 8120. The set screws 8040, 8140 are then tightened to secure the first and second shelf fasteners 8003, 8130 to the first and second mounting brackets 8020, 8120. Although the assembly process describes a specific order, one skilled in the art would recognize that the order of these steps may be rearranged. In order to disassemble the shelf apparatus 8001, a user would simply reverse the order above or its equivalent.

In the exemplified embodiment, the shelf 8010 has a generally rectangular shape and extends perpendicular to the exposed outer surface 8008 of the support structure 8005 such that household items can rest on the upper surface 8015 of the shelf 8010. However, the shelf 8010 is spaced from the support structure 8005 such that its rear edge 8012 does not abut directly against the support surface 8005. Rather, there is a gap between the rear edge 8012 of the shelf 8010 and the support structure 8005. Although the current embodiment of the shelf 8010 has a rectangular shape, the shelf 8010 may be square, triangular, circular, arcuate, or any other shape that can be configured to be mounted on the mounting bracket assembly 8110. Moreover, the shelf 8010 of the current embodiment is made of wood, however in other embodiments the shelf 8010 may be made of plastic, composite, metal, or any other suitable material capable of supporting household items placed thereon.

Referring now to FIG. 149, a shelf system 8201 is illustrated in accordance with another embodiment of the present invention shows. The shelf system 8201 generally comprises a shelf 8210 and a mounting bracket assembly that comprises a first mounting bracket 8220 and a second mounting bracket 8230. The shelf system 8201 also includes the shelf fasteners and the wall fasteners described above with reference to the shelf system 8000, although those components are not visible in FIG. 149. Thus, the shelf system 8201 is identical to the shelf system 8000 described above, except with regard to the shape of the shelf 8210. Specifically, the rear edge 8212 of the shelf 8210 includes a first recessed portion 8213, a second recessed portion 8214, and an extended portion 80215 extending between the first and second recessed portions 8213, 8214. The first and second shelf fasteners (not shown) are coupled to the shelf 8210 along the first and second recessed portions 80213, 8214 of the rear edge 8212. Thus, when the shelf 8210 is coupled to the first and second mounting brackets 8220, 8230 which are coupled to a support structure, the extended portion 8215 of the shelf 8210 may abut against or be immediately adjacent to the exposed outer surface of the support structure. Thus, the extended portion 8215 of the rear edge 8212 of the shelf 8210 fills in the gap between the rear face 8211 of the shelf 8210 and the support structure. The extended portion 8215 may thereby help to maximize the storage space of the shelf 8210 without changing the overall footprint of the shelf 8210. The descriptions of all other features of the shelf system 8000 are applicable to the shelf system 8201, other than the shape of the shelf 8210 as noted herein.

Referring now to FIG. 150, a shelf system 8301 is illustrated which is identical to the shelf system 8201, except it includes the addition of first and second hook members 8360 (only one of which is visible in FIG. 150). This embodiment not only maximizes the shelf space available for the shelf system 301, but it also incorporates the hook members 8360 for additional storage capabilities for items that may not easily rest on the shelf 8310 or that would be better stored if hung.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention.

It will be understood that while the invention has been described in conjunction with specific embodiments thereof, the foregoing description and examples are intended to illustrate, but not limit the scope of the invention. Other aspects, advantages and modifications will be apparent to those skilled in the art to which the invention pertains, and these aspects and modifications are within the scope of the invention and described and claimed herein.

What is claimed is:

1. A mounting system for fastening an accessory to a wall, the system comprising:

- a support structure configured for mounting an accessory thereto, the support structure comprising a perimeter frame formed by a plurality of side elements each including a vertical portion and a horizontal portion;
- a force-distributing plate configured to be positioned against an outer surface of the wall, the force-distributing plate interspersed between the wall and a rear side element of the plurality of side elements which is configured for fastening to the wall, the force-distributing plate creating a gap between the rear side element and the outer surface of the wall;
- a cover configured to cover at least a portion of the gap, the cover having a first rear face and a second rear face offset from the first rear face;
- a fastener that extends through the cover, the rear side element, and the force-distributing plate, the fastener being configured to fasten the cover, the rear side element, and the force-distributing plate to the wall in stacked relationship;
- wherein the first rear face of the cover contacts the rear side element in an installed position, and the second rear face of the cover contacts the outer surface of the wall in the installed position.

2. The system according to claim 1, wherein the vertical portions and the horizontal portions are substantially planar and intersect forming perpendicular corners between adjacent vertical portions.

3. The system according to claim 2, wherein the horizontal portions converge to define a central opening of the support structure.

4. The system according to claim 2, wherein the perimeter frame defines an upwardly open receptacle configured to receive at least a portion of a soap dispenser therein, the soap dispenser including a reservoir and a distributing tube extending downward from the reservoir and through the central opening of the support structure from which soap is dispensed.

5. The system according to claim 2, wherein the support structure defines an upwardly open receptacle configured to receive at least a portion of a shelf insert therein.

6. The system according to claim 5, wherein the shelf insert has a top which extends beyond top edges of the side elements of the support structure to form cantilevered overhangs.

7. The system according to claim 5, wherein the shelf insert has a top which does not extend beyond the side elements of the support structure.

8. The system according to claim 7, wherein the top of the shelf insert is substantially flush with top edges of the side elements.

9. A shelf support system comprising:

a plurality of side elements that are connected to form a perimeter frame, each of the side elements having a bottom edge, a top edge, and an inner surface;

a horizontal flange extending from the inner surfaces of each of the plurality of side elements at the bottom edge of the plurality of side elements;

a receptacle defined by the horizontal flange and the inner surfaces of the plurality of side elements, the receptacle having an open top end at the top edges of the plurality of side elements; and a shelf insert inserted into the upwardly open receptacle, the perimeter frame circumscribing the shelf insert and concealing a side surface of the shelf insert, a top surface of the shelf insert being flush with the top edges of the plurality of side elements.

10. The system of claim 9, wherein the shelf insert is completely inserted into the perimeter frame such that only the top surface is visible after insertion into the perimeter frame and the shelf insert does not extend laterally beyond the side elements.

11. The system according to claim 9, further comprising a central opening that is defined by distal edges of the horizontal flange.

12. The system of claim 9, further comprising:

a force distribution plate; and a cover; and wherein the shelf support system is configured to be positioned along a wall such that: (1) the force distribution plate is in contact with an outer surface of the wall; (2) a rear side element of the plurality of side elements is in contact with an outer surface of the force distribution plate so that the rear side element is spaced from the outer surface of the wall by a gap; and (3) the cover is in contact with the inner surface of the rear side element of the plurality of side elements so that the rear side element is sandwiched between the cover and the force distribution plate; and wherein the shelf support system is configured to be mounted to the wall by at least one fastener that extends through holes in the cover, the rear side element, and the force distribution plate and into the wall.

13. The system of claim 9, wherein the shelf insert has a composite construction comprising a lower core layer formed of a first material, and a veneered upper layer formed of a second material and which defines the top surface.

14. A shelf support system comprising:

a perimeter frame comprising:

a plurality of side elements that are connected together, each of the side elements having a bottom edge, a top edge, and an inner surface;

a horizontal flange extending from the inner surfaces of each of the plurality of side elements at the bottom edge of the plurality of side elements; and a receptacle defined by the horizontal flange and the inner surfaces of the plurality of side elements, the receptacle having an open top end at the top edges of the plurality of side elements; and a shelf insert comprising:

a lower portion having a bottom end, a top end, and an outer surface, the outer surface comprising a first side portion, a second side portion, and a front portion extending between the first and second side portion, the lower portion configured to be positioned within the receptacle so that the bottom surface of the lower portion rests atop of the horizontal flange and at least a portion of the outer surface of the lower portion interfaces with the inner surfaces of the plurality of side elements; and an upper portion that protrudes beyond the first side portion, the second side portion, and the front portion of the outer surface of the lower portion, the upper portion defining a top surface of the shelf insert.

15. The system according to claim 14, further comprising a U-shaped groove formed on an underside of the upper portion of the shelf insert, wherein one or more of the side elements at least partially nest within the groove.

16. The system according to claim 15, wherein the shelf insert comprises a front side, a rear side, a first lateral side, and a second lateral side, wherein the groove includes two parallel groove sections that extend front to back and perpendicularly to the rear side of shelf insert and a transverse groove section extending right to left between front ends of the parallel groove sections.

17. The system according to claim 15, wherein the groove has a depth less than a height of the side elements.

18. The system of claim 14, further comprising:

a force distribution plate; and a cover; and wherein the shelf support system is configured to be positioned along a wall such that the force distribution plate is in contact with an outer surface of the wall and a rear side element of the plurality of side elements is sandwiched between the cover and the force distribution plate; and wherein the shelf support system is configured to be mounted to the wall by at least one fastener that extends through holes in the cover, the rear side element, and the force distribution plate and into the wall.

* * * * *